US008341052B2

(12) United States Patent
Combs

(10) Patent No.: US 8,341,052 B2
(45) Date of Patent: Dec. 25, 2012

(54) COMBINED LOAN AND INVESTMENT SYSTEM AND METHOD

(76) Inventor: Richard T. Combs, Villa Hills, KY (US)

( * ) Notice: Subject to any disclaimer, the term of this patent is extended or adjusted under 35 U.S.C. 154(b) by 393 days.

(21) Appl. No.: 12/577,581

(22) Filed: Oct. 12, 2009

(65) Prior Publication Data

US 2010/0094776 A1 Apr. 15, 2010

Related U.S. Application Data

(63) Continuation-in-part of application No. 11/186,613, filed on Jul. 21, 2005, now Pat. No. 7,603,305.

(60) Provisional application No. 60/589,773, filed on Jul. 21, 2004.

(51) Int. Cl.
*G06Q 40/00* (2006.01)
(52) U.S. Cl. .......................... 705/35; 705/36 R; 705/38
(58) Field of Classification Search .................. None
See application file for complete search history.

(56) References Cited

U.S. PATENT DOCUMENTS

| | | | | |
|---|---|---|---|---|
| 4,875,648 | A | | 10/1989 | Guarnori |
| 4,876,648 | A | * | 10/1989 | Lloyd ............................... 705/38 |
| 4,953,085 | A | * | 8/1990 | Atkins ......................... 705/36 R |
| 5,214,579 | A | * | 5/1993 | Wolfberg et al. ........... 705/36 R |
| 5,673,402 | A | * | 9/1997 | Ryan et al. ....................... 705/38 |
| 5,689,649 | A | * | 11/1997 | Altman et al. .............. 705/36 R |
| 5,704,045 | A | * | 12/1997 | King et al. ....................... 705/35 |
| 5,819,230 | A | * | 10/1998 | Christie et al. .................... 705/4 |
| 5,852,811 | A | * | 12/1998 | Atkins ......................... 705/36 R |
| 5,875,437 | A | * | 2/1999 | Atkins ............................. 705/40 |
| 5,983,206 | A | * | 11/1999 | Oppenheimer ................ 705/38 |
| 5,987,436 | A | * | 11/1999 | Halbrook ..................... 705/36 R |
| 5,991,744 | A | * | 11/1999 | DiCresce .................... 705/36 R |
| 6,148,293 | A | * | 11/2000 | King ............................... 705/35 |
| 7,089,503 | B1 | * | 8/2006 | Bloomquist et al. .......... 715/780 |
| 7,447,663 | B1 | * | 11/2008 | Barker et al. .................... 705/78 |
| 2002/0091610 | A1 | * | 7/2002 | Smith ............................. 705/36 |
| 2002/0123949 | A1 | * | 9/2002 | VanLeeuwen .................. 705/35 |
| 2003/0028478 | A1 | * | 2/2003 | Kinney et al. ................... 705/38 |
| 2003/0149656 | A1 | * | 8/2003 | Magruder et al. ............... 705/38 |
| 2003/0229579 | A1 | * | 12/2003 | Savage et al. .................. 705/38 |
| 2004/0015438 | A1 | * | 1/2004 | Compiano et al. .............. 705/40 |

(Continued)

OTHER PUBLICATIONS

The Variable Universal Mortgage: A product whose time has come, Ed Morrow, Financial Services Advisor, Lexington: May/Jun. 2000. vol. 143, Iss, 3; p. 19.

(Continued)

*Primary Examiner* — Gregory Johnson
(74) *Attorney, Agent, or Firm* — Wood, Herron & Evans, LLP

(57) ABSTRACT

A combined loan and investment program comprises a computer processor and program code configured to be executed by the computer processor to process financial loan and investment data by calculating from the data interest and principal loan payments on a loan principal at a given rate and term, calculating investment performance data on a periodic principal investment deposit at a given rate and calculating loan principal amortization parameters as a function of the investment performance data. The present invention provides a method for paying off a mortgage and simultaneously generating wealth via an investment account by making a payment to a mortgagee, dividing the payment, applying a first portion of the payment to satisfy the interest due on the mortgage, applying a second portion of the payment to an investment account, allowing the investment account to grow and applying a portion of the investment account to satisfy the mortgage.

22 Claims, 4 Drawing Sheets

U.S. PATENT DOCUMENTS

| | | | | |
|---|---|---|---|---|
| 2004/0088247 A1* | 5/2004 | Grant et al. | | 705/38 |
| 2004/0088248 A1* | 5/2004 | Cutler | | 705/38 |
| 2004/0254878 A1* | 12/2004 | Fitzsimmons et al. | | 705/38 |
| 2004/0254879 A1* | 12/2004 | Dickerson | | 705/38 |
| 2005/0071264 A1* | 3/2005 | Tsoa-Lee et al. | | 705/38 |
| 2005/0246267 A1* | 11/2005 | Nichols | | 705/38 |
| 2006/0080200 A1* | 4/2006 | Ashton et al. | | 705/35 |
| 2007/0094127 A1* | 4/2007 | Izyayev | | 705/38 |
| 2008/0249925 A1* | 10/2008 | Nazari et al. | | 705/38 |

OTHER PUBLICATIONS

Fannie Mae Begins Jumbo Underwriting, Ed Staples, Real Estate Finance Today, Washington: Sep. 16, 1996. vol. 13. Iss. 18; p. 12.

Mortgage Models, Interest Rate Risk, and the Consumer: A Four Country Comparison, Soula Proxenos, L G Taff. Housing Finance International. London: Mar. 2003. vol. 17, Iss. 3; p. 14.

Super v. Salary, Barlett, Steve. Australian Accountant. Jul. 1991. vol. 61, Iss. 6; p. 39.

Fun with Figures: Can You Make a Profit on Your Mortgage? Canadian Business. Toronto: Jul. 1983. vol. 56, Iss. 7; pp. 1-2.

Add-On Product to Encourage Savings Is Patented, Mortgage Marketplace, Bethesda: May 10, 1999. vol. 22, Iss. 19; p. 1.

\* cited by examiner

COMPARISON REPORT

CONVENTIONAL LOAN RESULTS      COMBINATION LOAN & INVESTMENT RESULTS

PRINCIPAL BORROWED: _____

ANNUAL PAYMENTS: ___ TOTAL PAYMENTS: ___

ANNUAL INTEREST RATE: ___

REGULAR PAYMENT AMOUNT: ___

TOTAL INTEREST PAID: ___

TOTAL REPAID: ___

ANNUAL COST OF BORROWING (APR): ___

TERM TO REACH LOAN PAYOFF: ___

PRINCIPAL BORROWED: _____

ANNUAL PAYMENTS: ___ TOTAL PAYMENTS: ___

ANNUAL INTEREST RATE: ___

REGULAR PAYMENT AMOUNT: ___

TOTAL INTEREST PAID: ___

PLUS: ___ TOTAL AMOUNT INVESTED: ___

LESS: ___ INVESTMENT VALUE: ___

TOTAL REPAID: ___

ANNUAL COST OF BORROWING (APR): ___

TERM TO REACH LOAN PAYOFF: ___

MINIMUM INVESTMENT RATE OF
RETURN TO REACH LOAN PAYOFF: ___

FIG. 5

COMBINED LOAN AND INVESTMENT SYSTEM AND METHOD

RELATED APPLICATIONS

This application is a continuation in part application of application Ser. No. 11/186,613, filed Jul. 21, 2005, entitled COMBINED LOAN AND INVESTMENT SYSTEM AND METHOD, currently pending, and which will issue as U.S. Pat. No. 7,603,305 on Oct. 13, 2009, and which claims priority to Application 60/589,773 filed Jul. 21, 2004 entitled MORTGAGE ACCELERATION PRODUCTS AND METHODS.

FIELD OF THE INVENTION

The present invention relates to the financial systems and methods and more particularly to a system and method for simultaneously generating wealth while satisfying the interest obligations of a loan.

BACKGROUND OF THE INVENTION

Purchasing a home can be one of the most important financial goals of any consumer. A consumer's home can be one of their largest investments. The number of consumers utilizing a conventional mortgage loan to purchase a home or property, payoff debt, or make improvements increase annually. The average consumer tries to minimize their payment by amortizing over extended periods. Many lenders offer amortization periods for terms of ten, fifteen, thirty, or even forty years. The shorter the amortization schedule, the larger the payment is required. A conventional loan payment requires both principal and interest amounts to be paid as part of each payment. The amount of the conventional loan payment stays the same over the amortized period. The principal payments reduce the loan value, thus decreasing the amount of loan interest paid in subsequent payments. The reduction in the loan balance only occurs from additional principal payments. The equity value increases as the amount of the loan decreases. The equity does not generate any return. The positive growth in value of a property from market appreciation is calculated on the value of the property not the equity. The total out of pocket costs for a conventional loan with a loan rate greater than zero percent are always greater than the face amount of the loan.

Rising home prices are forcing consumers to allocate larger percentages of earned income towards housing. More and more consumers are required to have two incomes to afford a home. Home buyers are paying premiums for properties in attractive areas as housing markets continue to appreciate. Many consumers make a mortgage payment that represents a large percentage of their net income. This strain on the household budget results in rising bankruptcy rates. Finding suitable amounts of disposable income needed to allocate for long term financial goals challenges consumers. With the rising costs of goods and services many consumers are falling short or not adequately meeting their investment goals. The consumer needs control, choices, and flexibility before the housing market reaches a level that puts the dream of owning a home out of reach for the average consumer.

Lending institutions find themselves in a competitive market place. Consumers routinely make loan decisions based primarily on minimizing the current interest rate on their loan. The level of consumer loyalty continues to diminish. As rates decline the volume of loan refinancing increases, therefore the industry is faced with positioning laws prohibiting abusive refinancing arrangements. Lending institutions are faced with many risks. Institutions deal with risks of default, declining property values, interest rate risks, declining fee income from mortgage interest over time and the risk of pricing loans so they are not competitive.

OBJECTS OF THE INVENTION

Accordingly, it is an object of the invention to provide a system for enhancing the financial condition of a borrower.

Another objective of the invention is to increase financial status of a home buyer through home purchase, where the increase is a function of equity growth apart from real estate appreciation.

Another objective of the invention is to enable a home buyer to purchase a home under more favorable long term performance of the financing agreements than exist in a traditional mortgage arrangement.

Another objective is to provide lenders with a financial tool to increase loan volume, reduce refinancing frequency, to increase consumer loyalty, to reduce risks such as default, declining property value, interest rate risk, declining fee income from mortgage interest payments over time, and noncompetitive loan pricing.

The above and other objects and advantages of the present invention shall be made apparent from the accompanying drawings and the brief description thereof.

SUMMARY OF THE INVENTION

The present invention provides for a system that merges lending and investing concepts together to provide a method for consumers and lenders to achieve desirable results by allowing a consumer to continue to make the same monthly payments that are required from a conventional loan and market rates. By adding additional principal, systematically or as a lump sum, the investment objectives will be accelerated. For example, the system can accelerate the time period required to payoff a loan, create income from existing equity, be a wealth builder, allow consumers to maximize the value of a property, or enable a borrower to make declining payments over time. The system provides maximum benefit by allowing the consumer to take control of the investment of the principal otherwise applied to the pay down of a conventional loan balance. However, a conventional loan can be used in the system by using an additional systematic or lump sum investment amount in addition to the conventional loan payment.

The present invention can allow a consumer to make one payment, comprised of a loan and an investment component, or can accommodate separation of the loan investment component. The loan component services the debt obligation. The investment component allows the consumer to have the flexibility to apply payments toward principal. The payment can be an amount applied towards the reduction of the loan amount or be applied to an investment account. The investment amounts may be applied to a variety of options that allow for systematic and lump sum investment. Consolidating lending and investment components allows the consumer to use an easy and flexible vehicle to achieve a variety of financial goals. The institution that provides the product benefits from the fee income from both the loan and investment activity. The institution has the flexibility of selecting and customizing prudent investment options.

The present invention can offer a variety of investment options and vehicles that fit the objectives and the time horizon of the consumer. The system can allow for a self directed investment selection or investments selected and/or mandated by the managing institution. The investment options can include any investment that can possibly generate returns over a period of time, including but not limited to, individual securities, managed funds or sub-accounts, and fixed rate investments. These funds or sub-account choices can be provided through a single or multiple investment managers. The selection of investment options can include choices in all investment categories. A selection of funds can be made available through asset allocation models or individual fund choices can be made available to offer flexibility and diversification. A fixed account option can be made available for short term or conservative investment goals. A fixed rate option can include an investment for specific time periods at a fixed interest rate. Upon maturity of the fixed rate investment the consumer can select another fixed term or choose another investment option. The fixed rate investment can be used to dollar cost average into the variable investments to average the price of the investment over time.

In certain interest rate or market environments a defensive position may be beneficial. Hedging strategies can offset adverse rate or market conditions minimizing worst case scenarios. Hedging can lessen the effects of a sudden rise in interest rates or a decline in market value.

The systematic investment amount can be based on the calculation of a conventional loan payment at any given term and current market rate less the interest only loan payment. If a conventional loan were used as an alternative lending source an additional systematic or lump sum investment would potentially be needed to achieve desired results. The system can offer the flexibility of reducing the amount of the systematic investment. A smaller systematic investment amount or no systematic investment would be necessary if a suitable lump sum investment was invested. Once the principal value accumulates to a suitable level to produce the compound interest necessary to achieve one's goal the systematic investment can be reduced. The time period to achieve the desired results is extended if the investment is under funded by systematic or lump sum investments, withdrawals reduce the principal value below a sustainable level, or the investment return is under the anticipated rate.

As the investment value accumulates, the system can allow the managing institution to treat the investment value as collateral. For example, the institution may receive a security interest in the investment value or account or it may restrict access to the investment value until a required value is reached. This value may be calculated as a percentage of the market value of the property pledged as collateral. Further restrictions can be placed to limit the reduction in the systematic investment amounts until the investment account equals a predetermined value. Additional restrictions placed on withdrawals could be used to help determine the success of the consumer's goal. Exceptions could be available to allow dividends, interest, or systematic withdraws to be used for income needs. If a consumer's goal is income, restrictions may be placed on the investment value from dropping below a certain value. These restrictions can offer the lending institution a level of protection by requiring the investment to be used as collateral in addition to the property. The assignment allows lending institutions to have protection in markets that experience declining property values.

As the investment value increases the product can allow the interest, dividends, or systematic withdrawals to make the scheduled interest only loan payment. The growth of the investment value will be determined by the amount, frequency, and duration of the systematic or lump sum investment, as well as the rate of return on the investment value. Of course, the greater the rate of return and/or the amount of the principal applied, the sooner the investment value will be able to make the scheduled interest only loan payment.

The lending component of the system can offer a proprietary lending relationship with a single lending institution or offer a choice of multiple lenders. Multiple lenders offer the consumer the ability to take advantage of competition. The competition would offer to the consumer the best loan rate and benefits available in the marketplace. The availability of conventional or interest only loan options offer flexibility and gives consumers the potential to maximize their goals.

The present invention can offer tools to the consumer to make better decisions for financial success. Tools offered can be a mortgage amortization calculator, an analysis tool comparing the total cost between payments of a conventional and interest only loan option, and a hypothetical calculator analyzing systematic and lump sum investments. The investment calculator would compare investment rates for set amounts, frequencies, and durations. The calculator can allow for past performance of actual investments to be used to illustrate the performance of the investment component. An investment hypothetical can provide perspective to the type of investment needed to achieve a desired goal. Additional information can be provided such as the rate history of mortgage indices, a history of rates of return of investment indices, a calculator to illustrate the results of the system based upon the amount borrowed, the interest rate charged on the loan, the amount invested, the frequency and duration of the investment, and the interest rate earned on the investment.

The present invention can further comprise software to track activity, educate, and provide hypothetical illustrations. Tables can be provided to track loan and investment activity. The activity tracked could be payment amounts, rates, frequencies, loan balance, price per share, quantity of shares, investment value, and total out of pocket costs. As part of the educational component, testimonials can be provided to show real life examples of the use of the system. Additionally, historical data can be supplied to show past rates of return of investment indices and historical rates on interest only and conventional loan products. Definitions of key terms, words and phrases can also provide education. A tutorial can provide examples to illustrate each goal and the features of the system. Hypothetical illustrations can offer a mathematical projection based upon systematic and lump sum investments or withdraws for specified time periods at given interest rates. The consumer can view the projected results of the investment and loan component compared to a conventional loan. The results can illustrate the time period required to payoff a loan based upon the amount and duration of the payment activity, show amounts available for systematic withdraw, total out of pocket costs, and the value of the investment component for any given duration. Calculations will show a comparison of the total out of pocket costs between the system and a conventional loan. Illustrations can also be provided to show the values of the investment, loan balance and interest payments of the loan if the program were continued beyond the breakeven point, e.g., the time at which the investment value equals the loan balance.

The software can give an institution the flexibility to run illustrations at the point of sale. Fixed investment rates, past performance of investment indices, mutual fund past performance, or a combination of investment options can be used to illustrate the systematic and lump sum investment or withdraw activity for any specified duration, frequency, and investment amount. The illustration can also use various loan rates, balances, and loan types. Tools provided can include a mortgage amortization calculator, a calculator to determine the amount of a loan afforded based upon income and expenses, a cost analysis of using the system versus conventional loans, and hypothetical illustrations based on loan and investment activity. Institutions may want to use proprietary products exclusively or may elect to use additional outside relationships for either lending or investment alternatives. The software can make available a consolidated statement that merges information from mortgage and investment activity together on one statement. The consumer would benefit by being able to make a single payment. The consolidated statement can show the amount of a scheduled mortgage payment due, the principal balance of the loan outstanding, the current interest rate on the loan, a listing of investment options selected, investment activity for the period, and the current quantity and value of investments owned.

The present invention can be embodied in computers and in software and includes methods of obtaining the benefits described.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

FIG. 5 is a comparison report in accordance with one embodiment of the present invention.

DETAILED DESCRIPTION OF THE INVENTION

Figure 1:
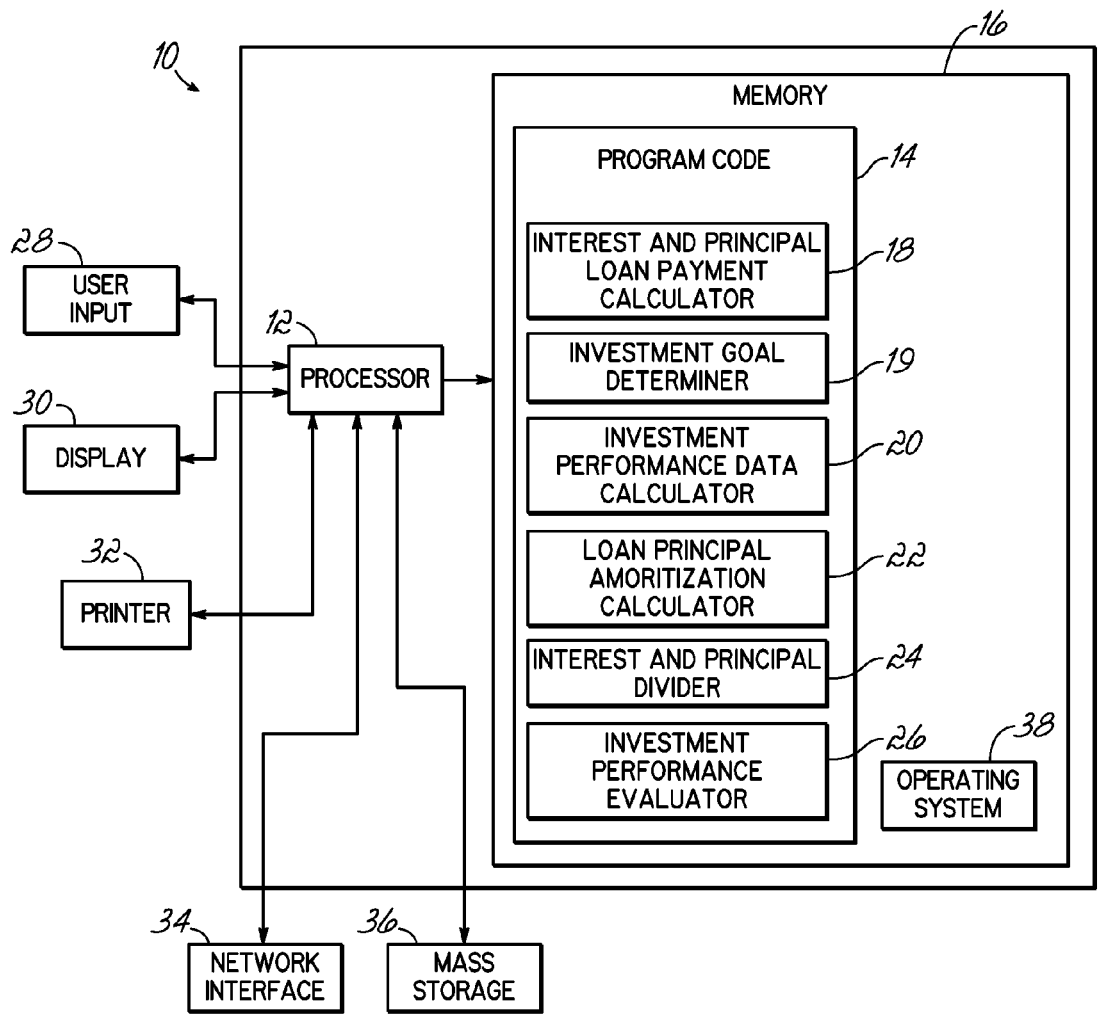
FIG. 1 is a block diagram of the present invention.

Referring to the figures and specifically to FIG. 1, the data processing system 10 for managing a combined loan and investment program preferably comprises a computer processor 12 and program code 14 stored within the memory 16 of the data processing system 10. The computer readable program code 14 is configured to be executed by the computer processor 12 to process financial loan and investment data by calculating from the data interest and principal loan payments on a loan principal at a given rate and term. This function is accomplished by an interest and principal and loan payment calculator or program 18. Additionally, the program code contains an investment goal determiner 19 which determines the investment goals a consumer. The program code also contains an investment performance data or future value calculator or program 20 which calculates investment performance data on periodic principal investment deposits at a given rate. Additionally, the computer readable program code 14 contains a loan principal amortization calculator or program 22 which calculates loan principal amortization parameters as a function of the investment performance data.

In an alternative embodiment, the program code 14 may further include an interest and principal divider or program 24 which further processes the financial loan and investment data by dividing the interest and loan payments into an interest satisfaction portion and a principal reduction portion. This program may further allocate the interest satisfaction portion to satisfy the requisite periodic interest payment for the loan and may further allocate at least a portion of the principal reduction portion as the periodic principal investment deposit.

In yet another embodiment of the present invention, the computer readable program code 14 may include an investment performance evaluator or program 26 which evaluates the investment performance data or investment rate of return to determine when the breakeven point may be reached or when the loan principal may be reduced from the investment program. Depending on the investment vehicle or vehicles that are chosen, i.e., whether they are fixed or variable rate investments, the breakeven point may be static or dynamic. In other words, if the investments selected all have a guaranteed rate of return, and assuming that there is otherwise no default in those investments, then the system 10 will be able to determine a date certain when the breakeven point will be reached. However, if the investments contain at least some variable instruments such as stocks, then the breakeven point will generally change over time, arriving sooner if the investments return better than expected, and later if the investments return less than expected.

In some circumstances, such as where the investment rate of return is very low, such as with a very conservative investment vehicle or where there has been a downturn in an otherwise more profitable investment vehicle, the calculated breakeven point may lie beyond the desired or required loan repayment term. In such cases, the program code 14 will recalculate the needed adjustments, either to the initial lump sum, an additional periodic payment or reduction of principal amount, a minimum investment rate of return needed to achieve the breakeven point during or by the end of the loan repayment term, or the new loan repayment term that will be needed if no other changes are made. The program code 14 can dynamically adjust and recalculate these variables as needed or desired. Hence, if the loan repayment term and the investment rate of return are selected to remain fixed, then the system 10 will provided the necessary lump sum amount and/or the necessary additional periodic payment amount to accomplish a particular financial objective.

The data processing system 10 may further comprise a user input 28, such as a computer keyboard, mouse, touch pad, touch screen, or like interface, as well as a display 30 which are connected to the processor 12. In alternative embodiments, the system 10 may further be interfaced with or located within various portable digital assistant (PDA) or like handheld computing devices 31. Additionally, a printer 32 or other like output device may be connected to the processor 12. The printer 32 may be used to generate paper statements 33, comparison reports or charts 35 (see also FIG. 5 and Tables 1b, 2b, and 3b), and other like products for a consumer. Of course, these products may also be provided electronically to a consumer via email, the Internet 37, or other like interface. In contrast to a traditional mortgage statement, which is typically provided annually, the present system 10 allows a user to receive more frequent statements and feedback, in some cases in a real time or near real time fashion, but at least generally monthly, to monitor the status of the investments and the progress towards the breakeven point. This allows for adjustments to be made as needed by either the user or the lending or investment institution to meet the desired objectives.

The processor 12 may also be connected to a network interface providing conductivity in a local area network, or access to the Internet at large. The processor 12 may also be connected to an additional mass storage unit 36 for storing financial loan and investment data. Finally, the data processing system 10 will typically contain an operating system for enabling the interaction of various hardware and software components.

Figure 2:
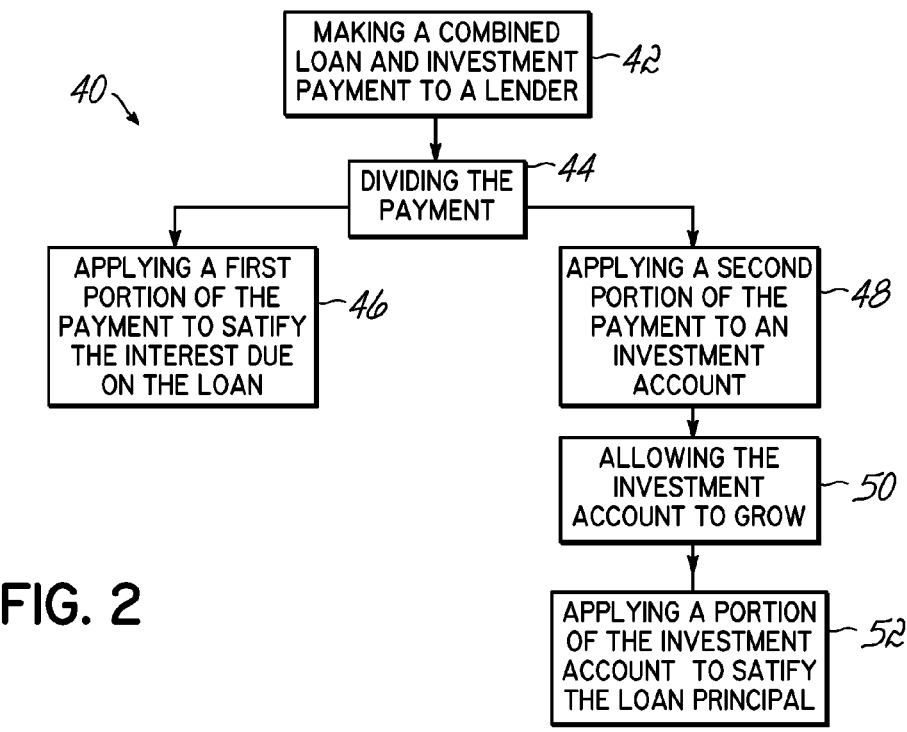
FIG. 2 is a flow chart illustrating the method of the present invention.

Referring to FIG. 2, the method of establishing and using a combined loan and investment system 40 is further illustrated. First, a consumer or borrower/investor, e.g., a mortgagor, makes a combined loan and investment payment to a lender such as a mortgagee (Block 42). The combined loan and investment payment is then divided (Block 44) and a first portion of the payment is applied to satisfy the interest due on the loan (Block 46) and a second portion of the payment is applied to the investment account (Block 48). The investment account is then allowed to grow (Block 50) until sufficient growth and/or principal accumulation occur that a portion of the investment account may be used to satisfy the loan principal (Block 52).

Figure 3:
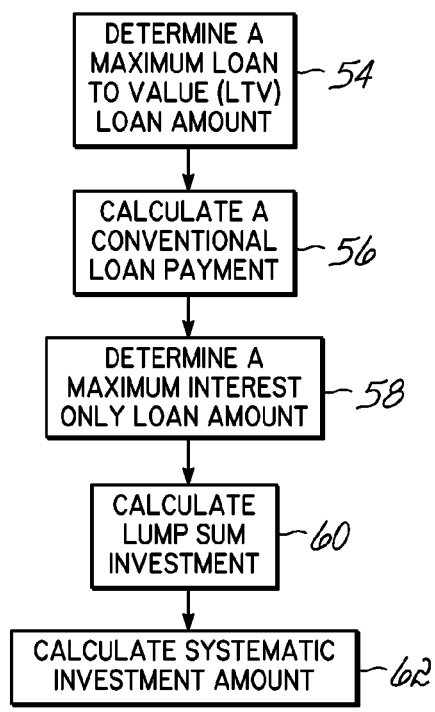
FIG. 3 is a flow chart further illustrating the method of the present invention.
Figure 4:
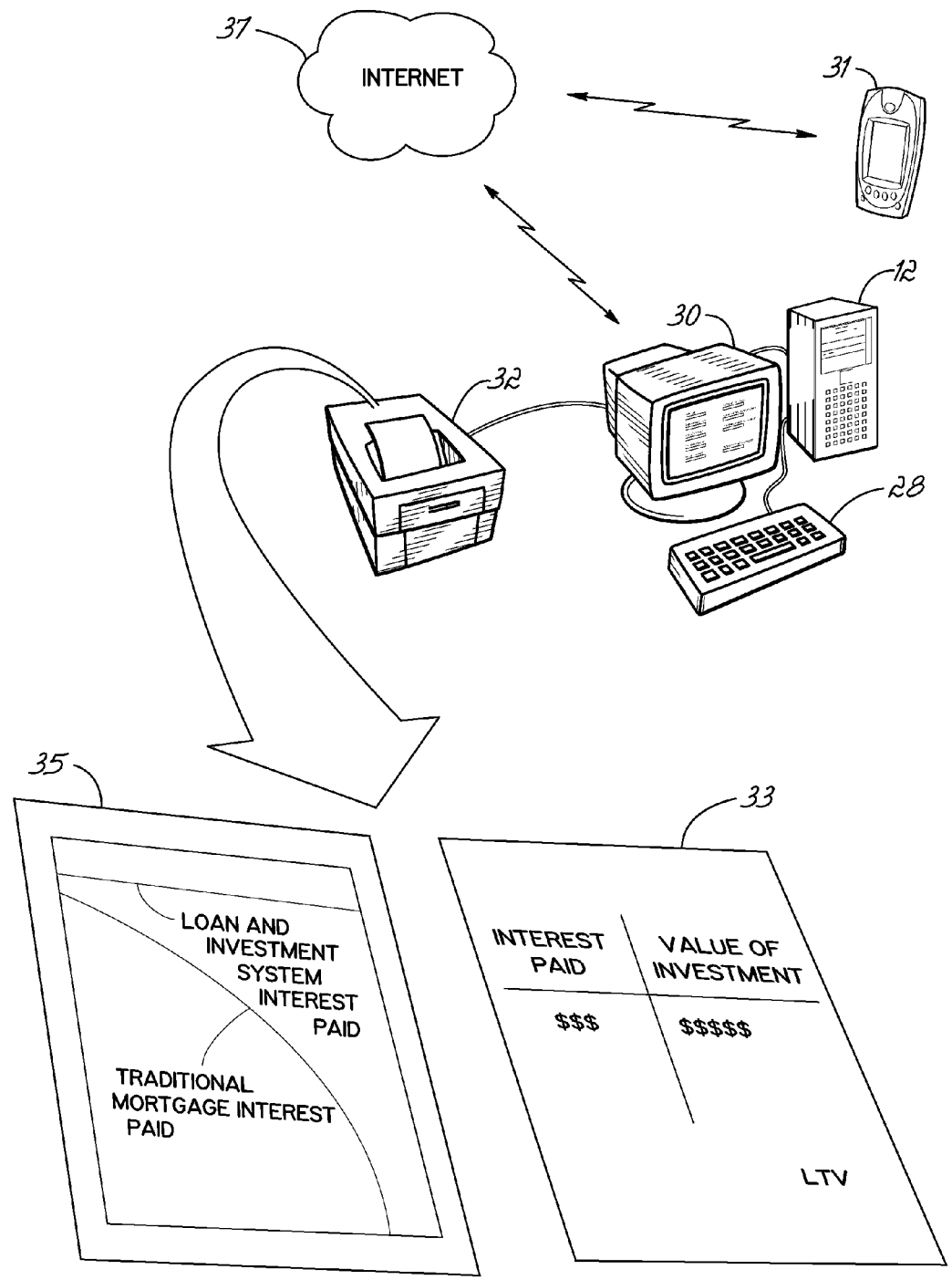
FIG. 4 is a perspective view further illustrating the present invention.

Referring to FIG. 3, the process of the present invention is further illustrated. As will be known to those skilled in the art, the processor 12 may be used to determine a maximum loan to value (LTV) amount (Block 54). The maximum LTV amount is a function of the value of the collateral for the loan multiplied by the loan to value ratio set by the lender or other authority. For example, a typical loan to value ratio might be 80%, wherein the lender will only lend up to 80% of the fair market value of the collateral. Accordingly, if the appraised value of a house is $125,000, and the lender requires a loan to value ratio of 80%, the maximum LTV amount will be $100,000 ($125,000×0.8).

The processor 12 may also be used to calculate a conventional loan payment (Block 56). The following formula may be stored in the program code 14 for performing this calculation.

$$A = P \frac{r(1+r)^n}{(1+r)^n - 1}$$

where

A=monthly payment of principal and interest

P=loan amount r=interest rate per month n=total number of months in loan term

Accordingly, if the loan amount (P) is $100,000 and the annual interest rate was 5.75%, making the interest rate per month (r) one twelfth of that (5.75%÷12), and the term of loan was 30 years making the total number of months (n) 360 (30 years×12 months/year), the monthly payment of principal and interest (A) would be $583.57.

The processor 12 may also be used to determine a maximum interest only loan amount (Block 58). If the annual conventional loan payment amount (e.g., 12×A in the above formula) divided by the interest only loan interest rate is greater or equal to the maximum LTV amount, then the maximum interest only loan amount will be set at the maximum LTV. Otherwise, the maximum interest only loan amount is a function of the annual conventional loan payment amount divided by the interest only loan interest rate. The following examples illustrate the calculation a maximum interest only loan amount (Block 58).

Example 1a

Determination of Maximum Interest Only Loan Amount

| | |
|---|---|
| Property Value: | $125,000.00 |
| Mortgage Balance: | $100,000.00 |
| Conventional Loan Interest Rate: | 5.75% (30 year fixed) |
| Interest Only Loan Rate: | 3.125% |
| LTV Ratio: | 80% |
| Calculate Annual Conventional Loan Payment For A Given Term and Rate | |
| $583.57 per month × 12 months = $7,002.84 | |
| Divide Annual Conventional Loan Payment by Interest Only Loan Rate | |
| $7,002.84 ÷ 0.03125 = $224,090.88 | |
| Comparison to the Maximum LTV Amount | |
| $224,090.88 ≧ $100,000.00 | |
| Maximum Interest Only Loan Amount | |
| $100,000.00 | |

Example 1b

Determination of Maximum Interest Only Loan Amount

| | |
|---|---|
| Property Value: | $250,000.00 |
| Mortgage Balance: | $175,000.00 |
| Conventional Loan Interest Rate: | 5.25% (30 year fixed) |
| Interest Only Loan Rate: | 4.39% |
| LTV Ratio: | 80% |
| Calculate Annual Conventional Loan Payment For A Given Term and Rate | |
| $966.36 per month × 12 months = $11,596.32 | |
| Divide Annual Conventional Loan Payment by Interest Only Loan Rate | |
| $11,596.32 ÷ 0.0439 = $264,153.08 | |
| Comparison to the Maximum LTV Amount | |
| $264,153.08 ≧ $200,000.00 | |
| Maximum Interest Only Loan Amount | |
| $200,000.00 | |

The processor 12 may also be used to calculate the lump sum investment (Bock 60). For situations involving an existing loan, there is first a comparison of whether the outstanding balance on the existing loan is less than the maximum interest only loan amount. If it is, the maximum lump sum investment that can be derived from the existing equity in the collateral is the maximum interest only loan amount less the existing loan amount. The following examples illustrate the calculation the lump sum investment (Bock 60).

Example 2a

Determination of Lump Sum Investment Amount

| | |
|---|---|
| Property Value: | $125,000.00 |
| Mortgage Balance: | $100,000.00 |

-continued

| | |
|---|---|
| Conventional Loan Interest Rate: | 5.75% (30 year fixed) |
| Interest Only Loan Rate: | 3.125% |
| LTV Ratio: | 80% |

Loan Balance Comparison to the Maximum Interest Only Loan Amount $100,000.00 = $100,000.00
Lump Sum Investment Amount $0.00

Example 2b

Determination of Lump Sum Investment Amount

| | |
|---|---|
| Property Value: | $250,000.00 |
| Mortgage Balance: | $175,000.00 |
| Conventional Loan Interest Rate: | 5.25% (30 year fixed) |
| Interest Only Loan Rate: | 4.39% |
| LTV Ratio: | 80% |

Loan Balance Comparison to the Maximum Interest Only Loan Amount $175,000.00 < $200,000.00
Deduct the Loan Balance from the Maximum Interest Only Loan Amount $200,000.00 − $175,000.00 = $25,000.00
Investment Lump Sum Amount $25,000.00

Example 2c

Determination of Lump Sum Investment Amount

See also Table 2b Below

| | |
|---|---|
| Property Value: | $250,000.00 |
| Mortgage Balance: | $160,000.00 |
| Conventional Loan Interest Rate: | 5.75% (30 year fixed) |
| Interest Only Loan Rate: | 5.75% |
| LTV Ratio: | 80% |

Calculate Annual Conventional Loan Payment For A Given Term and Rate $933.72 per month × 12 months = $11,204.64
Divide Annual Conventional Loan Payment by Interest Only Loan Rate $11,204.64 ÷ 0.0575 = $194,863.30
Comparison to the Maximum LTV Amount $194,863.30 < $200,000.00
Maximum Interest Only Loan Amount $194,863.30
Loan Balance Comparison to the Maximum Interest Only Loan Amount $160,000.00 < $194,863.30
Deduct the Loan Balance from the Maximum Interest Only Loan Amount $194,863.30 − $160,000.00 = $34,863.30
Investment Lump Sum Amount $34,863.30

Finally, the processor 12 may also be used to calculate a systematic investment amount (Block 62). When the maximum LTV amount times the interest only interest rate is less than the annual conventional loan payment (A), the systematic investment amount is the annual conventional loan payment (A) less the maximum interest only loan amount times the interest only interest rate. The following examples illustrate the calculation of the systematic investment amount (Block 62).

Example 3a

Determination of Maximum Systematic Investment Amount

| | |
|---|---|
| Property Value: | $125,000.00 |
| Mortgage Balance: | $100,000.00 |
| Conventional Loan Interest Rate: | 5.75% (30 year fixed) |
| Interest Only Loan Rate: | 3.125% |
| LTV Ratio: | 80% |

Calculate Annual Conventional Loan Payment For A Given Term and Rate $583.57 per month × 12 months = $7,002.84
Calculate Annual Interest Only Loan Payment For A Given Rate $100,000.00 × 0.03125 = $3,125.00
Deduct Annual Interest Only Loan Payment From Annual Conventional Loan $7,002.84 − $3,125.00 = $3,877.84
Deduct Annual Interest Only Loan Payment From Annual Conventional Loan $3,877.84 ÷ 12 = $323.15
Maximum Systematic Investment Amount $323.15

Example 3b

Determination of Maximum Systematic Investment Amount

| | |
|---|---|
| Property Value: | $250,000.00 |
| Mortgage Balance: | $175,000.00 |
| Conventional Loan Interest Rate: | 5.25% (30 year fixed) |
| Interest Only Loan Rate: | 4.39% |
| LTV Ratio: | 80% |

Calculate Annual Conventional Loan Payment For A Given Term and Rate $966.36 per month × 12 months = $11,596.32
Calculate Annual Interest Only Loan Payment For A Given Rate $175,000.00 × 0.0439 = $7,682.50
Deduct Annual Interest Only Loan Payment From Annual Conventional Loan Payment $11,596.32 − $7,682.50 = $3,913.82
Divide Difference by Twelve Months $3,913.82 ÷ 12 = $326.16
Maximum Systematic Investment Amount $326.16

Example 3c
Determination of Maximum Systematic Investment Amount

| | |
|---|---|
| Property Value: | $250,000.00 |
| Mortgage Balance: | $175,000.00 |
| Conventional Loan Interest Rate: | 5.25% (30 year fixed) |
| Interest Only Loan Rate: | 4.39% |
| LTV Ratio: | 80% |

Calculate Annual Conventional Loan Payment For A Given Term and Rate $966.36 per month × 12 months = $11,596.32

Calculate Annual Maximum Interest Only Loan Payment For A Given Rate $200,000.00 × 0.0439 = $8,780.00

Deduct Annual Maximum Interest Only Loan Payment from Annual Conventional Loan Payment $11,596.32 − $8,780.00 = $2,816.32

Divide Difference by Twelve Months $2,816.32 ÷ 12 = $234.70

Maximum Systematic Investment Amount $234.70

Further examples of the calculations performed by the present system 10 are contained in the following tables. Table 1 more particularly illustrates the use and application of the present invention in the context of systematic investments. Table 2 more particularly illustrates the use and application of the present invention in the context of a lump sum investment. Finally, table 3 more particularly illustrates the use and application of the present invention in the context of systematic investments and a lump sum investment. Tables 1a, 2a, and 3a provide further examples of the type of data that would be inputted by a user, lender, or investment advisor into the system, i.e., via a computer input device 28. Tables 1b, 2b, and 3b provide further examples of the comparison reports 35 that would be generated or that could be displayed on a monitor 30. Tables 1c, 2c, and 3c provide examples of how the system 10 would perform under various investment rate of return scenarios. Finally, Tables 1d, 2d, and 3d provide examples of the amortization of a corresponding loan under a traditional or conventional approach. In certain embodiments of the present invention, these reports, data sheets, comparison analysis, and the like could be all web enabled and be generated by and calculated by a web based tool operating on the Internet 37.

TABLE 1a

Combined Loan & Investment System Comparison Report Input (Systematic Investment)

| | |
|---|---|
| HOME VALUE: | $250,000.00 |
| EXISTING LOAN AMOUNT: | $160,000.00 |
| CONVENTIONAL LOAN INTEREST RATE: | 5.75% |
| PAYMENTS PER YEAR: | 12 |
| NUMBER OF REGULAR PAYMENTS: | 360 |
| PAYMENT AMOUNT: | $933.72 |
| INTEREST ONLY LOAN RATE: | 5.25% |
| INVESTMENT RATE OF RETURN: | 7.00% |
| INCOME TAX RATE: | 25.00% |
| MAXIMUM LOAN TO VALUE: | 80.00% |

TABLE 1b

Combined Loan & Investment System Comparison Report (Systematic Investment)

| CONVENTIONAL LOAN RESULTS | | COMBINED LOAN & INVESTMENT SYSTEM RESULTS | | DIFFERENCE |
|---|---|---|---|---|
| ANNUAL LOAN INTEREST RATE: | 5.75% | ANNUAL INTEREST ONLY LOAN RATE: | 5.25% | −0.50% |
| NUMBER OF REGULAR PAYMENTS: | 360 | NUMBER OF REGULAR PAYMENTS: | 360 | EQUAL |
| REGULAR PAYMENT AMOUNT: | 933.72 | REGULAR PAYMENT AMOUNT: | $933.72 | EQUAL |
| TOTAL PAYMENTS AT END OF TERM: | $336,139.20 | TOTAL PAYMENTS AT END OF TERM: | $336,139.20 | EQUAL |
| MAXIMUM BANK LTV PERCENT: | 80.00% | MAXIMUM BANK LTV PERCENT: | 80.00% | EQUAL |
| | | INVESTMENT RATE OF RETURN: | 7.00% | 7.00% |
| MAXIMUM LOAN TO VALUE: | $200,000.00 | MAXIMUM LOAN TO VALUE: | $200,000.00 | $200,000.00 |
| PRINCIPAL BORROWED: | $160,000.00 | PRINCIPAL BORROWED: | $160,000.00 | $0.00 |
| TOTAL INTEREST PAID | $176,139.20 | TOTAL INTEREST PAID: | $252,000.00 | $75,860.80 |
| REPAID: | $336,139.20 | TOTAL PRINCIPAL AND INTEREST REPAID: | $412,000.00 | $75,860.80 |
| | | SYSTEMATIC INVESTMENT: | $233.72 | $233.72 |
| | | LUMP SUM INVESTMENT: | $0.00 | $0.00 |
| | | LESS: | | |
| | | INVESTMENT VALUE AT END OF PERIOD: | $286,794.89 | $286,794.89 |
| NET AMOUNT PAID OUT OF POCKET: | $336,139.20 | NET AMOUNT PAID OUT OF POCKET: | $209,344.31 | ($126,794.89) |
| ANNUAL PERCENTAGE RATE | 5.75% | NET COST OF LOAN: | 4.36% | −1.39% |
| INVESTMENT VALUE AFTER LOAN PAYOFF: | $0.00 | INVESTMENT VALUE AFTER LOAN PAYOFF: | $126,794.89 | $126,794.89 |
| TAX SAVINGS: | $44,034.80 | TAX SAVINGS: | $63,000.00 | $18,965.20 |
| TERM TO REACH LOAN PAYOFF: | 360 | TERM TO REACH LOAN PAYOFF: | 276 | −84 |

TABLE 1c

Combined Loan and Investment System Comparison Report Data (Systematic Investment)

| | |
|---|---|
| LOAN | $160,000 |
| RATE | 5.25% |
| LUMP SUM INVESTMENT | $0.00 |
| SYSTEMATIC INVESTMENT | $233.72 |

| | COST OF BORROWING | | | | | | | |
|---|---|---|---|---|---|---|---|---|
| | MONTHLY | TOTAL | CUMMULATIVE | | | INVESTMENT VALUE | | |
| DATE | INTEREST PAYMENT | INTEREST PAID | INVESTMENT AMOUNT | 1% | 2% | 3% | 4% | 5% |
| 1 | $700.00 | $700.00 | $233.72 | $233.91 | $234.11 | $234.30 | $234.50 | $234.69 |
| 2 | $700.00 | $1,400.00 | $467.44 | $468.02 | $468.61 | $469.19 | $469.78 | $470.37 |

TABLE 1c-continued

Combined Loan and Investment System Comparison Report Data (Systematic Investment)

|  |  | LOAN | $160,000 |  |  |  |
|---|---|---|---|---|---|---|
|  |  | RATE | 5.25% |  |  |  |
|  |  | LUMP SUM INVESTMENT | $0.00 |  |  |  |
|  |  | SYSTEMATIC INVESTMENT | $233.72 |  |  |  |

| | | | | | | | | |
|---|---|---|---|---|---|---|---|---|
| 3 | $700.00 | $2,100.00 | $701.16 | $702.33 | $703.50 | $704.67 | $705.84 | $707.02 |
| 4 | $700.00 | $2,800.00 | $934.88 | $936.83 | $938.78 | $940.74 | $942.70 | $944.66 |
| 5 | $700.00 | $3,500.00 | $1,168.60 | $1,171.52 | $1,174.46 | $1,177.39 | $1,180.34 | $1,183.29 |
| 6 | $700.00 | $4,200.00 | $1,402.32 | $1,406.42 | $1,410.52 | $1,414.64 | $1,418.77 | $1,422.91 |
| 7 | $700.00 | $4,900.00 | $1,636.04 | $1,641.50 | $1,646.98 | $1,652.48 | $1,658.00 | $1,663.54 |
| 8 | $700.00 | $5,600.00 | $1,869.76 | $1,876.79 | $1,883.84 | $1,890.92 | $1,898.03 | $1,905.16 |
| 9 | $700.00 | $6,300.00 | $2,103.48 | $2,112.26 | $2,121.09 | $2,129.95 | $2,138.85 | $2,147.79 |
| 10 | $700.00 | $7,000.00 | $2,337.20 | $2,347.94 | $2,358.73 | $2,369.58 | $2,380.48 | $2,391.44 |
| 11 | $700.00 | $7,700.00 | $2,570.92 | $2,583.81 | $2,596.77 | $2,609.81 | $2,622.91 | $2,636.09 |
| 12 | $700.00 | $8,400.00 | $2,804.64 | $2,819.88 | $2,835.21 | $2,850.64 | $2,866.16 | $2,881.77 |
| 13 | $700.00 | $9,100.00 | $3,038.36 | $3,056.14 | $3,074.04 | $3,092.07 | $3,110.21 | $3,128.47 |
| 14 | $700.00 | $9,800.00 | $3,272.08 | $3,292.60 | $3,313.28 | $3,334.10 | $3,355.08 | $3,376.20 |
| 15 | $700.00 | $10,500.00 | $3,505.80 | $3,529.26 | $3,552.91 | $3,576.74 | $3,600.76 | $3,624.96 |
| 16 | $700.00 | $11,200.00 | $3,739.52 | $3,766.12 | $3,792.94 | $3,819.99 | $3,847.26 | $3,874.76 |
| 17 | $700.00 | $11,900.00 | $3,973.24 | $4,003.17 | $4,033.37 | $4,063.84 | $4,094.58 | $4,125.60 |
| 18 | $700.00 | $12,600.00 | $4,206.96 | $4,240.42 | $4,274.20 | $4,308.31 | $4,342.73 | $4,377.48 |
| 19 | $700.00 | $13,300.00 | $4,440.68 | $4,477.87 | $4,515.44 | $4,553.38 | $4,591.71 | $4,630.42 |
| 20 | $700.00 | $14,000.00 | $4,674.40 | $4,715.52 | $4,757.07 | $4,799.07 | $4,841.51 | $4,884.40 |
| 21 | $700.00 | $14,700.00 | $4,908.12 | $4,953.36 | $4,999.11 | $5,045.37 | $5,092.15 | $5,139.45 |
| 22 | $700.00 | $15,400.00 | $5,141.84 | $5,191.40 | $5,241.55 | $5,292.29 | $5,343.62 | $5,395.56 |
| 23 | $700.00 | $16,100.00 | $5,375.56 | $5,429.65 | $5,484.40 | $5,539.82 | $5,595.93 | $5,652.73 |
| 24 | $700.00 | $16,800.00 | $5,609.28 | $5,668.09 | $5,727.65 | $5,787.98 | $5,849.08 | $5,910.98 |
| 25 | $700.00 | $17,500.00 | $5,843.00 | $5,906.72 | $5,971.30 | $6,036.75 | $6,103.08 | $6,170.30 |
| 26 | $700.00 | $18,200.00 | $6,076.72 | $6,145.56 | $6,215.36 | $6,286.15 | $6,357.92 | $6,430.71 |
| 27 | $700.00 | $18,900.00 | $6,310.44 | $6,384.60 | $6,459.83 | $6,536.17 | $6,613.61 | $6,692.20 |
| 28 | $700.00 | $19,600.00 | $6,544.16 | $6,623.83 | $6,704.71 | $6,786.81 | $6,870.16 | $6,954.77 |
| 29 | $700.00 | $20,300.00 | $6,777.88 | $6,863.27 | $6,949.99 | $7,038.08 | $7,127.56 | $7,218.45 |
| 30 | $700.00 | $21,000.00 | $7,011.60 | $7,102.90 | $7,195.69 | $7,289.98 | $7,385.82 | $7,483.22 |
| 31 | $700.00 | $21,700.00 | $7,245.32 | $7,342.73 | $7,441.79 | $7,542.51 | $7,644.93 | $7,749.09 |
| 32 | $700.00 | $22,400.00 | $7,479.04 | $7,582.77 | $7,688.30 | $7,795.67 | $7,904.92 | $8,016.07 |
| 33 | $700.00 | $23,100.00 | $7,712.76 | $7,823.00 | $7,935.22 | $8,049.47 | $8,165.77 | $8,284.17 |
| 34 | $700.00 | $23,800.00 | $7,946.48 | $8,063.44 | $8,182.56 | $8,303.89 | $8,427.48 | $8,553.38 |
| 35 | $700.00 | $24,500.00 | $8,180.20 | $8,304.07 | $8,430.31 | $8,558.96 | $8,690.07 | $8,823.71 |
| 36 | $700.00 | $25,200.00 | $8,413.92 | $8,544.90 | $8,678.47 | $8,814.66 | $8,953.54 | $9,095.17 |
| 37 | $700.00 | $25,900.00 | $8,647.64 | $8,785.94 | $8,927.04 | $9,071.00 | $9,217.88 | $9,367.76 |
| 38 | $700.00 | $26,600.00 | $8,881.36 | $9,027.18 | $9,176.03 | $9,327.98 | $9,483.11 | $9,641.49 |
| 39 | $700.00 | $27,300.00 | $9,115.08 | $9,268.61 | $9,425.43 | $9,585.61 | $9,749.22 | $9,916.35 |
| 40 | $700.00 | $28,000.00 | $9,348.80 | $9,510.25 | $9,675.25 | $9,843.87 | $10,016.22 | $10,192.36 |
| 41 | $700.00 | $28,700.00 | $9,582.52 | $9,752.09 | $9,925.48 | $10,102.79 | $10,284.10 | $10,469.53 |
| 42 | $700.00 | $29,400.00 | $9,816.24 | $9,994.13 | $10,176.14 | $10,362.35 | $10,552.88 | $10,747.84 |
| 43 | $700.00 | $30,100.00 | $10,049.96 | $10,236.38 | $10,427.21 | $10,622.56 | $10,822.56 | $11,027.32 |
| 44 | $700.00 | $30,800.00 | $10,283.68 | $10,478.82 | $10,678.69 | $10,883.42 | $11,093.13 | $11,307.96 |
| 45 | $700.00 | $31,500.00 | $10,517.40 | $10,721.47 | $10,930.60 | $11,144.93 | $11,364.61 | $11,589.77 |
| 46 | $700.00 | $32,200.00 | $10,751.12 | $10,964.32 | $11,182.93 | $11,407.10 | $11,636.99 | $11,872.76 |
| 47 | $700.00 | $32,900.00 | $10,984.84 | $11,207.37 | $11,435.68 | $11,669.92 | $11,910.28 | $12,156.92 |
| 48 | $700.00 | $33,600.00 | $11,218.56 | $11,450.62 | $11,688.85 | $11,933.40 | $12,184.48 | $12,442.27 |
| 49 | $700.00 | $34,300.00 | $11,452.28 | $11,694.08 | $11,942.44 | $12,197.54 | $12,459.59 | $12,728.80 |
| 50 | $700.00 | $35,000.00 | $11,686.00 | $11,937.74 | $12,196.45 | $12,462.34 | $12,735.62 | $13,016.53 |
| 51 | $700.00 | $35,700.00 | $11,919.72 | $12,181.60 | $12,450.89 | $12,727.80 | $13,012.57 | $13,305.46 |
| 52 | $700.00 | $36,400.00 | $12,153.44 | $12,425.67 | $12,705.75 | $12,993.92 | $13,290.45 | $13,595.60 |
| 53 | $700.00 | $37,100.00 | $12,387.16 | $12,669.94 | $12,961.03 | $13,260.71 | $13,569.25 | $13,886.94 |
| 54 | $700.00 | $37,800.00 | $12,620.88 | $12,914.41 | $13,216.74 | $13,528.17 | $13,848.98 | $14,179.49 |
| 55 | $700.00 | $38,500.00 | $12,854.60 | $13,159.09 | $13,472.88 | $13,796.29 | $14,129.64 | $14,473.27 |
| 56 | $700.00 | $39,200.00 | $13,088.32 | $13,403.97 | $13,729.45 | $14,065.09 | $14,411.24 | $14,768.27 |
| 57 | $700.00 | $39,900.00 | $13,322.04 | $13,649.06 | $13,986.44 | $14,334.55 | $14,693.78 | $15,064.50 |
| 58 | $700.00 | $40,600.00 | $13,555.76 | $13,894.34 | $14,243.86 | $14,604.69 | $14,977.25 | $15,361.96 |
| 59 | $700.00 | $41,300.00 | $13,789.48 | $14,139.84 | $14,501.71 | $14,875.51 | $15,261.68 | $15,660.66 |
| 60 | $700.00 | $42,000.00 | $14,023.20 | $14,385.54 | $14,759.99 | $15,147.00 | $15,547.05 | $15,960.61 |
| 61 | $700.00 | $42,700.00 | $14,256.92 | $14,631.44 | $15,018.70 | $15,419.17 | $15,833.37 | $16,261.80 |
| 62 | $700.00 | $43,400.00 | $14,490.64 | $14,877.55 | $15,277.84 | $15,692.03 | $16,120.65 | $16,564.26 |
| 63 | $700.00 | $44,100.00 | $14,724.36 | $15,123.86 | $15,537.41 | $15,965.56 | $16,408.88 | $16,867.97 |
| 64 | $700.00 | $44,800.00 | $14,958.08 | $15,370.38 | $15,797.42 | $16,239.78 | $16,698.08 | $17,172.94 |
| 65 | $700.00 | $45,500.00 | $15,191.80 | $15,617.10 | $16,057.85 | $16,514.68 | $16,988.24 | $17,479.19 |
| 66 | $700.00 | $46,200.00 | $15,425.52 | $15,864.03 | $16,318.73 | $16,790.27 | $17,279.36 | $17,786.72 |
| 67 | $700.00 | $46,900.00 | $15,659.24 | $16,111.16 | $16,580.03 | $17,066.55 | $17,571.46 | $18,095.52 |
| 68 | $700.00 | $47,600.00 | $15,892.96 | $16,358.50 | $16,841.78 | $17,343.52 | $17,864.53 | $18,405.61 |
| 69 | $700.00 | $48,300.00 | $16,126.68 | $16,606.05 | $17,103.96 | $17,621.19 | $18,158.58 | $18,717.00 |
| 70 | $700.00 | $49,000.00 | $16,360.40 | $16,853.80 | $17,366.57 | $17,899.55 | $18,453.61 | $19,029.68 |
| 71 | $700.00 | $49,700.00 | $16,594.12 | $17,101.76 | $17,629.63 | $18,178.60 | $18,749.62 | $19,343.66 |
| 72 | $700.00 | $50,400.00 | $16,827.84 | $17,349.93 | $17,893.12 | $18,458.35 | $19,046.62 | $19,658.95 |
| 73 | $700.00 | $51,100.00 | $17,061.56 | $17,598.30 | $18,157.05 | $18,738.80 | $19,344.60 | $19,975.56 |
| 74 | $700.00 | $51,800.00 | $17,295.28 | $17,846.88 | $18,421.42 | $19,019.95 | $19,643.58 | $20,293.49 |
| 75 | $700.00 | $52,500.00 | $17,529.00 | $18,095.67 | $18,686.23 | $19,301.80 | $19,943.56 | $20,612.74 |

TABLE 1c-continued

Combined Loan and Investment System Comparison Report Data (Systematic Investment)

|  | LOAN | $160,000 |
|---|---|---|
|  | RATE | 5.25% |
|  | LUMP SUM INVESTMENT | $0.00 |
|  | SYSTEMATIC INVESTMENT | $233.72 |

| | | | | | | | | |
|---|---|---|---|---|---|---|---|---|
| 76 | $700.00 | $53,200.00 | $17,762.72 | $18,344.67 | $18,951.49 | $19,584.36 | $20,244.54 | $20,933.32 |
| 77 | $700.00 | $53,900.00 | $17,996.44 | $18,593.87 | $19,217.18 | $19,867.63 | $20,546.52 | $21,255.23 |
| 78 | $700.00 | $54,600.00 | $18,230.16 | $18,843.28 | $19,483.32 | $20,151.60 | $20,849.51 | $21,578.49 |
| 79 | $700.00 | $55,300.00 | $18,463.88 | $19,092.89 | $19,749.90 | $20,436.29 | $21,153.51 | $21,903.09 |
| 80 | $700.00 | $56,000.00 | $18,697.60 | $19,342.72 | $20,016.93 | $20,721.68 | $21,458.52 | $22,229.05 |
| 81 | $700.00 | $56,700.00 | $18,931.32 | $19,592.75 | $20,284.40 | $21,007.79 | $21,764.54 | $22,556.37 |
| 82 | $700.00 | $57,400.00 | $19,165.04 | $19,843.00 | $20,552.32 | $21,294.61 | $22,071.59 | $22,885.04 |
| 83 | $700.00 | $58,100.00 | $19,398.76 | $20,093.45 | $20,820.68 | $21,582.15 | $22,379.66 | $23,215.09 |
| 84 | $700.00 | $58,800.00 | $19,632.48 | $20,344.11 | $21,089.49 | $21,870.41 | $22,688.76 | $23,546.52 |
| 85 | $700.00 | $59,500.00 | $19,866.20 | $20,594.97 | $21,358.75 | $22,159.39 | $22,998.89 | $23,879.32 |
| 86 | $700.00 | $60,200.00 | $20,099.92 | $20,846.05 | $21,628.46 | $22,449.10 | $23,310.05 | $24,213.51 |
| 87 | $700.00 | $60,900.00 | $20,333.64 | $21,097.34 | $21,898.61 | $22,739.52 | $23,622.25 | $24,549.09 |
| 88 | $700.00 | $61,600.00 | $20,567.36 | $21,348.83 | $22,169.22 | $23,030.68 | $23,935.49 | $24,886.08 |
| 89 | $700.00 | $62,300.00 | $20,801.08 | $21,600.54 | $22,440.28 | $23,322.56 | $24,249.77 | $25,224.46 |
| 90 | $700.00 | $63,000.00 | $21,034.80 | $21,852.45 | $22,711.79 | $23,615.17 | $24,565.11 | $25,564.26 |
| 91 | $700.00 | $63,700.00 | $21,268.52 | $22,104.58 | $22,983.75 | $23,908.51 | $24,881.49 | $25,905.47 |
| 92 | $700.00 | $64,400.00 | $21,502.24 | $22,356.91 | $23,256.17 | $24,202.59 | $25,198.93 | $26,248.10 |
| 93 | $700.00 | $65,100.00 | $21,735.96 | $22,609.46 | $23,529.04 | $24,497.40 | $25,517.42 | $26,592.16 |
| 94 | $700.00 | $65,800.00 | $21,969.68 | $22,862.22 | $23,802.36 | $24,792.94 | $25,836.98 | $26,937.66 |
| 95 | $700.00 | $66,500.00 | $22,203.40 | $23,115.18 | $24,076.14 | $25,089.23 | $26,157.60 | $27,284.59 |
| 96 | $700.00 | $67,200.00 | $22,437.12 | $23,368.36 | $24,350.38 | $25,386.26 | $26,479.29 | $27,632.97 |
| 97 | $700.00 | $67,900.00 | $22,670.84 | $23,621.75 | $24,625.07 | $25,684.03 | $26,802.05 | $27,982.80 |
| 98 | $700.00 | $68,600.00 | $22,904.56 | $23,875.35 | $24,900.22 | $25,982.54 | $27,125.89 | $28,334.09 |
| 99 | $700.00 | $69,300.00 | $23,138.28 | $24,129.16 | $25,175.83 | $26,281.80 | $27,450.81 | $28,686.84 |
| 100 | $700.00 | $70,000.00 | $23,372.00 | $24,383.18 | $25,451.90 | $26,581.81 | $27,776.81 | $29,041.07 |
| 101 | $700.00 | $70,700.00 | $23,605.72 | $24,637.42 | $25,728.43 | $26,882.57 | $28,103.90 | $29,396.77 |
| 102 | $700.00 | $71,400.00 | $23,839.44 | $24,891.86 | $26,005.42 | $27,184.08 | $28,432.08 | $29,753.95 |
| 103 | $700.00 | $72,100.00 | $24,073.16 | $25,146.52 | $26,282.87 | $27,486.35 | $28,761.35 | $30,112.61 |
| 104 | $700.00 | $72,800.00 | $24,306.88 | $25,401.39 | $26,560.79 | $27,789.37 | $29,091.72 | $30,472.78 |
| 105 | $700.00 | $73,500.00 | $24,540.60 | $25,656.47 | $26,839.16 | $28,093.14 | $29,423.20 | $30,834.44 |
| 106 | $700.00 | $74,200.00 | $24,774.32 | $25,911.77 | $27,118.01 | $28,397.68 | $29,755.77 | $31,197.61 |
| 107 | $700.00 | $74,900.00 | $25,008.04 | $26,167.28 | $27,397.31 | $28,702.98 | $30,089.46 | $31,562.30 |
| 108 | $700.00 | $75,600.00 | $25,241.76 | $26,423.00 | $27,677.08 | $29,009.04 | $30,424.25 | $31,928.50 |
| 109 | $700.00 | $76,300.00 | $25,475.48 | $26,678.93 | $27,957.32 | $29,315.87 | $30,760.17 | $32,296.23 |
| 110 | $700.00 | $77,000.00 | $25,709.20 | $26,935.08 | $28,238.03 | $29,623.46 | $31,097.20 | $32,665.49 |
| 111 | $700.00 | $77,700.00 | $25,942.92 | $27,191.44 | $28,519.20 | $29,931.83 | $31,435.36 | $33,036.29 |
| 112 | $700.00 | $78,400.00 | $26,176.64 | $27,448.01 | $28,800.84 | $30,240.96 | $31,774.64 | $33,408.63 |
| 113 | $700.00 | $79,100.00 | $26,410.36 | $27,704.80 | $29,082.95 | $30,550.87 | $32,115.06 | $33,782.53 |
| 114 | $700.00 | $79,800.00 | $26,644.08 | $27,961.80 | $29,365.53 | $30,861.55 | $32,456.60 | $34,157.99 |
| 115 | $700.00 | $80,500.00 | $26,877.80 | $28,219.02 | $29,648.59 | $31,173.01 | $32,799.29 | $34,535.00 |
| 116 | $700.00 | $81,200.00 | $27,111.52 | $28,476.45 | $29,932.11 | $31,485.24 | $33,143.12 | $34,913.59 |
| 117 | $700.00 | $81,900.00 | $27,345.24 | $28,734.09 | $30,216.11 | $31,798.26 | $33,488.10 | $35,293.76 |
| 118 | $700.00 | $82,600.00 | $27,578.96 | $28,991.95 | $30,500.58 | $32,112.06 | $33,834.22 | $35,675.51 |
| 119 | $700.00 | $83,300.00 | $27,812.68 | $29,250.03 | $30,785.52 | $32,426.64 | $34,181.50 | $36,058.85 |
| 120 | $700.00 | $84,000.00 | $28,046.40 | $29,508.32 | $31,070.94 | $32,742.02 | $34,529.94 | $36,443.79 |
| 121 | $700.00 | $84,700.00 | $28,280.12 | $29,766.82 | $31,356.83 | $33,058.17 | $34,879.54 | $36,830.34 |
| 122 | $700.00 | $85,400.00 | $28,513.84 | $30,025.54 | $31,643.20 | $33,375.12 | $35,230.30 | $37,218.49 |
| 123 | $700.00 | $86,100.00 | $28,747.56 | $30,284.48 | $31,930.05 | $33,692.87 | $35,582.24 | $37,608.26 |
| 124 | $700.00 | $86,800.00 | $28,981.28 | $30,543.63 | $32,217.38 | $34,011.40 | $35,935.34 | $37,999.66 |
| 125 | $700.00 | $87,500.00 | $29,215.00 | $30,803.00 | $32,505.18 | $34,330.74 | $36,289.63 | $38,392.68 |
| 126 | $700.00 | $88,200.00 | $29,448.72 | $31,062.58 | $32,793.47 | $34,650.87 | $36,645.09 | $38,787.34 |
| 127 | $700.00 | $88,900.00 | $29,682.44 | $31,322.38 | $33,082.23 | $34,971.80 | $37,001.74 | $39,183.65 |
| 128 | $700.00 | $89,600.00 | $29,916.16 | $31,582.40 | $33,371.48 | $35,293.53 | $37,359.58 | $39,581.61 |
| 129 | $700.00 | $90,300.00 | $30,149.88 | $31,842.63 | $33,661.21 | $35,616.07 | $37,718.61 | $39,981.23 |
| 130 | $700.00 | $91,000.00 | $30,383.60 | $32,103.08 | $33,951.42 | $35,939.41 | $38,078.84 | $40,382.51 |
| 131 | $700.00 | $91,700.00 | $30,617.32 | $32,363.75 | $34,242.11 | $36,263.57 | $38,440.27 | $40,785.47 |
| 132 | $700.00 | $92,400.00 | $30,851.04 | $32,624.64 | $34,533.29 | $36,588.53 | $38,802.90 | $41,190.10 |
| 133 | $700.00 | $93,100.00 | $31,084.76 | $32,885.74 | $34,824.96 | $36,914.31 | $39,166.74 | $41,596.42 |
| 134 | $700.00 | $93,800.00 | $31,318.48 | $33,147.06 | $35,117.11 | $37,240.90 | $39,531.80 | $42,004.43 |
| 135 | $700.00 | $94,500.00 | $31,552.20 | $33,408.60 | $35,409.75 | $37,568.30 | $39,898.07 | $42,414.14 |
| 136 | $700.00 | $95,200.00 | $31,785.92 | $33,670.35 | $35,702.87 | $37,896.53 | $40,265.56 | $42,825.56 |
| 137 | $700.00 | $95,900.00 | $32,019.64 | $33,932.32 | $35,996.49 | $38,225.57 | $40,634.28 | $43,238.70 |
| 138 | $700.00 | $96,600.00 | $32,253.36 | $34,194.52 | $36,290.59 | $38,555.44 | $41,004.23 | $43,653.55 |
| 139 | $700.00 | $97,300.00 | $32,487.08 | $34,456.93 | $36,585.19 | $38,886.13 | $41,375.41 | $44,070.13 |
| 140 | $700.00 | $98,000.00 | $32,720.80 | $34,719.55 | $36,880.27 | $39,217.65 | $41,747.82 | $44,488.45 |
| 141 | $700.00 | $98,700.00 | $32,954.52 | $34,982.40 | $37,175.85 | $39,550.00 | $42,121.48 | $44,908.52 |
| 142 | $700.00 | $99,400.00 | $33,188.24 | $35,245.47 | $37,471.92 | $39,883.18 | $42,496.39 | $45,330.33 |
| 143 | $700.00 | $100,100.00 | $33,421.96 | $35,508.76 | $37,768.48 | $40,217.19 | $42,872.54 | $45,753.90 |
| 144 | $700.00 | $100,800.00 | $33,655.68 | $35,772.26 | $38,065.54 | $40,552.04 | $43,249.95 | $46,179.23 |
| 145 | $700.00 | $101,500.00 | $33,889.40 | $36,035.99 | $38,363.09 | $40,887.73 | $43,628.61 | $46,606.34 |
| 146 | $700.00 | $102,200.00 | $34,123.12 | $36,299.93 | $38,661.14 | $41,224.25 | $44,008.54 | $47,035.23 |
| 147 | $700.00 | $102,900.00 | $34,356.84 | $36,564.09 | $38,959.68 | $41,561.61 | $44,389.73 | $47,465.90 |
| 148 | $700.00 | $103,600.00 | $34,590.56 | $36,828.48 | $39,258.72 | $41,899.82 | $44,772.20 | $47,898.37 |

TABLE 1c-continued

Combined Loan and Investment System Comparison Report Data (Systematic Investment)

| | LOAN | $160,000 | | | | |
|---|---|---|---|---|---|---|
| | RATE | 5.25% | | | | |
| | LUMP SUM INVESTMENT | $0.00 | | | | |
| | SYSTEMATIC INVESTMENT | $233.72 | | | | |

| | | | | | | | | |
|---|---|---|---|---|---|---|---|---|
| 149 | $700.00 | $104,300.00 | $34,824.28 | $37,093.08 | $39,558.26 | $42,238.88 | $45,155.94 | $48,332.64 |
| 150 | $700.00 | $105,000.00 | $35,058.00 | $37,357.91 | $39,858.30 | $42,578.78 | $45,540.96 | $48,768.72 |
| 151 | $700.00 | $105,700.00 | $35,291.72 | $37,622.96 | $40,158.84 | $42,919.53 | $45,927.26 | $49,206.62 |
| 152 | $700.00 | $106,400.00 | $35,525.44 | $37,888.22 | $40,459.89 | $43,261.13 | $46,314.85 | $49,646.34 |
| 153 | $700.00 | $107,100.00 | $35,759.16 | $38,153.71 | $40,761.43 | $43,603.59 | $46,703.73 | $50,087.89 |
| 154 | $700.00 | $107,800.00 | $35,992.88 | $38,419.42 | $41,063.47 | $43,946.90 | $47,093.91 | $50,531.29 |
| 155 | $700.00 | $108,500.00 | $36,226.60 | $38,685.35 | $41,366.02 | $44,291.07 | $47,485.39 | $50,976.53 |
| 156 | $700.00 | $109,200.00 | $36,460.32 | $38,951.51 | $41,669.08 | $44,636.11 | $47,878.17 | $51,423.62 |
| 157 | $700.00 | $109,900.00 | $36,694.04 | $39,217.88 | $41,972.63 | $44,982.00 | $48,272.27 | $51,872.58 |
| 158 | $700.00 | $110,600.00 | $36,927.76 | $39,484.48 | $42,276.70 | $45,328.76 | $48,667.67 | $52,323.41 |
| 159 | $700.00 | $111,300.00 | $37,161.48 | $39,751.29 | $42,581.27 | $45,676.39 | $49,064.40 | $52,776.12 |
| 160 | $700.00 | $112,000.00 | $37,395.20 | $40,018.34 | $42,886.35 | $46,024.88 | $49,462.44 | $53,230.71 |
| 161 | $700.00 | $112,700.00 | $37,628.92 | $40,285.60 | $43,191.93 | $46,374.25 | $49,861.82 | $53,687.20 |
| 162 | $700.00 | $113,400.00 | $37,862.64 | $40,553.08 | $43,498.03 | $46,724.49 | $50,262.52 | $54,145.59 |
| 163 | $700.00 | $114,100.00 | $38,096.36 | $40,820.79 | $43,804.64 | $47,075.60 | $50,664.56 | $54,605.89 |
| 164 | $700.00 | $114,800.00 | $38,330.08 | $41,088.73 | $44,111.75 | $47,427.60 | $51,067.94 | $55,068.11 |
| 165 | $700.00 | $115,500.00 | $38,563.80 | $41,356.88 | $44,419.38 | $47,780.47 | $51,472.67 | $55,532.26 |
| 166 | $700.00 | $116,200.00 | $38,797.52 | $41,625.26 | $44,727.52 | $48,134.23 | $51,878.75 | $55,998.33 |
| 167 | $700.00 | $116,900.00 | $39,031.24 | $41,893.86 | $45,036.18 | $48,488.87 | $52,286.17 | $56,466.35 |
| 168 | $700.00 | $117,600.00 | $39,264.96 | $42,162.69 | $45,345.35 | $48,844.39 | $52,694.96 | $56,936.32 |
| 169 | $700.00 | $118,300.00 | $39,498.68 | $42,431.74 | $45,655.03 | $49,200.81 | $53,105.11 | $57,408.25 |
| 170 | $700.00 | $119,000.00 | $39,732.40 | $42,701.01 | $45,965.24 | $49,558.11 | $53,516.62 | $57,882.15 |
| 171 | $700.00 | $119,700.00 | $39,966.12 | $42,970.51 | $46,275.95 | $49,916.31 | $53,929.51 | $58,358.02 |
| 172 | $700.00 | $120,400.00 | $40,199.84 | $43,240.24 | $46,587.19 | $50,275.41 | $54,343.78 | $58,835.87 |
| 173 | $700.00 | $121,100.00 | $40,433.56 | $43,510.18 | $46,898.94 | $50,635.40 | $54,759.42 | $59,315.71 |
| 174 | $700.00 | $121,800.00 | $40,667.28 | $43,780.36 | $47,211.22 | $50,996.29 | $55,176.45 | $59,797.56 |
| 175 | $700.00 | $122,500.00 | $40,901.00 | $44,050.76 | $47,524.01 | $51,358.09 | $55,594.87 | $60,281.41 |
| 176 | $700.00 | $123,200.00 | $41,134.72 | $44,321.38 | $47,837.33 | $51,720.79 | $56,014.69 | $60,767.27 |
| 177 | $700.00 | $123,900.00 | $41,368.44 | $44,592.23 | $48,151.17 | $52,084.40 | $56,435.90 | $61,255.16 |
| 178 | $700.00 | $124,600.00 | $41,602.16 | $44,863.30 | $48,465.53 | $52,448.91 | $56,858.52 | $61,745.09 |
| 179 | $700.00 | $125,300.00 | $41,835.88 | $45,134.61 | $48,780.42 | $52,814.34 | $57,282.55 | $62,237.05 |
| 180 | $700.00 | $126,000.00 | $42,069.60 | $45,406.13 | $49,095.83 | $53,180.68 | $57,707.99 | $62,731.07 |
| 181 | $700.00 | $126,700.00 | $42,303.32 | $45,677.89 | $49,411.76 | $53,547.93 | $58,134.85 | $63,227.14 |
| 182 | $700.00 | $127,400.00 | $42,537.04 | $45,949.87 | $49,728.22 | $53,916.11 | $58,563.13 | $63,725.28 |
| 183 | $700.00 | $128,100.00 | $42,770.76 | $46,222.07 | $50,045.21 | $54,285.20 | $58,992.84 | $64,225.50 |
| 184 | $700.00 | $128,800.00 | $43,004.48 | $46,494.50 | $50,362.73 | $54,655.22 | $59,423.98 | $64,727.80 |
| 185 | $700.00 | $129,500.00 | $43,238.20 | $46,767.16 | $50,680.78 | $55,026.16 | $59,856.56 | $65,232.19 |
| 186 | $700.00 | $130,200.00 | $43,471.92 | $47,040.05 | $50,999.36 | $55,398.03 | $60,290.58 | $65,738.68 |
| 187 | $700.00 | $130,900.00 | $43,705.64 | $47,313.17 | $51,318.47 | $55,770.83 | $60,726.05 | $66,247.29 |
| 188 | $700.00 | $131,600.00 | $43,939.36 | $47,586.51 | $51,638.11 | $56,144.56 | $61,162.97 | $66,758.01 |
| 189 | $700.00 | $132,300.00 | $44,173.08 | $47,860.08 | $51,958.28 | $56,519.23 | $61,601.34 | $67,270.87 |
| 190 | $700.00 | $133,000.00 | $44,406.80 | $48,133.88 | $52,278.99 | $56,894.83 | $62,041.18 | $67,785.85 |
| 191 | $700.00 | $133,700.00 | $44,640.52 | $48,407.90 | $52,600.23 | $57,271.37 | $62,482.48 | $68,302.99 |
| 192 | $700.00 | $134,400.00 | $44,874.24 | $48,682.16 | $52,922.00 | $57,648.85 | $62,925.26 | $68,822.28 |
| 193 | $700.00 | $135,100.00 | $45,107.96 | $48,956.64 | $53,244.32 | $58,027.28 | $63,369.51 | $69,343.73 |
| 194 | $700.00 | $135,800.00 | $45,341.68 | $49,231.35 | $53,567.17 | $58,406.65 | $63,815.24 | $69,867.36 |
| 195 | $700.00 | $136,500.00 | $45,575.40 | $49,506.29 | $53,890.55 | $58,786.97 | $64,262.46 | $70,393.17 |
| 196 | $700.00 | $137,200.00 | $45,809.12 | $49,781.46 | $54,214.48 | $59,168.25 | $64,711.16 | $70,921.16 |
| 197 | $700.00 | $137,900.00 | $46,042.84 | $50,056.86 | $54,538.95 | $59,550.47 | $65,161.37 | $71,451.36 |
| 198 | $700.00 | $138,600.00 | $46,276.56 | $50,332.49 | $54,863.96 | $59,933.65 | $65,613.07 | $71,983.77 |
| 199 | $700.00 | $139,300.00 | $46,510.28 | $50,608.35 | $55,189.51 | $60,317.79 | $66,066.28 | $72,518.40 |
| 200 | $700.00 | $140,000.00 | $46,744.00 | $50,884.44 | $55,515.60 | $60,702.89 | $66,521.00 | $73,055.25 |
| 201 | $700.00 | $140,700.00 | $46,977.72 | $51,160.76 | $55,842.23 | $61,088.95 | $66,977.23 | $73,594.34 |
| 202 | $700.00 | $141,400.00 | $47,211.44 | $51,437.31 | $56,169.41 | $61,475.98 | $67,434.99 | $74,135.68 |
| 203 | $700.00 | $142,100.00 | $47,445.16 | $51,714.09 | $56,497.14 | $61,863.97 | $67,894.27 | $74,679.27 |
| 204 | $700.00 | $142,800.00 | $47,678.88 | $51,991.10 | $56,825.41 | $62,252.94 | $68,355.09 | $75,225.13 |
| 205 | $700.00 | $143,500.00 | $47,912.60 | $52,268.34 | $57,154.23 | $62,642.87 | $68,817.44 | $75,773.26 |
| 206 | $700.00 | $144,200.00 | $48,146.32 | $52,545.81 | $57,483.59 | $63,033.78 | $69,281.33 | $76,323.68 |
| 207 | $700.00 | $144,900.00 | $48,380.04 | $52,823.51 | $57,813.51 | $63,425.67 | $69,746.76 | $76,876.39 |
| 208 | $700.00 | $145,600.00 | $48,613.76 | $53,101.45 | $58,143.98 | $63,818.54 | $70,213.75 | $77,431.40 |
| 209 | $700.00 | $146,300.00 | $48,847.48 | $53,379.61 | $58,474.99 | $64,212.39 | $70,682.30 | $77,988.72 |
| 210 | $700.00 | $147,000.00 | $49,081.20 | $53,658.01 | $58,806.56 | $64,607.23 | $71,152.40 | $78,548.37 |
| 211 | $700.00 | $147,700.00 | $49,314.92 | $53,936.64 | $59,138.68 | $65,003.05 | $71,624.08 | $79,110.35 |
| 212 | $700.00 | $148,400.00 | $49,548.64 | $54,215.50 | $59,471.35 | $65,399.86 | $72,097.32 | $79,674.67 |
| 213 | $700.00 | $149,100.00 | $49,782.36 | $54,494.60 | $59,804.58 | $65,797.66 | $72,572.15 | $80,241.34 |
| 214 | $700.00 | $149,800.00 | $50,016.08 | $54,773.92 | $60,138.37 | $66,196.46 | $73,048.55 | $80,810.37 |
| 215 | $700.00 | $150,500.00 | $50,249.80 | $55,053.48 | $60,472.71 | $66,596.26 | $73,526.55 | $81,381.78 |
| 216 | $700.00 | $151,200.00 | $50,483.52 | $55,333.27 | $60,807.60 | $66,997.05 | $74,006.13 | $81,955.56 |
| 217 | $700.00 | $151,900.00 | $50,717.24 | $55,613.30 | $61,143.06 | $67,398.85 | $74,487.32 | $82,531.74 |
| 218 | $700.00 | $152,600.00 | $50,950.96 | $55,893.56 | $61,479.07 | $67,801.65 | $74,970.11 | $83,110.31 |
| 219 | $700.00 | $153,300.00 | $51,184.68 | $56,174.05 | $61,815.65 | $68,205.46 | $75,454.51 | $83,691.30 |
| 220 | $700.00 | $154,000.00 | $51,418.40 | $56,454.78 | $62,152.78 | $68,610.28 | $75,940.52 | $84,274.71 |
| 221 | $700.00 | $154,700.00 | $51,652.12 | $56,735.74 | $62,490.48 | $69,016.11 | $76,428.16 | $84,860.55 |

TABLE 1c-continued

Combined Loan and Investment System Comparison Report Data (Systematic Investment)

|  |  | LOAN | $160,000 |  |  |  |  |
|---|---|---|---|---|---|---|---|
|  |  | RATE | 5.25% |  |  |  |  |
|  |  | LUMP SUM INVESTMENT | $0.00 |  |  |  |  |
|  |  | SYSTEMATIC INVESTMENT | $233.72 |  |  |  |  |

| | | | | | | | | |
|---|---|---|---|---|---|---|---|---|
| 222 | $700.00 | $155,400.00 | $51,885.84 | $57,016.93 | $62,828.74 | $69,422.95 | $76,917.42 | $85,448.82 |
| 223 | $700.00 | $156,100.00 | $52,119.56 | $57,298.36 | $63,167.57 | $69,830.81 | $77,408.31 | $86,039.56 |
| 224 | $700.00 | $156,800.00 | $52,353.28 | $57,580.03 | $63,506.96 | $70,239.70 | $77,900.84 | $86,632.75 |
| 225 | $700.00 | $157,500.00 | $52,587.00 | $57,861.92 | $63,846.91 | $70,649.60 | $78,395.00 | $87,228.41 |
| 226 | $700.00 | $158,200.00 | $52,820.72 | $58,144.06 | $64,187.43 | $71,060.53 | $78,890.82 | $87,826.56 |
| 227 | $700.00 | $158,900.00 | $53,054.44 | $58,426.43 | $64,528.52 | $71,472.48 | $79,388.29 | $88,427.19 |
| 228 | $700.00 | $159,600.00 | $53,288.16 | $58,709.03 | $64,870.18 | $71,885.47 | $79,887.41 | $89,030.33 |
| 229 | $700.00 | $160,300.00 | $53,521.88 | $58,991.87 | $65,212.40 | $72,299.49 | $80,388.21 | $89,635.99 |
| 230 | $700.00 | $161,000.00 | $53,755.60 | $59,274.94 | $65,555.20 | $72,714.54 | $80,890.67 | $90,244.17 |
| 231 | $700.00 | $161,700.00 | $53,989.32 | $59,558.25 | $65,898.57 | $73,130.63 | $81,394.80 | $90,854.88 |
| 232 | $700.00 | $162,400.00 | $54,223.04 | $59,841.80 | $66,242.51 | $73,547.76 | $81,900.61 | $91,468.13 |
| 233 | $700.00 | $163,100.00 | $54,456.76 | $60,125.58 | $66,587.02 | $73,965.93 | $82,408.12 | $92,083.94 |
| 234 | $700.00 | $163,800.00 | $54,690.48 | $60,409.60 | $66,932.11 | $74,385.15 | $82,917.31 | $92,702.32 |
| 235 | $700.00 | $164,500.00 | $54,924.20 | $60,693.86 | $67,277.77 | $74,805.42 | $83,428.20 | $93,323.27 |
| 236 | $700.00 | $165,200.00 | $55,157.92 | $60,978.35 | $67,624.01 | $75,226.74 | $83,940.79 | $93,946.81 |
| 237 | $700.00 | $165,900.00 | $55,391.64 | $61,263.08 | $67,970.83 | $75,649.11 | $84,455.09 | $94,572.95 |
| 238 | $700.00 | $166,600.00 | $55,625.36 | $61,548.05 | $68,318.22 | $76,072.54 | $84,971.11 | $95,201.70 |
| 239 | $700.00 | $167,300.00 | $55,859.08 | $61,833.25 | $68,666.20 | $76,497.02 | $85,488.85 | $95,833.07 |
| 240 | $700.00 | $168,000.00 | $56,092.80 | $62,118.70 | $69,014.75 | $76,922.57 | $86,008.31 | $96,467.07 |
| 241 | $700.00 | $168,700.00 | $56,326.52 | $62,404.38 | $69,363.88 | $77,349.18 | $86,529.50 | $97,103.71 |
| 242 | $700.00 | $169,400.00 | $56,560.24 | $62,690.29 | $69,713.60 | $77,776.86 | $87,052.43 | $97,743.00 |
| 243 | $700.00 | $170,100.00 | $56,793.96 | $62,976.45 | $70,063.90 | $78,205.60 | $87,577.11 | $98,384.96 |
| 244 | $700.00 | $170,800.00 | $57,027.68 | $63,262.85 | $70,414.78 | $78,635.42 | $88,103.53 | $99,029.59 |
| 245 | $700.00 | $171,500.00 | $57,261.40 | $63,549.48 | $70,766.25 | $79,066.32 | $88,631.71 | $99,676.90 |
| 246 | $700.00 | $172,200.00 | $57,495.12 | $63,836.35 | $71,118.30 | $79,498.29 | $89,161.64 | $100,326.92 |
| 247 | $700.00 | $172,900.00 | $57,728.84 | $64,123.46 | $71,470.94 | $79,931.34 | $89,693.35 | $100,979.64 |
| 248 | $700.00 | $173,600.00 | $57,962.56 | $64,410.82 | $71,824.17 | $80,365.47 | $90,226.83 | $101,635.08 |
| 249 | $700.00 | $174,300.00 | $58,196.28 | $64,698.41 | $72,177.99 | $80,800.69 | $90,762.08 | $102,293.26 |
| 250 | $700.00 | $175,000.00 | $58,430.00 | $64,986.24 | $72,532.39 | $81,236.99 | $91,299.12 | $102,954.17 |
| 251 | $700.00 | $175,700.00 | $58,663.72 | $65,274.31 | $72,887.39 | $81,674.39 | $91,837.95 | $103,617.84 |
| 252 | $700.00 | $176,400.00 | $58,897.44 | $65,562.62 | $73,242.98 | $82,112.88 | $92,378.57 | $104,284.28 |
| 253 | $700.00 | $177,100.00 | $59,131.16 | $65,851.17 | $73,599.16 | $82,552.47 | $92,921.00 | $104,953.49 |
| 254 | $700.00 | $177,800.00 | $59,364.88 | $66,139.96 | $73,955.93 | $82,993.15 | $93,465.24 | $105,625.49 |
| 255 | $700.00 | $178,500.00 | $59,598.60 | $66,428.99 | $74,313.30 | $83,434.94 | $94,011.29 | $106,300.29 |
| 256 | $700.00 | $179,200.00 | $59,832.32 | $66,718.26 | $74,671.27 | $83,877.83 | $94,559.16 | $106,977.90 |
| 257 | $700.00 | $179,900.00 | $60,066.04 | $67,007.77 | $75,029.83 | $84,321.83 | $95,108.85 | $107,658.34 |
| 258 | $700.00 | $180,600.00 | $60,299.76 | $67,297.53 | $75,388.99 | $84,766.94 | $95,660.38 | $108,341.61 |
| 259 | $700.00 | $181,300.00 | $60,533.48 | $67,587.52 | $75,748.75 | $85,213.16 | $96,213.75 | $109,027.72 |
| 260 | $700.00 | $182,000.00 | $60,767.20 | $67,877.76 | $76,109.10 | $85,660.50 | $96,768.96 | $109,716.70 |
| 261 | $700.00 | $182,700.00 | $61,000.92 | $68,168.24 | $76,470.06 | $86,108.95 | $97,326.02 | $110,408.55 |
| 262 | $700.00 | $183,400.00 | $61,234.64 | $68,458.96 | $76,831.62 | $86,558.53 | $97,884.94 | $111,103.28 |
| 263 | $700.00 | $184,100.00 | $61,468.36 | $68,749.93 | $77,193.78 | $87,009.23 | $98,445.73 | $111,800.90 |
| 264 | $700.00 | $184,800.00 | $61,702.08 | $69,041.13 | $77,556.55 | $87,461.06 | $99,008.38 | $112,501.43 |
| 265 | $700.00 | $185,500.00 | $61,935.80 | $69,332.58 | $77,919.92 | $87,914.01 | $99,572.90 | $113,204.88 |
| 266 | $700.00 | $186,200.00 | $62,169.52 | $69,624.28 | $78,283.90 | $88,368.10 | $100,139.31 | $113,911.26 |
| 267 | $700.00 | $186,900.00 | $62,403.24 | $69,916.21 | $78,648.48 | $88,823.33 | $100,707.61 | $114,620.59 |
| 268 | $700.00 | $187,600.00 | $62,636.96 | $70,208.39 | $79,013.67 | $89,279.69 | $101,277.80 | $115,332.86 |
| 269 | $700.00 | $188,300.00 | $62,870.68 | $70,500.81 | $79,379.47 | $89,737.19 | $101,849.89 | $116,048.11 |
| 270 | $700.00 | $189,000.00 | $63,104.40 | $70,793.48 | $79,745.88 | $90,195.84 | $102,423.89 | $116,766.34 |
| 271 | $700.00 | $189,700.00 | $63,338.12 | $71,086.38 | $80,112.90 | $90,655.63 | $102,999.80 | $117,487.56 |
| 272 | $700.00 | $190,400.00 | $63,571.84 | $71,379.54 | $80,480.53 | $91,116.58 | $103,577.63 | $118,211.79 |
| 273 | $700.00 | $191,100.00 | $63,805.56 | $71,672.94 | $80,848.77 | $91,578.67 | $104,157.39 | $118,939.03 |
| 274 | $700.00 | $191,800.00 | $64,039.28 | $71,966.58 | $81,217.63 | $92,041.93 | $104,739.08 | $119,669.30 |
| 275 | $700.00 | $192,500.00 | $64,273.00 | $72,260.47 | $81,587.10 | $92,506.33 | $105,322.71 | $120,402.62 |
| 276 | $700.00 | $193,200.00 | $64,506.72 | $72,554.60 | $81,957.19 | $92,971.90 | $105,908.29 | $121,138.99 |
| 277 | $700.00 | $193,900.00 | $64,740.44 | $72,848.97 | $82,327.89 | $93,438.64 | $106,495.81 | $121,878.43 |
| 278 | $700.00 | $194,600.00 | $64,974.16 | $73,143.60 | $82,699.22 | $93,906.54 | $107,085.30 | $122,620.95 |
| 279 | $700.00 | $195,300.00 | $65,207.88 | $73,438.46 | $83,071.16 | $94,375.61 | $107,676.75 | $123,366.56 |
| 280 | $700.00 | $196,000.00 | $65,441.60 | $73,733.58 | $83,443.72 | $94,845.85 | $108,270.17 | $124,115.28 |
| 281 | $700.00 | $196,700.00 | $65,675.32 | $74,028.94 | $83,816.90 | $95,317.27 | $108,865.57 | $124,867.13 |
| 282 | $700.00 | $197,400.00 | $65,909.04 | $74,324.54 | $84,190.71 | $95,789.87 | $109,462.95 | $125,622.10 |
| 283 | $700.00 | $198,100.00 | $66,142.76 | $74,620.39 | $84,565.13 | $96,263.65 | $110,062.33 | $126,380.22 |
| 284 | $700.00 | $198,800.00 | $66,376.48 | $74,916.49 | $84,940.19 | $96,738.61 | $110,663.70 | $127,141.50 |
| 285 | $700.00 | $199,500.00 | $66,610.20 | $75,212.84 | $85,315.86 | $97,214.76 | $111,267.08 | $127,905.95 |
| 286 | $700.00 | $200,200.00 | $66,843.92 | $75,509.43 | $85,692.16 | $97,692.10 | $111,872.47 | $128,673.58 |
| 287 | $700.00 | $200,900.00 | $67,077.64 | $75,806.27 | $86,069.09 | $98,170.64 | $112,479.88 | $129,444.42 |
| 288 | $700.00 | $201,600.00 | $67,311.36 | $76,103.36 | $86,446.65 | $98,650.37 | $113,089.31 | $130,218.46 |
| 289 | $700.00 | $202,300.00 | $67,545.08 | $76,400.69 | $86,824.84 | $99,131.30 | $113,700.77 | $130,995.73 |
| 290 | $700.00 | $203,000.00 | $67,778.80 | $76,698.27 | $87,203.66 | $99,613.43 | $114,314.27 | $131,776.24 |
| 291 | $700.00 | $203,700.00 | $68,012.52 | $76,996.10 | $87,583.11 | $100,096.77 | $114,929.82 | $132,560.00 |
| 292 | $700.00 | $204,400.00 | $68,246.24 | $77,294.18 | $87,963.19 | $100,581.32 | $115,547.42 | $133,347.03 |
| 293 | $700.00 | $205,100.00 | $68,479.96 | $77,592.51 | $88,343.90 | $101,067.07 | $116,167.08 | $134,137.34 |
| 294 | $700.00 | $205,800.00 | $68,713.68 | $77,891.08 | $88,725.25 | $101,554.05 | $116,788.80 | $134,930.94 |

TABLE 1c-continued

Combined Loan and Investment System Comparison Report Data (Systematic Investment)

|  |  |  | LOAN | $160,000 |  |  |  |
|  |  |  | RATE | 5.25% |  |  |  |
|  |  |  | LUMP SUM INVESTMENT | $0.00 |  |  |  |
|  |  |  | SYSTEMATIC INVESTMENT | $233.72 |  |  |  |

| | | | | | | | | |
|---|---|---|---|---|---|---|---|---|
| 295 | $700.00 | $206,500.00 | $68,947.40 | $78,189.91 | $89,107.24 | $102,042.24 | $117,412.59 | $135,727.84 |
| 296 | $700.00 | $207,200.00 | $69,181.12 | $78,488.98 | $89,489.86 | $102,531.65 | $118,038.47 | $136,528.07 |
| 297 | $700.00 | $207,900.00 | $69,414.84 | $78,788.30 | $89,873.12 | $103,022.28 | $118,666.43 | $137,331.63 |
| 298 | $700.00 | $208,600.00 | $69,648.56 | $79,087.87 | $90,257.02 | $103,514.14 | $119,296.48 | $138,138.54 |
| 299 | $700.00 | $209,300.00 | $69,882.28 | $79,387.69 | $90,641.55 | $104,007.23 | $119,928.64 | $138,948.81 |
| 300 | $700.00 | $210,000.00 | $70,116.00 | $79,687.77 | $91,026.73 | $104,501.55 | $120,562.90 | $139,762.46 |
| 301 | $700.00 | $210,700.00 | $70,349.72 | $79,988.09 | $91,412.55 | $104,997.11 | $121,199.27 | $140,579.49 |
| 302 | $700.00 | $211,400.00 | $70,583.44 | $80,288.66 | $91,799.02 | $105,493.91 | $121,837.77 | $141,399.94 |
| 303 | $700.00 | $212,100.00 | $70,817.16 | $80,589.48 | $92,186.12 | $105,991.95 | $122,478.40 | $142,223.80 |
| 304 | $700.00 | $212,800.00 | $71,050.88 | $80,890.55 | $92,573.88 | $106,491.23 | $123,121.16 | $143,051.09 |
| 305 | $700.00 | $213,500.00 | $71,284.60 | $81,191.88 | $92,962.28 | $106,991.76 | $123,766.06 | $143,881.83 |
| 306 | $700.00 | $214,200.00 | $71,518.32 | $81,493.45 | $93,351.32 | $107,493.55 | $124,413.11 | $144,716.03 |
| 307 | $700.00 | $214,900.00 | $71,752.04 | $81,795.28 | $93,741.02 | $107,996.58 | $125,062.32 | $145,553.71 |
| 308 | $700.00 | $215,600.00 | $71,985.76 | $82,097.35 | $94,131.36 | $108,500.88 | $125,713.69 | $146,394.88 |
| 309 | $700.00 | $216,300.00 | $72,219.48 | $82,399.68 | $94,522.36 | $109,006.44 | $126,367.24 | $147,239.55 |
| 310 | $700.00 | $217,000.00 | $72,453.20 | $82,702.27 | $94,914.01 | $109,513.26 | $127,022.96 | $148,087.74 |
| 311 | $700.00 | $217,700.00 | $72,686.92 | $83,005.10 | $95,306.30 | $110,021.34 | $127,680.87 | $148,939.47 |
| 312 | $700.00 | $218,400.00 | $72,920.64 | $83,308.18 | $95,699.26 | $110,530.70 | $128,340.97 | $149,794.74 |
| 313 | $700.00 | $219,100.00 | $73,154.36 | $83,611.52 | $96,092.87 | $111,041.33 | $129,003.28 | $150,653.58 |
| 314 | $700.00 | $219,800.00 | $73,388.08 | $83,915.11 | $96,487.13 | $111,553.24 | $129,667.79 | $151,516.00 |
| 315 | $700.00 | $220,500.00 | $73,621.80 | $84,218.96 | $96,882.05 | $112,066.43 | $130,334.51 | $152,382.01 |
| 316 | $700.00 | $221,200.00 | $73,855.52 | $84,523.05 | $97,277.63 | $112,580.90 | $131,003.46 | $153,251.63 |
| 317 | $700.00 | $221,900.00 | $74,089.24 | $84,827.41 | $97,673.87 | $113,096.65 | $131,674.64 | $154,124.87 |
| 318 | $700.00 | $222,600.00 | $74,322.96 | $85,132.01 | $98,070.77 | $113,613.70 | $132,348.05 | $155,001.75 |
| 319 | $700.00 | $223,300.00 | $74,556.68 | $85,436.87 | $98,468.33 | $114,132.04 | $133,023.71 | $155,882.28 |
| 320 | $700.00 | $224,000.00 | $74,790.40 | $85,741.98 | $98,866.55 | $114,651.67 | $133,701.62 | $156,766.49 |
| 321 | $700.00 | $224,700.00 | $75,024.12 | $86,047.35 | $99,265.44 | $115,172.61 | $134,381.79 | $157,654.37 |
| 322 | $700.00 | $225,400.00 | $75,257.84 | $86,352.97 | $99,664.99 | $115,694.84 | $135,064.23 | $158,545.96 |
| 323 | $700.00 | $226,100.00 | $75,491.56 | $86,658.84 | $100,065.21 | $116,218.38 | $135,748.94 | $159,441.26 |
| 324 | $700.00 | $226,800.00 | $75,725.28 | $86,964.97 | $100,466.10 | $116,743.23 | $136,435.94 | $160,340.30 |
| 325 | $700.00 | $227,500.00 | $75,959.00 | $87,271.36 | $100,867.65 | $117,269.40 | $137,125.22 | $161,243.07 |
| 326 | $700.00 | $228,200.00 | $76,192.72 | $87,578.00 | $101,269.87 | $117,796.87 | $137,816.81 | $162,149.61 |
| 327 | $700.00 | $228,900.00 | $76,426.44 | $87,884.90 | $101,672.76 | $118,325.67 | $138,510.70 | $163,059.93 |
| 328 | $700.00 | $229,600.00 | $76,660.16 | $88,192.05 | $102,076.33 | $118,855.79 | $139,206.90 | $163,974.04 |
| 329 | $700.00 | $230,300.00 | $76,893.88 | $88,499.46 | $102,480.56 | $119,387.23 | $139,905.42 | $164,891.96 |
| 330 | $700.00 | $231,000.00 | $77,127.60 | $88,807.12 | $102,885.48 | $119,920.01 | $140,606.27 | $165,813.70 |
| 331 | $700.00 | $231,700.00 | $77,361.32 | $89,115.04 | $103,291.06 | $120,454.11 | $141,309.46 | $166,739.29 |
| 332 | $700.00 | $232,400.00 | $77,595.04 | $89,423.22 | $103,697.32 | $120,989.55 | $142,014.99 | $167,668.73 |
| 333 | $700.00 | $233,100.00 | $77,828.76 | $89,731.65 | $104,104.26 | $121,526.33 | $142,722.87 | $168,602.04 |
| 334 | $700.00 | $233,800.00 | $78,062.48 | $90,040.34 | $104,511.88 | $122,064.45 | $143,433.11 | $169,539.24 |
| 335 | $700.00 | $234,500.00 | $78,296.20 | $90,349.29 | $104,920.17 | $122,603.91 | $144,145.72 | $170,480.35 |
| 336 | $700.00 | $235,200.00 | $78,529.92 | $90,658.50 | $105,329.15 | $123,144.73 | $144,860.71 | $171,425.38 |
| 337 | $700.00 | $235,900.00 | $78,763.64 | $90,967.96 | $105,738.81 | $123,686.89 | $145,578.07 | $172,374.35 |
| 338 | $700.00 | $236,600.00 | $78,997.36 | $91,277.68 | $106,149.15 | $124,230.41 | $146,297.83 | $173,327.27 |
| 339 | $700.00 | $237,300.00 | $79,231.08 | $91,587.66 | $106,560.17 | $124,775.30 | $147,019.99 | $174,284.16 |
| 340 | $700.00 | $238,000.00 | $79,464.80 | $91,897.90 | $106,971.88 | $125,321.54 | $147,744.56 | $175,245.04 |
| 341 | $700.00 | $238,700.00 | $79,698.52 | $92,208.40 | $107,384.28 | $125,869.15 | $148,471.54 | $176,209.92 |
| 342 | $700.00 | $239,400.00 | $79,932.24 | $92,519.15 | $107,797.36 | $126,418.12 | $149,200.94 | $177,178.82 |
| 343 | $700.00 | $240,100.00 | $80,165.96 | $92,830.17 | $108,211.13 | $126,968.47 | $149,932.78 | $178,151.76 |
| 344 | $700.00 | $240,800.00 | $80,399.68 | $93,141.44 | $108,625.60 | $127,520.20 | $150,667.05 | $179,128.75 |
| 345 | $700.00 | $241,500.00 | $80,633.40 | $93,452.97 | $109,040.75 | $128,073.30 | $151,403.78 | $180,109.81 |
| 346 | $700.00 | $242,200.00 | $80,867.12 | $93,764.76 | $109,456.59 | $128,627.79 | $152,142.95 | $181,094.97 |
| 347 | $700.00 | $242,900.00 | $81,100.84 | $94,076.82 | $109,873.13 | $129,183.66 | $152,884.60 | $182,084.22 |
| 348 | $700.00 | $243,600.00 | $81,334.56 | $94,389.13 | $110,290.36 | $129,740.93 | $153,628.71 | $183,077.60 |
| 349 | $700.00 | $244,300.00 | $81,568.28 | $94,701.70 | $110,708.29 | $130,299.58 | $154,375.31 | $184,075.12 |
| 350 | $700.00 | $245,000.00 | $81,802.00 | $95,014.53 | $111,126.91 | $130,859.64 | $155,124.39 | $185,076.79 |
| 351 | $700.00 | $245,700.00 | $82,035.72 | $95,327.63 | $111,546.23 | $131,421.09 | $155,875.97 | $186,082.64 |
| 352 | $700.00 | $246,400.00 | $82,269.44 | $95,640.98 | $111,966.25 | $131,983.95 | $156,630.05 | $187,092.68 |
| 353 | $700.00 | $247,100.00 | $82,503.16 | $95,954.60 | $112,386.97 | $132,548.21 | $157,386.65 | $188,106.92 |
| 354 | $700.00 | $247,800.00 | $82,736.88 | $96,268.47 | $112,808.39 | $133,113.89 | $158,145.78 | $189,125.40 |
| 355 | $700.00 | $248,500.00 | $82,970.60 | $96,582.61 | $113,230.52 | $133,680.98 | $158,907.43 | $190,148.11 |
| 356 | $700.00 | $249,200.00 | $83,204.32 | $96,897.01 | $113,653.34 | $134,249.48 | $159,671.62 | $191,175.09 |
| 357 | $700.00 | $249,900.00 | $83,438.04 | $97,211.68 | $114,076.88 | $134,819.41 | $160,438.36 | $192,206.35 |
| 358 | $700.00 | $250,600.00 | $83,671.76 | $97,526.60 | $114,501.11 | $135,390.76 | $161,207.65 | $193,241.90 |
| 359 | $700.00 | $251,300.00 | $83,905.48 | $97,841.79 | $114,926.06 | $135,963.54 | $161,979.51 | $194,281.77 |
| 360 | $700.00 | $252,000.00 | $84,139.20 | $98,157.24 | $115,351.71 | $136,537.76 | $162,753.94 | $195,325.97 |

| | | INVESTMENT VALUE | | | | | | |
|---|---|---|---|---|---|---|---|---|
| | DATE | 6% | 7% | 8% | 9% | 10% | 11% | 12% |
| | 1 | $234.89 | $235.08 | $235.28 | $235.47 | $235.67 | $235.86 | $236.06 |
| | 2 | $470.95 | $471.54 | $472.12 | $472.71 | $473.30 | $473.89 | $474.47 |

TABLE 1c-continued

Combined Loan and Investment System Comparison Report Data (Systematic Investment)

| | LOAN | | $160,000 | | | |
|---|---|---|---|---|---|---|
| | RATE | | 5.25% | | | |
| | LUMP SUM INVESTMENT | | $0.00 | | | |
| | SYSTEMATIC INVESTMENT | | $233.72 | | | |

| | | | | | | | |
|---|---|---|---|---|---|---|---|
| 3 | $708.20 | $709.37 | $710.55 | $711.73 | $712.91 | $714.09 | $715.28 |
| 4 | $946.62 | $948.59 | $950.57 | $952.54 | $954.52 | $956.50 | $958.49 |
| 5 | $1,186.25 | $1,189.21 | $1,192.18 | $1,195.16 | $1,198.14 | $1,201.13 | $1,204.13 |
| 6 | $1,427.07 | $1,431.23 | $1,435.41 | $1,439.59 | $1,443.79 | $1,448.00 | $1,452.23 |
| 7 | $1,669.09 | $1,674.66 | $1,680.25 | $1,685.86 | $1,691.49 | $1,697.14 | $1,702.81 |
| 8 | $1,912.32 | $1,919.52 | $1,926.73 | $1,933.98 | $1,941.26 | $1,948.56 | $1,955.89 |
| 9 | $2,156.77 | $2,165.80 | $2,174.86 | $2,183.96 | $2,193.10 | $2,202.28 | $2,211.51 |
| 10 | $2,402.45 | $2,413.51 | $2,424.63 | $2,435.81 | $2,447.04 | $2,458.33 | $2,469.68 |
| 11 | $2,649.35 | $2,662.68 | $2,676.08 | $2,689.55 | $2,703.10 | $2,716.73 | $2,730.43 |
| 12 | $2,897.48 | $2,913.29 | $2,929.20 | $2,945.20 | $2,961.30 | $2,977.50 | $2,993.80 |
| 13 | $3,146.86 | $3,165.37 | $3,184.00 | $3,202.76 | $3,221.64 | $3,240.65 | $3,259.79 |
| 14 | $3,397.48 | $3,418.92 | $3,440.51 | $3,462.25 | $3,484.16 | $3,506.22 | $3,528.45 |
| 15 | $3,649.36 | $3,673.94 | $3,698.72 | $3,723.69 | $3,748.86 | $3,774.22 | $3,799.79 |
| 16 | $3,902.49 | $3,930.46 | $3,958.66 | $3,987.09 | $4,015.77 | $4,044.68 | $4,073.84 |
| 17 | $4,156.89 | $4,188.47 | $4,220.33 | $4,252.47 | $4,284.90 | $4,317.62 | $4,350.64 |
| 18 | $4,412.57 | $4,447.99 | $4,483.74 | $4,519.84 | $4,556.28 | $4,593.06 | $4,630.20 |
| 19 | $4,669.52 | $4,709.02 | $4,748.91 | $4,789.21 | $4,829.91 | $4,871.03 | $4,912.56 |
| 20 | $4,927.76 | $4,971.57 | $5,015.85 | $5,060.60 | $5,105.83 | $5,151.54 | $5,197.74 |
| 21 | $5,187.28 | $5,235.65 | $5,284.56 | $5,334.03 | $5,384.05 | $5,434.63 | $5,485.78 |
| 22 | $5,448.11 | $5,501.28 | $5,555.07 | $5,609.51 | $5,664.58 | $5,720.31 | $5,776.69 |
| 23 | $5,710.24 | $5,768.45 | $5,827.39 | $5,887.05 | $5,947.45 | $6,008.61 | $6,070.52 |
| 24 | $5,973.68 | $6,037.18 | $6,101.51 | $6,166.68 | $6,232.68 | $6,299.55 | $6,367.25 |
| 25 | $6,238.43 | $6,307.48 | $6,377.47 | $6,448.40 | $6,520.29 | $6,593.16 | $6,667.01 |
| 26 | $6,504.51 | $6,579.36 | $6,655.26 | $6,732.23 | $6,810.29 | $6,889.46 | $6,969.74 |
| 27 | $6,771.93 | $6,852.82 | $6,934.91 | $7,018.20 | $7,102.71 | $7,188.47 | $7,275.49 |
| 28 | $7,040.67 | $7,127.88 | $7,216.42 | $7,306.31 | $7,397.57 | $7,490.23 | $7,584.30 |
| 29 | $7,310.77 | $7,404.54 | $7,499.81 | $7,596.58 | $7,694.88 | $7,794.75 | $7,896.20 |
| 30 | $7,582.21 | $7,682.82 | $7,785.08 | $7,889.03 | $7,994.68 | $8,102.07 | $8,211.22 |
| 31 | $7,855.01 | $7,962.72 | $8,072.26 | $8,183.67 | $8,296.97 | $8,412.20 | $8,529.39 |
| 32 | $8,129.17 | $8,244.25 | $8,361.36 | $8,480.52 | $8,601.77 | $8,725.17 | $8,850.74 |
| 33 | $8,404.71 | $8,527.43 | $8,652.38 | $8,779.59 | $8,909.12 | $9,041.01 | $9,175.31 |
| 34 | $8,681.62 | $8,812.25 | $8,945.34 | $9,080.91 | $9,219.03 | $9,359.75 | $9,503.12 |
| 35 | $8,959.91 | $9,098.74 | $9,240.25 | $9,384.49 | $9,531.53 | $9,681.41 | $9,834.21 |
| 36 | $9,239.60 | $9,386.90 | $9,537.13 | $9,690.35 | $9,846.62 | $10,006.02 | $10,168.61 |
| 37 | $9,520.69 | $9,676.74 | $9,835.99 | $9,998.50 | $10,164.35 | $10,333.61 | $10,506.35 |
| 38 | $9,803.18 | $9,968.27 | $10,136.84 | $10,308.96 | $10,484.72 | $10,664.19 | $10,847.47 |
| 39 | $10,087.09 | $10,261.51 | $10,439.70 | $10,621.75 | $10,807.76 | $10,997.81 | $11,192.00 |
| 40 | $10,372.41 | $10,556.45 | $10,744.57 | $10,936.89 | $11,133.49 | $11,334.49 | $11,539.98 |
| 41 | $10,659.16 | $10,853.11 | $11,051.48 | $11,254.39 | $11,461.94 | $11,674.25 | $11,891.44 |
| 42 | $10,947.34 | $11,151.50 | $11,360.44 | $11,574.27 | $11,793.12 | $12,017.12 | $12,246.41 |
| 43 | $11,236.97 | $11,451.64 | $11,671.45 | $11,896.55 | $12,127.06 | $12,363.14 | $12,604.93 |
| 44 | $11,528.04 | $11,753.52 | $11,984.54 | $12,221.25 | $12,463.79 | $12,712.33 | $12,967.04 |
| 45 | $11,820.57 | $12,057.17 | $12,299.71 | $12,548.38 | $12,803.32 | $13,064.73 | $13,332.76 |
| 46 | $12,114.56 | $12,362.58 | $12,616.99 | $12,877.96 | $13,145.69 | $13,420.35 | $13,702.15 |
| 47 | $12,410.03 | $12,669.78 | $12,936.38 | $13,210.02 | $13,490.90 | $13,779.23 | $14,075.23 |
| 48 | $12,706.96 | $12,978.77 | $13,257.90 | $13,544.57 | $13,838.99 | $14,141.40 | $14,452.04 |
| 49 | $13,005.39 | $13,289.57 | $13,581.57 | $13,881.63 | $14,189.99 | $14,506.90 | $14,832.61 |
| 50 | $13,305.30 | $13,602.17 | $13,907.39 | $14,221.21 | $14,543.90 | $14,875.74 | $15,217.00 |
| 51 | $13,606.72 | $13,916.60 | $14,235.38 | $14,563.34 | $14,900.77 | $15,247.96 | $15,605.23 |
| 52 | $13,909.64 | $14,232.86 | $14,565.56 | $14,908.04 | $15,260.61 | $15,623.60 | $15,997.33 |
| 53 | $14,214.08 | $14,550.97 | $14,897.95 | $15,255.32 | $15,623.45 | $16,002.68 | $16,393.37 |
| 54 | $14,520.04 | $14,870.94 | $15,232.54 | $15,605.21 | $15,989.31 | $16,385.23 | $16,793.36 |
| 55 | $14,827.52 | $15,192.77 | $15,569.37 | $15,957.72 | $16,358.22 | $16,771.29 | $17,197.35 |
| 56 | $15,136.55 | $15,516.48 | $15,908.45 | $16,312.88 | $16,730.21 | $17,160.89 | $17,605.38 |
| 57 | $15,447.12 | $15,842.07 | $16,249.78 | $16,670.70 | $17,105.30 | $17,554.06 | $18,017.49 |
| 58 | $15,759.25 | $16,169.57 | $16,593.39 | $17,031.20 | $17,483.51 | $17,950.83 | $18,433.72 |
| 59 | $16,072.93 | $16,498.97 | $16,939.29 | $17,394.41 | $17,864.87 | $18,351.25 | $18,854.12 |
| 60 | $16,388.18 | $16,830.30 | $17,287.50 | $17,760.34 | $18,249.41 | $18,755.33 | $19,278.71 |
| 61 | $16,705.01 | $17,163.56 | $17,638.03 | $18,129.02 | $18,637.16 | $19,163.11 | $19,707.56 |
| 62 | $17,023.43 | $17,498.76 | $17,990.89 | $18,500.46 | $19,028.14 | $19,574.64 | $20,140.69 |
| 63 | $17,343.43 | $17,835.92 | $18,346.11 | $18,874.68 | $19,422.37 | $19,989.93 | $20,578.15 |
| 64 | $17,665.04 | $18,175.05 | $18,703.69 | $19,251.72 | $19,819.89 | $20,409.04 | $21,019.99 |
| 65 | $17,988.25 | $18,516.15 | $19,063.66 | $19,631.58 | $20,220.73 | $20,831.98 | $21,466.25 |
| 66 | $18,313.08 | $18,859.25 | $19,426.03 | $20,014.29 | $20,624.90 | $21,258.81 | $21,916.97 |
| 67 | $18,639.54 | $19,204.34 | $19,790.82 | $20,399.87 | $21,032.44 | $21,689.54 | $22,372.20 |
| 68 | $18,967.62 | $19,551.45 | $20,158.03 | $20,788.34 | $21,443.38 | $22,124.22 | $22,831.98 |
| 69 | $19,297.35 | $19,900.59 | $20,527.70 | $21,179.72 | $21,857.74 | $22,562.89 | $23,296.35 |
| 70 | $19,628.73 | $20,251.76 | $20,899.83 | $21,574.04 | $22,275.56 | $23,005.58 | $23,765.37 |
| 71 | $19,961.76 | $20,604.98 | $21,274.44 | $21,971.32 | $22,696.86 | $23,452.33 | $24,239.09 |
| 72 | $20,296.46 | $20,960.25 | $21,651.55 | $22,371.58 | $23,121.66 | $23,903.17 | $24,717.53 |
| 73 | $20,632.83 | $21,317.61 | $22,031.17 | $22,774.84 | $23,550.01 | $24,358.14 | $25,200.77 |
| 74 | $20,970.88 | $21,677.04 | $22,413.32 | $23,181.12 | $23,981.93 | $24,817.29 | $25,688.83 |
| 75 | $21,310.62 | $22,038.58 | $22,798.02 | $23,590.46 | $24,417.45 | $25,280.64 | $26,181.78 |

TABLE 1c-continued

Combined Loan and Investment System Comparison Report Data (Systematic Investment)

| | LOAN | | $160,000 | | | |
|---|---|---|---|---|---|---|
| | RATE | | 5.25% | | | |
| | LUMP SUM INVESTMENT | | $0.00 | | | |
| | SYSTEMATIC INVESTMENT | | $233.72 | | | |

| | | | | | | |
|---|---|---|---|---|---|---|
| 76 | $21,652.06 | $22,402.22 | $23,185.29 | $24,002.86 | $24,856.59 | $25,748.25 | $26,679.65 |
| 77 | $21,995.21 | $22,767.98 | $23,575.13 | $24,418.35 | $25,299.40 | $26,220.13 | $27,182.50 |
| 78 | $22,340.08 | $23,135.88 | $23,967.58 | $24,836.96 | $25,745.90 | $26,696.35 | $27,690.39 |
| 79 | $22,686.67 | $23,505.92 | $24,362.64 | $25,258.71 | $26,196.11 | $27,176.93 | $28,203.35 |
| 80 | $23,034.99 | $23,878.12 | $24,760.34 | $25,683.63 | $26,650.08 | $27,661.91 | $28,721.44 |
| 81 | $23,385.05 | $24,252.49 | $25,160.68 | $26,111.73 | $27,107.83 | $28,151.34 | $29,244.71 |
| 82 | $23,736.87 | $24,629.05 | $25,563.70 | $26,543.04 | $27,569.40 | $28,645.26 | $29,773.21 |
| 83 | $24,090.44 | $25,007.80 | $25,969.40 | $26,977.58 | $28,034.81 | $29,143.70 | $30,307.00 |
| 84 | $24,445.78 | $25,388.76 | $26,377.81 | $27,415.39 | $28,504.10 | $29,646.71 | $30,846.13 |
| 85 | $24,802.90 | $25,771.95 | $26,788.94 | $27,856.47 | $28,977.30 | $30,154.34 | $31,390.65 |
| 86 | $25,161.80 | $26,157.37 | $27,202.81 | $28,300.87 | $29,454.45 | $30,666.62 | $31,940.61 |
| 87 | $25,522.50 | $26,545.04 | $27,619.44 | $28,748.60 | $29,935.57 | $31,183.59 | $32,496.08 |
| 88 | $25,885.00 | $26,934.97 | $28,038.85 | $29,199.69 | $30,420.70 | $31,705.30 | $33,057.09 |
| 89 | $26,249.31 | $27,327.17 | $28,461.05 | $29,654.16 | $30,909.88 | $32,231.79 | $33,623.72 |
| 90 | $26,615.45 | $27,721.66 | $28,886.07 | $30,112.04 | $31,403.13 | $32,763.12 | $34,196.02 |
| 91 | $26,983.41 | $28,118.45 | $29,313.92 | $30,573.35 | $31,900.49 | $33,299.31 | $34,774.03 |
| 92 | $27,353.22 | $28,517.56 | $29,744.63 | $31,038.12 | $32,401.99 | $33,840.41 | $35,357.83 |
| 93 | $27,724.87 | $28,919.00 | $30,178.20 | $31,506.38 | $32,907.68 | $34,386.48 | $35,947.47 |
| 94 | $28,098.39 | $29,322.78 | $30,614.67 | $31,978.15 | $33,417.57 | $34,937.55 | $36,543.00 |
| 95 | $28,473.77 | $29,728.91 | $31,054.05 | $32,453.46 | $33,931.72 | $35,493.67 | $37,144.49 |
| 96 | $28,851.02 | $30,137.41 | $31,496.35 | $32,932.34 | $34,450.15 | $36,054.89 | $37,751.99 |
| 97 | $29,230.17 | $30,548.30 | $31,941.60 | $33,414.80 | $34,972.91 | $36,621.26 | $38,365.57 |
| 98 | $29,611.21 | $30,961.58 | $32,389.83 | $33,900.89 | $35,500.01 | $37,192.82 | $38,985.28 |
| 99 | $29,994.15 | $31,377.27 | $32,841.04 | $34,390.62 | $36,031.51 | $37,769.61 | $39,611.19 |
| 100 | $30,379.01 | $31,795.39 | $33,295.25 | $34,884.02 | $36,567.45 | $38,351.70 | $40,243.36 |
| 101 | $30,765.80 | $32,215.94 | $33,752.50 | $35,381.12 | $37,107.84 | $38,939.12 | $40,881.85 |
| 102 | $31,154.51 | $32,638.95 | $34,212.80 | $35,881.95 | $37,652.74 | $39,531.92 | $41,526.72 |
| 103 | $31,545.17 | $33,064.43 | $34,676.16 | $36,386.54 | $38,202.18 | $40,130.16 | $42,178.05 |
| 104 | $31,937.79 | $33,492.39 | $35,142.61 | $36,894.91 | $38,756.20 | $40,733.88 | $42,835.89 |
| 105 | $32,332.37 | $33,922.85 | $35,612.17 | $37,407.10 | $39,314.84 | $41,343.14 | $43,500.30 |
| 106 | $32,728.92 | $34,355.81 | $36,084.87 | $37,923.12 | $39,878.13 | $41,957.98 | $44,171.36 |
| 107 | $33,127.45 | $34,791.30 | $36,560.71 | $38,443.02 | $40,446.11 | $42,578.46 | $44,849.13 |
| 108 | $33,527.98 | $35,229.34 | $37,039.73 | $38,966.81 | $41,018.83 | $43,204.62 | $45,533.68 |
| 109 | $33,930.50 | $35,669.92 | $37,521.94 | $39,494.54 | $41,596.32 | $43,836.53 | $46,225.08 |
| 110 | $34,335.04 | $36,113.08 | $38,007.36 | $40,026.22 | $42,178.63 | $44,474.22 | $46,923.38 |
| 111 | $34,741.61 | $36,558.83 | $38,496.02 | $40,561.89 | $42,765.78 | $45,117.77 | $47,628.68 |
| 112 | $35,150.21 | $37,007.17 | $38,987.94 | $41,101.58 | $43,357.83 | $45,767.21 | $48,341.02 |
| 113 | $35,560.84 | $37,458.13 | $39,483.14 | $41,645.31 | $43,954.82 | $46,422.60 | $49,060.49 |
| 114 | $35,973.54 | $37,911.72 | $39,981.64 | $42,193.12 | $44,556.77 | $47,084.01 | $49,787.15 |
| 115 | $36,388.29 | $38,367.95 | $40,483.46 | $42,745.05 | $45,163.75 | $47,751.47 | $50,521.08 |
| 116 | $36,805.12 | $38,826.85 | $40,988.63 | $43,301.11 | $45,775.78 | $48,425.06 | $51,262.35 |
| 117 | $37,224.04 | $39,288.42 | $41,497.16 | $43,861.34 | $46,392.91 | $49,104.82 | $52,011.03 |
| 118 | $37,645.05 | $39,752.69 | $42,009.09 | $44,425.77 | $47,015.19 | $49,790.81 | $52,767.19 |
| 119 | $38,068.16 | $40,219.66 | $42,524.43 | $44,994.44 | $47,642.65 | $50,483.08 | $53,530.92 |
| 120 | $38,493.39 | $40,689.36 | $43,043.20 | $45,567.37 | $48,275.34 | $51,181.71 | $54,302.29 |
| 121 | $38,920.75 | $41,161.80 | $43,565.43 | $46,144.60 | $48,913.30 | $51,886.74 | $55,081.37 |
| 122 | $39,350.24 | $41,636.99 | $44,091.15 | $46,726.15 | $49,556.58 | $52,598.23 | $55,868.24 |
| 123 | $39,781.88 | $42,114.96 | $44,620.37 | $47,312.07 | $50,205.22 | $53,316.24 | $56,662.98 |
| 124 | $40,215.68 | $42,595.71 | $45,153.12 | $47,902.39 | $50,859.26 | $54,040.84 | $57,465.67 |
| 125 | $40,651.64 | $43,079.27 | $45,689.41 | $48,497.13 | $51,518.76 | $54,772.07 | $58,276.38 |
| 126 | $41,089.79 | $43,565.65 | $46,229.29 | $49,096.33 | $52,183.75 | $55,510.01 | $59,095.20 |
| 127 | $41,530.13 | $44,054.86 | $46,772.76 | $49,700.02 | $52,854.28 | $56,254.72 | $59,922.21 |
| 128 | $41,972.67 | $44,546.93 | $47,319.86 | $50,308.25 | $53,530.40 | $57,006.25 | $60,757.49 |
| 129 | $42,417.42 | $45,041.88 | $47,870.60 | $50,921.03 | $54,212.15 | $57,764.67 | $61,601.12 |
| 130 | $42,864.39 | $45,539.70 | $48,425.02 | $51,538.41 | $54,899.59 | $58,530.04 | $62,453.19 |
| 131 | $43,313.60 | $46,040.43 | $48,983.13 | $52,160.42 | $55,592.75 | $59,302.43 | $63,313.78 |
| 132 | $43,765.06 | $46,544.09 | $49,544.96 | $52,787.10 | $56,291.70 | $60,081.89 | $64,182.97 |
| 133 | $44,218.78 | $47,050.68 | $50,110.54 | $53,418.48 | $56,996.46 | $60,868.51 | $65,060.86 |
| 134 | $44,674.76 | $47,560.22 | $50,679.89 | $54,054.59 | $57,707.10 | $61,662.33 | $65,947.53 |
| 135 | $45,133.02 | $48,072.74 | $51,253.03 | $54,695.47 | $58,423.66 | $62,463.43 | $66,843.06 |
| 136 | $45,593.57 | $48,588.25 | $51,830.00 | $55,341.16 | $59,146.19 | $63,271.88 | $67,747.55 |
| 137 | $46,056.43 | $49,106.76 | $52,410.81 | $55,991.69 | $59,874.74 | $64,087.73 | $68,661.08 |
| 138 | $46,521.60 | $49,628.30 | $52,995.49 | $56,647.10 | $60,609.37 | $64,911.06 | $69,583.75 |
| 139 | $46,989.10 | $50,152.88 | $53,584.07 | $57,307.43 | $61,350.11 | $65,741.94 | $70,515.64 |
| 140 | $47,458.93 | $50,680.53 | $54,176.58 | $57,972.70 | $62,097.03 | $66,580.44 | $71,456.86 |
| 141 | $47,931.12 | $51,211.25 | $54,773.03 | $58,642.97 | $62,850.17 | $67,426.62 | $72,407.48 |
| 142 | $48,405.66 | $51,745.06 | $55,373.47 | $59,318.27 | $63,609.59 | $68,280.56 | $73,367.61 |
| 143 | $48,882.58 | $52,281.99 | $55,977.90 | $59,998.63 | $64,375.34 | $69,142.33 | $74,337.35 |
| 144 | $49,361.88 | $52,822.05 | $56,586.36 | $60,684.09 | $65,147.47 | $70,012.00 | $75,316.78 |
| 145 | $49,843.58 | $53,365.27 | $57,198.88 | $61,374.69 | $65,926.03 | $70,889.64 | $76,306.00 |
| 146 | $50,327.68 | $53,911.65 | $57,815.49 | $62,070.48 | $66,711.08 | $71,775.32 | $77,305.12 |
| 147 | $50,814.21 | $54,461.21 | $58,436.20 | $62,771.48 | $67,502.68 | $72,669.12 | $78,314.23 |
| 148 | $51,303.17 | $55,013.99 | $59,061.06 | $63,477.74 | $68,300.87 | $73,571.12 | $79,333.43 |

TABLE 1c-continued

Combined Loan and Investment System Comparison Report Data (Systematic Investment)

| | LOAN | | $160,000 | | | |
|---|---|---|---|---|---|---|
| | RATE | | 5.25% | | | |
| | LUMP SUM INVESTMENT | | $0.00 | | | |
| | SYSTEMATIC INVESTMENT | | $233.72 | | | |

| | | | | | | | |
|---|---|---|---|---|---|---|---|
| 149 | $51,794.57 | $55,569.99 | $59,690.07 | $64,189.29 | $69,105.71 | $74,481.38 | $80,362.82 |
| 150 | $52,288.43 | $56,129.23 | $60,323.29 | $64,906.19 | $69,917.26 | $75,399.99 | $81,402.51 |
| 151 | $52,784.77 | $56,691.73 | $60,960.72 | $65,628.46 | $70,735.57 | $76,327.02 | $82,452.59 |
| 152 | $53,283.58 | $57,257.52 | $61,602.40 | $66,356.14 | $71,560.70 | $77,262.55 | $83,513.17 |
| 153 | $53,784.88 | $57,826.60 | $62,248.36 | $67,089.29 | $72,392.71 | $78,206.65 | $84,584.36 |
| 154 | $54,288.70 | $58,399.01 | $62,898.63 | $67,827.93 | $73,231.65 | $79,159.41 | $85,666.26 |
| 155 | $54,795.03 | $58,974.75 | $63,553.23 | $68,572.11 | $74,077.58 | $80,120.90 | $86,758.98 |
| 156 | $55,303.89 | $59,553.85 | $64,212.20 | $69,321.87 | $74,930.56 | $81,091.20 | $87,862.63 |
| 157 | $55,815.30 | $60,136.34 | $64,875.56 | $70,077.26 | $75,790.65 | $82,070.40 | $88,977.31 |
| 158 | $56,329.27 | $60,722.21 | $65,543.34 | $70,838.31 | $76,657.90 | $83,058.58 | $90,103.14 |
| 159 | $56,845.80 | $61,311.51 | $66,215.57 | $71,605.07 | $77,532.39 | $84,055.81 | $91,240.23 |
| 160 | $57,364.92 | $61,904.24 | $66,892.29 | $72,377.59 | $78,414.16 | $85,062.18 | $92,388.69 |
| 161 | $57,886.63 | $62,500.44 | $67,573.52 | $73,155.89 | $79,303.28 | $86,077.78 | $93,548.63 |
| 162 | $58,410.95 | $63,100.11 | $68,259.29 | $73,940.03 | $80,199.81 | $87,102.69 | $94,720.18 |
| 163 | $58,937.90 | $63,703.27 | $68,949.63 | $74,730.06 | $81,103.81 | $88,136.99 | $95,903.44 |
| 164 | $59,467.48 | $64,309.96 | $69,644.57 | $75,526.00 | $82,015.34 | $89,180.78 | $97,098.53 |
| 165 | $59,999.70 | $64,920.18 | $70,344.14 | $76,327.92 | $82,934.47 | $90,234.13 | $98,305.57 |
| 166 | $60,534.59 | $65,533.97 | $71,048.38 | $77,135.85 | $83,861.25 | $91,297.14 | $99,524.68 |
| 167 | $61,072.15 | $66,151.33 | $71,757.32 | $77,949.85 | $84,795.77 | $92,369.89 | $100,755.99 |
| 168 | $61,612.40 | $66,772.30 | $72,470.98 | $78,769.94 | $85,738.07 | $93,452.48 | $101,999.60 |
| 169 | $62,155.35 | $67,396.89 | $73,189.39 | $79,596.19 | $86,688.22 | $94,544.99 | $103,255.66 |
| 170 | $62,701.02 | $68,025.12 | $73,912.60 | $80,428.63 | $87,646.29 | $95,647.51 | $104,524.27 |
| 171 | $63,249.41 | $68,657.02 | $74,640.63 | $81,267.32 | $88,612.34 | $96,760.15 | $105,805.57 |
| 172 | $63,800.54 | $69,292.60 | $75,373.51 | $82,112.30 | $89,586.44 | $97,882.98 | $107,099.68 |
| 173 | $64,354.44 | $69,931.89 | $76,111.28 | $82,963.61 | $90,568.67 | $99,016.10 | $108,406.74 |
| 174 | $64,911.10 | $70,574.91 | $76,853.97 | $83,821.31 | $91,559.07 | $100,159.61 | $109,726.86 |
| 175 | $65,470.54 | $71,221.68 | $77,601.61 | $84,685.45 | $92,557.73 | $101,313.60 | $111,060.19 |
| 176 | $66,032.78 | $71,872.22 | $78,354.23 | $85,556.06 | $93,564.71 | $102,478.17 | $112,406.85 |
| 177 | $66,597.83 | $72,526.56 | $79,111.87 | $86,433.20 | $94,580.09 | $103,653.42 | $113,766.97 |
| 178 | $67,165.71 | $73,184.71 | $79,874.56 | $87,316.93 | $95,603.92 | $104,839.44 | $115,140.70 |
| 179 | $67,736.43 | $73,846.71 | $80,642.33 | $88,207.28 | $96,636.29 | $106,036.33 | $116,528.16 |
| 180 | $68,310.00 | $74,512.56 | $81,415.23 | $89,104.30 | $97,677.26 | $107,244.19 | $117,929.50 |
| 181 | $68,886.44 | $75,182.30 | $82,193.27 | $90,008.06 | $98,726.90 | $108,463.12 | $119,344.85 |
| 182 | $69,465.76 | $75,855.95 | $82,976.51 | $90,918.59 | $99,785.30 | $109,693.23 | $120,774.36 |
| 183 | $70,047.98 | $76,533.53 | $83,764.96 | $91,835.95 | $100,852.51 | $110,934.62 | $122,218.16 |
| 184 | $70,633.11 | $77,215.06 | $84,558.67 | $92,760.20 | $101,928.61 | $112,187.38 | $123,676.40 |
| 185 | $71,221.16 | $77,900.56 | $85,357.68 | $93,691.37 | $103,013.69 | $113,451.62 | $125,149.22 |
| 186 | $71,812.15 | $78,590.06 | $86,162.00 | $94,629.53 | $104,107.80 | $114,727.46 | $126,636.77 |
| 187 | $72,406.10 | $79,283.59 | $86,971.70 | $95,574.72 | $105,211.03 | $116,014.99 | $128,139.20 |
| 188 | $73,003.02 | $79,981.16 | $87,786.79 | $96,527.01 | $106,323.46 | $117,314.32 | $129,656.64 |
| 189 | $73,602.93 | $80,682.80 | $88,607.31 | $97,486.43 | $107,445.16 | $118,625.57 | $131,189.27 |
| 190 | $74,205.83 | $81,388.53 | $89,433.30 | $98,453.05 | $108,576.20 | $119,948.83 | $132,737.22 |
| 191 | $74,811.75 | $82,098.38 | $90,264.80 | $99,426.92 | $109,716.67 | $121,284.23 | $134,300.65 |
| 192 | $75,420.69 | $82,812.37 | $91,101.85 | $100,408.10 | $110,866.64 | $122,631.86 | $135,879.71 |
| 193 | $76,032.69 | $83,530.53 | $91,944.47 | $101,396.63 | $112,026.20 | $123,991.85 | $137,474.57 |
| 194 | $76,647.74 | $84,252.87 | $92,792.71 | $102,392.58 | $113,195.42 | $125,364.30 | $139,085.37 |
| 195 | $77,265.87 | $84,979.43 | $93,646.61 | $103,396.00 | $114,374.38 | $126,749.34 | $140,712.28 |
| 196 | $77,887.08 | $85,710.23 | $94,506.20 | $104,406.94 | $115,563.17 | $128,147.07 | $142,355.46 |
| 197 | $78,511.41 | $86,445.29 | $95,371.52 | $105,425.47 | $116,761.86 | $129,557.61 | $144,015.07 |
| 198 | $79,138.85 | $87,184.64 | $96,242.60 | $106,451.63 | $117,970.55 | $130,981.09 | $145,691.28 |
| 199 | $79,769.44 | $87,928.30 | $97,119.50 | $107,485.49 | $119,189.30 | $132,417.61 | $147,384.25 |
| 200 | $80,403.17 | $88,676.30 | $98,002.24 | $108,527.10 | $120,418.21 | $133,867.30 | $149,094.15 |
| 201 | $81,040.08 | $89,428.66 | $98,890.87 | $109,576.53 | $121,657.37 | $135,330.28 | $150,821.15 |
| 202 | $81,680.17 | $90,185.41 | $99,785.42 | $110,633.83 | $122,906.85 | $136,806.67 | $152,565.42 |
| 203 | $82,323.46 | $90,946.57 | $100,685.93 | $111,699.05 | $124,166.74 | $138,296.59 | $154,327.13 |
| 204 | $82,969.96 | $91,712.18 | $101,592.45 | $112,772.27 | $125,437.13 | $139,800.17 | $156,106.46 |
| 205 | $83,619.70 | $92,482.25 | $102,505.01 | $113,853.53 | $126,718.10 | $141,317.54 | $157,903.58 |
| 206 | $84,272.69 | $93,256.81 | $103,423.66 | $114,942.91 | $128,009.76 | $142,848.81 | $159,718.67 |
| 207 | $84,928.94 | $94,035.89 | $104,348.42 | $116,040.45 | $129,312.17 | $144,394.12 | $161,551.91 |
| 208 | $85,588.47 | $94,819.52 | $105,279.36 | $117,146.23 | $130,625.44 | $145,953.60 | $163,403.49 |
| 209 | $86,251.30 | $95,607.72 | $106,216.50 | $118,260.30 | $131,949.65 | $147,527.37 | $165,273.58 |
| 210 | $86,917.45 | $96,400.51 | $107,159.89 | $119,382.72 | $133,284.90 | $149,115.56 | $167,162.38 |
| 211 | $87,586.92 | $97,197.93 | $108,109.57 | $120,513.57 | $134,631.28 | $150,718.32 | $169,070.06 |
| 212 | $88,259.75 | $98,000.00 | $109,065.57 | $121,652.89 | $135,988.87 | $152,335.76 | $170,996.82 |
| 213 | $88,935.93 | $98,806.75 | $110,027.96 | $122,800.76 | $137,357.78 | $153,968.04 | $172,942.84 |
| 214 | $89,615.50 | $99,618.21 | $110,996.75 | $123,957.24 | $138,738.10 | $155,615.27 | $174,908.33 |
| 215 | $90,298.47 | $100,434.40 | $111,972.01 | $125,122.39 | $140,129.91 | $157,277.61 | $176,893.47 |
| 216 | $90,984.85 | $101,255.35 | $112,953.77 | $126,296.28 | $141,533.33 | $158,955.18 | $178,898.46 |
| 217 | $91,674.66 | $102,081.09 | $113,942.07 | $127,478.98 | $142,948.44 | $160,648.14 | $180,923.50 |
| 218 | $92,367.92 | $102,911.64 | $114,936.96 | $128,670.54 | $144,375.35 | $162,356.61 | $182,968.79 |
| 219 | $93,064.65 | $103,747.05 | $115,938.49 | $129,871.05 | $145,814.14 | $164,080.74 | $185,034.54 |
| 220 | $93,764.86 | $104,587.32 | $116,946.69 | $131,080.55 | $147,264.93 | $165,820.67 | $187,120.94 |
| 221 | $94,468.58 | $105,432.50 | $117,961.61 | $132,299.13 | $148,727.81 | $167,576.56 | $189,228.21 |

TABLE 1c-continued

Combined Loan and Investment System Comparison Report Data (Systematic Investment)

| | LOAN | | $160,000 | | | |
|---|---|---|---|---|---|---|
| | RATE | | 5.25% | | | |
| | LUMP SUM INVESTMENT | | $0.00 | | | |
| | SYSTEMATIC INVESTMENT | | $233.72 | | | |

| | | | | | | | |
|---|---|---|---|---|---|---|---|
| 222 | $95,175.81 | $106,282.60 | $118,983.30 | $133,526.85 | $150,202.87 | $169,348.54 | $191,356.55 |
| 223 | $95,886.58 | $107,137.67 | $120,011.80 | $134,763.77 | $151,690.23 | $171,136.76 | $193,506.17 |
| 224 | $96,600.90 | $107,997.72 | $121,047.16 | $136,009.97 | $153,189.98 | $172,941.38 | $195,677.29 |
| 225 | $97,318.79 | $108,862.79 | $122,089.42 | $137,265.52 | $154,702.23 | $174,762.54 | $197,870.12 |
| 226 | $98,040.27 | $109,732.91 | $123,138.62 | $138,530.48 | $156,227.09 | $176,600.39 | $200,084.88 |
| 227 | $98,765.36 | $110,608.10 | $124,194.83 | $139,804.93 | $157,764.65 | $178,455.09 | $202,321.78 |
| 228 | $99,494.08 | $111,488.40 | $125,258.07 | $141,088.94 | $159,315.02 | $180,326.79 | $204,581.06 |
| 229 | $100,226.44 | $112,373.83 | $126,328.40 | $142,382.58 | $160,878.31 | $182,215.65 | $206,862.92 |
| 230 | $100,962.46 | $113,264.43 | $127,405.87 | $143,685.93 | $162,454.63 | $184,121.82 | $209,167.61 |
| 231 | $101,702.16 | $114,160.22 | $128,490.52 | $144,999.04 | $164,044.09 | $186,045.47 | $211,495.34 |
| 232 | $102,445.56 | $115,061.24 | $129,582.40 | $146,322.01 | $165,646.79 | $187,986.75 | $213,846.35 |
| 233 | $103,192.68 | $115,967.51 | $130,681.56 | $147,654.90 | $167,262.85 | $189,945.82 | $216,220.88 |
| 234 | $103,943.53 | $116,879.07 | $131,788.05 | $148,997.78 | $168,892.37 | $191,922.85 | $218,619.14 |
| 235 | $104,698.13 | $117,795.95 | $132,901.92 | $150,350.74 | $170,535.48 | $193,918.01 | $221,041.39 |
| 236 | $105,456.51 | $118,718.18 | $134,023.21 | $151,713.84 | $172,192.27 | $195,931.45 | $223,487.86 |
| 237 | $106,218.68 | $119,645.78 | $135,151.97 | $153,087.17 | $173,862.88 | $197,963.35 | $225,958.80 |
| 238 | $106,984.67 | $120,578.80 | $136,288.26 | $154,470.80 | $175,547.40 | $200,013.88 | $228,454.44 |
| 239 | $107,754.48 | $121,517.26 | $137,432.13 | $155,864.80 | $177,245.96 | $202,083.20 | $230,975.04 |
| 240 | $108,528.14 | $122,461.19 | $138,583.62 | $157,269.26 | $178,958.68 | $204,171.49 | $233,520.85 |
| 241 | $109,305.67 | $123,410.63 | $139,742.79 | $158,684.25 | $180,685.67 | $206,278.93 | $236,092.12 |
| 242 | $110,087.09 | $124,365.61 | $140,909.69 | $160,109.86 | $182,427.05 | $208,405.68 | $238,689.10 |
| 243 | $110,872.41 | $125,326.16 | $142,084.37 | $161,546.15 | $184,182.95 | $210,551.93 | $241,312.04 |
| 244 | $111,661.66 | $126,292.31 | $143,266.87 | $162,993.22 | $185,953.47 | $212,717.85 | $243,961.22 |
| 245 | $112,454.86 | $127,264.10 | $144,457.26 | $164,451.14 | $187,738.75 | $214,903.63 | $246,636.89 |
| 246 | $113,252.02 | $128,241.56 | $145,655.59 | $165,920.00 | $189,538.91 | $217,109.44 | $249,339.32 |
| 247 | $114,053.17 | $129,224.72 | $146,861.91 | $167,399.87 | $191,354.07 | $219,335.47 | $252,068.77 |
| 248 | $114,858.32 | $130,213.61 | $148,076.26 | $168,890.84 | $193,184.35 | $221,581.91 | $254,825.51 |
| 249 | $115,667.50 | $131,208.28 | $149,298.72 | $170,393.00 | $195,029.89 | $223,848.94 | $257,609.82 |
| 250 | $116,480.73 | $132,208.74 | $150,529.32 | $171,906.42 | $196,890.81 | $226,136.75 | $260,421.98 |
| 251 | $117,298.02 | $133,215.04 | $151,768.13 | $173,431.19 | $198,767.23 | $228,445.53 | $263,262.26 |
| 252 | $118,119.40 | $134,227.21 | $153,015.19 | $174,967.40 | $200,659.29 | $230,775.48 | $266,130.94 |
| 253 | $118,944.89 | $135,245.29 | $154,270.57 | $176,515.13 | $202,567.12 | $233,126.78 | $269,028.30 |
| 254 | $119,774.50 | $136,269.30 | $155,534.32 | $178,074.46 | $204,490.85 | $235,499.64 | $271,954.64 |
| 255 | $120,608.26 | $137,299.29 | $156,806.49 | $179,645.49 | $206,430.61 | $237,894.25 | $274,910.25 |
| 256 | $121,446.19 | $138,335.29 | $158,087.15 | $181,228.31 | $208,386.53 | $240,310.81 | $277,895.41 |
| 257 | $122,288.31 | $139,377.33 | $159,376.34 | $182,822.99 | $210,358.75 | $242,749.52 | $280,910.42 |
| 258 | $123,134.64 | $140,425.44 | $160,674.13 | $184,429.64 | $212,347.41 | $245,210.59 | $283,955.58 |
| 259 | $123,985.20 | $141,479.68 | $161,980.57 | $186,048.33 | $214,352.64 | $247,694.21 | $287,031.19 |
| 260 | $124,840.02 | $142,540.06 | $163,295.72 | $187,679.17 | $216,374.58 | $250,200.61 | $290,137.56 |
| 261 | $125,699.10 | $143,606.62 | $164,619.63 | $189,322.23 | $218,413.37 | $252,729.98 | $293,274.99 |
| 262 | $126,562.49 | $144,679.41 | $165,952.37 | $190,977.62 | $220,469.15 | $255,282.53 | $296,443.80 |
| 263 | $127,430.19 | $145,758.46 | $167,294.00 | $192,645.43 | $222,542.06 | $257,858.48 | $299,644.30 |
| 264 | $128,302.23 | $146,843.80 | $168,644.57 | $194,325.74 | $224,632.24 | $260,458.05 | $302,876.80 |
| 265 | $129,178.63 | $147,935.47 | $170,004.15 | $196,018.66 | $226,739.84 | $263,081.44 | $306,141.62 |
| 266 | $130,059.41 | $149,033.51 | $171,372.79 | $197,724.27 | $228,865.01 | $265,728.88 | $309,439.10 |
| 267 | $130,944.60 | $150,137.96 | $172,750.55 | $199,442.68 | $231,007.89 | $268,400.59 | $312,769.54 |
| 268 | $131,834.21 | $151,248.85 | $174,137.50 | $201,173.97 | $233,168.62 | $271,096.79 | $316,133.30 |
| 269 | $132,728.27 | $152,366.21 | $175,533.69 | $202,918.25 | $235,347.36 | $273,817.71 | $319,530.69 |
| 270 | $133,626.80 | $153,490.10 | $176,939.20 | $204,675.61 | $237,544.25 | $276,563.57 | $322,962.05 |
| 271 | $134,529.82 | $154,620.54 | $178,354.07 | $206,446.15 | $239,759.46 | $279,334.60 | $326,427.73 |
| 272 | $135,437.36 | $155,757.58 | $179,778.37 | $208,229.97 | $241,993.12 | $282,131.03 | $329,928.06 |
| 273 | $136,349.43 | $156,901.25 | $181,212.17 | $210,027.16 | $244,245.40 | $284,953.09 | $333,463.40 |
| 274 | $137,266.07 | $158,051.59 | $182,655.53 | $211,837.84 | $246,516.44 | $287,801.02 | $337,034.09 |
| 275 | $138,187.29 | $159,208.64 | $184,108.52 | $213,662.10 | $248,806.42 | $290,675.06 | $340,640.49 |
| 276 | $139,113.11 | $160,372.44 | $185,571.18 | $215,500.04 | $251,115.47 | $293,575.45 | $344,282.95 |
| 277 | $140,043.57 | $161,543.03 | $187,043.60 | $217,351.76 | $253,443.77 | $296,502.42 | $347,961.84 |
| 278 | $140,978.67 | $162,720.45 | $188,525.84 | $219,217.37 | $255,791.47 | $299,456.22 | $351,677.51 |
| 279 | $141,918.46 | $163,904.73 | $190,017.96 | $221,096.97 | $258,158.73 | $302,437.10 | $355,430.35 |
| 280 | $142,862.94 | $165,095.93 | $191,520.02 | $222,990.67 | $260,545.72 | $305,445.30 | $359,220.71 |
| 281 | $143,812.14 | $166,294.07 | $193,032.10 | $224,898.58 | $262,952.60 | $308,481.08 | $363,048.97 |
| 282 | $144,766.09 | $167,499.20 | $194,554.26 | $226,820.79 | $265,379.54 | $311,544.68 | $366,915.52 |
| 283 | $145,724.81 | $168,711.37 | $196,086.56 | $228,757.42 | $267,826.70 | $314,636.37 | $370,820.73 |
| 284 | $146,688.32 | $169,930.60 | $197,629.09 | $230,708.57 | $270,294.26 | $317,756.40 | $374,765.00 |
| 285 | $147,656.65 | $171,156.94 | $199,181.89 | $232,674.36 | $272,782.38 | $320,905.03 | $378,748.70 |
| 286 | $148,629.82 | $172,390.44 | $200,745.05 | $234,654.89 | $275,291.23 | $324,082.52 | $382,772.25 |
| 287 | $149,607.86 | $173,631.14 | $202,318.63 | $236,650.27 | $277,821.00 | $327,289.14 | $386,836.03 |
| 288 | $150,590.79 | $174,879.07 | $203,902.70 | $238,660.62 | $280,371.84 | $330,525.15 | $390,940.44 |
| 289 | $151,578.63 | $176,134.28 | $205,497.33 | $240,686.05 | $282,943.94 | $333,790.83 | $395,085.91 |
| 290 | $152,571.41 | $177,396.81 | $207,102.59 | $242,726.67 | $285,537.47 | $337,086.44 | $399,272.82 |
| 291 | $153,569.16 | $178,666.71 | $208,718.55 | $244,782.59 | $288,152.62 | $340,412.26 | $403,501.61 |
| 292 | $154,571.89 | $179,944.02 | $210,345.28 | $246,853.93 | $290,789.56 | $343,768.57 | $407,772.68 |
| 293 | $155,579.64 | $181,228.77 | $211,982.86 | $248,940.81 | $293,448.47 | $347,155.64 | $412,086.46 |
| 294 | $156,592.43 | $182,521.02 | $213,631.36 | $251,043.34 | $296,129.54 | $350,573.77 | $416,443.39 |

TABLE 1c-continued

Combined Loan and Investment System Comparison Report Data (Systematic Investment)

| | LOAN | $160,000 |
|---|---|---|
| | RATE | 5.25% |
| | LUMP SUM INVESTMENT | $0.00 |
| | SYSTEMATIC INVESTMENT | $233.72 |

| | | | | | | | |
|---|---|---|---|---|---|---|---|
| 295 | $157,610.28 | $183,820.81 | $215,290.85 | $253,161.64 | $298,832.96 | $354,023.22 | $420,843.88 |
| 296 | $158,633.22 | $185,128.19 | $216,961.40 | $255,295.82 | $301,558.90 | $357,504.30 | $425,288.37 |
| 297 | $159,661.27 | $186,443.18 | $218,643.09 | $257,446.02 | $304,307.56 | $361,017.28 | $429,777.31 |
| 298 | $160,694.47 | $187,765.85 | $220,335.98 | $259,612.33 | $307,079.12 | $364,562.47 | $434,311.14 |
| 299 | $161,732.83 | $189,096.24 | $222,040.17 | $261,794.90 | $309,873.78 | $368,140.16 | $438,890.31 |
| 300 | $162,776.38 | $190,434.38 | $223,755.71 | $263,993.83 | $312,691.73 | $371,750.64 | $443,515.27 |
| 301 | $163,825.15 | $191,780.33 | $225,482.70 | $266,209.26 | $315,533.16 | $375,394.21 | $448,186.48 |
| 302 | $164,879.17 | $193,134.13 | $227,221.19 | $268,441.30 | $318,398.27 | $379,071.19 | $452,904.41 |
| 303 | $165,938.45 | $194,495.83 | $228,971.28 | $270,690.09 | $321,287.26 | $382,781.87 | $457,669.51 |
| 304 | $167,003.03 | $195,865.47 | $230,733.03 | $272,955.73 | $324,200.32 | $386,526.57 | $462,482.26 |
| 305 | $168,072.94 | $197,243.11 | $232,506.53 | $275,238.37 | $327,137.66 | $390,305.59 | $467,343.14 |
| 306 | $169,148.19 | $198,628.78 | $234,291.85 | $277,538.14 | $330,099.47 | $394,119.25 | $472,252.63 |
| 307 | $170,228.82 | $200,022.53 | $236,089.08 | $279,855.14 | $333,085.97 | $397,967.87 | $477,211.21 |
| 308 | $171,314.85 | $201,424.41 | $237,898.28 | $282,189.53 | $336,097.36 | $401,851.78 | $482,219.38 |
| 309 | $172,406.31 | $202,834.47 | $239,719.55 | $284,541.43 | $339,133.83 | $405,771.28 | $487,277.63 |
| 310 | $173,503.23 | $204,252.75 | $241,552.96 | $286,910.96 | $342,195.62 | $409,726.71 | $492,386.47 |
| 311 | $174,605.64 | $205,679.31 | $243,398.59 | $289,298.26 | $345,282.92 | $413,718.40 | $497,546.39 |
| 312 | $175,713.56 | $207,114.19 | $245,256.52 | $291,703.47 | $348,395.94 | $417,746.68 | $502,757.91 |
| 313 | $176,827.01 | $208,557.44 | $247,126.85 | $294,126.72 | $351,534.91 | $421,811.89 | $508,021.54 |
| 314 | $177,946.04 | $210,009.11 | $249,009.64 | $296,568.15 | $354,700.03 | $425,914.36 | $513,337.82 |
| 315 | $179,070.65 | $211,469.24 | $250,904.98 | $299,027.88 | $357,891.53 | $430,054.44 | $518,707.25 |
| 316 | $180,200.90 | $212,937.90 | $252,812.96 | $301,506.06 | $361,109.63 | $434,232.47 | $524,130.38 |
| 317 | $181,336.79 | $214,415.12 | $254,733.65 | $304,002.83 | $364,354.55 | $438,448.79 | $529,607.74 |
| 318 | $182,478.36 | $215,900.96 | $256,667.16 | $306,518.32 | $367,626.50 | $442,703.77 | $535,139.88 |
| 319 | $183,625.64 | $217,395.46 | $258,613.55 | $309,052.69 | $370,925.72 | $446,997.75 | $540,727.33 |
| 320 | $184,778.66 | $218,898.69 | $260,572.92 | $311,606.05 | $374,252.44 | $451,331.09 | $546,370.66 |
| 321 | $185,937.44 | $220,410.68 | $262,545.35 | $314,178.57 | $377,606.88 | $455,704.16 | $552,070.43 |
| 322 | $187,102.02 | $221,931.49 | $264,530.93 | $316,770.38 | $380,989.27 | $460,117.31 | $557,827.19 |
| 323 | $188,272.42 | $223,461.17 | $266,529.75 | $319,381.63 | $384,399.85 | $464,570.91 | $563,641.52 |
| 324 | $189,448.67 | $224,999.78 | $268,541.89 | $322,012.47 | $387,838.85 | $469,065.34 | $569,513.99 |
| 325 | $190,630.80 | $226,547.36 | $270,567.45 | $324,663.04 | $391,306.50 | $473,600.97 | $575,445.19 |
| 326 | $191,818.84 | $228,103.97 | $272,606.51 | $327,333.48 | $394,803.06 | $478,178.17 | $581,435.70 |
| 327 | $193,012.82 | $229,669.66 | $274,659.16 | $330,023.96 | $398,328.75 | $482,797.34 | $587,486.11 |
| 328 | $194,212.78 | $231,244.49 | $276,725.50 | $332,734.61 | $401,883.83 | $487,458.84 | $593,597.03 |
| 329 | $195,418.73 | $232,828.49 | $278,805.62 | $335,465.59 | $405,468.53 | $492,163.08 | $599,769.06 |
| 330 | $196,630.71 | $234,421.74 | $280,899.60 | $338,217.06 | $409,083.10 | $496,910.43 | $606,002.80 |
| 331 | $197,848.75 | $236,024.29 | $283,007.54 | $340,989.16 | $412,727.79 | $501,701.31 | $612,298.89 |
| 332 | $199,072.89 | $237,636.18 | $285,129.54 | $343,782.05 | $416,402.86 | $506,536.10 | $618,657.94 |
| 333 | $200,303.14 | $239,257.47 | $287,265.68 | $346,595.89 | $420,108.55 | $511,415.21 | $625,080.57 |
| 334 | $201,539.54 | $240,888.23 | $289,416.06 | $349,430.83 | $423,845.12 | $516,339.04 | $631,567.44 |
| 335 | $202,782.13 | $242,528.49 | $291,580.78 | $352,287.03 | $427,612.83 | $521,308.01 | $638,119.17 |
| 336 | $204,030.93 | $244,178.32 | $293,759.93 | $355,164.66 | $431,411.94 | $526,322.53 | $644,736.42 |
| 337 | $205,285.97 | $245,837.78 | $295,953.61 | $358,063.87 | $435,242.71 | $531,383.02 | $651,419.84 |
| 338 | $206,547.29 | $247,506.92 | $298,161.91 | $360,984.82 | $439,105.40 | $536,489.89 | $658,170.09 |
| 339 | $207,814.92 | $249,185.79 | $300,384.93 | $363,927.68 | $443,000.28 | $541,643.58 | $664,987.85 |
| 340 | $209,088.88 | $250,874.46 | $302,622.78 | $366,892.61 | $446,927.61 | $546,844.51 | $671,873.79 |
| 341 | $210,369.21 | $252,572.98 | $304,875.54 | $369,879.77 | $450,887.68 | $552,093.11 | $678,828.58 |
| 342 | $211,655.95 | $254,281.40 | $307,143.32 | $372,889.35 | $454,880.74 | $557,389.83 | $685,852.92 |
| 343 | $212,949.11 | $255,999.79 | $309,426.22 | $375,921.49 | $458,907.08 | $562,735.10 | $692,947.51 |
| 344 | $214,248.75 | $257,728.21 | $311,724.34 | $378,976.37 | $462,966.98 | $568,129.36 | $700,113.04 |
| 345 | $215,554.88 | $259,466.71 | $314,037.78 | $382,054.17 | $467,060.70 | $573,573.08 | $707,350.23 |
| 346 | $216,867.54 | $261,215.35 | $316,366.65 | $385,155.05 | $471,188.54 | $579,066.70 | $714,659.79 |
| 347 | $218,186.77 | $262,974.19 | $318,711.04 | $388,279.18 | $475,350.78 | $584,610.67 | $722,042.45 |
| 348 | $219,512.59 | $264,743.28 | $321,071.05 | $391,426.75 | $479,547.71 | $590,205.46 | $729,498.93 |
| 349 | $220,845.04 | $266,522.70 | $323,446.81 | $394,597.92 | $483,779.60 | $595,851.54 | $737,029.97 |
| 350 | $222,184.16 | $268,312.50 | $325,838.40 | $397,792.88 | $488,046.77 | $601,549.38 | $744,636.33 |
| 351 | $223,529.97 | $270,112.74 | $328,245.93 | $401,011.80 | $492,349.49 | $607,299.44 | $752,318.75 |
| 352 | $224,882.51 | $271,923.48 | $330,669.51 | $404,254.86 | $496,688.07 | $613,102.22 | $760,078.00 |
| 353 | $226,241.81 | $273,744.79 | $333,109.26 | $407,522.25 | $501,062.81 | $618,958.18 | $767,914.83 |
| 354 | $227,607.90 | $275,576.72 | $335,565.26 | $410,814.14 | $505,474.00 | $624,867.83 | $775,830.04 |
| 355 | $228,980.83 | $277,419.33 | $338,037.64 | $414,130.72 | $509,921.95 | $630,831.65 | $783,824.40 |
| 356 | $230,360.63 | $279,272.69 | $340,526.51 | $417,472.17 | $514,406.97 | $636,850.13 | $791,898.70 |
| 357 | $231,747.32 | $281,136.87 | $343,031.96 | $420,838.68 | $518,929.36 | $642,923.79 | $800,053.74 |
| 358 | $233,140.94 | $283,011.91 | $345,554.12 | $424,230.45 | $523,489.44 | $649,053.12 | $808,290.34 |
| 359 | $234,541.54 | $284,897.90 | $348,093.09 | $427,647.65 | $528,087.52 | $655,238.63 | $816,609.30 |
| 360 | $235,949.13 | $286,794.89 | $350,648.99 | $431,090.48 | $532,723.91 | $661,480.85 | $825,011.45 |

TABLE 1d

CONVENTIONAL LOAN AMORTIZATION SCHEDULE

LOAN AMOUNT $160,000.00  
INTEREST RATE 5.75%  
TOTAL NUMBER OF PAYMENTS 360  
PAYMENT $933.72

| PMT | BEGINNING LOAN BALANCE | PRINCIPAL | INTEREST | CUMMULATIVE PRINCIPAL | CUMMULATIVE INTEREST | LOAN BALANCE |
|---|---|---|---|---|---|---|
| 1 | $160,000.00 | $167.05 | $766.67 | $167.05 | $766.67 | $159,832.95 |
| 2 | $159,832.95 | $167.85 | $765.87 | $334.91 | $1,532.53 | $159,665.09 |
| 3 | $159,665.09 | $168.66 | $765.06 | $503.57 | $2,297.59 | $159,496.43 |
| 4 | $159,496.43 | $169.47 | $764.25 | $673.03 | $3,061.85 | $159,326.97 |
| 5 | $159,326.97 | $170.28 | $763.44 | $843.31 | $3,825.29 | $159,156.69 |
| 6 | $159,156.69 | $171.09 | $762.63 | $1,014.40 | $4,587.92 | $158,985.60 |
| 7 | $158,985.60 | $171.91 | $761.81 | $1,186.32 | $5,349.72 | $158,813.68 |
| 8 | $158,813.68 | $172.74 | $760.98 | $1,359.06 | $6,110.70 | $158,640.94 |
| 9 | $158,640.94 | $173.57 | $760.15 | $1,532.62 | $6,870.86 | $158,467.38 |
| 10 | $158,467.38 | $174.40 | $759.32 | $1,707.02 | $7,630.18 | $158,292.98 |
| 11 | $158,292.98 | $175.23 | $758.49 | $1,882.25 | $8,388.67 | $158,117.75 |
| 12 | $158,117.75 | $176.07 | $757.65 | $2,058.32 | $9,146.32 | $157,941.68 |
| 13 | $157,941.68 | $176.92 | $756.80 | $2,235.24 | $9,903.12 | $157,764.76 |
| 14 | $157,764.76 | $177.76 | $755.96 | $2,413.00 | $10,659.08 | $157,587.00 |
| 15 | $157,587.00 | $178.62 | $755.10 | $2,591.62 | $11,414.18 | $157,408.38 |
| 16 | $157,408.38 | $179.47 | $754.25 | $2,771.09 | $12,168.43 | $157,228.91 |
| 17 | $157,228.91 | $180.33 | $753.39 | $2,951.42 | $12,921.82 | $157,048.58 |
| 18 | $157,048.58 | $181.20 | $752.52 | $3,132.62 | $13,674.34 | $156,867.38 |
| 19 | $156,867.38 | $182.06 | $751.66 | $3,314.68 | $14,426.00 | $156,685.32 |
| 20 | $156,685.32 | $182.94 | $750.78 | $3,497.62 | $15,176.78 | $156,502.38 |
| 21 | $156,502.38 | $183.81 | $749.91 | $3,681.43 | $15,926.69 | $156,318.57 |
| 22 | $156,318.57 | $184.69 | $749.03 | $3,866.12 | $16,675.72 | $156,133.88 |
| 23 | $156,133.88 | $185.58 | $748.14 | $4,051.70 | $17,423.86 | $155,948.30 |
| 24 | $155,948.30 | $186.47 | $747.25 | $4,238.17 | $18,171.11 | $155,761.83 |
| 25 | $155,761.83 | $187.36 | $746.36 | $4,425.53 | $18,917.47 | $155,574.47 |
| 26 | $155,574.47 | $188.26 | $745.46 | $4,613.79 | $19,662.93 | $155,386.21 |
| 27 | $155,386.21 | $189.16 | $744.56 | $4,802.95 | $20,407.49 | $155,197.05 |
| 28 | $155,197.05 | $190.07 | $743.65 | $4,993.02 | $21,151.14 | $155,006.98 |
| 29 | $155,006.98 | $190.98 | $742.74 | $5,184.00 | $21,893.88 | $154,816.00 |
| 30 | $154,816.00 | $191.89 | $741.83 | $5,375.89 | $22,635.71 | $154,624.11 |
| 31 | $154,624.11 | $192.81 | $740.91 | $5,568.70 | $23,376.62 | $154,431.30 |
| 32 | $154,431.30 | $193.74 | $739.98 | $5,762.44 | $24,116.60 | $154,237.56 |
| 33 | $154,237.56 | $194.67 | $739.05 | $5,957.11 | $24,855.65 | $154,042.89 |
| 34 | $154,042.89 | $195.60 | $738.12 | $6,152.70 | $25,593.78 | $153,847.30 |
| 35 | $153,847.30 | $196.54 | $737.18 | $6,349.24 | $26,330.96 | $153,650.76 |
| 36 | $153,650.76 | $197.48 | $736.24 | $6,546.71 | $27,067.21 | $153,453.29 |
| 37 | $153,453.29 | $198.42 | $735.30 | $6,745.14 | $27,802.50 | $153,254.86 |
| 38 | $153,254.86 | $199.37 | $734.35 | $6,944.51 | $28,536.85 | $153,055.49 |
| 39 | $153,055.49 | $200.33 | $733.39 | $7,144.84 | $29,270.24 | $152,855.16 |
| 40 | $152,855.16 | $201.29 | $732.43 | $7,346.13 | $30,002.67 | $152,653.87 |
| 41 | $152,653.87 | $202.25 | $731.47 | $7,548.38 | $30,734.14 | $152,451.62 |
| 42 | $152,451.62 | $203.22 | $730.50 | $7,751.61 | $31,464.63 | $152,248.39 |
| 43 | $152,248.39 | $204.20 | $729.52 | $7,955.80 | $32,194.16 | $152,044.20 |
| 44 | $152,044.20 | $205.17 | $728.55 | $8,160.98 | $32,922.70 | $151,839.02 |
| 45 | $151,839.02 | $206.16 | $727.56 | $8,367.14 | $33,650.26 | $151,632.86 |
| 46 | $151,632.86 | $207.15 | $726.57 | $8,574.28 | $34,376.84 | $151,425.72 |
| 47 | $151,425.72 | $208.14 | $725.58 | $8,782.42 | $35,102.42 | $151,217.58 |
| 48 | $151,217.58 | $209.14 | $724.58 | $8,991.56 | $35,827.00 | $151,008.44 |
| 49 | $151,008.44 | $210.14 | $723.58 | $9,201.69 | $36,550.59 | $150,798.31 |
| 50 | $150,798.31 | $211.14 | $722.58 | $9,412.84 | $37,273.16 | $150,587.16 |
| 51 | $150,587.16 | $212.16 | $721.56 | $9,624.99 | $37,994.73 | $150,375.01 |
| 52 | $150,375.01 | $213.17 | $720.55 | $9,838.17 | $38,715.27 | $150,161.83 |
| 53 | $150,161.83 | $214.19 | $719.53 | $10,052.36 | $39,434.80 | $149,947.64 |
| 54 | $149,947.64 | $215.22 | $718.50 | $10,267.58 | $40,153.30 | $149,732.42 |
| 55 | $149,732.42 | $216.25 | $717.47 | $10,483.84 | $40,870.76 | $149,516.16 |
| 56 | $149,516.16 | $217.29 | $716.43 | $10,701.12 | $41,587.20 | $149,298.88 |
| 57 | $149,298.88 | $218.33 | $715.39 | $10,919.45 | $42,302.59 | $149,080.55 |
| 58 | $149,080.55 | $219.38 | $714.34 | $11,138.83 | $43,016.93 | $148,861.17 |
| 59 | $148,861.17 | $220.43 | $713.29 | $11,359.26 | $43,730.22 | $148,640.74 |
| 60 | $148,640.74 | $221.48 | $712.24 | $11,580.74 | $44,442.46 | $148,419.26 |
| 61 | $148,419.26 | $222.54 | $711.18 | $11,803.28 | $45,153.64 | $148,196.72 |
| 62 | $148,196.72 | $223.61 | $710.11 | $12,026.89 | $45,863.75 | $147,973.11 |
| 63 | $147,973.11 | $224.68 | $709.04 | $12,251.58 | $46,572.78 | $147,748.42 |
| 64 | $147,748.42 | $225.76 | $707.96 | $12,477.33 | $47,280.75 | $147,522.67 |
| 65 | $147,522.67 | $226.84 | $706.88 | $12,704.18 | $47,987.62 | $147,295.82 |
| 66 | $147,295.82 | $227.93 | $705.79 | $12,932.10 | $48,693.42 | $147,067.90 |
| 67 | $147,067.90 | $229.02 | $704.70 | $13,161.12 | $49,398.12 | $146,838.88 |
| 68 | $146,838.88 | $230.12 | $703.60 | $13,391.24 | $50,101.72 | $146,608.76 |
| 69 | $146,608.76 | $231.22 | $702.50 | $13,622.46 | $50,804.22 | $146,377.54 |
| 70 | $146,377.54 | $232.33 | $701.39 | $13,854.79 | $51,505.61 | $146,145.21 |
| 71 | $146,145.21 | $233.44 | $700.28 | $14,088.23 | $52,205.89 | $145,911.77 |

TABLE 1d-continued

CONVENTIONAL LOAN AMORTIZATION SCHEDULE

LOAN AMOUNT $160,000.00
INTEREST RATE 5.75%
TOTAL NUMBER OF PAYMENTS 360
PAYMENT $933.72

| PMT | BEGINNING LOAN BALANCE | PRINCIPAL | INTEREST | CUMMULATIVE PRINCIPAL | CUMMULATIVE INTEREST | LOAN BALANCE |
|---|---|---|---|---|---|---|
| 72 | $145,911.77 | $234.56 | $699.16 | $14,322.79 | $52,905.05 | $145,677.21 |
| 73 | $145,677.21 | $235.68 | $698.04 | $14,558.47 | $53,603.09 | $145,441.53 |
| 74 | $145,441.53 | $236.81 | $696.91 | $14,795.28 | $54,300.00 | $145,204.72 |
| 75 | $145,204.72 | $237.95 | $695.77 | $15,033.23 | $54,995.77 | $144,966.77 |
| 76 | $144,966.77 | $239.09 | $694.63 | $15,272.32 | $55,690.40 | $144,727.68 |
| 77 | $144,727.68 | $240.23 | $693.49 | $15,512.55 | $56,383.89 | $144,487.45 |
| 78 | $144,487.45 | $241.38 | $692.34 | $15,753.94 | $57,076.22 | $144,246.06 |
| 79 | $144,246.06 | $242.54 | $691.18 | $15,996.48 | $57,767.40 | $144,003.52 |
| 80 | $144,003.52 | $243.70 | $690.02 | $16,240.18 | $58,457.42 | $143,759.82 |
| 81 | $143,759.82 | $244.87 | $688.85 | $16,485.05 | $59,146.27 | $143,514.95 |
| 82 | $143,514.95 | $246.04 | $687.68 | $16,731.09 | $59,833.95 | $143,268.91 |
| 83 | $143,268.91 | $247.22 | $686.50 | $16,978.32 | $60,520.44 | $143,021.68 |
| 84 | $143,021.68 | $248.41 | $685.31 | $17,226.73 | $61,205.75 | $142,773.27 |
| 85 | $142,773.27 | $249.60 | $684.12 | $17,476.32 | $61,889.88 | $142,523.68 |
| 86 | $142,523.68 | $250.79 | $682.93 | $17,727.12 | $62,572.80 | $142,272.88 |
| 87 | $142,272.88 | $252.00 | $681.72 | $17,979.11 | $63,254.53 | $142,020.89 |
| 88 | $142,020.89 | $253.20 | $680.52 | $18,232.32 | $63,935.04 | $141,767.68 |
| 89 | $141,767.68 | $254.42 | $679.30 | $18,486.73 | $64,614.35 | $141,513.27 |
| 90 | $141,513.27 | $255.64 | $678.08 | $18,742.37 | $65,292.43 | $141,257.63 |
| 91 | $141,257.63 | $256.86 | $676.86 | $18,999.23 | $65,969.29 | $141,000.77 |
| 92 | $141,000.77 | $258.09 | $675.63 | $19,257.32 | $66,644.92 | $140,742.68 |
| 93 | $140,742.68 | $259.33 | $674.39 | $19,516.65 | $67,319.31 | $140,483.35 |
| 94 | $140,483.35 | $260.57 | $673.15 | $19,777.22 | $67,992.46 | $140,222.78 |
| 95 | $140,222.78 | $261.82 | $671.90 | $20,039.04 | $68,664.36 | $139,960.96 |
| 96 | $139,960.96 | $263.07 | $670.65 | $20,302.11 | $69,335.01 | $139,697.89 |
| 97 | $139,697.89 | $264.33 | $669.39 | $20,566.45 | $70,004.39 | $139,433.55 |
| 98 | $139,433.55 | $265.60 | $668.12 | $20,832.05 | $70,672.51 | $139,167.95 |
| 99 | $139,167.95 | $266.87 | $666.85 | $21,098.92 | $71,339.36 | $138,901.08 |
| 100 | $138,901.08 | $268.15 | $665.57 | $21,367.07 | $72,004.93 | $138,632.93 |
| 101 | $138,632.93 | $269.44 | $664.28 | $21,636.51 | $72,669.21 | $138,363.49 |
| 102 | $138,363.49 | $270.73 | $662.99 | $21,907.24 | $73,332.20 | $138,092.76 |
| 103 | $138,092.76 | $272.03 | $661.69 | $22,179.26 | $73,993.90 | $137,820.74 |
| 104 | $137,820.74 | $273.33 | $660.39 | $22,452.59 | $74,654.29 | $137,547.41 |
| 105 | $137,547.41 | $274.64 | $659.08 | $22,727.23 | $75,313.37 | $137,272.77 |
| 106 | $137,272.77 | $275.95 | $657.77 | $23,003.19 | $75,971.13 | $136,996.81 |
| 107 | $136,996.81 | $277.28 | $656.44 | $23,280.46 | $76,627.58 | $136,719.54 |
| 108 | $136,719.54 | $278.61 | $655.11 | $23,559.07 | $77,282.69 | $136,440.93 |
| 109 | $136,440.93 | $279.94 | $653.78 | $23,839.01 | $77,936.47 | $136,160.99 |
| 110 | $136,160.99 | $281.28 | $652.44 | $24,120.29 | $78,588.91 | $135,879.71 |
| 111 | $135,879.71 | $282.63 | $651.09 | $24,402.92 | $79,240.00 | $135,597.08 |
| 112 | $135,597.08 | $283.98 | $649.74 | $24,686.91 | $79,889.73 | $135,313.09 |
| 113 | $135,313.09 | $285.34 | $648.38 | $24,972.25 | $80,538.11 | $135,027.75 |
| 114 | $135,027.75 | $286.71 | $647.01 | $25,258.96 | $81,185.12 | $134,741.04 |
| 115 | $134,741.04 | $288.09 | $645.63 | $25,547.05 | $81,830.75 | $134,452.95 |
| 116 | $134,452.95 | $289.47 | $644.25 | $25,836.53 | $82,475.01 | $134,163.49 |
| 117 | $134,163.49 | $290.85 | $642.87 | $26,127.37 | $83,117.87 | $133,872.63 |
| 118 | $133,872.63 | $292.25 | $641.47 | $26,419.61 | $83,759.35 | $133,580.39 |
| 119 | $133,580.39 | $293.65 | $640.07 | $26,713.26 | $84,399.42 | $133,286.74 |
| 120 | $133,286.74 | $295.05 | $638.67 | $27,008.32 | $85,038.08 | $132,991.68 |
| 121 | $132,991.68 | $296.47 | $637.25 | $27,304.78 | $85,675.34 | $132,695.22 |
| 122 | $132,695.22 | $297.89 | $635.83 | $27,602.67 | $86,311.17 | $132,397.33 |
| 123 | $132,397.33 | $299.32 | $634.40 | $27,901.99 | $86,945.57 | $132,098.01 |
| 124 | $132,098.01 | $300.75 | $632.97 | $28,202.74 | $87,578.54 | $131,797.26 |
| 125 | $131,797.26 | $302.19 | $631.53 | $28,504.93 | $88,210.07 | $131,495.07 |
| 126 | $131,495.07 | $303.64 | $630.08 | $28,808.57 | $88,840.15 | $131,191.43 |
| 127 | $131,191.43 | $305.09 | $628.63 | $29,113.67 | $89,468.77 | $130,886.33 |
| 128 | $130,886.33 | $306.56 | $627.16 | $29,420.22 | $90,095.94 | $130,579.78 |
| 129 | $130,579.78 | $308.03 | $625.69 | $29,728.25 | $90,721.63 | $130,271.75 |
| 130 | $130,271.75 | $309.50 | $624.22 | $30,037.75 | $91,345.85 | $129,962.25 |
| 131 | $129,962.25 | $310.98 | $622.74 | $30,348.73 | $91,968.59 | $129,651.27 |
| 132 | $129,651.27 | $312.47 | $621.25 | $30,661.21 | $92,589.83 | $129,338.79 |
| 133 | $129,338.79 | $313.97 | $619.75 | $30,975.18 | $93,209.58 | $129,024.82 |
| 134 | $129,024.82 | $315.48 | $618.24 | $31,290.65 | $93,827.83 | $128,709.35 |
| 135 | $128,709.35 | $316.99 | $616.73 | $31,607.64 | $94,444.56 | $128,392.36 |
| 136 | $128,392.36 | $318.51 | $615.21 | $31,926.15 | $95,059.77 | $128,073.85 |
| 137 | $128,073.85 | $320.03 | $613.69 | $32,246.18 | $95,673.46 | $127,753.82 |
| 138 | $127,753.82 | $321.57 | $612.15 | $32,567.75 | $96,285.61 | $127,432.25 |
| 139 | $127,432.25 | $323.11 | $610.61 | $32,890.85 | $96,896.23 | $127,109.15 |
| 140 | $127,109.15 | $324.66 | $609.06 | $33,215.51 | $97,505.29 | $126,784.49 |
| 141 | $126,784.49 | $326.21 | $607.51 | $33,541.72 | $98,112.80 | $126,458.28 |
| 142 | $126,458.28 | $327.77 | $605.95 | $33,869.50 | $98,718.74 | $126,130.50 |

TABLE 1d-continued

CONVENTIONAL LOAN AMORTIZATION SCHEDULE

LOAN AMOUNT $160,000.00
INTEREST RATE 5.75%
TOTAL NUMBER OF PAYMENTS 360
PAYMENT $933.72

| PMT | BEGINNING LOAN BALANCE | PRINCIPAL | INTEREST | CUMMULATIVE PRINCIPAL | CUMMULATIVE INTEREST | LOAN BALANCE |
|---|---|---|---|---|---|---|
| 143 | $126,130.50 | $329.34 | $604.38 | $34,198.84 | $99,323.12 | $125,801.16 |
| 144 | $125,801.16 | $330.92 | $602.80 | $34,529.76 | $99,925.92 | $125,470.24 |
| 145 | $125,470.24 | $332.51 | $601.21 | $34,862.27 | $100,527.13 | $125,137.73 |
| 146 | $125,137.73 | $334.10 | $599.62 | $35,196.37 | $101,126.75 | $124,803.63 |
| 147 | $124,803.63 | $335.70 | $598.02 | $35,532.08 | $101,724.76 | $124,467.92 |
| 148 | $124,467.92 | $337.31 | $596.41 | $35,869.39 | $102,321.17 | $124,130.61 |
| 149 | $124,130.61 | $338.93 | $594.79 | $36,208.31 | $102,915.97 | $123,791.69 |
| 150 | $123,791.69 | $340.55 | $593.17 | $36,548.87 | $103,509.13 | $123,451.13 |
| 151 | $123,451.13 | $342.18 | $591.54 | $36,891.05 | $104,100.67 | $123,108.95 |
| 152 | $123,108.95 | $343.82 | $589.90 | $37,234.87 | $104,690.57 | $122,765.13 |
| 153 | $122,765.13 | $345.47 | $588.25 | $37,580.34 | $105,278.82 | $122,419.66 |
| 154 | $122,419.66 | $347.13 | $586.59 | $37,927.47 | $105,865.41 | $122,072.53 |
| 155 | $122,072.53 | $348.79 | $584.93 | $38,276.26 | $106,450.34 | $121,723.74 |
| 156 | $121,723.74 | $350.46 | $583.26 | $38,626.72 | $107,033.60 | $121,373.28 |
| 157 | $121,373.28 | $352.14 | $581.58 | $38,978.86 | $107,615.18 | $121,021.14 |
| 158 | $121,021.14 | $353.83 | $579.89 | $39,332.68 | $108,195.08 | $120,667.32 |
| 159 | $120,667.32 | $355.52 | $578.20 | $39,688.21 | $108,773.27 | $120,311.79 |
| 160 | $120,311.79 | $357.23 | $576.49 | $40,045.43 | $109,349.77 | $119,954.57 |
| 161 | $119,954.57 | $358.94 | $574.78 | $40,404.37 | $109,924.55 | $119,595.63 |
| 162 | $119,595.63 | $360.66 | $573.06 | $40,765.03 | $110,497.61 | $119,234.97 |
| 163 | $119,234.97 | $362.39 | $571.33 | $41,127.41 | $111,068.95 | $118,872.59 |
| 164 | $118,872.59 | $364.12 | $569.60 | $41,491.54 | $111,638.54 | $118,508.46 |
| 165 | $118,508.46 | $365.87 | $567.85 | $41,857.40 | $112,206.40 | $118,142.60 |
| 166 | $118,142.60 | $367.62 | $566.10 | $42,225.02 | $112,772.50 | $117,774.98 |
| 167 | $117,774.98 | $369.38 | $564.34 | $42,594.40 | $113,336.84 | $117,405.60 |
| 168 | $117,405.60 | $371.15 | $562.57 | $42,965.56 | $113,899.40 | $117,034.44 |
| 169 | $117,034.44 | $372.93 | $560.79 | $43,338.49 | $114,460.19 | $116,661.51 |
| 170 | $116,661.51 | $374.72 | $559.00 | $43,713.20 | $115,019.20 | $116,286.80 |
| 171 | $116,286.80 | $376.51 | $557.21 | $44,089.72 | $115,576.40 | $115,910.28 |
| 172 | $115,910.28 | $378.32 | $555.40 | $44,468.03 | $116,131.81 | $115,531.97 |
| 173 | $115,531.97 | $380.13 | $553.59 | $44,848.16 | $116,685.40 | $115,151.84 |
| 174 | $115,151.84 | $381.95 | $551.77 | $45,230.11 | $117,237.17 | $114,769.89 |
| 175 | $114,769.89 | $383.78 | $549.94 | $45,613.89 | $117,787.11 | $114,386.11 |
| 176 | $114,386.11 | $385.62 | $548.10 | $45,999.51 | $118,335.21 | $114,000.49 |
| 177 | $114,000.49 | $387.47 | $546.25 | $46,386.98 | $118,881.46 | $113,613.02 |
| 178 | $113,613.02 | $389.32 | $544.40 | $46,776.30 | $119,425.86 | $113,223.70 |
| 179 | $113,223.70 | $391.19 | $542.53 | $47,167.49 | $119,968.39 | $112,832.51 |
| 180 | $112,832.51 | $393.06 | $540.66 | $47,560.56 | $120,509.04 | $112,439.44 |
| 181 | $112,439.44 | $394.95 | $538.77 | $47,955.51 | $121,047.81 | $112,044.49 |
| 182 | $112,044.49 | $396.84 | $536.88 | $48,352.35 | $121,584.69 | $111,647.65 |
| 183 | $111,647.65 | $398.74 | $534.98 | $48,751.09 | $122,119.67 | $111,248.91 |
| 184 | $111,248.91 | $400.65 | $533.07 | $49,151.74 | $122,652.74 | $110,848.26 |
| 185 | $110,848.26 | $402.57 | $531.15 | $49,554.31 | $123,183.89 | $110,445.69 |
| 186 | $110,445.69 | $404.50 | $529.22 | $49,958.81 | $123,713.11 | $110,041.19 |
| 187 | $110,041.19 | $406.44 | $527.28 | $50,365.25 | $124,240.39 | $109,634.75 |
| 188 | $109,634.75 | $408.39 | $525.33 | $50,773.64 | $124,765.72 | $109,226.36 |
| 189 | $109,226.36 | $410.34 | $523.38 | $51,183.98 | $125,289.10 | $108,816.02 |
| 190 | $108,816.02 | $412.31 | $521.41 | $51,596.29 | $125,810.51 | $108,403.71 |
| 191 | $108,403.71 | $414.29 | $519.43 | $52,010.58 | $126,329.94 | $107,989.42 |
| 192 | $107,989.42 | $416.27 | $517.45 | $52,426.85 | $126,847.39 | $107,573.15 |
| 193 | $107,573.15 | $418.27 | $515.45 | $52,845.12 | $127,362.84 | $107,154.88 |
| 194 | $107,154.88 | $420.27 | $513.45 | $53,265.38 | $127,876.30 | $106,734.62 |
| 195 | $106,734.62 | $422.28 | $511.44 | $53,687.67 | $128,387.73 | $106,312.33 |
| 196 | $106,312.33 | $424.31 | $509.41 | $54,111.97 | $128,897.15 | $105,888.03 |
| 197 | $105,888.03 | $426.34 | $507.38 | $54,538.31 | $129,404.53 | $105,461.69 |
| 198 | $105,461.69 | $428.38 | $505.34 | $54,966.70 | $129,909.86 | $105,033.30 |
| 199 | $105,033.30 | $430.44 | $503.28 | $55,397.13 | $130,413.15 | $104,602.87 |
| 200 | $104,602.87 | $432.50 | $501.22 | $55,829.63 | $130,914.37 | $104,170.37 |
| 201 | $104,170.37 | $434.57 | $499.15 | $56,264.20 | $131,413.52 | $103,735.80 |
| 202 | $103,735.80 | $436.65 | $497.07 | $56,700.85 | $131,910.59 | $103,299.15 |
| 203 | $103,299.15 | $438.74 | $494.98 | $57,139.60 | $132,405.56 | $102,860.40 |
| 204 | $102,860.40 | $440.85 | $492.87 | $57,580.45 | $132,898.43 | $102,419.55 |
| 205 | $102,419.55 | $442.96 | $490.76 | $58,023.41 | $133,389.19 | $101,976.59 |
| 206 | $101,976.59 | $445.08 | $488.64 | $58,468.49 | $133,877.83 | $101,531.51 |
| 207 | $101,531.51 | $447.21 | $486.51 | $58,915.70 | $134,364.34 | $101,084.30 |
| 208 | $101,084.30 | $449.36 | $484.36 | $59,365.06 | $134,848.70 | $100,634.94 |
| 209 | $100,634.94 | $451.51 | $482.21 | $59,816.57 | $135,330.91 | $100,183.43 |
| 210 | $100,183.43 | $453.67 | $480.05 | $60,270.25 | $135,810.95 | $99,729.75 |
| 211 | $99,729.75 | $455.85 | $477.87 | $60,726.09 | $136,288.83 | $99,273.91 |
| 212 | $99,273.91 | $458.03 | $475.69 | $61,184.13 | $136,764.51 | $98,815.87 |
| 213 | $98,815.87 | $460.23 | $473.49 | $61,644.35 | $137,238.01 | $98,355.65 |

TABLE 1d-continued

CONVENTIONAL LOAN AMORTIZATION SCHEDULE

LOAN AMOUNT $160,000.00
INTEREST RATE 5.75%
TOTAL NUMBER OF PAYMENTS 360
PAYMENT $933.72

| PMT | BEGINNING LOAN BALANCE | PRINCIPAL | INTEREST | CUMMULATIVE PRINCIPAL | CUMMULATIVE INTEREST | LOAN BALANCE |
|---|---|---|---|---|---|---|
| 214 | $98,355.65 | $462.43 | $471.29 | $62,106.79 | $137,709.29 | $97,893.21 |
| 215 | $97,893.21 | $464.65 | $469.07 | $62,571.43 | $138,178.37 | $97,428.57 |
| 216 | $97,428.57 | $466.87 | $466.85 | $63,038.31 | $138,645.21 | $96,961.69 |
| 217 | $96,961.69 | $469.11 | $464.61 | $63,507.42 | $139,109.82 | $96,492.58 |
| 218 | $96,492.58 | $471.36 | $462.36 | $63,978.78 | $139,572.18 | $96,021.22 |
| 219 | $96,021.22 | $473.62 | $460.10 | $64,452.40 | $140,032.28 | $95,547.60 |
| 220 | $95,547.60 | $475.89 | $457.83 | $64,928.29 | $140,490.11 | $95,071.71 |
| 221 | $95,071.71 | $478.17 | $455.55 | $65,406.45 | $140,945.67 | $94,593.55 |
| 222 | $94,593.55 | $480.46 | $453.26 | $65,886.91 | $141,398.93 | $94,113.09 |
| 223 | $94,113.09 | $482.76 | $450.96 | $66,369.68 | $141,849.88 | $93,630.32 |
| 224 | $93,630.32 | $485.07 | $448.65 | $66,854.75 | $142,298.53 | $93,145.25 |
| 225 | $93,145.25 | $487.40 | $446.32 | $67,342.15 | $142,744.85 | $92,657.85 |
| 226 | $92,657.85 | $489.73 | $443.99 | $67,831.88 | $143,188.84 | $92,168.12 |
| 227 | $92,168.12 | $492.08 | $441.64 | $68,323.96 | $143,630.48 | $91,676.04 |
| 228 | $91,676.04 | $494.44 | $439.28 | $68,818.40 | $144,069.76 | $91,181.60 |
| 229 | $91,181.60 | $496.81 | $436.91 | $69,315.21 | $144,506.67 | $90,684.79 |
| 230 | $90,684.79 | $499.19 | $434.53 | $69,814.40 | $144,941.20 | $90,185.60 |
| 231 | $90,185.60 | $501.58 | $432.14 | $70,315.98 | $145,373.34 | $89,684.02 |
| 232 | $89,684.02 | $503.98 | $429.74 | $70,819.97 | $145,803.07 | $89,180.03 |
| 233 | $89,180.03 | $506.40 | $427.32 | $71,326.36 | $146,230.40 | $88,673.64 |
| 234 | $88,673.64 | $508.83 | $424.89 | $71,835.19 | $146,655.29 | $88,164.81 |
| 235 | $88,164.81 | $511.26 | $422.46 | $72,346.45 | $147,077.75 | $87,653.55 |
| 236 | $87,653.55 | $513.71 | $420.01 | $72,860.17 | $147,497.75 | $87,139.83 |
| 237 | $87,139.83 | $516.17 | $417.55 | $73,376.34 | $147,915.30 | $86,623.66 |
| 238 | $86,623.66 | $518.65 | $415.07 | $73,894.99 | $148,330.37 | $86,105.01 |
| 239 | $86,105.01 | $521.13 | $412.59 | $74,416.12 | $148,742.96 | $85,583.88 |
| 240 | $85,583.88 | $523.63 | $410.09 | $74,939.75 | $149,153.05 | $85,060.25 |
| 241 | $85,060.25 | $526.14 | $407.58 | $75,465.89 | $149,560.63 | $84,534.11 |
| 242 | $84,534.11 | $528.66 | $405.06 | $75,994.55 | $149,965.69 | $84,005.45 |
| 243 | $84,005.45 | $531.19 | $402.53 | $76,525.75 | $150,368.21 | $83,474.25 |
| 244 | $83,474.25 | $533.74 | $399.98 | $77,059.49 | $150,768.19 | $82,940.51 |
| 245 | $82,940.51 | $536.30 | $397.42 | $77,595.78 | $151,165.62 | $82,404.22 |
| 246 | $82,404.22 | $538.87 | $394.85 | $78,134.65 | $151,560.47 | $81,865.35 |
| 247 | $81,865.35 | $541.45 | $392.27 | $78,676.10 | $151,952.74 | $81,323.90 |
| 248 | $81,323.90 | $544.04 | $389.68 | $79,220.14 | $152,342.42 | $80,779.86 |
| 249 | $80,779.86 | $546.65 | $387.07 | $79,766.79 | $152,729.49 | $80,233.21 |
| 250 | $80,233.21 | $549.27 | $384.45 | $80,316.06 | $153,113.94 | $79,683.94 |
| 251 | $79,683.94 | $551.90 | $381.82 | $80,867.96 | $153,495.76 | $79,132.04 |
| 252 | $79,132.04 | $554.55 | $379.17 | $81,422.51 | $153,874.93 | $78,577.49 |
| 253 | $78,577.49 | $557.20 | $376.52 | $81,979.71 | $154,251.45 | $78,020.29 |
| 254 | $78,020.29 | $559.87 | $373.85 | $82,539.58 | $154,625.30 | $77,460.42 |
| 255 | $77,460.42 | $562.56 | $371.16 | $83,102.14 | $154,996.46 | $76,897.86 |
| 256 | $76,897.86 | $565.25 | $368.47 | $83,667.39 | $155,364.93 | $76,332.61 |
| 257 | $76,332.61 | $567.96 | $365.76 | $84,235.35 | $155,730.69 | $75,764.65 |
| 258 | $75,764.65 | $570.68 | $363.04 | $84,806.03 | $156,093.73 | $75,193.97 |
| 259 | $75,193.97 | $573.42 | $360.30 | $85,379.45 | $156,454.03 | $74,620.55 |
| 260 | $74,620.55 | $576.16 | $357.56 | $85,955.61 | $156,811.59 | $74,044.39 |
| 261 | $74,044.39 | $578.92 | $354.80 | $86,534.53 | $157,166.39 | $73,465.47 |
| 262 | $73,465.47 | $581.70 | $352.02 | $87,116.23 | $157,518.41 | $72,883.77 |
| 263 | $72,883.77 | $584.49 | $349.23 | $87,700.72 | $157,867.64 | $72,299.28 |
| 264 | $72,299.28 | $587.29 | $346.43 | $88,288.00 | $158,214.08 | $71,712.00 |
| 265 | $71,712.00 | $590.10 | $343.62 | $88,878.10 | $158,557.70 | $71,121.90 |
| 266 | $71,121.90 | $592.93 | $340.79 | $89,471.03 | $158,898.49 | $70,528.97 |
| 267 | $70,528.97 | $595.77 | $337.95 | $90,066.80 | $159,236.44 | $69,933.20 |
| 268 | $69,933.20 | $598.62 | $335.10 | $90,665.42 | $159,571.54 | $69,334.58 |
| 269 | $69,334.58 | $601.49 | $332.23 | $91,266.91 | $159,903.77 | $68,733.09 |
| 270 | $68,733.09 | $604.37 | $329.35 | $91,871.29 | $160,233.11 | $68,128.71 |
| 271 | $68,128.71 | $607.27 | $326.45 | $92,478.56 | $160,559.56 | $67,521.44 |
| 272 | $67,521.44 | $610.18 | $323.54 | $93,088.74 | $160,883.10 | $66,911.26 |
| 273 | $66,911.26 | $613.10 | $320.62 | $93,701.84 | $161,203.72 | $66,298.16 |
| 274 | $66,298.16 | $616.04 | $317.68 | $94,317.88 | $161,521.40 | $65,682.12 |
| 275 | $65,682.12 | $618.99 | $314.73 | $94,936.88 | $161,836.12 | $65,063.12 |
| 276 | $65,063.12 | $621.96 | $311.76 | $95,558.84 | $162,147.88 | $64,441.16 |
| 277 | $64,441.16 | $624.94 | $308.78 | $96,183.78 | $162,456.66 | $63,816.22 |
| 278 | $63,816.22 | $627.93 | $305.79 | $96,811.71 | $162,762.45 | $63,188.29 |
| 279 | $63,188.29 | $630.94 | $302.78 | $97,442.65 | $163,065.23 | $62,557.35 |
| 280 | $62,557.35 | $633.97 | $299.75 | $98,076.62 | $163,364.98 | $61,923.38 |
| 281 | $61,923.38 | $637.00 | $296.72 | $98,713.62 | $163,661.70 | $61,286.38 |
| 282 | $61,286.38 | $640.06 | $293.66 | $99,353.68 | $163,955.36 | $60,646.32 |
| 283 | $60,646.32 | $643.12 | $290.60 | $99,996.80 | $164,245.96 | $60,003.20 |
| 284 | $60,003.20 | $646.20 | $287.52 | $100,643.01 | $164,533.47 | $59,356.99 |

TABLE 1d-continued

CONVENTIONAL LOAN AMORTIZATION SCHEDULE

LOAN AMOUNT $160,000.00
INTEREST RATE 5.75%
TOTAL NUMBER OF PAYMENTS 360
PAYMENT $933.72

| PMT | BEGINNING LOAN BALANCE | PRINCIPAL | INTEREST | CUMMULATIVE PRINCIPAL | CUMMULATIVE INTEREST | LOAN BALANCE |
|---|---|---|---|---|---|---|
| 285 | $59,356.99 | $649.30 | $284.42 | $101,292.31 | $164,817.89 | $58,707.69 |
| 286 | $58,707.69 | $652.41 | $281.31 | $101,944.72 | $165,099.20 | $58,055.28 |
| 287 | $58,055.28 | $655.54 | $278.18 | $102,600.26 | $165,377.38 | $57,399.74 |
| 288 | $57,399.74 | $658.68 | $275.04 | $103,258.94 | $165,652.42 | $56,741.06 |
| 289 | $56,741.06 | $661.84 | $271.88 | $103,920.77 | $165,924.31 | $56,079.23 |
| 290 | $56,079.23 | $665.01 | $268.71 | $104,585.78 | $166,193.02 | $55,414.22 |
| 291 | $55,414.22 | $668.19 | $265.53 | $105,253.97 | $166,458.55 | $54,746.03 |
| 292 | $54,746.03 | $671.40 | $262.32 | $105,925.37 | $166,720.87 | $54,074.63 |
| 293 | $54,074.63 | $674.61 | $259.11 | $106,599.98 | $166,979.98 | $53,400.02 |
| 294 | $53,400.02 | $677.84 | $255.88 | $107,277.83 | $167,235.85 | $52,722.17 |
| 295 | $52,722.17 | $681.09 | $252.63 | $107,958.92 | $167,488.48 | $52,041.08 |
| 296 | $52,041.08 | $684.36 | $249.36 | $108,643.28 | $167,737.84 | $51,356.72 |
| 297 | $51,356.72 | $687.64 | $246.08 | $109,330.91 | $167,983.93 | $50,669.09 |
| 298 | $50,669.09 | $690.93 | $242.79 | $110,021.84 | $168,226.72 | $49,978.16 |
| 299 | $49,978.16 | $694.24 | $239.48 | $110,716.08 | $168,466.20 | $49,283.92 |
| 300 | $49,283.92 | $697.57 | $236.15 | $111,413.65 | $168,702.35 | $48,586.35 |
| 301 | $48,586.35 | $700.91 | $232.81 | $112,114.56 | $168,935.16 | $47,885.44 |
| 302 | $47,885.44 | $704.27 | $229.45 | $112,818.83 | $169,164.61 | $47,181.17 |
| 303 | $47,181.17 | $707.64 | $226.08 | $113,526.47 | $169,390.69 | $46,473.53 |
| 304 | $46,473.53 | $711.03 | $222.69 | $114,237.51 | $169,613.37 | $45,762.49 |
| 305 | $45,762.49 | $714.44 | $219.28 | $114,951.95 | $169,832.65 | $45,048.05 |
| 306 | $45,048.05 | $717.86 | $215.86 | $115,669.81 | $170,048.51 | $44,330.19 |
| 307 | $44,330.19 | $721.30 | $212.42 | $116,391.12 | $170,260.92 | $43,608.88 |
| 308 | $43,608.88 | $724.76 | $208.96 | $117,115.88 | $170,469.88 | $42,884.12 |
| 309 | $42,884.12 | $728.23 | $205.49 | $117,844.11 | $170,675.37 | $42,155.89 |
| 310 | $42,155.89 | $731.72 | $202.00 | $118,575.84 | $170,877.36 | $41,424.16 |
| 311 | $41,424.16 | $735.23 | $198.49 | $119,311.07 | $171,075.85 | $40,688.93 |
| 312 | $40,688.93 | $738.75 | $194.97 | $120,049.82 | $171,270.82 | $39,950.18 |
| 313 | $39,950.18 | $742.29 | $191.43 | $120,792.11 | $171,462.25 | $39,207.89 |
| 314 | $39,207.89 | $745.85 | $187.87 | $121,537.96 | $171,650.12 | $38,462.04 |
| 315 | $38,462.04 | $749.42 | $184.30 | $122,287.38 | $171,834.42 | $37,712.62 |
| 316 | $37,712.62 | $753.01 | $180.71 | $123,040.39 | $172,015.13 | $36,959.61 |
| 317 | $36,959.61 | $756.62 | $177.10 | $123,797.02 | $172,192.22 | $36,202.98 |
| 318 | $36,202.98 | $760.25 | $173.47 | $124,557.26 | $172,365.70 | $35,442.74 |
| 319 | $35,442.74 | $763.89 | $169.83 | $125,321.15 | $172,535.53 | $34,678.85 |
| 320 | $34,678.85 | $767.55 | $166.17 | $126,088.70 | $172,701.70 | $33,911.30 |
| 321 | $33,911.30 | $771.23 | $162.49 | $126,859.93 | $172,864.19 | $33,140.07 |
| 322 | $33,140.07 | $774.92 | $158.80 | $127,634.86 | $173,022.98 | $32,365.14 |
| 323 | $32,365.14 | $778.64 | $155.08 | $128,413.49 | $173,178.07 | $31,586.51 |
| 324 | $31,586.51 | $782.37 | $151.35 | $129,195.86 | $173,329.42 | $30,804.14 |
| 325 | $30,804.14 | $786.12 | $147.60 | $129,981.99 | $173,477.02 | $30,018.02 |
| 326 | $30,018.02 | $789.88 | $143.84 | $130,771.86 | $173,620.86 | $29,228.14 |
| 327 | $29,228.14 | $793.67 | $140.05 | $131,565.53 | $173,760.91 | $28,434.47 |
| 328 | $28,434.47 | $797.47 | $136.25 | $132,363.00 | $173,897.16 | $27,637.00 |
| 329 | $27,637.00 | $801.29 | $132.43 | $133,164.30 | $174,029.58 | $26,835.70 |
| 330 | $26,835.70 | $805.13 | $128.59 | $133,969.43 | $174,158.17 | $26,030.57 |
| 331 | $26,030.57 | $808.99 | $124.73 | $134,778.42 | $174,282.90 | $25,221.58 |
| 332 | $25,221.58 | $812.87 | $120.85 | $135,591.28 | $174,403.76 | $24,408.72 |
| 333 | $24,408.72 | $816.76 | $116.96 | $136,408.05 | $174,520.71 | $23,591.95 |
| 334 | $23,591.95 | $820.68 | $113.04 | $137,228.72 | $174,633.76 | $22,771.28 |
| 335 | $22,771.28 | $824.61 | $109.11 | $138,053.33 | $174,742.87 | $21,946.67 |
| 336 | $21,946.67 | $828.56 | $105.16 | $138,881.89 | $174,848.03 | $21,118.11 |
| 337 | $21,118.11 | $832.53 | $101.19 | $139,714.42 | $174,949.22 | $20,285.58 |
| 338 | $20,285.58 | $836.52 | $97.20 | $140,550.93 | $175,046.43 | $19,449.07 |
| 339 | $19,449.07 | $840.53 | $93.19 | $141,391.46 | $175,139.62 | $18,608.54 |
| 340 | $18,608.54 | $844.55 | $89.17 | $142,236.02 | $175,228.78 | $17,763.98 |
| 341 | $17,763.98 | $848.60 | $85.12 | $143,084.62 | $175,313.90 | $16,915.38 |
| 342 | $16,915.38 | $852.67 | $81.05 | $143,937.28 | $175,394.96 | $16,062.72 |
| 343 | $16,062.72 | $856.75 | $76.97 | $144,794.04 | $175,471.92 | $15,205.96 |
| 344 | $15,205.96 | $860.86 | $72.86 | $145,654.89 | $175,544.79 | $14,345.11 |
| 345 | $14,345.11 | $864.98 | $68.74 | $146,519.88 | $175,613.52 | $13,480.12 |
| 346 | $13,480.12 | $869.13 | $64.59 | $147,389.01 | $175,678.11 | $12,610.99 |
| 347 | $12,610.99 | $873.29 | $60.43 | $148,262.30 | $175,738.54 | $11,737.70 |
| 348 | $11,737.70 | $877.48 | $56.24 | $149,139.77 | $175,794.79 | $10,860.23 |
| 349 | $10,860.23 | $881.68 | $52.04 | $150,021.46 | $175,846.82 | $9,978.54 |
| 350 | $9,978.54 | $885.91 | $47.81 | $150,907.36 | $175,894.64 | $9,092.64 |
| 351 | $9,092.64 | $890.15 | $43.57 | $151,797.51 | $175,938.21 | $8,202.49 |
| 352 | $8,202.49 | $894.42 | $39.30 | $152,691.93 | $175,977.51 | $7,308.07 |
| 353 | $7,308.07 | $898.70 | $35.02 | $153,590.63 | $176,012.53 | $6,409.37 |
| 354 | $6,409.37 | $903.01 | $30.71 | $154,493.64 | $176,043.24 | $5,506.36 |
| 355 | $5,506.36 | $907.34 | $26.38 | $155,400.98 | $176,069.62 | $4,599.02 |

TABLE 1d-continued

CONVENTIONAL LOAN AMORTIZATION SCHEDULE

LOAN AMOUNT: $160,000.00
INTEREST RATE: 5.75%
TOTAL NUMBER OF PAYMENTS: 360
PAYMENT: $933.72

| PMT | BEGINNING LOAN BALANCE | PRINCIPAL | INTEREST | CUMMULATIVE PRINCIPAL | CUMMULATIVE INTEREST | LOAN BALANCE |
|---|---|---|---|---|---|---|
| 356 | $4,599.02 | $911.68 | $22.04 | $156,312.66 | $176,091.66 | $3,687.34 |
| 357 | $3,687.34 | $916.05 | $17.67 | $157,228.71 | $176,109.33 | $2,771.29 |
| 358 | $2,771.29 | $920.44 | $13.28 | $158,149.15 | $176,122.61 | $1,850.85 |
| 359 | $1,850.85 | $924.85 | $8.87 | $159,074.00 | $176,131.48 | $926.00 |
| 360 | $926.00 | $929.28 | $4.44 | $160,003.28 | $176,135.92 | −$3.28 |

TABLE 2a

Combined Loan & Investment System Comparison Report Input (Lump Sum Investment)

| | |
|---|---|
| HOME VALUE: | $250,000.00 |
| EXISTING LOAN AMOUNT: | $160,000.00 |
| CONVENTIONAL LOAN INTEREST RATE: | 5.75% |
| PAYMENTS PER YEAR: | 12 |
| NUMBER OF REGULAR PAYMENTS: | 360 |
| PAYMENT AMOUNT: | $933.72 |
| INTEREST ONLY LOAN RATE: | 5.75% |
| INVESTMENT RATE OF RETURN: | 7.00% |
| INCOME TAX RATE: | 25.00% |
| MAXIMUM LOAN TO VALUE RATIO: | 80% |

TABLE 2b

Combined Loan & Investment System Comparison Report (Lump Sum Investment)

| CONVENTIONAL LOAN RESULTS | | COMBINED LOAN & INVESTMENT SYSTEM | | DIFFERENCE |
|---|---|---|---|---|
| ANNUAL LOAN INTEREST RATE: | 5.75% | ANNUAL INTEREST ONLY LOAN RATE: | 5.75% | EQUAL |
| NUMBER OF REGULAR PAYMENTS: | 360 | NUMBER OF REGULAR PAYMENTS: | 360 | EQUAL |
| REGULAR PAYMENT AMOUNT: | 933.72 | REGULAR PAYMENT AMOUNT: | $933.72 | EQUAL |
| TOTAL PAYMENTS AT END OF TERM: | $336,139.20 | TOTAL PAYMENTS AT END OF TERM: | $336,139.20 | EQUAL |
| | | INVESTMENT RATE OF RETURN: | 7.00% | 7.00% |
| MAXIMUM LOAN TO VALUE: | $200,000.00 | MAXIMUM LOAN TO VALUE: | $200,000.00 | |
| PRINCIPAL BORROWED: | $160,000.00 | PRINCIPAL BORROWED: | $194,863.30 | $34,863.30 |
| TOTAL INTEREST PAID: | $176,139.20 | TOTAL INTEREST PAID: | $336,139.20 | $160,000.00 |
| REPAID: | $336,139.20 | TOTAL PRINCIPAL AND INTEREST REPAID | $531,002.50 | $194,863.30 |
| | | SYSTEMATIC INVESTMENT: | 0 | |
| | | LUMP SUM INVESTMENT: | $34,863.30 | $34,863.30 |
| | | LESS: | | |
| | | INVESTMENT VALUE AT END OF PERIOD: | $348,878.39 | $348,878.39 |
| NET AMOUNT PAID OUT OF POCKET: | $336,139.20 | NET AMOUNT PAID OUT OF POCKET: | $182,124.11 | ($154,015.09) |
| NET ANNUAL PERCENTAGE RATE: | 5.75% | NET ANNUAL PERCENTAGE RATE: | 3.12% | −2.63% |
| INVESTMENT VALUE AFTER PAYOFF: | $0.00 | INVESTMENT VALUE AFTER PAYOFF: | $154,015.09 | 154,015.09 |
| TAX SAVINGS: | $44,034.80 | TAX SAVINGS: | $84,034.80 | $40,000.00 |
| TERM TO REACH LOAN PAYOFF: | 360 | TERM TO REACH LOAN PAYOFF: | 302 | −58 |

TABLE 2c

Combined Loan and Investment System Comparison Report Data (Lump Sum)

LOAN: $194,863.30
RATE: 5.75%
INV AMT: $34,863.30

| | COST OF BORROWING | | | INVESTMENT VALUE | | | | |
|---|---|---|---|---|---|---|---|---|
| | MINIMUM | | | | | | | |
| DATE | MONTHLY INTEREST PAYMENT | TOTAL INTEREST PAID | CUMMULATIVE INVESTMENT AMOUNT | 1% | 2% | 3% | 4% | 5% |
| 1 | $933.72 | $933.72 | $34,863.30 | $34,892.36 | $34,921.41 | $34,950.46 | $34,979.52 | $35,008.57 |
| 2 | $933.72 | $1,867.44 | $34,863.30 | $34,921.43 | $34,979.61 | $35,037.84 | $35,096.11 | $35,154.44 |
| 3 | $933.72 | $2,801.16 | $34,863.30 | $34,950.54 | $35,037.91 | $35,125.43 | $35,213.10 | $35,300.91 |
| 4 | $933.72 | $3,734.88 | $34,863.30 | $34,979.66 | $35,096.31 | $35,213.25 | $35,330.48 | $35,448.00 |
| 5 | $933.72 | $4,668.60 | $34,863.30 | $35,008.81 | $35,154.80 | $35,301.28 | $35,448.25 | $35,595.70 |
| 6 | $933.72 | $5,602.32 | $34,863.30 | $35,037.98 | $35,213.39 | $35,389.53 | $35,566.41 | $35,744.02 |

TABLE 2c-continued

Combined Loan and Investment System Comparison Report Data (Lump Sum)

LOAN $194,863.30
RATE 5.75%
INV AMT $34,863.30

| | | | | | | | | |
|---|---|---|---|---|---|---|---|---|
| 7  | $933.72 | $6,536.04  | $34,863.30 | $35,067.18 | $35,272.08 | $35,478.01 | $35,684.96 | $35,892.95 |
| 8  | $933.72 | $7,469.76  | $34,863.30 | $35,096.41 | $35,330.87 | $35,566.70 | $35,803.91 | $36,042.50 |
| 9  | $933.72 | $8,403.48  | $34,863.30 | $35,125.65 | $35,389.75 | $35,655.62 | $35,923.26 | $36,192.68 |
| 10 | $933.72 | $9,337.20  | $34,863.30 | $35,154.92 | $35,448.74 | $35,744.76 | $36,043.00 | $36,343.48 |
| 11 | $933.72 | $10,270.92 | $34,863.30 | $35,184.22 | $35,507.82 | $35,834.12 | $36,163.15 | $36,494.92 |
| 12 | $933.72 | $11,204.64 | $34,863.30 | $35,213.54 | $35,567.00 | $35,923.71 | $36,283.69 | $36,646.98 |
| 13 | $933.72 | $12,138.36 | $34,863.30 | $35,242.88 | $35,626.28 | $36,013.51 | $36,404.63 | $36,799.67 |
| 14 | $933.72 | $13,072.08 | $34,863.30 | $35,272.25 | $35,685.65 | $36,103.55 | $36,525.98 | $36,953.00 |
| 15 | $933.72 | $14,005.80 | $34,863.30 | $35,301.65 | $35,745.13 | $36,193.81 | $36,647.74 | $37,106.98 |
| 16 | $933.72 | $14,939.52 | $34,863.30 | $35,331.07 | $35,804.70 | $36,284.29 | $36,769.90 | $37,261.59 |
| 17 | $933.72 | $15,873.24 | $34,863.30 | $35,360.51 | $35,864.38 | $36,375.00 | $36,892.46 | $37,416.84 |
| 18 | $933.72 | $16,806.96 | $34,863.30 | $35,389.97 | $35,924.15 | $36,465.94 | $37,015.44 | $37,572.75 |
| 19 | $933.72 | $17,740.68 | $34,863.30 | $35,419.47 | $35,984.03 | $36,557.10 | $37,138.82 | $37,729.30 |
| 20 | $933.72 | $18,674.40 | $34,863.30 | $35,448.98 | $36,044.00 | $36,648.50 | $37,262.62 | $37,886.51 |
| 21 | $933.72 | $19,608.12 | $34,863.30 | $35,478.52 | $36,104.07 | $36,740.12 | $37,386.83 | $38,044.37 |
| 22 | $933.72 | $20,541.84 | $34,863.30 | $35,508.09 | $36,164.25 | $36,831.97 | $37,511.45 | $38,202.89 |
| 23 | $933.72 | $21,475.56 | $34,863.30 | $35,537.68 | $36,224.52 | $36,924.05 | $37,636.49 | $38,362.06 |
| 24 | $933.72 | $22,409.28 | $34,863.30 | $35,567.29 | $36,284.89 | $37,016.36 | $37,761.94 | $38,521.91 |
| 25 | $933.72 | $23,343.00 | $34,863.30 | $35,596.93 | $36,345.37 | $37,108.90 | $37,887.82 | $38,682.41 |
| 26 | $933.72 | $24,276.72 | $34,863.30 | $35,626.60 | $36,405.95 | $37,201.67 | $38,014.11 | $38,843.59 |
| 27 | $933.72 | $25,210.44 | $34,863.30 | $35,656.29 | $36,466.62 | $37,294.68 | $38,140.82 | $39,005.44 |
| 28 | $933.72 | $26,144.16 | $34,863.30 | $35,686.00 | $36,527.40 | $37,387.91 | $38,267.96 | $39,167.96 |
| 29 | $933.72 | $27,077.88 | $34,863.30 | $35,715.74 | $36,588.28 | $37,481.38 | $38,395.52 | $39,331.16 |
| 30 | $933.72 | $28,011.60 | $34,863.30 | $35,745.50 | $36,649.26 | $37,575.09 | $38,523.50 | $39,495.04 |
| 31 | $933.72 | $28,945.32 | $34,863.30 | $35,775.29 | $36,710.34 | $37,669.02 | $38,651.91 | $39,659.60 |
| 32 | $933.72 | $29,879.04 | $34,863.30 | $35,805.10 | $36,771.52 | $37,763.20 | $38,780.75 | $39,824.85 |
| 33 | $933.72 | $30,812.76 | $34,863.30 | $35,834.94 | $36,832.81 | $37,857.60 | $38,910.02 | $39,990.79 |
| 34 | $933.72 | $31,746.48 | $34,863.30 | $35,864.80 | $36,894.20 | $37,952.25 | $39,039.72 | $40,157.42 |
| 35 | $933.72 | $32,680.20 | $34,863.30 | $35,894.69 | $36,955.69 | $38,047.13 | $39,169.86 | $40,324.74 |
| 36 | $933.72 | $33,613.92 | $34,863.30 | $35,924.60 | $37,017.28 | $38,142.25 | $39,300.42 | $40,492.76 |
| 37 | $933.72 | $34,547.64 | $34,863.30 | $35,954.54 | $37,078.98 | $38,237.60 | $39,431.42 | $40,661.48 |
| 38 | $933.72 | $35,481.36 | $34,863.30 | $35,984.50 | $37,140.78 | $38,333.20 | $39,562.86 | $40,830.90 |
| 39 | $933.72 | $36,415.08 | $34,863.30 | $36,014.49 | $37,202.68 | $38,429.03 | $39,694.74 | $41,001.03 |
| 40 | $933.72 | $37,348.80 | $34,863.30 | $36,044.50 | $37,264.68 | $38,525.10 | $39,827.05 | $41,171.87 |
| 41 | $933.72 | $38,282.52 | $34,863.30 | $36,074.54 | $37,326.79 | $38,621.41 | $39,959.81 | $41,343.42 |
| 42 | $933.72 | $39,216.24 | $34,863.30 | $36,104.60 | $37,389.00 | $38,717.97 | $40,093.01 | $41,515.68 |
| 43 | $933.72 | $40,149.96 | $34,863.30 | $36,134.69 | $37,451.32 | $38,814.76 | $40,226.65 | $41,688.66 |
| 44 | $933.72 | $41,083.68 | $34,863.30 | $36,164.80 | $37,513.73 | $38,911.80 | $40,360.74 | $41,862.37 |
| 45 | $933.72 | $42,017.40 | $34,863.30 | $36,194.94 | $37,576.26 | $39,009.08 | $40,495.28 | $42,036.79 |
| 46 | $933.72 | $42,951.12 | $34,863.30 | $36,225.10 | $37,638.88 | $39,106.60 | $40,630.26 | $42,211.95 |
| 47 | $933.72 | $43,884.84 | $34,863.30 | $36,255.29 | $37,701.62 | $39,204.37 | $40,765.70 | $42,387.83 |
| 48 | $933.72 | $44,818.56 | $34,863.30 | $36,285.50 | $37,764.45 | $39,302.38 | $40,901.58 | $42,564.45 |
| 49 | $933.72 | $45,752.28 | $34,863.30 | $36,315.74 | $37,827.39 | $39,400.64 | $41,037.92 | $42,741.80 |
| 50 | $933.72 | $46,686.00 | $34,863.30 | $36,346.00 | $37,890.44 | $39,499.14 | $41,174.71 | $42,919.89 |
| 51 | $933.72 | $47,619.72 | $34,863.30 | $36,376.29 | $37,953.59 | $39,597.89 | $41,311.96 | $43,098.72 |
| 52 | $933.72 | $48,553.44 | $34,863.30 | $36,406.60 | $38,016.84 | $39,696.88 | $41,449.67 | $43,278.30 |
| 53 | $933.72 | $49,487.16 | $34,863.30 | $36,436.94 | $38,080.21 | $39,796.12 | $41,587.84 | $43,458.63 |
| 54 | $933.72 | $50,420.88 | $34,863.30 | $36,467.30 | $38,143.67 | $39,895.61 | $41,726.46 | $43,639.70 |
| 55 | $933.72 | $51,354.60 | $34,863.30 | $36,497.69 | $38,207.25 | $39,995.35 | $41,865.55 | $43,821.54 |
| 56 | $933.72 | $52,288.32 | $34,863.30 | $36,528.11 | $38,270.92 | $40,095.34 | $42,005.10 | $44,004.13 |
| 57 | $933.72 | $53,222.04 | $34,863.30 | $36,558.55 | $38,334.71 | $40,195.58 | $42,145.12 | $44,187.48 |
| 58 | $933.72 | $54,155.76 | $34,863.30 | $36,589.01 | $38,398.60 | $40,296.07 | $42,285.60 | $44,371.59 |
| 59 | $933.72 | $55,089.48 | $34,863.30 | $36,619.50 | $38,462.60 | $40,396.81 | $42,426.55 | $44,556.47 |
| 60 | $933.72 | $56,023.20 | $34,863.30 | $36,650.02 | $38,526.70 | $40,497.80 | $42,567.98 | $44,742.12 |
| 61 | $933.72 | $56,956.92 | $34,863.30 | $36,680.56 | $38,590.91 | $40,599.04 | $42,709.87 | $44,928.55 |
| 62 | $933.72 | $57,890.64 | $34,863.30 | $36,711.13 | $38,655.23 | $40,700.54 | $42,852.24 | $45,115.75 |
| 63 | $933.72 | $58,824.36 | $34,863.30 | $36,741.72 | $38,719.66 | $40,802.29 | $42,995.08 | $45,303.73 |
| 64 | $933.72 | $59,758.08 | $34,863.30 | $36,772.34 | $38,784.19 | $40,904.30 | $43,138.39 | $45,492.50 |
| 65 | $933.72 | $60,691.80 | $34,863.30 | $36,802.98 | $38,848.83 | $41,006.56 | $43,282.19 | $45,682.05 |
| 66 | $933.72 | $61,625.52 | $34,863.30 | $36,833.65 | $38,913.58 | $41,109.08 | $43,426.46 | $45,872.39 |
| 67 | $933.72 | $62,559.24 | $34,863.30 | $36,864.35 | $38,978.43 | $41,211.85 | $43,571.22 | $46,063.53 |
| 68 | $933.72 | $63,492.96 | $34,863.30 | $36,895.07 | $39,043.40 | $41,314.88 | $43,716.45 | $46,255.46 |
| 69 | $933.72 | $64,426.68 | $34,863.30 | $36,925.81 | $39,108.47 | $41,418.17 | $43,862.18 | $46,448.19 |
| 70 | $933.72 | $65,360.40 | $34,863.30 | $36,956.59 | $39,173.65 | $41,521.71 | $44,008.38 | $46,641.73 |
| 71 | $933.72 | $66,294.12 | $34,863.30 | $36,987.38 | $39,238.94 | $41,625.51 | $44,155.08 | $46,836.07 |
| 72 | $933.72 | $67,227.84 | $34,863.30 | $37,018.21 | $39,304.34 | $41,729.58 | $44,302.26 | $47,031.22 |
| 73 | $933.72 | $68,161.56 | $34,863.30 | $37,049.05 | $39,369.85 | $41,833.90 | $44,449.94 | $47,227.18 |
| 74 | $933.72 | $69,095.28 | $34,863.30 | $37,079.93 | $39,435.46 | $41,938.49 | $44,598.10 | $47,423.96 |
| 75 | $933.72 | $70,029.00 | $34,863.30 | $37,110.83 | $39,501.19 | $42,043.33 | $44,746.76 | $47,621.56 |
| 76 | $933.72 | $70,962.72 | $34,863.30 | $37,141.75 | $39,567.02 | $42,148.44 | $44,895.92 | $47,819.98 |
| 77 | $933.72 | $71,896.44 | $34,863.30 | $37,172.71 | $39,632.97 | $42,253.81 | $45,045.57 | $48,019.23 |
| 78 | $933.72 | $72,830.16 | $34,863.30 | $37,203.68 | $39,699.02 | $42,359.45 | $45,195.72 | $48,219.31 |
| 79 | $933.72 | $73,763.88 | $34,863.30 | $37,234.69 | $39,765.19 | $42,465.35 | $45,346.38 | $48,420.23 |
| 80 | $933.72 | $74,697.60 | $34,863.30 | $37,265.71 | $39,831.46 | $42,571.51 | $45,497.53 | $48,621.98 |

TABLE 2c-continued

Combined Loan and Investment System Comparison Report Data (Lump Sum)

|  |  |  | LOAN | $194,863.30 |  |  |  |
|  |  |  | RATE | 5.75% |  |  |  |
|  |  |  | INV AMT | $34,863.30 |  |  |  |

| | | | | | | | |
|---|---|---|---|---|---|---|---|
| 81 | $933.72 | $75,631.32 | $34,863.30 | $37,296.77 | $39,897.85 | $42,677.94 | $45,649.19 | $48,824.57 |
| 82 | $933.72 | $76,565.04 | $34,863.30 | $37,327.85 | $39,964.35 | $42,784.63 | $45,801.35 | $49,028.00 |
| 83 | $933.72 | $77,498.76 | $34,863.30 | $37,358.96 | $40,030.95 | $42,891.59 | $45,954.02 | $49,232.29 |
| 84 | $933.72 | $78,432.48 | $34,863.30 | $37,390.09 | $40,097.67 | $42,998.82 | $46,107.20 | $49,437.42 |
| 85 | $933.72 | $79,366.20 | $34,863.30 | $37,421.25 | $40,164.50 | $43,106.32 | $46,260.89 | $49,643.41 |
| 86 | $933.72 | $80,299.92 | $34,863.30 | $37,452.43 | $40,231.44 | $43,214.09 | $46,415.10 | $49,850.26 |
| 87 | $933.72 | $81,233.64 | $34,863.30 | $37,483.64 | $40,298.50 | $43,322.12 | $46,569.81 | $50,057.97 |
| 88 | $933.72 | $82,167.36 | $34,863.30 | $37,514.88 | $40,365.66 | $43,430.43 | $46,725.05 | $50,266.54 |
| 89 | $933.72 | $83,101.08 | $34,863.30 | $37,546.14 | $40,432.94 | $43,539.00 | $46,880.80 | $50,475.99 |
| 90 | $933.72 | $84,034.80 | $34,863.30 | $37,577.43 | $40,500.32 | $43,647.85 | $47,037.07 | $50,686.30 |
| 91 | $933.72 | $84,968.52 | $34,863.30 | $37,608.74 | $40,567.82 | $43,756.97 | $47,193.86 | $50,897.50 |
| 92 | $933.72 | $85,902.24 | $34,863.30 | $37,640.08 | $40,635.44 | $43,866.36 | $47,351.17 | $51,109.57 |
| 93 | $933.72 | $86,835.96 | $34,863.30 | $37,671.45 | $40,703.16 | $43,976.03 | $47,509.01 | $51,322.53 |
| 94 | $933.72 | $87,769.68 | $34,863.30 | $37,702.84 | $40,771.00 | $44,085.97 | $47,667.37 | $51,536.37 |
| 95 | $933.72 | $88,703.40 | $34,863.30 | $37,734.26 | $40,838.95 | $44,196.18 | $47,826.26 | $51,751.11 |
| 96 | $933.72 | $89,637.12 | $34,863.30 | $37,765.71 | $40,907.02 | $44,306.67 | $47,985.68 | $51,966.73 |
| 97 | $933.72 | $90,570.84 | $34,863.30 | $37,797.18 | $40,975.20 | $44,417.44 | $48,145.63 | $52,183.26 |
| 98 | $933.72 | $91,504.56 | $34,863.30 | $37,828.68 | $41,043.49 | $44,528.48 | $48,306.12 | $52,400.69 |
| 99 | $933.72 | $92,438.28 | $34,863.30 | $37,860.20 | $41,111.89 | $44,639.81 | $48,467.14 | $52,619.03 |
| 100 | $933.72 | $93,372.00 | $34,863.30 | $37,891.75 | $41,180.41 | $44,751.41 | $48,628.70 | $52,838.28 |
| 101 | $933.72 | $94,305.72 | $34,863.30 | $37,923.33 | $41,249.05 | $44,863.28 | $48,790.79 | $53,058.43 |
| 102 | $933.72 | $95,239.44 | $34,863.30 | $37,954.93 | $41,317.80 | $44,975.44 | $48,953.43 | $53,279.51 |
| 103 | $933.72 | $96,173.16 | $34,863.30 | $37,986.56 | $41,386.66 | $45,087.88 | $49,116.61 | $53,501.51 |
| 104 | $933.72 | $97,106.88 | $34,863.30 | $38,018.22 | $41,455.64 | $45,200.60 | $49,280.33 | $53,724.43 |
| 105 | $933.72 | $98,040.60 | $34,863.30 | $38,049.90 | $41,524.73 | $45,313.60 | $49,444.60 | $53,948.28 |
| 106 | $933.72 | $98,974.32 | $34,863.30 | $38,081.61 | $41,593.94 | $45,426.89 | $49,609.41 | $54,173.07 |
| 107 | $933.72 | $99,908.04 | $34,863.30 | $38,113.34 | $41,663.26 | $45,540.45 | $49,774.78 | $54,398.79 |
| 108 | $933.72 | $100,841.76 | $34,863.30 | $38,145.10 | $41,732.70 | $45,654.30 | $49,940.69 | $54,625.45 |
| 109 | $933.72 | $101,775.48 | $34,863.30 | $38,176.89 | $41,802.25 | $45,768.44 | $50,107.16 | $54,853.06 |
| 110 | $933.72 | $102,709.20 | $34,863.30 | $38,208.70 | $41,871.92 | $45,882.86 | $50,274.19 | $55,081.61 |
| 111 | $933.72 | $103,642.92 | $34,863.30 | $38,240.54 | $41,941.71 | $45,997.57 | $50,441.77 | $55,311.12 |
| 112 | $933.72 | $104,576.64 | $34,863.30 | $38,272.41 | $42,011.61 | $46,112.56 | $50,609.91 | $55,541.58 |
| 113 | $933.72 | $105,510.36 | $34,863.30 | $38,304.30 | $42,081.63 | $46,227.84 | $50,778.61 | $55,773.01 |
| 114 | $933.72 | $106,444.08 | $34,863.30 | $38,336.22 | $42,151.77 | $46,343.41 | $50,947.87 | $56,005.39 |
| 115 | $933.72 | $107,377.80 | $34,863.30 | $38,368.17 | $42,222.02 | $46,459.27 | $51,117.69 | $56,238.75 |
| 116 | $933.72 | $108,311.52 | $34,863.30 | $38,400.15 | $42,292.39 | $46,575.42 | $51,288.09 | $56,473.08 |
| 117 | $933.72 | $109,245.24 | $34,863.30 | $38,432.15 | $42,362.88 | $46,691.86 | $51,459.05 | $56,708.38 |
| 118 | $933.72 | $110,178.96 | $34,863.30 | $38,464.17 | $42,433.48 | $46,808.59 | $51,630.58 | $56,944.67 |
| 119 | $933.72 | $111,112.68 | $34,863.30 | $38,496.23 | $42,504.21 | $46,925.61 | $51,802.68 | $57,181.94 |
| 120 | $933.72 | $112,046.40 | $34,863.30 | $38,528.31 | $42,575.05 | $47,042.92 | $51,975.35 | $57,420.19 |
| 121 | $933.72 | $112,980.12 | $34,863.30 | $38,560.41 | $42,646.01 | $47,160.53 | $52,148.60 | $57,659.44 |
| 122 | $933.72 | $113,913.84 | $34,863.30 | $38,592.55 | $42,717.08 | $47,278.43 | $52,322.43 | $57,899.69 |
| 123 | $933.72 | $114,847.56 | $34,863.30 | $38,624.71 | $42,788.28 | $47,396.63 | $52,496.84 | $58,140.94 |
| 124 | $933.72 | $115,781.28 | $34,863.30 | $38,656.89 | $42,859.59 | $47,515.12 | $52,671.83 | $58,383.19 |
| 125 | $933.72 | $116,715.00 | $34,863.30 | $38,689.11 | $42,931.02 | $47,633.91 | $52,847.40 | $58,626.46 |
| 126 | $933.72 | $117,648.72 | $34,863.30 | $38,721.35 | $43,002.58 | $47,752.99 | $53,023.56 | $58,870.73 |
| 127 | $933.72 | $118,582.44 | $34,863.30 | $38,753.62 | $43,074.25 | $47,872.37 | $53,200.31 | $59,116.03 |
| 128 | $933.72 | $119,516.16 | $34,863.30 | $38,785.91 | $43,146.04 | $47,992.06 | $53,377.64 | $59,362.35 |
| 129 | $933.72 | $120,449.88 | $34,863.30 | $38,818.23 | $43,217.95 | $48,112.04 | $53,555.57 | $59,609.69 |
| 130 | $933.72 | $121,383.60 | $34,863.30 | $38,850.58 | $43,289.98 | $48,232.32 | $53,734.09 | $59,858.06 |
| 131 | $933.72 | $122,317.32 | $34,863.30 | $38,882.96 | $43,362.13 | $48,352.90 | $53,913.20 | $60,107.47 |
| 132 | $933.72 | $123,251.04 | $34,863.30 | $38,915.36 | $43,434.40 | $48,473.78 | $54,092.91 | $60,357.92 |
| 133 | $933.72 | $124,184.76 | $34,863.30 | $38,947.79 | $43,506.79 | $48,594.96 | $54,273.22 | $60,609.41 |
| 134 | $933.72 | $125,118.48 | $34,863.30 | $38,980.25 | $43,579.30 | $48,716.45 | $54,454.13 | $60,861.95 |
| 135 | $933.72 | $126,052.20 | $34,863.30 | $39,012.73 | $43,651.93 | $48,838.24 | $54,635.64 | $61,115.54 |
| 136 | $933.72 | $126,985.92 | $34,863.30 | $39,045.24 | $43,724.68 | $48,960.34 | $54,817.76 | $61,370.19 |
| 137 | $933.72 | $127,919.64 | $34,863.30 | $39,077.78 | $43,797.56 | $49,082.74 | $55,000.49 | $61,625.90 |
| 138 | $933.72 | $128,853.36 | $34,863.30 | $39,110.34 | $43,870.56 | $49,205.45 | $55,183.82 | $61,882.67 |
| 139 | $933.72 | $129,787.08 | $34,863.30 | $39,142.93 | $43,943.67 | $49,328.46 | $55,367.77 | $62,140.52 |
| 140 | $933.72 | $130,720.80 | $34,863.30 | $39,175.55 | $44,016.91 | $49,451.78 | $55,552.33 | $62,399.44 |
| 141 | $933.72 | $131,654.52 | $34,863.30 | $39,208.20 | $44,090.27 | $49,575.41 | $55,737.50 | $62,659.43 |
| 142 | $933.72 | $132,588.24 | $34,863.30 | $39,240.87 | $44,163.76 | $49,699.35 | $55,923.29 | $62,920.52 |
| 143 | $933.72 | $133,521.96 | $34,863.30 | $39,273.57 | $44,237.36 | $49,823.60 | $56,109.71 | $63,182.68 |
| 144 | $933.72 | $134,455.68 | $34,863.30 | $39,306.30 | $44,311.09 | $49,948.16 | $56,296.74 | $63,445.95 |
| 145 | $933.72 | $135,389.40 | $34,863.30 | $39,339.06 | $44,384.94 | $50,073.03 | $56,484.39 | $63,710.30 |
| 146 | $933.72 | $136,323.12 | $34,863.30 | $39,371.84 | $44,458.92 | $50,198.21 | $56,672.68 | $63,975.76 |
| 147 | $933.72 | $137,256.84 | $34,863.30 | $39,404.65 | $44,533.02 | $50,323.70 | $56,861.58 | $64,242.33 |
| 148 | $933.72 | $138,190.56 | $34,863.30 | $39,437.49 | $44,607.24 | $50,449.51 | $57,051.12 | $64,510.00 |
| 149 | $933.72 | $139,124.28 | $34,863.30 | $39,470.35 | $44,681.58 | $50,575.64 | $57,241.29 | $64,778.80 |
| 150 | $933.72 | $140,058.00 | $34,863.30 | $39,503.24 | $44,756.05 | $50,702.08 | $57,432.10 | $65,048.71 |
| 151 | $933.72 | $140,991.72 | $34,863.30 | $39,536.16 | $44,830.65 | $50,828.83 | $57,623.54 | $65,319.74 |
| 152 | $933.72 | $141,925.44 | $34,863.30 | $39,569.11 | $44,905.37 | $50,955.90 | $57,815.62 | $65,591.91 |
| 153 | $933.72 | $142,859.16 | $34,863.30 | $39,602.08 | $44,980.21 | $51,083.29 | $58,008.34 | $65,865.21 |
| 154 | $933.72 | $143,792.88 | $34,863.30 | $39,635.09 | $45,055.17 | $51,211.00 | $58,201.70 | $66,139.65 |

TABLE 2c-continued

Combined Loan and Investment System Comparison Report Data (Lump Sum)

LOAN $194,863.30
RATE 5.75%
INV AMT $34,863.30

| | | | | | | | | |
|---|---|---|---|---|---|---|---|---|
| 155 | $933.72 | $144,726.60 | $34,863.30 | $39,668.11 | $45,130.27 | $51,339.03 | $58,395.70 | $66,415.23 |
| 156 | $933.72 | $145,660.32 | $34,863.30 | $39,701.17 | $45,205.48 | $51,467.38 | $58,590.35 | $66,691.96 |
| 157 | $933.72 | $146,594.04 | $34,863.30 | $39,734.26 | $45,280.83 | $51,596.04 | $58,785.66 | $66,969.84 |
| 158 | $933.72 | $147,527.76 | $34,863.30 | $39,767.37 | $45,356.29 | $51,725.03 | $58,981.61 | $67,248.88 |
| 159 | $933.72 | $148,461.48 | $34,863.30 | $39,800.51 | $45,431.89 | $51,854.35 | $59,178.21 | $67,529.09 |
| 160 | $933.72 | $149,395.20 | $34,863.30 | $39,833.67 | $45,507.61 | $51,983.98 | $59,375.47 | $67,810.46 |
| 161 | $933.72 | $150,328.92 | $34,863.30 | $39,866.87 | $45,583.45 | $52,113.94 | $59,573.39 | $68,093.00 |
| 162 | $933.72 | $151,262.64 | $34,863.30 | $39,900.09 | $45,659.43 | $52,244.23 | $59,771.97 | $68,376.72 |
| 163 | $933.72 | $152,196.36 | $34,863.30 | $39,933.34 | $45,735.53 | $52,374.84 | $59,971.21 | $68,661.63 |
| 164 | $933.72 | $153,130.08 | $34,863.30 | $39,966.62 | $45,811.75 | $52,505.78 | $60,171.11 | $68,947.72 |
| 165 | $933.72 | $154,063.80 | $34,863.30 | $39,999.92 | $45,888.10 | $52,637.04 | $60,371.68 | $69,235.00 |
| 166 | $933.72 | $154,997.52 | $34,863.30 | $40,033.26 | $45,964.58 | $52,768.63 | $60,572.92 | $69,523.48 |
| 167 | $933.72 | $155,931.24 | $34,863.30 | $40,066.62 | $46,041.19 | $52,900.55 | $60,774.83 | $69,813.16 |
| 168 | $933.72 | $156,864.96 | $34,863.30 | $40,100.01 | $46,117.93 | $53,032.81 | $60,977.42 | $70,104.05 |
| 169 | $933.72 | $157,798.68 | $34,863.30 | $40,133.42 | $46,194.79 | $53,165.39 | $61,180.67 | $70,396.15 |
| 170 | $933.72 | $158,732.40 | $34,863.30 | $40,166.87 | $46,271.78 | $53,298.30 | $61,384.61 | $70,689.46 |
| 171 | $933.72 | $159,666.12 | $34,863.30 | $40,200.34 | $46,348.90 | $53,431.55 | $61,589.22 | $70,984.00 |
| 172 | $933.72 | $160,599.84 | $34,863.30 | $40,233.84 | $46,426.15 | $53,565.13 | $61,794.52 | $71,279.77 |
| 173 | $933.72 | $161,533.56 | $34,863.30 | $40,267.37 | $46,503.53 | $53,699.04 | $62,000.50 | $71,576.77 |
| 174 | $933.72 | $162,467.28 | $34,863.30 | $40,300.93 | $46,581.03 | $53,833.29 | $62,207.17 | $71,875.01 |
| 175 | $933.72 | $163,401.00 | $34,863.30 | $40,334.51 | $46,658.67 | $53,967.87 | $62,414.53 | $72,174.49 |
| 176 | $933.72 | $164,334.72 | $34,863.30 | $40,368.12 | $46,736.43 | $54,102.79 | $62,622.58 | $72,475.21 |
| 177 | $933.72 | $165,268.44 | $34,863.30 | $40,401.76 | $46,814.33 | $54,238.05 | $62,831.32 | $72,777.19 |
| 178 | $933.72 | $166,202.16 | $34,863.30 | $40,435.43 | $46,892.35 | $54,373.64 | $63,040.76 | $73,080.43 |
| 179 | $933.72 | $167,135.88 | $34,863.30 | $40,469.13 | $46,970.50 | $54,509.58 | $63,250.89 | $73,384.93 |
| 180 | $933.72 | $168,069.60 | $34,863.30 | $40,502.85 | $47,048.79 | $54,645.85 | $63,461.73 | $73,690.70 |
| 181 | $933.72 | $169,003.32 | $34,863.30 | $40,536.60 | $47,127.20 | $54,782.46 | $63,673.27 | $73,997.75 |
| 182 | $933.72 | $169,937.04 | $34,863.30 | $40,570.38 | $47,205.75 | $54,919.42 | $63,885.51 | $74,306.07 |
| 183 | $933.72 | $170,870.76 | $34,863.30 | $40,604.19 | $47,284.42 | $55,056.72 | $64,098.46 | $74,615.68 |
| 184 | $933.72 | $171,804.48 | $34,863.30 | $40,638.03 | $47,363.23 | $55,194.36 | $64,312.13 | $74,926.58 |
| 185 | $933.72 | $172,738.20 | $34,863.30 | $40,671.89 | $47,442.17 | $55,332.35 | $64,526.50 | $75,238.77 |
| 186 | $933.72 | $173,671.92 | $34,863.30 | $40,705.79 | $47,521.24 | $55,470.68 | $64,741.59 | $75,552.27 |
| 187 | $933.72 | $174,605.64 | $34,863.30 | $40,739.71 | $47,600.44 | $55,609.35 | $64,957.39 | $75,867.07 |
| 188 | $933.72 | $175,539.36 | $34,863.30 | $40,773.66 | $47,679.78 | $55,748.38 | $65,173.92 | $76,183.18 |
| 189 | $933.72 | $176,473.08 | $34,863.30 | $40,807.64 | $47,759.24 | $55,887.75 | $65,391.16 | $76,500.61 |
| 190 | $933.72 | $177,406.80 | $34,863.30 | $40,841.64 | $47,838.84 | $56,027.47 | $65,609.14 | $76,819.36 |
| 191 | $933.72 | $178,340.52 | $34,863.30 | $40,875.68 | $47,918.57 | $56,167.54 | $65,827.83 | $77,139.45 |
| 192 | $933.72 | $179,274.24 | $34,863.30 | $40,909.74 | $47,998.44 | $56,307.96 | $66,047.26 | $77,460.86 |
| 193 | $933.72 | $180,207.96 | $34,863.30 | $40,943.83 | $48,078.43 | $56,448.72 | $66,267.42 | $77,783.61 |
| 194 | $933.72 | $181,141.68 | $34,863.30 | $40,977.95 | $48,158.57 | $56,589.85 | $66,488.31 | $78,107.71 |
| 195 | $933.72 | $182,075.40 | $34,863.30 | $41,012.10 | $48,238.83 | $56,731.32 | $66,709.94 | $78,433.16 |
| 196 | $933.72 | $183,009.12 | $34,863.30 | $41,046.28 | $48,319.23 | $56,873.15 | $66,932.30 | $78,759.97 |
| 197 | $933.72 | $183,942.84 | $34,863.30 | $41,080.48 | $48,399.76 | $57,015.33 | $67,155.41 | $79,088.13 |
| 198 | $933.72 | $184,876.56 | $34,863.30 | $41,114.72 | $48,480.43 | $57,157.87 | $67,379.26 | $79,417.67 |
| 199 | $933.72 | $185,810.28 | $34,863.30 | $41,148.98 | $48,561.23 | $57,300.77 | $67,603.86 | $79,748.57 |
| 200 | $933.72 | $186,744.00 | $34,863.30 | $41,183.27 | $48,642.16 | $57,444.02 | $67,829.20 | $80,080.86 |
| 201 | $933.72 | $187,677.72 | $34,863.30 | $41,217.59 | $48,723.23 | $57,587.63 | $68,055.30 | $80,414.53 |
| 202 | $933.72 | $188,611.44 | $34,863.30 | $41,251.94 | $48,804.44 | $57,731.60 | $68,282.15 | $80,749.59 |
| 203 | $933.72 | $189,545.16 | $34,863.30 | $41,286.31 | $48,885.78 | $57,875.93 | $68,509.76 | $81,086.05 |
| 204 | $933.72 | $190,478.88 | $34,863.30 | $41,320.72 | $48,967.25 | $58,020.62 | $68,738.13 | $81,423.90 |
| 205 | $933.72 | $191,412.60 | $34,863.30 | $41,355.15 | $49,048.87 | $58,165.67 | $68,967.25 | $81,763.17 |
| 206 | $933.72 | $192,346.32 | $34,863.30 | $41,389.61 | $49,130.62 | $58,311.08 | $69,197.14 | $82,103.85 |
| 207 | $933.72 | $193,280.04 | $34,863.30 | $41,424.11 | $49,212.50 | $58,456.86 | $69,427.80 | $82,445.95 |
| 208 | $933.72 | $194,213.76 | $34,863.30 | $41,458.63 | $49,294.52 | $58,603.00 | $69,659.23 | $82,789.47 |
| 209 | $933.72 | $195,147.48 | $34,863.30 | $41,493.18 | $49,376.68 | $58,749.51 | $69,891.42 | $83,134.43 |
| 210 | $933.72 | $196,081.20 | $34,863.30 | $41,527.75 | $49,458.97 | $58,896.38 | $70,124.40 | $83,480.82 |
| 211 | $933.72 | $197,014.92 | $34,863.30 | $41,562.36 | $49,541.40 | $59,043.62 | $70,358.14 | $83,828.66 |
| 212 | $933.72 | $197,948.64 | $34,863.30 | $41,596.99 | $49,623.97 | $59,191.23 | $70,592.67 | $84,177.95 |
| 213 | $933.72 | $198,882.36 | $34,863.30 | $41,631.66 | $49,706.68 | $59,339.21 | $70,827.98 | $84,528.69 |
| 214 | $933.72 | $199,816.08 | $34,863.30 | $41,666.35 | $49,789.52 | $59,487.56 | $71,064.07 | $84,880.89 |
| 215 | $933.72 | $200,749.80 | $34,863.30 | $41,701.07 | $49,872.51 | $59,636.28 | $71,300.95 | $85,234.56 |
| 216 | $933.72 | $201,683.52 | $34,863.30 | $41,735.82 | $49,955.63 | $59,785.37 | $71,538.62 | $85,589.71 |
| 217 | $933.72 | $202,617.24 | $34,863.30 | $41,770.60 | $50,038.89 | $59,934.83 | $71,777.09 | $85,946.33 |
| 218 | $933.72 | $203,550.96 | $34,863.30 | $41,805.41 | $50,122.28 | $60,084.67 | $72,016.34 | $86,304.44 |
| 219 | $933.72 | $204,484.68 | $34,863.30 | $41,840.25 | $50,205.82 | $60,234.88 | $72,256.40 | $86,664.04 |
| 220 | $933.72 | $205,418.40 | $34,863.30 | $41,875.12 | $50,289.50 | $60,385.47 | $72,497.25 | $87,025.14 |
| 221 | $933.72 | $206,352.12 | $34,863.30 | $41,910.01 | $50,373.31 | $60,536.43 | $72,738.91 | $87,387.75 |
| 222 | $933.72 | $207,285.84 | $34,863.30 | $41,944.94 | $50,457.27 | $60,687.77 | $72,981.37 | $87,751.86 |
| 223 | $933.72 | $208,219.56 | $34,863.30 | $41,979.89 | $50,541.37 | $60,839.49 | $73,224.64 | $88,117.49 |
| 224 | $933.72 | $209,153.28 | $34,863.30 | $42,014.88 | $50,625.60 | $60,991.59 | $73,468.72 | $88,484.65 |
| 225 | $933.72 | $210,087.00 | $34,863.30 | $42,049.89 | $50,709.98 | $61,144.07 | $73,713.62 | $88,853.34 |
| 226 | $933.72 | $211,020.72 | $34,863.30 | $42,084.93 | $50,794.49 | $61,296.93 | $73,959.33 | $89,223.56 |
| 227 | $933.72 | $211,954.44 | $34,863.30 | $42,120.00 | $50,879.15 | $61,450.17 | $74,205.86 | $89,595.32 |
| 228 | $933.72 | $212,888.16 | $34,863.30 | $42,155.10 | $50,963.95 | $61,603.80 | $74,453.22 | $89,968.64 |

TABLE 2c-continued

Combined Loan and Investment System Comparison Report Data (Lump Sum)

|  |  | LOAN | $194,863.30 |  |  |  |  |
|--|--|--|--|--|--|--|--|
|  |  | RATE | 5.75% |  |  |  |  |
|  |  | INV AMT | $34,863.30 |  |  |  |  |

| | | | | | | | |
|---|---|---|---|---|---|---|---|
| 229 | $933.72 | $213,821.88 | $34,863.30 | $42,190.23 | $51,048.89 | $61,757.81 | $74,701.39 | $90,343.51 |
| 230 | $933.72 | $214,755.60 | $34,863.30 | $42,225.39 | $51,133.97 | $61,912.20 | $74,950.40 | $90,719.94 |
| 231 | $933.72 | $215,689.32 | $34,863.30 | $42,260.58 | $51,219.19 | $62,066.98 | $75,200.23 | $91,097.94 |
| 232 | $933.72 | $216,623.04 | $34,863.30 | $42,295.79 | $51,304.56 | $62,222.15 | $75,450.90 | $91,477.51 |
| 233 | $933.72 | $217,556.76 | $34,863.30 | $42,331.04 | $51,390.07 | $62,377.70 | $75,702.40 | $91,858.67 |
| 234 | $933.72 | $218,490.48 | $34,863.30 | $42,366.32 | $51,475.72 | $62,533.65 | $75,954.75 | $92,241.41 |
| 235 | $933.72 | $219,424.20 | $34,863.30 | $42,401.62 | $51,561.51 | $62,689.98 | $76,207.93 | $92,625.75 |
| 236 | $933.72 | $220,357.92 | $34,863.30 | $42,436.96 | $51,647.45 | $62,846.71 | $76,461.95 | $93,011.69 |
| 237 | $933.72 | $221,291.64 | $34,863.30 | $42,472.32 | $51,733.52 | $63,003.82 | $76,716.83 | $93,399.24 |
| 238 | $933.72 | $222,225.36 | $34,863.30 | $42,507.71 | $51,819.75 | $63,161.33 | $76,972.55 | $93,788.41 |
| 239 | $933.72 | $223,159.08 | $34,863.30 | $42,543.14 | $51,906.11 | $63,319.24 | $77,229.13 | $94,179.19 |
| 240 | $933.72 | $224,092.80 | $34,863.30 | $42,578.59 | $51,992.62 | $63,477.54 | $77,486.56 | $94,571.60 |
| 241 | $933.72 | $225,026.52 | $34,863.30 | $42,614.07 | $52,079.28 | $63,636.23 | $77,744.84 | $94,965.65 |
| 242 | $933.72 | $225,960.24 | $34,863.30 | $42,649.58 | $52,166.08 | $63,795.32 | $78,003.99 | $95,361.34 |
| 243 | $933.72 | $226,893.96 | $34,863.30 | $42,685.12 | $52,253.02 | $63,954.81 | $78,264.01 | $95,758.68 |
| 244 | $933.72 | $227,827.68 | $34,863.30 | $42,720.70 | $52,340.11 | $64,114.70 | $78,524.89 | $96,157.68 |
| 245 | $933.72 | $228,761.40 | $34,863.30 | $42,756.30 | $52,427.34 | $64,274.98 | $78,786.64 | $96,558.33 |
| 246 | $933.72 | $229,695.12 | $34,863.30 | $42,791.93 | $52,514.72 | $64,435.67 | $79,049.26 | $96,960.66 |
| 247 | $933.72 | $230,628.84 | $34,863.30 | $42,827.59 | $52,602.25 | $64,596.76 | $79,312.76 | $97,364.66 |
| 248 | $933.72 | $231,562.56 | $34,863.30 | $42,863.28 | $52,689.92 | $64,758.25 | $79,577.13 | $97,770.35 |
| 249 | $933.72 | $232,496.28 | $34,863.30 | $42,899.00 | $52,777.73 | $64,920.15 | $79,842.39 | $98,177.72 |
| 250 | $933.72 | $233,430.00 | $34,863.30 | $42,934.74 | $52,865.70 | $65,082.45 | $80,108.53 | $98,586.80 |
| 251 | $933.72 | $234,363.72 | $34,863.30 | $42,970.52 | $52,953.81 | $65,245.15 | $80,375.56 | $98,997.58 |
| 252 | $933.72 | $235,297.44 | $34,863.30 | $43,006.33 | $53,042.06 | $65,408.27 | $80,643.48 | $99,410.07 |
| 253 | $933.72 | $236,231.16 | $34,863.30 | $43,042.17 | $53,130.46 | $65,571.79 | $80,912.29 | $99,824.28 |
| 254 | $933.72 | $237,164.88 | $34,863.30 | $43,078.04 | $53,219.02 | $65,735.72 | $81,182.00 | $100,240.21 |
| 255 | $933.72 | $238,098.60 | $34,863.30 | $43,113.94 | $53,307.71 | $65,900.05 | $81,452.60 | $100,657.88 |
| 256 | $933.72 | $239,032.32 | $34,863.30 | $43,149.87 | $53,396.56 | $66,064.81 | $81,724.11 | $101,077.29 |
| 257 | $933.72 | $239,966.04 | $34,863.30 | $43,185.82 | $53,485.55 | $66,229.97 | $81,996.53 | $101,498.44 |
| 258 | $933.72 | $240,899.76 | $34,863.30 | $43,221.81 | $53,574.70 | $66,395.54 | $82,269.85 | $101,921.35 |
| 259 | $933.72 | $241,833.48 | $34,863.30 | $43,257.83 | $53,663.99 | $66,561.53 | $82,544.08 | $102,346.02 |
| 260 | $933.72 | $242,767.20 | $34,863.30 | $43,293.88 | $53,753.43 | $66,727.93 | $82,819.23 | $102,772.46 |
| 261 | $933.72 | $243,700.92 | $34,863.30 | $43,329.96 | $53,843.02 | $66,894.75 | $83,095.29 | $103,200.68 |
| 262 | $933.72 | $244,634.64 | $34,863.30 | $43,366.07 | $53,932.76 | $67,061.99 | $83,372.28 | $103,630.69 |
| 263 | $933.72 | $245,568.36 | $34,863.30 | $43,402.20 | $54,022.64 | $67,229.65 | $83,650.18 | $104,062.48 |
| 264 | $933.72 | $246,502.08 | $34,863.30 | $43,438.37 | $54,112.68 | $67,397.72 | $83,929.02 | $104,496.07 |
| 265 | $933.72 | $247,435.80 | $34,863.30 | $43,474.57 | $54,202.87 | $67,566.21 | $84,208.78 | $104,931.47 |
| 266 | $933.72 | $248,369.52 | $34,863.30 | $43,510.80 | $54,293.21 | $67,735.13 | $84,489.48 | $105,368.69 |
| 267 | $933.72 | $249,303.24 | $34,863.30 | $43,547.06 | $54,383.70 | $67,904.47 | $84,771.11 | $105,807.73 |
| 268 | $933.72 | $250,236.96 | $34,863.30 | $43,583.35 | $54,474.34 | $68,074.23 | $85,053.68 | $106,248.59 |
| 269 | $933.72 | $251,170.68 | $34,863.30 | $43,619.67 | $54,565.13 | $68,244.41 | $85,337.19 | $106,691.29 |
| 270 | $933.72 | $252,104.40 | $34,863.30 | $43,656.02 | $54,656.07 | $68,415.03 | $85,621.65 | $107,135.84 |
| 271 | $933.72 | $253,038.12 | $34,863.30 | $43,692.40 | $54,747.16 | $68,586.06 | $85,907.05 | $107,582.24 |
| 272 | $933.72 | $253,971.84 | $34,863.30 | $43,728.81 | $54,838.41 | $68,757.53 | $86,193.41 | $108,030.50 |
| 273 | $933.72 | $254,905.56 | $34,863.30 | $43,765.25 | $54,929.80 | $68,929.42 | $86,480.72 | $108,480.63 |
| 274 | $933.72 | $255,839.28 | $34,863.30 | $43,801.72 | $55,021.35 | $69,101.75 | $86,768.99 | $108,932.63 |
| 275 | $933.72 | $256,773.00 | $34,863.30 | $43,838.22 | $55,113.06 | $69,274.50 | $87,058.22 | $109,386.51 |
| 276 | $933.72 | $257,706.72 | $34,863.30 | $43,874.75 | $55,204.91 | $69,447.69 | $87,348.41 | $109,842.29 |
| 277 | $933.72 | $258,640.44 | $34,863.30 | $43,911.31 | $55,296.92 | $69,621.31 | $87,639.58 | $110,299.97 |
| 278 | $933.72 | $259,574.16 | $34,863.30 | $43,947.91 | $55,389.08 | $69,795.36 | $87,931.71 | $110,759.55 |
| 279 | $933.72 | $260,507.88 | $34,863.30 | $43,984.53 | $55,481.40 | $69,969.85 | $88,224.81 | $111,221.05 |
| 280 | $933.72 | $261,441.60 | $34,863.30 | $44,021.18 | $55,573.86 | $70,144.77 | $88,518.90 | $111,684.47 |
| 281 | $933.72 | $262,375.32 | $34,863.30 | $44,057.87 | $55,666.49 | $70,320.13 | $88,813.96 | $112,149.82 |
| 282 | $933.72 | $263,309.04 | $34,863.30 | $44,094.58 | $55,759.27 | $70,495.93 | $89,110.01 | $112,617.11 |
| 283 | $933.72 | $264,242.76 | $34,863.30 | $44,131.33 | $55,852.20 | $70,672.17 | $89,407.04 | $113,086.35 |
| 284 | $933.72 | $265,176.48 | $34,863.30 | $44,168.11 | $55,945.28 | $70,848.85 | $89,705.06 | $113,557.54 |
| 285 | $933.72 | $266,110.20 | $34,863.30 | $44,204.90 | $56,038.53 | $71,025.98 | $90,004.08 | $114,030.70 |
| 286 | $933.72 | $267,043.92 | $34,863.30 | $44,241.75 | $56,131.92 | $71,203.54 | $90,304.09 | $114,505.83 |
| 287 | $933.72 | $267,977.64 | $34,863.30 | $44,278.62 | $56,225.48 | $71,381.55 | $90,605.11 | $114,982.94 |
| 288 | $933.72 | $268,911.36 | $34,863.30 | $44,315.52 | $56,319.19 | $71,560.00 | $90,907.12 | $115,462.03 |
| 289 | $933.72 | $269,845.08 | $34,863.30 | $44,352.45 | $56,413.05 | $71,738.90 | $91,210.15 | $115,943.12 |
| 290 | $933.72 | $270,778.80 | $34,863.30 | $44,389.41 | $56,507.07 | $71,918.25 | $91,514.18 | $116,426.22 |
| 291 | $933.72 | $271,712.52 | $34,863.30 | $44,426.40 | $56,601.25 | $72,098.05 | $91,819.23 | $116,911.33 |
| 292 | $933.72 | $272,646.24 | $34,863.30 | $44,463.42 | $56,695.59 | $72,278.29 | $92,125.29 | $117,398.46 |
| 293 | $933.72 | $273,579.96 | $34,863.30 | $44,500.47 | $56,790.08 | $72,458.99 | $92,432.38 | $117,887.62 |
| 294 | $933.72 | $274,513.68 | $34,863.30 | $44,537.56 | $56,884.73 | $72,640.14 | $92,740.49 | $118,378.82 |
| 295 | $933.72 | $275,447.40 | $34,863.30 | $44,574.67 | $56,979.54 | $72,821.74 | $93,049.62 | $118,872.06 |
| 296 | $933.72 | $276,381.12 | $34,863.30 | $44,611.82 | $57,074.50 | $73,003.79 | $93,359.79 | $119,367.36 |
| 297 | $933.72 | $277,314.84 | $34,863.30 | $44,648.99 | $57,169.63 | $73,186.30 | $93,670.98 | $119,864.73 |
| 298 | $933.72 | $278,248.56 | $34,863.30 | $44,686.20 | $57,264.91 | $73,369.27 | $93,983.22 | $120,364.16 |
| 299 | $933.72 | $279,182.28 | $34,863.30 | $44,723.44 | $57,360.35 | $73,552.69 | $94,296.50 | $120,865.68 |
| 300 | $933.72 | $280,116.00 | $34,863.30 | $44,760.71 | $57,455.95 | $73,736.57 | $94,610.82 | $121,369.29 |
| 301 | $933.72 | $281,049.72 | $34,863.30 | $44,798.01 | $57,551.71 | $73,920.91 | $94,926.19 | $121,874.99 |
| 302 | $933.72 | $281,983.44 | $34,863.30 | $44,835.34 | $57,647.63 | $74,105.71 | $95,242.61 | $122,382.81 |

TABLE 2c-continued

Combined Loan and Investment System Comparison Report Data (Lump Sum)

LOAN $194,863.30
RATE 5.75%
INV AMT $34,863.30

| | | | | | | | | |
|---|---|---|---|---|---|---|---|---|
| 303 | $933.72 | $282,917.16 | $34,863.30 | $44,872.70 | $57,743.71 | $74,290.98 | $95,560.09 | $122,892.73 |
| 304 | $933.72 | $283,850.88 | $34,863.30 | $44,910.10 | $57,839.95 | $74,476.71 | $95,878.62 | $123,404.79 |
| 305 | $933.72 | $284,784.60 | $34,863.30 | $44,947.52 | $57,936.35 | $74,662.90 | $96,198.22 | $123,918.97 |
| 306 | $933.72 | $285,718.32 | $34,863.30 | $44,984.98 | $58,032.91 | $74,849.55 | $96,518.88 | $124,435.30 |
| 307 | $933.72 | $286,652.04 | $34,863.30 | $45,022.47 | $58,129.63 | $75,036.68 | $96,840.61 | $124,953.78 |
| 308 | $933.72 | $287,585.76 | $34,863.30 | $45,059.99 | $58,226.52 | $75,224.27 | $97,163.41 | $125,474.42 |
| 309 | $933.72 | $288,519.48 | $34,863.30 | $45,097.54 | $58,323.56 | $75,412.33 | $97,487.29 | $125,997.23 |
| 310 | $933.72 | $289,453.20 | $34,863.30 | $45,135.12 | $58,420.77 | $75,600.86 | $97,812.24 | $126,522.22 |
| 311 | $933.72 | $290,386.92 | $34,863.30 | $45,172.73 | $58,518.13 | $75,789.86 | $98,138.28 | $127,049.40 |
| 312 | $933.72 | $291,320.64 | $34,863.30 | $45,210.37 | $58,615.66 | $75,979.34 | $98,465.41 | $127,578.77 |
| 313 | $933.72 | $292,254.36 | $34,863.30 | $45,248.05 | $58,713.36 | $76,169.29 | $98,793.63 | $128,110.35 |
| 314 | $933.72 | $293,188.08 | $34,863.30 | $45,285.76 | $58,811.21 | $76,359.71 | $99,122.94 | $128,644.14 |
| 315 | $933.72 | $294,121.80 | $34,863.30 | $45,323.49 | $58,909.23 | $76,550.61 | $99,453.35 | $129,180.16 |
| 316 | $933.72 | $295,055.52 | $34,863.30 | $45,361.26 | $59,007.41 | $76,741.99 | $99,784.86 | $129,718.41 |
| 317 | $933.72 | $295,989.24 | $34,863.30 | $45,399.06 | $59,105.76 | $76,933.84 | $100,117.48 | $130,258.90 |
| 318 | $933.72 | $296,922.96 | $34,863.30 | $45,436.90 | $59,204.27 | $77,126.18 | $100,451.20 | $130,801.65 |
| 319 | $933.72 | $297,856.68 | $34,863.30 | $45,474.76 | $59,302.94 | $77,318.99 | $100,786.04 | $131,346.66 |
| 320 | $933.72 | $298,790.40 | $34,863.30 | $45,512.66 | $59,401.78 | $77,512.29 | $101,121.99 | $131,893.93 |
| 321 | $933.72 | $299,724.12 | $34,863.30 | $45,550.58 | $59,500.78 | $77,706.07 | $101,459.07 | $132,443.49 |
| 322 | $933.72 | $300,657.84 | $34,863.30 | $45,588.54 | $59,599.95 | $77,900.33 | $101,797.26 | $132,995.34 |
| 323 | $933.72 | $301,591.56 | $34,863.30 | $45,626.53 | $59,699.29 | $78,095.09 | $102,136.59 | $133,549.49 |
| 324 | $933.72 | $302,525.28 | $34,863.30 | $45,664.55 | $59,798.78 | $78,290.32 | $102,477.04 | $134,105.94 |
| 325 | $933.72 | $303,459.00 | $34,863.30 | $45,702.61 | $59,898.45 | $78,486.05 | $102,818.63 | $134,664.72 |
| 326 | $933.72 | $304,392.72 | $34,863.30 | $45,740.69 | $59,998.28 | $78,682.26 | $103,161.36 | $135,225.82 |
| 327 | $933.72 | $305,326.44 | $34,863.30 | $45,778.81 | $60,098.28 | $78,878.97 | $103,505.23 | $135,789.26 |
| 328 | $933.72 | $306,260.16 | $34,863.30 | $45,816.96 | $60,198.44 | $79,076.17 | $103,850.25 | $136,355.05 |
| 329 | $933.72 | $307,193.88 | $34,863.30 | $45,855.14 | $60,298.77 | $79,273.86 | $104,196.42 | $136,923.20 |
| 330 | $933.72 | $308,127.60 | $34,863.30 | $45,893.35 | $60,399.27 | $79,472.04 | $104,543.74 | $137,493.71 |
| 331 | $933.72 | $309,061.32 | $34,863.30 | $45,931.60 | $60,499.93 | $79,670.72 | $104,892.22 | $138,066.60 |
| 332 | $933.72 | $309,995.04 | $34,863.30 | $45,969.87 | $60,600.77 | $79,869.90 | $105,241.86 | $138,641.88 |
| 333 | $933.72 | $310,928.76 | $34,863.30 | $46,008.18 | $60,701.77 | $80,069.57 | $105,592.67 | $139,219.55 |
| 334 | $933.72 | $311,862.48 | $34,863.30 | $46,046.52 | $60,802.94 | $80,269.75 | $105,944.64 | $139,799.63 |
| 335 | $933.72 | $312,796.20 | $34,863.30 | $46,084.89 | $60,904.28 | $80,470.42 | $106,297.79 | $140,382.13 |
| 336 | $933.72 | $313,729.92 | $34,863.30 | $46,123.30 | $61,005.78 | $80,671.60 | $106,652.12 | $140,967.06 |
| 337 | $933.72 | $314,663.64 | $34,863.30 | $46,161.74 | $61,107.46 | $80,873.28 | $107,007.62 | $141,554.42 |
| 338 | $933.72 | $315,597.36 | $34,863.30 | $46,200.20 | $61,209.31 | $81,075.46 | $107,364.32 | $142,144.23 |
| 339 | $933.72 | $316,531.08 | $34,863.30 | $46,238.70 | $61,311.32 | $81,278.15 | $107,722.20 | $142,736.50 |
| 340 | $933.72 | $317,464.80 | $34,863.30 | $46,277.24 | $61,413.51 | $81,481.34 | $108,081.27 | $143,331.23 |
| 341 | $933.72 | $318,398.52 | $34,863.30 | $46,315.80 | $61,515.86 | $81,685.05 | $108,441.54 | $143,928.45 |
| 342 | $933.72 | $319,332.24 | $34,863.30 | $46,354.40 | $61,618.39 | $81,889.26 | $108,803.01 | $144,528.15 |
| 343 | $933.72 | $320,265.96 | $34,863.30 | $46,393.03 | $61,721.09 | $82,093.98 | $109,165.69 | $145,130.35 |
| 344 | $933.72 | $321,199.68 | $34,863.30 | $46,431.69 | $61,823.95 | $82,299.22 | $109,529.58 | $145,735.06 |
| 345 | $933.72 | $322,133.40 | $34,863.30 | $46,470.38 | $61,926.99 | $82,504.97 | $109,894.67 | $146,342.29 |
| 346 | $933.72 | $323,067.12 | $34,863.30 | $46,509.10 | $62,030.21 | $82,711.23 | $110,260.99 | $146,952.05 |
| 347 | $933.72 | $324,000.84 | $34,863.30 | $46,547.86 | $62,133.59 | $82,918.01 | $110,628.53 | $147,564.35 |
| 348 | $933.72 | $324,934.56 | $34,863.30 | $46,586.65 | $62,237.15 | $83,125.30 | $110,997.29 | $148,179.20 |
| 349 | $933.72 | $325,868.28 | $34,863.30 | $46,625.47 | $62,340.87 | $83,333.12 | $111,367.28 | $148,796.61 |
| 350 | $933.72 | $326,802.00 | $34,863.30 | $46,664.33 | $62,444.78 | $83,541.45 | $111,738.50 | $149,416.60 |
| 351 | $933.72 | $327,735.72 | $34,863.30 | $46,703.22 | $62,548.85 | $83,750.30 | $112,110.97 | $150,039.17 |
| 352 | $933.72 | $328,669.44 | $34,863.30 | $46,742.13 | $62,653.10 | $83,959.68 | $112,484.67 | $150,664.33 |
| 353 | $933.72 | $329,603.16 | $34,863.30 | $46,781.09 | $62,757.52 | $84,169.58 | $112,859.62 | $151,292.10 |
| 354 | $933.72 | $330,536.88 | $34,863.30 | $46,820.07 | $62,862.12 | $84,380.00 | $113,235.82 | $151,922.48 |
| 355 | $933.72 | $331,470.60 | $34,863.30 | $46,859.09 | $62,966.89 | $84,590.95 | $113,613.27 | $152,555.49 |
| 356 | $933.72 | $332,404.32 | $34,863.30 | $46,898.14 | $63,071.83 | $84,802.43 | $113,991.98 | $153,191.14 |
| 357 | $933.72 | $333,338.04 | $34,863.30 | $46,937.22 | $63,176.95 | $85,014.43 | $114,371.95 | $153,829.44 |
| 358 | $933.72 | $334,271.76 | $34,863.30 | $46,976.33 | $63,282.25 | $85,226.97 | $114,753.19 | $154,470.39 |
| 359 | $933.72 | $335,205.48 | $34,863.30 | $47,015.48 | $63,387.72 | $85,440.04 | $115,135.70 | $155,114.02 |
| 360 | $933.72 | $336,139.20 | $34,863.30 | $47,054.66 | $63,493.36 | $85,653.64 | $115,519.49 | $155,760.33 |

| | | INVESTMENT VALUE | | | | | |
|---|---|---|---|---|---|---|---|
| DATE | 6% | 7% | 8% | 9% | 10% | 11% | 12% |
| 1 | $35,037.62 | $35,066.67 | $35,095.73 | $35,124.78 | $35,153.83 | $35,182.88 | $35,211.94 |
| 2 | $35,212.81 | $35,271.23 | $35,329.70 | $35,388.21 | $35,446.78 | $35,505.39 | $35,564.06 |
| 3 | $35,388.87 | $35,476.98 | $35,565.23 | $35,653.63 | $35,742.17 | $35,830.86 | $35,919.70 |
| 4 | $35,565.82 | $35,683.93 | $35,802.33 | $35,921.03 | $36,040.02 | $36,159.31 | $36,278.89 |
| 5 | $35,743.65 | $35,892.08 | $36,041.01 | $36,190.44 | $36,340.36 | $36,490.77 | $36,641.68 |
| 6 | $35,922.36 | $36,101.45 | $36,281.29 | $36,461.86 | $36,643.19 | $36,825.27 | $37,008.10 |
| 7 | $36,101.98 | $36,312.05 | $36,523.16 | $36,735.33 | $36,948.55 | $37,162.83 | $37,378.18 |
| 8 | $36,282.49 | $36,523.87 | $36,766.65 | $37,010.84 | $37,256.46 | $37,503.49 | $37,751.96 |
| 9 | $36,463.90 | $36,736.92 | $37,011.76 | $37,288.43 | $37,566.93 | $37,847.28 | $38,129.48 |
| 10 | $36,646.22 | $36,951.22 | $37,258.51 | $37,568.09 | $37,879.98 | $38,194.21 | $38,510.78 |
| 11 | $36,829.45 | $37,166.77 | $37,506.90 | $37,849.85 | $38,195.65 | $38,544.32 | $38,895.89 |

TABLE 2c-continued

Combined Loan and Investment System Comparison Report Data (Lump Sum)

LOAN $194,863.30
RATE 5.75%
INV AMT $34,863.30

| | | | | | | | |
|---|---|---|---|---|---|---|---|
| 12 | $37,013.60 | $37,383.58 | $37,756.94 | $38,133.72 | $38,513.95 | $38,897.65 | $39,284.84 |
| 13 | $37,198.66 | $37,601.65 | $38,008.65 | $38,419.73 | $38,834.90 | $39,254.21 | $39,677.69 |
| 14 | $37,384.66 | $37,820.99 | $38,262.05 | $38,707.87 | $39,158.52 | $39,614.04 | $40,074.47 |
| 15 | $37,571.58 | $38,041.61 | $38,517.13 | $38,998.18 | $39,484.84 | $39,977.17 | $40,475.21 |
| 16 | $37,759.44 | $38,263.52 | $38,773.91 | $39,290.67 | $39,813.88 | $40,343.62 | $40,879.97 |
| 17 | $37,948.24 | $38,486.72 | $39,032.40 | $39,585.35 | $40,145.67 | $40,713.44 | $41,288.77 |
| 18 | $38,137.98 | $38,711.23 | $39,292.62 | $39,882.24 | $40,480.21 | $41,086.65 | $41,701.65 |
| 19 | $38,328.67 | $38,937.05 | $39,554.57 | $40,181.36 | $40,817.55 | $41,463.27 | $42,118.67 |
| 20 | $38,520.31 | $39,164.18 | $39,818.26 | $40,482.72 | $41,157.69 | $41,843.35 | $42,539.86 |
| 21 | $38,712.91 | $39,392.64 | $40,083.72 | $40,786.34 | $41,500.67 | $42,226.92 | $42,965.26 |
| 22 | $38,906.48 | $39,622.43 | $40,350.94 | $41,092.23 | $41,846.51 | $42,614.00 | $43,394.91 |
| 23 | $39,101.01 | $39,853.56 | $40,619.95 | $41,400.43 | $42,195.23 | $43,004.63 | $43,828.86 |
| 24 | $39,296.51 | $40,086.04 | $40,890.75 | $41,710.93 | $42,546.86 | $43,398.84 | $44,267.15 |
| 25 | $39,493.00 | $40,319.87 | $41,163.35 | $42,023.76 | $42,901.42 | $43,796.66 | $44,709.82 |
| 26 | $39,690.46 | $40,555.07 | $41,437.78 | $42,338.94 | $43,258.93 | $44,198.13 | $45,156.92 |
| 27 | $39,888.91 | $40,791.64 | $41,714.03 | $42,656.48 | $43,619.42 | $44,603.28 | $45,608.48 |
| 28 | $40,088.36 | $41,029.59 | $41,992.12 | $42,976.40 | $43,982.92 | $45,012.14 | $46,064.57 |
| 29 | $40,288.80 | $41,268.93 | $42,272.07 | $43,298.73 | $44,349.44 | $45,424.75 | $46,525.21 |
| 30 | $40,490.24 | $41,509.67 | $42,553.88 | $43,623.47 | $44,719.02 | $45,841.15 | $46,990.47 |
| 31 | $40,692.70 | $41,751.81 | $42,837.58 | $43,950.64 | $45,091.68 | $46,261.36 | $47,460.37 |
| 32 | $40,896.16 | $41,995.36 | $43,123.16 | $44,280.27 | $45,467.44 | $46,685.42 | $47,934.98 |
| 33 | $41,100.64 | $42,240.33 | $43,410.65 | $44,612.38 | $45,846.34 | $47,113.37 | $48,414.33 |
| 34 | $41,306.14 | $42,486.74 | $43,700.05 | $44,946.97 | $46,228.39 | $47,545.24 | $48,898.47 |
| 35 | $41,512.67 | $42,734.57 | $43,991.39 | $45,284.07 | $46,613.63 | $47,981.07 | $49,387.45 |
| 36 | $41,720.24 | $42,983.86 | $44,284.66 | $45,623.70 | $47,002.07 | $48,420.90 | $49,881.33 |
| 37 | $41,928.84 | $43,234.60 | $44,579.89 | $45,965.88 | $47,393.76 | $48,864.76 | $50,380.14 |
| 38 | $42,138.48 | $43,486.80 | $44,877.09 | $46,310.62 | $47,788.71 | $49,312.68 | $50,883.94 |
| 39 | $42,349.18 | $43,740.47 | $45,176.27 | $46,657.95 | $48,186.95 | $49,764.72 | $51,392.78 |
| 40 | $42,560.92 | $43,995.63 | $45,477.45 | $47,007.89 | $48,588.50 | $50,220.89 | $51,906.71 |
| 41 | $42,773.73 | $44,252.27 | $45,780.63 | $47,360.45 | $48,993.41 | $50,681.25 | $52,425.78 |
| 42 | $42,987.59 | $44,510.41 | $46,085.83 | $47,715.65 | $49,401.69 | $51,145.83 | $52,950.03 |
| 43 | $43,202.53 | $44,770.05 | $46,393.07 | $48,073.52 | $49,813.37 | $51,614.67 | $53,479.53 |
| 44 | $43,418.54 | $45,031.21 | $46,702.36 | $48,434.07 | $50,228.48 | $52,087.80 | $54,014.33 |
| 45 | $43,635.64 | $45,293.89 | $47,013.71 | $48,797.32 | $50,647.05 | $52,565.27 | $54,554.47 |
| 46 | $43,853.82 | $45,558.11 | $47,327.13 | $49,163.30 | $51,069.11 | $53,047.12 | $55,100.02 |
| 47 | $44,073.08 | $45,823.86 | $47,642.65 | $49,532.03 | $51,494.68 | $53,533.39 | $55,651.02 |
| 48 | $44,293.45 | $46,091.17 | $47,960.27 | $49,903.52 | $51,923.81 | $54,024.11 | $56,207.53 |
| 49 | $44,514.92 | $46,360.03 | $48,280.00 | $50,277.80 | $52,356.50 | $54,519.33 | $56,769.60 |
| 50 | $44,737.49 | $46,630.47 | $48,601.87 | $50,654.88 | $52,792.81 | $55,019.09 | $57,337.30 |
| 51 | $44,961.18 | $46,902.48 | $48,925.88 | $51,034.79 | $53,232.75 | $55,523.43 | $57,910.67 |
| 52 | $45,185.99 | $47,176.07 | $49,252.05 | $51,417.55 | $53,676.35 | $56,032.40 | $58,489.78 |
| 53 | $45,411.92 | $47,451.27 | $49,580.40 | $51,803.18 | $54,123.66 | $56,546.03 | $59,074.68 |
| 54 | $45,638.97 | $47,728.07 | $49,910.94 | $52,191.71 | $54,574.69 | $57,064.37 | $59,665.42 |
| 55 | $45,867.17 | $48,006.48 | $50,243.68 | $52,583.15 | $55,029.48 | $57,587.46 | $60,262.08 |
| 56 | $46,096.51 | $48,286.52 | $50,578.63 | $52,977.52 | $55,488.06 | $58,115.34 | $60,864.70 |
| 57 | $46,326.99 | $48,568.19 | $50,915.82 | $53,374.85 | $55,950.46 | $58,648.06 | $61,473.35 |
| 58 | $46,558.62 | $48,851.50 | $51,255.26 | $53,775.16 | $56,416.71 | $59,185.67 | $62,088.08 |
| 59 | $46,791.42 | $49,136.47 | $51,596.96 | $54,178.48 | $56,886.85 | $59,728.21 | $62,708.96 |
| 60 | $47,025.37 | $49,423.10 | $51,940.94 | $54,584.81 | $57,360.91 | $60,275.72 | $63,336.05 |
| 61 | $47,260.50 | $49,711.40 | $52,287.22 | $54,994.20 | $57,838.91 | $60,828.24 | $63,969.41 |
| 62 | $47,496.80 | $50,001.39 | $52,635.80 | $55,406.66 | $58,320.90 | $61,385.83 | $64,609.10 |
| 63 | $47,734.29 | $50,293.06 | $52,986.70 | $55,822.21 | $58,806.91 | $61,948.54 | $65,255.20 |
| 64 | $47,972.96 | $50,586.44 | $53,339.95 | $56,240.87 | $59,296.97 | $62,516.40 | $65,907.75 |
| 65 | $48,212.82 | $50,881.52 | $53,695.55 | $56,662.68 | $59,791.11 | $63,089.47 | $66,566.82 |
| 66 | $48,453.89 | $51,178.33 | $54,053.52 | $57,087.65 | $60,289.37 | $63,667.79 | $67,232.49 |
| 67 | $48,696.16 | $51,476.87 | $54,413.88 | $57,515.81 | $60,791.78 | $64,251.41 | $67,904.82 |
| 68 | $48,939.64 | $51,777.15 | $54,776.63 | $57,947.18 | $61,298.38 | $64,840.38 | $68,583.87 |
| 69 | $49,184.34 | $52,079.19 | $55,141.81 | $58,381.78 | $61,809.20 | $65,434.75 | $69,269.71 |
| 70 | $49,430.26 | $52,382.98 | $55,509.42 | $58,819.64 | $62,324.28 | $66,034.57 | $69,962.40 |
| 71 | $49,677.41 | $52,688.55 | $55,879.49 | $59,260.79 | $62,843.65 | $66,639.89 | $70,662.03 |
| 72 | $49,925.80 | $52,995.90 | $56,252.02 | $59,705.25 | $63,367.34 | $67,250.75 | $71,368.65 |
| 73 | $50,175.42 | $53,305.04 | $56,627.03 | $60,153.04 | $63,895.40 | $67,867.22 | $72,082.33 |
| 74 | $50,426.30 | $53,615.99 | $57,004.54 | $60,604.18 | $64,427.87 | $68,489.33 | $72,803.16 |
| 75 | $50,678.43 | $53,928.75 | $57,384.57 | $61,058.71 | $64,964.76 | $69,117.15 | $73,531.19 |
| 76 | $50,931.83 | $54,243.33 | $57,767.14 | $61,516.66 | $65,506.14 | $69,750.73 | $74,266.50 |
| 77 | $51,186.48 | $54,559.75 | $58,152.25 | $61,978.03 | $66,052.02 | $70,390.11 | $75,009.16 |
| 78 | $51,442.42 | $54,878.02 | $58,539.93 | $62,442.87 | $66,602.46 | $71,035.35 | $75,759.26 |
| 79 | $51,699.63 | $55,198.14 | $58,930.20 | $62,911.19 | $67,157.48 | $71,686.51 | $76,516.85 |
| 80 | $51,958.13 | $55,520.13 | $59,323.07 | $63,383.02 | $67,717.12 | $72,343.63 | $77,282.02 |
| 81 | $52,217.92 | $55,844.00 | $59,718.56 | $63,858.39 | $68,281.43 | $73,006.78 | $78,054.84 |
| 82 | $52,479.01 | $56,169.75 | $60,116.68 | $64,337.33 | $68,850.44 | $73,676.01 | $78,835.39 |
| 83 | $52,741.40 | $56,497.41 | $60,517.46 | $64,819.86 | $69,424.20 | $74,351.38 | $79,623.74 |
| 84 | $53,005.11 | $56,826.98 | $60,920.91 | $65,306.01 | $70,002.73 | $75,032.93 | $80,419.98 |
| 85 | $53,270.13 | $57,158.47 | $61,327.05 | $65,795.81 | $70,586.09 | $75,720.73 | $81,224.18 |

TABLE 2c-continued

Combined Loan and Investment System Comparison Report Data (Lump Sum)

LOAN $194,863.30
RATE 5.75%
INV AMT $34,863.30

| | | | | | | | |
|---|---|---|---|---|---|---|---|
| 86 | $53,536.49 | $57,491.89 | $61,735.89 | $66,289.27 | $71,174.30 | $76,414.84 | $82,036.42 |
| 87 | $53,804.17 | $57,827.26 | $62,147.47 | $66,786.44 | $71,767.42 | $77,115.31 | $82,856.78 |
| 88 | $54,073.19 | $58,164.59 | $62,561.78 | $67,287.34 | $72,365.49 | $77,822.20 | $83,685.35 |
| 89 | $54,343.55 | $58,503.88 | $62,978.86 | $67,792.00 | $72,968.53 | $78,535.57 | $84,522.20 |
| 90 | $54,615.27 | $58,845.16 | $63,398.72 | $68,300.44 | $73,576.60 | $79,255.48 | $85,367.43 |
| 91 | $54,888.35 | $59,188.42 | $63,821.38 | $68,812.69 | $74,189.74 | $79,981.99 | $86,221.10 |
| 92 | $55,162.79 | $59,533.68 | $64,246.85 | $69,328.79 | $74,807.99 | $80,715.15 | $87,083.31 |
| 93 | $55,438.60 | $59,880.96 | $64,675.17 | $69,848.75 | $75,431.39 | $81,455.04 | $87,954.14 |
| 94 | $55,715.80 | $60,230.27 | $65,106.33 | $70,372.62 | $76,059.98 | $82,201.71 | $88,833.69 |
| 95 | $55,994.38 | $60,581.61 | $65,540.38 | $70,900.41 | $76,693.82 | $82,955.23 | $89,722.02 |
| 96 | $56,274.35 | $60,935.01 | $65,977.31 | $71,432.16 | $77,332.93 | $83,715.65 | $90,619.24 |
| 97 | $56,555.72 | $61,290.46 | $66,417.16 | $71,967.91 | $77,977.37 | $84,483.05 | $91,525.44 |
| 98 | $56,838.50 | $61,647.99 | $66,859.94 | $72,507.66 | $78,627.18 | $85,257.47 | $92,440.69 |
| 99 | $57,122.69 | $62,007.60 | $67,305.67 | $73,051.47 | $79,282.41 | $86,039.00 | $93,365.10 |
| 100 | $57,408.30 | $62,369.31 | $67,754.38 | $73,599.36 | $79,943.10 | $86,827.69 | $94,298.75 |
| 101 | $57,695.35 | $62,733.13 | $68,206.08 | $74,151.35 | $80,609.29 | $87,623.61 | $95,241.74 |
| 102 | $57,983.82 | $63,099.08 | $68,660.78 | $74,707.49 | $81,281.03 | $88,426.83 | $96,194.15 |
| 103 | $58,273.74 | $63,467.15 | $69,118.52 | $75,267.79 | $81,958.38 | $89,237.41 | $97,156.09 |
| 104 | $58,565.11 | $63,837.38 | $69,579.31 | $75,832.30 | $82,641.36 | $90,055.42 | $98,127.66 |
| 105 | $58,857.94 | $64,209.76 | $70,043.17 | $76,401.05 | $83,330.04 | $90,880.93 | $99,108.93 |
| 106 | $59,152.23 | $64,584.32 | $70,510.13 | $76,974.05 | $84,024.46 | $91,714.00 | $100,100.02 |
| 107 | $59,447.99 | $64,961.06 | $70,980.20 | $77,551.36 | $84,724.66 | $92,554.71 | $101,101.02 |
| 108 | $59,745.23 | $65,340.00 | $71,453.40 | $78,132.99 | $85,430.70 | $93,403.13 | $102,112.03 |
| 109 | $60,043.95 | $65,721.15 | $71,929.75 | $78,718.99 | $86,142.62 | $94,259.33 | $103,133.15 |
| 110 | $60,344.17 | $66,104.53 | $72,409.28 | $79,309.38 | $86,860.48 | $95,123.37 | $104,164.48 |
| 111 | $60,645.89 | $66,490.14 | $72,892.01 | $79,904.20 | $87,584.32 | $95,995.33 | $105,206.13 |
| 112 | $60,949.12 | $66,877.99 | $73,377.96 | $80,503.49 | $88,314.18 | $96,875.29 | $106,258.19 |
| 113 | $61,253.87 | $67,268.12 | $73,867.15 | $81,107.26 | $89,050.14 | $97,763.31 | $107,320.77 |
| 114 | $61,560.14 | $67,660.51 | $74,359.59 | $81,715.57 | $89,792.22 | $98,659.48 | $108,393.98 |
| 115 | $61,867.94 | $68,055.20 | $74,855.32 | $82,328.43 | $90,540.49 | $99,563.86 | $109,477.92 |
| 116 | $62,177.28 | $68,452.19 | $75,354.36 | $82,945.90 | $91,294.99 | $100,476.53 | $110,572.70 |
| 117 | $62,488.17 | $68,851.49 | $75,856.72 | $83,567.99 | $92,055.79 | $101,397.56 | $111,678.42 |
| 118 | $62,800.61 | $69,253.13 | $76,362.43 | $84,194.75 | $92,822.92 | $102,327.04 | $112,795.21 |
| 119 | $63,114.61 | $69,657.10 | $76,871.52 | $84,826.21 | $93,596.44 | $103,265.04 | $113,923.16 |
| 120 | $63,430.18 | $70,063.44 | $77,383.99 | $85,462.41 | $94,376.41 | $104,211.63 | $115,062.39 |
| 121 | $63,747.33 | $70,472.14 | $77,899.89 | $86,103.38 | $95,162.88 | $105,166.91 | $116,213.02 |
| 122 | $64,066.07 | $70,883.23 | $78,419.22 | $86,749.15 | $95,955.91 | $106,130.94 | $117,375.15 |
| 123 | $64,386.40 | $71,296.71 | $78,942.01 | $87,399.77 | $96,755.54 | $107,103.80 | $118,548.90 |
| 124 | $64,708.33 | $71,712.61 | $79,468.29 | $88,055.27 | $97,561.83 | $108,085.59 | $119,734.39 |
| 125 | $65,031.87 | $72,130.93 | $79,998.08 | $88,715.68 | $98,374.85 | $109,076.37 | $120,931.73 |
| 126 | $65,357.03 | $72,551.70 | $80,531.40 | $89,381.05 | $99,194.64 | $110,076.24 | $122,141.05 |
| 127 | $65,683.82 | $72,974.92 | $81,068.28 | $90,051.41 | $100,021.26 | $111,085.27 | $123,362.46 |
| 128 | $66,012.24 | $73,400.60 | $81,608.73 | $90,726.79 | $100,854.77 | $112,103.55 | $124,596.08 |
| 129 | $66,342.30 | $73,828.77 | $82,152.79 | $91,407.24 | $101,695.23 | $113,131.17 | $125,842.04 |
| 130 | $66,674.01 | $74,259.44 | $82,700.48 | $92,092.80 | $102,542.69 | $114,168.20 | $127,100.46 |
| 131 | $67,007.38 | $74,692.62 | $83,251.81 | $92,783.50 | $103,397.21 | $115,214.75 | $128,371.47 |
| 132 | $67,342.42 | $75,128.33 | $83,806.83 | $93,479.37 | $104,258.85 | $116,270.88 | $129,655.18 |
| 133 | $67,679.13 | $75,566.58 | $84,365.54 | $94,180.47 | $105,127.68 | $117,336.70 | $130,951.74 |
| 134 | $68,017.52 | $76,007.38 | $84,927.98 | $94,886.82 | $106,003.74 | $118,412.28 | $132,261.25 |
| 135 | $68,357.61 | $76,450.76 | $85,494.16 | $95,598.47 | $106,887.11 | $119,497.73 | $133,583.87 |
| 136 | $68,699.40 | $76,896.72 | $86,064.12 | $96,315.46 | $107,777.83 | $120,593.13 | $134,919.70 |
| 137 | $69,042.90 | $77,345.28 | $86,637.88 | $97,037.83 | $108,675.98 | $121,698.56 | $136,268.90 |
| 138 | $69,388.11 | $77,796.47 | $87,215.47 | $97,765.61 | $109,581.61 | $122,814.13 | $137,631.59 |
| 139 | $69,735.05 | $78,250.28 | $87,796.91 | $98,498.85 | $110,494.80 | $123,939.93 | $139,007.91 |
| 140 | $70,083.73 | $78,706.74 | $88,382.22 | $99,237.59 | $111,415.58 | $125,076.05 | $140,397.99 |
| 141 | $70,434.15 | $79,165.86 | $88,971.43 | $99,981.87 | $112,344.05 | $126,222.58 | $141,801.97 |
| 142 | $70,786.32 | $79,627.66 | $89,564.58 | $100,731.74 | $113,280.25 | $127,379.62 | $143,219.99 |
| 143 | $71,140.25 | $80,092.16 | $90,161.67 | $101,487.23 | $114,224.25 | $128,547.26 | $144,652.18 |
| 144 | $71,495.95 | $80,559.36 | $90,762.75 | $102,248.38 | $115,176.12 | $129,725.61 | $146,098.71 |
| 145 | $71,853.43 | $81,029.29 | $91,367.84 | $103,015.24 | $116,135.92 | $130,914.76 | $147,559.69 |
| 146 | $72,212.70 | $81,501.96 | $91,976.96 | $103,787.86 | $117,103.72 | $132,114.82 | $149,035.29 |
| 147 | $72,573.76 | $81,977.39 | $92,590.14 | $104,566.27 | $118,079.58 | $133,325.87 | $150,525.64 |
| 148 | $72,936.63 | $82,455.59 | $93,207.40 | $105,350.51 | $119,063.58 | $134,548.02 | $152,030.90 |
| 149 | $73,301.31 | $82,936.58 | $93,828.79 | $106,140.64 | $120,055.78 | $135,781.38 | $153,551.21 |
| 150 | $73,667.82 | $83,420.38 | $94,454.31 | $106,936.70 | $121,056.24 | $137,026.04 | $155,086.72 |
| 151 | $74,036.16 | $83,907.00 | $95,084.01 | $107,738.72 | $122,065.04 | $138,282.11 | $156,637.59 |
| 152 | $74,406.34 | $84,396.45 | $95,717.90 | $108,546.76 | $123,082.25 | $139,549.70 | $158,203.96 |
| 153 | $74,778.37 | $84,888.77 | $96,356.02 | $109,360.86 | $124,107.94 | $140,828.91 | $159,786.00 |
| 154 | $75,152.26 | $85,383.95 | $96,998.39 | $110,181.07 | $125,142.17 | $142,119.84 | $161,383.86 |
| 155 | $75,528.02 | $85,882.02 | $97,645.05 | $111,007.43 | $126,185.02 | $143,422.60 | $162,997.70 |
| 156 | $75,905.66 | $86,383.00 | $98,296.02 | $111,839.98 | $127,236.56 | $144,737.31 | $164,627.68 |
| 157 | $76,285.19 | $86,886.90 | $98,951.32 | $112,678.78 | $128,296.87 | $146,064.07 | $166,273.96 |
| 158 | $76,666.62 | $87,393.74 | $99,611.00 | $113,523.88 | $129,366.01 | $147,402.99 | $167,936.70 |
| 159 | $77,049.95 | $87,903.54 | $100,275.07 | $114,375.30 | $130,444.06 | $148,754.18 | $169,616.06 |

TABLE 2c-continued

Combined Loan and Investment System Comparison Report Data (Lump Sum)

LOAN $194,863.30
RATE 5.75%
INV AMT $34,863.30

| | | | | | | | |
|---|---|---|---|---|---|---|---|
| 160 | $77,435.20 | $88,416.31 | $100,943.57 | $115,233.12 | $131,531.09 | $150,117.76 | $171,312.22 |
| 161 | $77,822.38 | $88,932.07 | $101,616.53 | $116,097.37 | $132,627.19 | $151,493.84 | $173,025.35 |
| 162 | $78,211.49 | $89,450.84 | $102,293.97 | $116,968.10 | $133,732.41 | $152,882.54 | $174,755.60 |
| 163 | $78,602.55 | $89,972.64 | $102,975.93 | $117,845.36 | $134,846.85 | $154,283.96 | $176,503.16 |
| 164 | $78,995.56 | $90,497.48 | $103,662.44 | $118,729.20 | $135,970.57 | $155,698.23 | $178,268.19 |
| 165 | $79,390.54 | $91,025.38 | $104,353.52 | $119,619.67 | $137,103.66 | $157,125.46 | $180,050.87 |
| 166 | $79,787.49 | $91,556.36 | $105,049.21 | $120,516.82 | $138,246.19 | $158,565.78 | $181,851.38 |
| 167 | $80,186.43 | $92,090.44 | $105,749.54 | $121,420.69 | $139,398.24 | $160,019.30 | $183,669.89 |
| 168 | $80,587.36 | $92,627.64 | $106,454.54 | $122,331.35 | $140,559.90 | $161,486.14 | $185,506.59 |
| 169 | $80,990.30 | $93,167.97 | $107,164.23 | $123,248.83 | $141,731.23 | $162,966.43 | $187,361.66 |
| 170 | $81,395.25 | $93,711.45 | $107,878.66 | $124,173.20 | $142,912.32 | $164,460.29 | $189,235.27 |
| 171 | $81,802.22 | $94,258.10 | $108,597.85 | $125,104.50 | $144,103.26 | $165,967.84 | $191,127.63 |
| 172 | $82,211.23 | $94,807.93 | $109,321.84 | $126,042.78 | $145,304.12 | $167,489.22 | $193,038.90 |
| 173 | $82,622.29 | $95,360.98 | $110,050.65 | $126,988.10 | $146,514.99 | $169,024.53 | $194,969.29 |
| 174 | $83,035.40 | $95,917.25 | $110,784.32 | $127,940.51 | $147,735.94 | $170,573.92 | $196,918.98 |
| 175 | $83,450.58 | $96,476.77 | $111,522.88 | $128,900.07 | $148,967.08 | $172,137.52 | $198,888.17 |
| 176 | $83,867.83 | $97,039.55 | $112,266.37 | $129,866.82 | $150,208.47 | $173,715.45 | $200,877.06 |
| 177 | $84,287.17 | $97,605.62 | $113,014.81 | $130,840.82 | $151,460.21 | $175,307.84 | $202,885.83 |
| 178 | $84,708.61 | $98,174.98 | $113,768.24 | $131,822.12 | $152,722.37 | $176,914.83 | $204,914.68 |
| 179 | $85,132.15 | $98,747.67 | $114,526.70 | $132,810.79 | $153,995.06 | $178,536.55 | $206,963.83 |
| 180 | $85,557.81 | $99,323.70 | $115,290.21 | $133,806.87 | $155,278.35 | $180,173.13 | $209,033.47 |
| 181 | $85,985.60 | $99,903.09 | $116,058.81 | $134,810.42 | $156,572.34 | $181,824.72 | $211,123.80 |
| 182 | $86,415.53 | $100,485.85 | $116,832.54 | $135,821.50 | $157,877.11 | $183,491.44 | $213,235.04 |
| 183 | $86,847.61 | $101,072.02 | $117,611.42 | $136,840.16 | $159,192.75 | $185,173.45 | $215,367.39 |
| 184 | $87,281.84 | $101,661.61 | $118,395.50 | $137,866.46 | $160,519.36 | $186,870.87 | $217,521.07 |
| 185 | $87,718.25 | $102,254.63 | $119,184.80 | $138,900.46 | $161,857.02 | $188,583.86 | $219,696.28 |
| 186 | $88,156.84 | $102,851.12 | $119,979.37 | $139,942.21 | $163,205.83 | $190,312.54 | $221,893.24 |
| 187 | $88,597.63 | $103,451.08 | $120,779.23 | $140,991.78 | $164,565.88 | $192,057.07 | $224,112.17 |
| 188 | $89,040.62 | $104,054.55 | $121,584.42 | $142,049.22 | $165,937.26 | $193,817.60 | $226,353.29 |
| 189 | $89,485.82 | $104,661.53 | $122,394.99 | $143,114.59 | $167,320.07 | $195,594.26 | $228,616.83 |
| 190 | $89,933.25 | $105,272.06 | $123,210.95 | $144,187.95 | $168,714.40 | $197,387.20 | $230,902.99 |
| 191 | $90,382.91 | $105,886.15 | $124,032.36 | $145,269.36 | $170,120.36 | $199,196.59 | $233,212.02 |
| 192 | $90,834.83 | $106,503.82 | $124,859.24 | $146,358.88 | $171,538.03 | $201,022.56 | $235,544.15 |
| 193 | $91,289.00 | $107,125.09 | $125,691.64 | $147,456.57 | $172,967.51 | $202,865.26 | $237,899.59 |
| 194 | $91,745.45 | $107,749.98 | $126,529.58 | $148,562.49 | $174,408.90 | $204,724.86 | $240,278.58 |
| 195 | $92,204.18 | $108,378.53 | $127,373.11 | $149,676.71 | $175,862.31 | $206,601.50 | $242,681.37 |
| 196 | $92,665.20 | $109,010.73 | $128,222.26 | $150,799.29 | $177,327.83 | $208,495.35 | $245,108.18 |
| 197 | $93,128.52 | $109,646.63 | $129,077.08 | $151,930.28 | $178,805.56 | $210,406.56 | $247,559.26 |
| 198 | $93,594.17 | $110,286.23 | $129,937.59 | $153,069.76 | $180,295.61 | $212,335.29 | $250,034.86 |
| 199 | $94,062.14 | $110,929.57 | $130,803.84 | $154,217.78 | $181,798.07 | $214,281.69 | $252,535.20 |
| 200 | $94,532.45 | $111,576.66 | $131,675.87 | $155,374.42 | $183,313.06 | $216,245.94 | $255,060.56 |
| 201 | $95,005.11 | $112,227.52 | $132,553.71 | $156,539.72 | $184,840.67 | $218,228.20 | $257,611.16 |
| 202 | $95,480.13 | $112,882.18 | $133,437.40 | $157,713.77 | $186,381.01 | $220,228.62 | $260,187.27 |
| 203 | $95,957.54 | $113,540.66 | $134,326.98 | $158,896.63 | $187,934.18 | $222,247.38 | $262,789.15 |
| 204 | $96,437.32 | $114,202.98 | $135,222.50 | $160,088.35 | $189,500.30 | $224,284.65 | $265,417.04 |
| 205 | $96,919.51 | $114,869.17 | $136,123.98 | $161,289.01 | $191,079.47 | $226,340.59 | $268,071.21 |
| 206 | $97,404.11 | $115,539.24 | $137,031.47 | $162,498.68 | $192,671.80 | $228,415.38 | $270,751.92 |
| 207 | $97,891.13 | $116,213.22 | $137,945.02 | $163,717.42 | $194,277.39 | $230,509.19 | $273,459.44 |
| 208 | $98,380.58 | $116,891.13 | $138,864.65 | $164,945.30 | $195,896.37 | $232,622.19 | $276,194.03 |
| 209 | $98,872.49 | $117,572.99 | $139,790.41 | $166,182.39 | $197,528.84 | $234,754.56 | $278,955.97 |
| 210 | $99,366.85 | $118,258.84 | $140,722.35 | $167,428.76 | $199,174.92 | $236,906.48 | $281,745.53 |
| 211 | $99,863.68 | $118,948.68 | $141,660.50 | $168,684.47 | $200,834.71 | $239,078.12 | $284,562.99 |
| 212 | $100,363.00 | $119,642.55 | $142,604.90 | $169,949.61 | $202,508.33 | $241,269.67 | $287,408.62 |
| 213 | $100,864.82 | $120,340.46 | $143,555.60 | $171,224.23 | $204,195.90 | $243,481.31 | $290,282.71 |
| 214 | $101,369.14 | $121,042.45 | $144,512.64 | $172,508.41 | $205,897.53 | $245,713.22 | $293,185.53 |
| 215 | $101,875.99 | $121,748.53 | $145,476.06 | $173,802.23 | $207,613.34 | $247,965.59 | $296,117.39 |
| 216 | $102,385.37 | $122,458.73 | $146,445.90 | $175,105.74 | $209,343.46 | $250,238.61 | $299,078.56 |
| 217 | $102,897.29 | $123,173.07 | $147,422.20 | $176,419.03 | $211,087.98 | $252,532.46 | $302,069.35 |
| 218 | $103,411.78 | $123,891.58 | $148,405.02 | $177,742.18 | $212,847.05 | $254,847.35 | $305,090.04 |
| 219 | $103,928.84 | $124,614.28 | $149,394.38 | $179,075.24 | $214,620.78 | $257,183.45 | $308,140.94 |
| 220 | $104,448.48 | $125,341.20 | $150,390.35 | $180,418.31 | $216,409.28 | $259,540.96 | $311,222.35 |
| 221 | $104,970.72 | $126,072.35 | $151,392.95 | $181,771.45 | $218,212.69 | $261,920.09 | $314,334.57 |
| 222 | $105,495.58 | $126,807.78 | $152,402.23 | $183,134.73 | $220,031.13 | $264,321.02 | $317,477.92 |
| 223 | $106,023.06 | $127,547.49 | $153,418.25 | $184,508.24 | $221,864.73 | $266,743.96 | $320,652.70 |
| 224 | $106,553.17 | $128,291.52 | $154,441.04 | $185,892.05 | $223,713.60 | $269,189.12 | $323,859.23 |
| 225 | $107,085.94 | $129,039.88 | $155,470.65 | $187,286.24 | $225,577.88 | $271,656.68 | $327,097.82 |
| 226 | $107,621.37 | $129,792.61 | $156,507.12 | $188,690.89 | $227,457.69 | $274,146.87 | $330,368.80 |
| 227 | $108,159.47 | $130,549.74 | $157,550.50 | $190,106.07 | $229,353.17 | $276,659.88 | $333,672.49 |
| 228 | $108,700.27 | $131,311.28 | $158,600.83 | $191,531.87 | $231,264.45 | $279,195.93 | $337,009.21 |
| 229 | $109,243.77 | $132,077.26 | $159,658.17 | $192,968.36 | $233,191.66 | $281,755.23 | $340,379.30 |
| 230 | $109,789.99 | $132,847.71 | $160,722.56 | $194,415.62 | $235,134.92 | $284,337.98 | $343,783.10 |
| 231 | $110,338.94 | $133,622.66 | $161,794.04 | $195,873.74 | $237,094.38 | $286,944.42 | $347,220.93 |
| 232 | $110,890.64 | $134,402.12 | $162,872.67 | $197,342.79 | $239,070.16 | $289,574.74 | $350,693.14 |
| 233 | $111,445.09 | $135,186.13 | $163,958.49 | $198,822.86 | $241,062.41 | $292,229.17 | $354,200.07 |

TABLE 2c-continued

Combined Loan and Investment System Comparison Report Data (Lump Sum)

LOAN $194,863.30
RATE 5.75%
INV AMT $34,863.30

| | | | | | | | |
|---|---|---|---|---|---|---|---|
| 234 | $112,002.31 | $135,974.72 | $165,051.55 | $200,314.03 | $243,071.27 | $294,907.94 | $357,742.07 |
| 235 | $112,562.33 | $136,767.91 | $166,151.89 | $201,816.39 | $245,096.86 | $297,611.26 | $361,319.49 |
| 236 | $113,125.14 | $137,565.72 | $167,259.57 | $203,330.01 | $247,139.34 | $300,339.37 | $364,932.68 |
| 237 | $113,690.76 | $138,368.19 | $168,374.63 | $204,854.99 | $249,198.83 | $303,092.48 | $368,582.01 |
| 238 | $114,259.22 | $139,175.33 | $169,497.13 | $206,391.40 | $251,275.49 | $305,870.83 | $372,267.83 |
| 239 | $114,830.51 | $139,987.19 | $170,627.11 | $207,939.33 | $253,369.45 | $308,674.64 | $375,990.51 |
| 240 | $115,404.67 | $140,803.78 | $171,764.62 | $209,498.88 | $255,480.86 | $311,504.16 | $379,750.41 |
| 241 | $115,981.69 | $141,625.14 | $172,909.72 | $211,070.12 | $257,609.87 | $314,359.61 | $383,547.92 |
| 242 | $116,561.60 | $142,451.28 | $174,062.45 | $212,653.15 | $259,756.62 | $317,241.24 | $387,383.40 |
| 243 | $117,144.41 | $143,282.25 | $175,222.87 | $214,248.04 | $261,921.26 | $320,149.29 | $391,257.23 |
| 244 | $117,730.13 | $144,118.06 | $176,391.02 | $215,854.90 | $264,103.93 | $323,083.99 | $395,169.80 |
| 245 | $118,318.78 | $144,958.75 | $177,566.96 | $217,473.82 | $266,304.80 | $326,045.59 | $399,121.50 |
| 246 | $118,910.37 | $145,804.34 | $178,750.74 | $219,104.87 | $268,524.01 | $329,034.35 | $403,112.72 |
| 247 | $119,504.92 | $146,654.87 | $179,942.41 | $220,748.16 | $270,761.71 | $332,050.49 | $407,143.84 |
| 248 | $120,102.45 | $147,510.36 | $181,142.03 | $222,403.77 | $273,018.05 | $335,094.29 | $411,215.28 |
| 249 | $120,702.96 | $148,370.83 | $182,349.64 | $224,071.80 | $275,293.20 | $338,165.99 | $415,327.43 |
| 250 | $121,306.48 | $149,236.33 | $183,565.31 | $225,752.33 | $277,587.31 | $341,265.84 | $419,480.71 |
| 251 | $121,913.01 | $150,106.87 | $184,789.08 | $227,445.48 | $279,900.54 | $344,394.11 | $423,675.52 |
| 252 | $122,522.57 | $150,982.50 | $186,021.00 | $229,151.32 | $282,233.05 | $347,551.06 | $427,912.27 |
| 253 | $123,135.19 | $151,863.23 | $187,261.14 | $230,869.95 | $284,584.99 | $350,736.94 | $432,191.39 |
| 254 | $123,750.86 | $152,749.10 | $188,509.55 | $232,601.48 | $286,956.53 | $353,952.03 | $436,513.31 |
| 255 | $124,369.62 | $153,640.13 | $189,766.28 | $234,345.99 | $289,347.83 | $357,196.59 | $440,878.44 |
| 256 | $124,991.46 | $154,536.37 | $191,031.39 | $236,103.58 | $291,759.07 | $360,470.89 | $445,287.22 |
| 257 | $125,616.42 | $155,437.83 | $192,304.93 | $237,874.36 | $294,190.39 | $363,775.21 | $449,740.10 |
| 258 | $126,244.50 | $156,344.55 | $193,586.97 | $239,658.42 | $296,641.98 | $367,109.82 | $454,237.50 |
| 259 | $126,875.73 | $157,256.56 | $194,877.55 | $241,455.86 | $299,113.99 | $370,474.99 | $458,779.87 |
| 260 | $127,510.11 | $158,173.89 | $196,176.73 | $243,266.78 | $301,606.61 | $373,871.01 | $463,367.67 |
| 261 | $128,147.66 | $159,096.57 | $197,484.57 | $245,091.28 | $304,120.00 | $377,298.16 | $468,001.35 |
| 262 | $128,788.39 | $160,024.64 | $198,801.14 | $246,929.46 | $306,654.33 | $380,756.73 | $472,681.36 |
| 263 | $129,432.34 | $160,958.11 | $200,126.48 | $248,781.43 | $309,209.79 | $384,247.00 | $477,408.18 |
| 264 | $130,079.50 | $161,897.04 | $201,460.66 | $250,647.29 | $311,786.53 | $387,769.26 | $482,182.26 |
| 265 | $130,729.90 | $162,841.43 | $202,803.73 | $252,527.15 | $314,384.76 | $391,323.81 | $487,004.08 |
| 266 | $131,383.54 | $163,791.34 | $204,155.75 | $254,421.10 | $317,004.63 | $394,910.95 | $491,874.12 |
| 267 | $132,040.46 | $164,746.79 | $205,516.79 | $256,329.26 | $319,646.33 | $398,530.97 | $496,792.86 |
| 268 | $132,700.66 | $165,707.82 | $206,886.90 | $258,251.73 | $322,310.05 | $402,184.17 | $501,760.79 |
| 269 | $133,364.17 | $166,674.44 | $208,266.15 | $260,188.62 | $324,995.97 | $405,870.85 | $506,778.40 |
| 270 | $134,030.99 | $167,646.71 | $209,654.59 | $262,140.03 | $327,704.27 | $409,591.34 | $511,846.18 |
| 271 | $134,701.14 | $168,624.65 | $211,052.29 | $264,106.08 | $330,435.14 | $413,345.92 | $516,964.64 |
| 272 | $135,374.65 | $169,608.30 | $212,459.30 | $266,086.88 | $333,188.76 | $417,134.93 | $522,134.29 |
| 273 | $136,051.52 | $170,597.68 | $213,875.70 | $268,082.53 | $335,965.34 | $420,958.67 | $527,355.63 |
| 274 | $136,731.78 | $171,592.83 | $215,301.53 | $270,093.15 | $338,765.05 | $424,817.45 | $532,629.19 |
| 275 | $137,415.44 | $172,593.79 | $216,736.88 | $272,118.85 | $341,588.09 | $428,711.61 | $537,955.48 |
| 276 | $138,102.52 | $173,600.59 | $218,181.79 | $274,159.74 | $344,434.66 | $432,641.47 | $543,335.04 |
| 277 | $138,793.03 | $174,613.26 | $219,636.34 | $276,215.94 | $347,304.95 | $436,607.35 | $548,768.39 |
| 278 | $139,486.99 | $175,631.83 | $221,100.58 | $278,287.56 | $350,199.16 | $440,609.58 | $554,256.07 |
| 279 | $140,184.43 | $176,656.35 | $222,574.58 | $280,374.71 | $353,117.48 | $444,648.51 | $559,798.63 |
| 280 | $140,885.35 | $177,686.85 | $224,058.41 | $282,477.52 | $356,060.13 | $448,724.45 | $565,396.62 |
| 281 | $141,589.78 | $178,723.35 | $225,552.13 | $284,596.10 | $359,027.29 | $452,837.76 | $571,050.58 |
| 282 | $142,297.73 | $179,765.91 | $227,055.82 | $286,730.57 | $362,019.19 | $456,988.77 | $576,761.09 |
| 283 | $143,009.22 | $180,814.54 | $228,569.52 | $288,881.05 | $365,036.02 | $461,177.83 | $582,528.70 |
| 284 | $143,724.26 | $181,869.29 | $230,093.32 | $291,047.66 | $368,077.98 | $465,405.30 | $588,353.99 |
| 285 | $144,442.88 | $182,930.20 | $231,627.27 | $293,230.52 | $371,145.30 | $469,671.51 | $594,237.53 |
| 286 | $145,165.10 | $183,997.29 | $233,171.46 | $295,429.75 | $374,238.18 | $473,976.83 | $600,179.90 |
| 287 | $145,890.92 | $185,070.61 | $234,725.93 | $297,645.47 | $377,356.83 | $478,321.62 | $606,181.70 |
| 288 | $146,620.38 | $186,150.19 | $236,290.77 | $299,877.81 | $380,501.47 | $482,706.24 | $612,243.52 |
| 289 | $147,353.48 | $187,236.06 | $237,866.04 | $302,126.90 | $383,672.31 | $487,131.04 | $618,365.95 |
| 290 | $148,090.25 | $188,328.27 | $239,451.82 | $304,392.85 | $386,869.58 | $491,596.41 | $624,549.61 |
| 291 | $148,830.70 | $189,426.85 | $241,048.16 | $306,675.79 | $390,093.50 | $496,102.71 | $630,795.11 |
| 292 | $149,574.85 | $190,531.84 | $242,655.15 | $308,975.86 | $393,344.28 | $500,650.32 | $637,103.06 |
| 293 | $150,322.73 | $191,643.28 | $244,272.85 | $311,293.18 | $396,622.14 | $505,239.62 | $643,474.09 |
| 294 | $151,074.34 | $192,761.20 | $245,901.34 | $313,627.88 | $399,927.33 | $509,870.98 | $649,908.83 |
| 295 | $151,829.71 | $193,885.64 | $247,540.68 | $315,980.09 | $403,260.06 | $514,544.80 | $656,407.92 |
| 296 | $152,588.86 | $195,016.64 | $249,190.95 | $318,349.94 | $406,620.56 | $519,261.46 | $662,972.00 |
| 297 | $153,351.80 | $196,154.24 | $250,852.22 | $320,737.56 | $410,009.06 | $524,021.35 | $669,601.72 |
| 298 | $154,118.56 | $197,298.47 | $252,524.57 | $323,143.10 | $413,425.80 | $528,824.88 | $676,297.74 |
| 299 | $154,889.16 | $198,449.38 | $254,208.07 | $325,566.67 | $416,871.02 | $533,672.44 | $683,060.71 |
| 300 | $155,663.60 | $199,607.00 | $255,902.79 | $328,008.42 | $420,344.94 | $538,564.44 | $689,891.32 |
| 301 | $156,441.92 | $200,771.37 | $257,608.81 | $330,468.48 | $423,847.82 | $543,501.28 | $696,790.24 |
| 302 | $157,224.13 | $201,942.54 | $259,326.20 | $332,947.00 | $427,379.88 | $548,483.38 | $703,758.14 |
| 303 | $158,010.25 | $203,120.54 | $261,055.04 | $335,444.10 | $430,941.38 | $553,511.14 | $710,795.72 |
| 304 | $158,800.30 | $204,305.41 | $262,795.41 | $337,959.93 | $434,532.56 | $558,584.99 | $717,903.68 |
| 305 | $159,594.30 | $205,497.19 | $264,547.38 | $340,494.63 | $438,153.67 | $563,705.36 | $725,082.71 |
| 306 | $160,392.27 | $206,695.92 | $266,311.03 | $343,048.34 | $441,804.95 | $568,872.66 | $732,333.54 |
| 307 | $161,194.24 | $207,901.65 | $268,086.43 | $345,621.20 | $445,486.65 | $574,087.32 | $739,656.88 |

TABLE 2c-continued

Combined Loan and Investment System Comparison Report Data (Lump Sum)

LOAN $194,863.30
RATE 5.75%
INV AMT $34,863.30

| | | | | | | | |
|---|---|---|---|---|---|---|---|
| 308 | $162,000.21 | $209,114.41 | $269,873.68 | $348,213.36 | $449,199.04 | $579,349.79 | $747,053.44 |
| 309 | $162,810.21 | $210,334.24 | $271,672.83 | $350,824.96 | $452,942.37 | $584,660.49 | $754,523.98 |
| 310 | $163,624.26 | $211,561.19 | $273,483.99 | $353,456.15 | $456,716.89 | $590,019.88 | $762,069.22 |
| 311 | $164,442.38 | $212,795.30 | $275,307.21 | $356,107.07 | $460,522.86 | $595,428.40 | $769,689.91 |
| 312 | $165,264.59 | $214,036.60 | $277,142.59 | $358,777.87 | $464,360.55 | $600,886.49 | $777,386.81 |
| 313 | $166,090.91 | $215,285.15 | $278,990.21 | $361,468.71 | $468,230.22 | $606,394.62 | $785,160.68 |
| 314 | $166,921.37 | $216,540.98 | $280,850.15 | $364,179.72 | $472,132.14 | $611,953.24 | $793,012.28 |
| 315 | $167,755.98 | $217,804.14 | $282,722.48 | $366,911.07 | $476,066.58 | $617,562.81 | $800,942.41 |
| 316 | $168,594.76 | $219,074.66 | $284,607.30 | $369,662.90 | $480,033.80 | $623,223.80 | $808,951.83 |
| 317 | $169,437.73 | $220,352.60 | $286,504.68 | $372,435.37 | $484,034.08 | $628,936.68 | $817,041.35 |
| 318 | $170,284.92 | $221,637.99 | $288,414.71 | $375,228.64 | $488,067.70 | $634,701.94 | $825,211.76 |
| 319 | $171,136.34 | $222,930.87 | $290,337.47 | $378,042.85 | $492,134.93 | $640,520.04 | $833,463.88 |
| 320 | $171,992.02 | $224,231.30 | $292,273.06 | $380,878.17 | $496,236.05 | $646,391.47 | $841,798.52 |
| 321 | $172,851.98 | $225,539.32 | $294,221.54 | $383,734.76 | $500,371.35 | $652,316.73 | $850,216.50 |
| 322 | $173,716.24 | $226,854.97 | $296,183.02 | $386,612.77 | $504,541.11 | $658,296.30 | $858,718.67 |
| 323 | $174,584.83 | $228,178.29 | $298,157.58 | $389,512.37 | $508,745.62 | $664,330.68 | $867,305.86 |
| 324 | $175,457.75 | $229,509.33 | $300,145.29 | $392,433.71 | $512,985.17 | $670,420.38 | $875,978.92 |
| 325 | $176,335.04 | $230,848.13 | $302,146.26 | $395,376.96 | $517,260.05 | $676,565.90 | $884,738.70 |
| 326 | $177,216.71 | $232,194.75 | $304,160.57 | $398,342.29 | $521,570.55 | $682,767.75 | $893,586.09 |
| 327 | $178,102.80 | $233,549.21 | $306,188.31 | $401,329.86 | $525,916.97 | $689,026.46 | $902,521.95 |
| 328 | $178,993.31 | $234,911.59 | $308,229.56 | $404,339.83 | $530,299.61 | $695,342.53 | $911,547.17 |
| 329 | $179,888.28 | $236,281.90 | $310,284.43 | $407,372.38 | $534,718.77 | $701,716.50 | $920,662.64 |
| 330 | $180,787.72 | $237,660.21 | $312,352.99 | $410,427.67 | $539,174.76 | $708,148.91 | $929,869.27 |
| 331 | $181,691.66 | $239,046.57 | $314,435.34 | $413,505.88 | $543,667.89 | $714,640.27 | $939,167.96 |
| 332 | $182,600.12 | $240,441.00 | $316,531.58 | $416,607.17 | $548,198.45 | $721,191.14 | $948,559.64 |
| 333 | $183,513.12 | $241,843.58 | $318,641.79 | $419,731.73 | $552,766.77 | $727,802.06 | $958,045.24 |
| 334 | $184,430.68 | $243,254.33 | $320,766.07 | $422,879.72 | $557,373.16 | $734,473.58 | $967,625.69 |
| 335 | $185,352.84 | $244,673.31 | $322,904.51 | $426,051.31 | $562,017.94 | $741,206.25 | $977,301.95 |
| 336 | $186,279.60 | $246,100.57 | $325,057.20 | $429,246.70 | $566,701.42 | $748,000.64 | $987,074.97 |
| 337 | $187,211.00 | $247,536.16 | $327,224.25 | $432,466.05 | $571,423.93 | $754,857.32 | $996,945.72 |
| 338 | $188,147.05 | $248,980.12 | $329,405.75 | $435,709.55 | $576,185.80 | $761,776.84 | $1,006,915.17 |
| 339 | $189,087.79 | $250,432.51 | $331,601.79 | $438,977.37 | $580,987.35 | $768,759.80 | $1,016,984.33 |
| 340 | $190,033.23 | $251,893.36 | $333,812.46 | $442,269.70 | $585,828.91 | $775,806.76 | $1,027,154.17 |
| 341 | $190,983.39 | $253,362.74 | $336,037.88 | $445,586.72 | $590,710.82 | $782,918.32 | $1,037,425.71 |
| 342 | $191,938.31 | $254,840.69 | $338,278.13 | $448,928.62 | $595,633.41 | $790,095.07 | $1,047,799.97 |
| 343 | $192,898.00 | $256,327.26 | $340,533.32 | $452,295.58 | $600,597.02 | $797,337.61 | $1,058,277.97 |
| 344 | $193,862.49 | $257,822.50 | $342,803.54 | $455,687.80 | $605,601.99 | $804,646.54 | $1,068,860.75 |
| 345 | $194,831.80 | $259,326.47 | $345,088.90 | $459,105.46 | $610,648.68 | $812,022.47 | $1,079,549.35 |
| 346 | $195,805.96 | $260,839.21 | $347,389.49 | $462,548.75 | $615,737.42 | $819,466.01 | $1,090,344.85 |
| 347 | $196,784.99 | $262,360.77 | $349,705.42 | $466,017.87 | $620,868.56 | $826,977.78 | $1,101,248.30 |
| 348 | $197,768.92 | $263,891.21 | $352,036.79 | $469,513.00 | $626,042.46 | $834,558.41 | $1,112,260.78 |
| 349 | $198,757.76 | $265,430.57 | $354,383.70 | $473,034.35 | $631,259.49 | $842,208.53 | $1,123,383.39 |
| 350 | $199,751.55 | $266,978.92 | $356,746.26 | $476,582.11 | $636,519.98 | $849,928.77 | $1,134,617.22 |
| 351 | $200,750.31 | $268,536.29 | $359,124.57 | $480,156.47 | $641,824.31 | $857,719.78 | $1,145,963.39 |
| 352 | $201,754.06 | $270,102.75 | $361,518.73 | $483,757.65 | $647,172.85 | $865,582.22 | $1,157,423.03 |
| 353 | $202,762.83 | $271,678.35 | $363,928.86 | $487,385.83 | $652,565.96 | $873,516.72 | $1,168,997.26 |
| 354 | $203,776.65 | $273,263.14 | $366,355.05 | $491,041.22 | $658,004.01 | $881,523.96 | $1,180,687.23 |
| 355 | $204,795.53 | $274,857.18 | $368,797.42 | $494,724.03 | $663,487.37 | $889,604.59 | $1,192,494.10 |
| 356 | $205,819.51 | $276,460.51 | $371,256.07 | $498,434.46 | $669,016.44 | $897,759.30 | $1,204,419.04 |
| 357 | $206,848.60 | $278,073.20 | $373,731.11 | $502,172.72 | $674,591.57 | $905,988.76 | $1,216,463.23 |
| 358 | $207,882.85 | $279,695.29 | $376,222.65 | $505,939.01 | $680,213.17 | $914,293.66 | $1,228,627.87 |
| 359 | $208,922.26 | $281,326.85 | $378,730.80 | $509,733.56 | $685,881.61 | $922,674.68 | $1,240,914.15 |
| 360 | $209,966.87 | $282,967.92 | $381,255.67 | $513,556.56 | $691,597.29 | $931,132.53 | $1,253,323.29 |

TABLE 2d

CONVENTIONAL LOAN AMORTIZATION SCHEDULE

LOAN AMOUNT $160,000.00
INTEREST RATE 5.75%
TOTAL NUMBER OF PAYMENTS 360
PAYMENT $933.72

| PMT | BEGINNING LOAN BALANCE | PRINCIPAL | INTEREST | CUMMULATIVE PRINCIPAL | CUMMULATIVE INTEREST | LOAN BALANCE |
|---|---|---|---|---|---|---|
| 1 | $160,000.00 | $167.05 | $766.67 | $167.05 | $766.67 | $159,832.95 |
| 2 | $159,832.95 | $167.85 | $765.87 | $334.91 | $1,532.53 | $159,665.09 |
| 3 | $159,665.09 | $168.66 | $765.06 | $503.57 | $2,297.59 | $159,496.43 |
| 4 | $159,496.43 | $169.47 | $764.25 | $673.03 | $3,061.85 | $159,326.97 |
| 5 | $159,326.97 | $170.28 | $763.44 | $843.31 | $3,825.29 | $159,156.69 |
| 6 | $159,156.69 | $171.09 | $762.63 | $1,014.40 | $4,587.92 | $158,985.60 |

TABLE 2d-continued

CONVENTIONAL LOAN AMORTIZATION SCHEDULE

LOAN AMOUNT $160,000.00
INTEREST RATE 5.75%
TOTAL NUMBER OF PAYMENTS 360
PAYMENT $933.72

| PMT | BEGINNING LOAN BALANCE | PRINCIPAL | INTEREST | CUMMULATIVE PRINCIPAL | CUMMULATIVE INTEREST | LOAN BALANCE |
|---|---|---|---|---|---|---|
| 7 | $158,985.60 | $171.91 | $761.81 | $1,186.32 | $5,349.72 | $158,813.68 |
| 8 | $158,813.68 | $172.74 | $760.98 | $1,359.06 | $6,110.70 | $158,640.94 |
| 9 | $158,640.94 | $173.57 | $760.15 | $1,532.62 | $6,870.86 | $158,467.38 |
| 10 | $158,467.38 | $174.40 | $759.32 | $1,707.02 | $7,630.18 | $158,292.98 |
| 11 | $158,292.98 | $175.23 | $758.49 | $1,882.25 | $8,388.67 | $158,117.75 |
| 12 | $158,117.75 | $176.07 | $757.65 | $2,058.32 | $9,146.32 | $157,941.68 |
| 13 | $157,941.68 | $176.92 | $756.80 | $2,235.24 | $9,903.12 | $157,764.76 |
| 14 | $157,764.76 | $177.76 | $755.96 | $2,413.00 | $10,659.08 | $157,587.00 |
| 15 | $157,587.00 | $178.62 | $755.10 | $2,591.62 | $11,414.18 | $157,408.38 |
| 16 | $157,408.38 | $179.47 | $754.25 | $2,771.09 | $12,168.43 | $157,228.91 |
| 17 | $157,228.91 | $180.33 | $753.39 | $2,951.42 | $12,921.82 | $157,048.58 |
| 18 | $157,048.58 | $181.20 | $752.52 | $3,132.62 | $13,674.34 | $156,867.38 |
| 19 | $156,867.38 | $182.06 | $751.66 | $3,314.68 | $14,426.00 | $156,685.32 |
| 20 | $156,685.32 | $182.94 | $750.78 | $3,497.62 | $15,176.78 | $156,502.38 |
| 21 | $156,502.38 | $183.81 | $749.91 | $3,681.43 | $15,926.69 | $156,318.57 |
| 22 | $156,318.57 | $184.69 | $749.03 | $3,866.12 | $16,675.72 | $156,133.88 |
| 23 | $156,133.88 | $185.58 | $748.14 | $4,051.70 | $17,423.86 | $155,948.30 |
| 24 | $155,948.30 | $186.47 | $747.25 | $4,238.17 | $18,171.11 | $155,761.83 |
| 25 | $155,761.83 | $187.36 | $746.36 | $4,425.53 | $18,917.47 | $155,574.47 |
| 26 | $155,574.47 | $188.26 | $745.46 | $4,613.79 | $19,662.93 | $155,386.21 |
| 27 | $155,386.21 | $189.16 | $744.56 | $4,802.95 | $20,407.49 | $155,197.05 |
| 28 | $155,197.05 | $190.07 | $743.65 | $4,993.02 | $21,151.14 | $155,006.98 |
| 29 | $155,006.98 | $190.98 | $742.74 | $5,184.00 | $21,893.88 | $154,816.00 |
| 30 | $154,816.00 | $191.89 | $741.83 | $5,375.89 | $22,635.71 | $154,624.11 |
| 31 | $154,624.11 | $192.81 | $740.91 | $5,568.70 | $23,376.62 | $154,431.30 |
| 32 | $154,431.30 | $193.74 | $739.98 | $5,762.44 | $24,116.60 | $154,237.56 |
| 33 | $154,237.56 | $194.67 | $739.05 | $5,957.11 | $24,855.65 | $154,042.89 |
| 34 | $154,042.89 | $195.60 | $738.12 | $6,152.70 | $25,593.78 | $153,847.30 |
| 35 | $153,847.30 | $196.54 | $737.18 | $6,349.24 | $26,330.96 | $153,650.76 |
| 36 | $153,650.76 | $197.48 | $736.24 | $6,546.71 | $27,067.21 | $153,453.29 |
| 37 | $153,453.29 | $198.42 | $735.30 | $6,745.14 | $27,802.50 | $153,254.86 |
| 38 | $153,254.86 | $199.37 | $734.35 | $6,944.51 | $28,536.85 | $153,055.49 |
| 39 | $153,055.49 | $200.33 | $733.39 | $7,144.84 | $29,270.24 | $152,855.16 |
| 40 | $152,855.16 | $201.29 | $732.43 | $7,346.13 | $30,002.67 | $152,653.87 |
| 41 | $152,653.87 | $202.25 | $731.47 | $7,548.38 | $30,734.14 | $152,451.62 |
| 42 | $152,451.62 | $203.22 | $730.50 | $7,751.61 | $31,464.63 | $152,248.39 |
| 43 | $152,248.39 | $204.20 | $729.52 | $7,955.80 | $32,194.16 | $152,044.20 |
| 44 | $152,044.20 | $205.17 | $728.55 | $8,160.98 | $32,922.70 | $151,839.02 |
| 45 | $151,839.02 | $206.16 | $727.56 | $8,367.14 | $33,650.26 | $151,632.86 |
| 46 | $151,632.86 | $207.15 | $726.57 | $8,574.28 | $34,376.84 | $151,425.72 |
| 47 | $151,425.72 | $208.14 | $725.58 | $8,782.42 | $35,102.42 | $151,217.58 |
| 48 | $151,217.58 | $209.14 | $724.58 | $8,991.56 | $35,827.00 | $151,008.44 |
| 49 | $151,008.44 | $210.14 | $723.58 | $9,201.69 | $36,550.59 | $150,798.31 |
| 50 | $150,798.31 | $211.14 | $722.58 | $9,412.84 | $37,273.16 | $150,587.16 |
| 51 | $150,587.16 | $212.16 | $721.56 | $9,624.99 | $37,994.73 | $150,375.01 |
| 52 | $150,375.01 | $213.17 | $720.55 | $9,838.17 | $38,715.27 | $150,161.83 |
| 53 | $150,161.83 | $214.19 | $719.53 | $10,052.36 | $39,434.80 | $149,947.64 |
| 54 | $149,947.64 | $215.22 | $718.50 | $10,267.58 | $40,153.30 | $149,732.42 |
| 55 | $149,732.42 | $216.25 | $717.47 | $10,483.84 | $40,870.76 | $149,516.16 |
| 56 | $149,516.16 | $217.29 | $716.43 | $10,701.12 | $41,587.20 | $149,298.88 |
| 57 | $149,298.88 | $218.33 | $715.39 | $10,919.45 | $42,302.59 | $149,080.55 |
| 58 | $149,080.55 | $219.38 | $714.34 | $11,138.83 | $43,016.93 | $148,861.17 |
| 59 | $148,861.17 | $220.43 | $713.29 | $11,359.26 | $43,730.22 | $148,640.74 |
| 60 | $148,640.74 | $221.48 | $712.24 | $11,580.74 | $44,442.46 | $148,419.26 |
| 61 | $148,419.26 | $222.54 | $711.18 | $11,803.28 | $45,153.64 | $148,196.72 |
| 62 | $148,196.72 | $223.61 | $710.11 | $12,026.89 | $45,863.75 | $147,973.11 |
| 63 | $147,973.11 | $224.68 | $709.04 | $12,251.58 | $46,572.78 | $147,748.42 |
| 64 | $147,748.42 | $225.76 | $707.96 | $12,477.33 | $47,280.75 | $147,522.67 |
| 65 | $147,522.67 | $226.84 | $706.88 | $12,704.18 | $47,987.62 | $147,295.82 |
| 66 | $147,295.82 | $227.93 | $705.79 | $12,932.10 | $48,693.42 | $147,067.90 |
| 67 | $147,067.90 | $229.02 | $704.70 | $13,161.12 | $49,398.12 | $146,838.88 |
| 68 | $146,838.88 | $230.12 | $703.60 | $13,391.24 | $50,101.72 | $146,608.76 |
| 69 | $146,608.76 | $231.22 | $702.50 | $13,622.46 | $50,804.22 | $146,377.54 |
| 70 | $146,377.54 | $232.33 | $701.39 | $13,854.79 | $51,505.61 | $146,145.21 |
| 71 | $146,145.21 | $233.44 | $700.28 | $14,088.23 | $52,205.89 | $145,911.77 |
| 72 | $145,911.77 | $234.56 | $699.16 | $14,322.79 | $52,905.05 | $145,677.21 |
| 73 | $145,677.21 | $235.68 | $698.04 | $14,558.47 | $53,603.09 | $145,441.53 |
| 74 | $145,441.53 | $236.81 | $696.91 | $14,795.28 | $54,300.00 | $145,204.72 |
| 75 | $145,204.72 | $237.95 | $695.77 | $15,033.23 | $54,995.77 | $144,966.77 |
| 76 | $144,966.77 | $239.09 | $694.63 | $15,272.32 | $55,690.40 | $144,727.68 |
| 77 | $144,727.68 | $240.23 | $693.49 | $15,512.55 | $56,383.89 | $144,487.45 |

TABLE 2d-continued

CONVENTIONAL LOAN AMORTIZATION SCHEDULE

LOAN AMOUNT $160,000.00
INTEREST RATE 5.75%
TOTAL NUMBER OF PAYMENTS 360
PAYMENT $933.72

| PMT | BEGINNING LOAN BALANCE | PRINCIPAL | INTEREST | CUMMULATIVE PRINCIPAL | CUMMULATIVE INTEREST | LOAN BALANCE |
|---|---|---|---|---|---|---|
| 78 | $144,487.45 | $241.38 | $692.34 | $15,753.94 | $57,076.22 | $144,246.06 |
| 79 | $144,246.06 | $242.54 | $691.18 | $15,996.48 | $57,767.40 | $144,003.52 |
| 80 | $144,003.52 | $243.70 | $690.02 | $16,240.18 | $58,457.42 | $143,759.82 |
| 81 | $143,759.82 | $244.87 | $688.85 | $16,485.05 | $59,146.27 | $143,514.95 |
| 82 | $143,514.95 | $246.04 | $687.68 | $16,731.09 | $59,833.95 | $143,268.91 |
| 83 | $143,268.91 | $247.22 | $686.50 | $16,978.32 | $60,520.44 | $143,021.68 |
| 84 | $143,021.68 | $248.41 | $685.31 | $17,226.73 | $61,205.75 | $142,773.27 |
| 85 | $142,773.27 | $249.60 | $684.12 | $17,476.32 | $61,889.88 | $142,523.68 |
| 86 | $142,523.68 | $250.79 | $682.93 | $17,727.12 | $62,572.80 | $142,272.88 |
| 87 | $142,272.88 | $252.00 | $681.72 | $17,979.11 | $63,254.53 | $142,020.89 |
| 88 | $142,020.89 | $253.20 | $680.52 | $18,232.32 | $63,935.04 | $141,767.68 |
| 89 | $141,767.68 | $254.42 | $679.30 | $18,486.73 | $64,614.35 | $141,513.27 |
| 90 | $141,513.27 | $255.64 | $678.08 | $18,742.37 | $65,292.43 | $141,257.63 |
| 91 | $141,257.63 | $256.86 | $676.86 | $18,999.23 | $65,969.29 | $141,000.77 |
| 92 | $141,000.77 | $258.09 | $675.63 | $19,257.32 | $66,644.92 | $140,742.68 |
| 93 | $140,742.68 | $259.33 | $674.39 | $19,516.65 | $67,319.31 | $140,483.35 |
| 94 | $140,483.35 | $260.57 | $673.15 | $19,777.22 | $67,992.46 | $140,222.78 |
| 95 | $140,222.78 | $261.82 | $671.90 | $20,039.04 | $68,664.36 | $139,960.96 |
| 96 | $139,960.96 | $263.07 | $670.65 | $20,302.11 | $69,335.01 | $139,697.89 |
| 97 | $139,697.89 | $264.33 | $669.39 | $20,566.45 | $70,004.39 | $139,433.55 |
| 98 | $139,433.55 | $265.60 | $668.12 | $20,832.05 | $70,672.51 | $139,167.95 |
| 99 | $139,167.95 | $266.87 | $666.85 | $21,098.92 | $71,339.36 | $138,901.08 |
| 100 | $138,901.08 | $268.15 | $665.57 | $21367.07 | $72,004.93 | $138,632.93 |
| 101 | $138,632.93 | $269.44 | $664.28 | $21636.51 | $72,669.21 | $138,363.49 |
| 102 | $138,363.49 | $270.73 | $662.99 | $21,907.24 | $73,332.20 | $138,092.76 |
| 103 | $138,092.76 | $272.03 | $661.69 | $22,179.26 | $73,993.90 | $137,820.74 |
| 104 | $137,820.74 | $273.33 | $660.39 | $22,452.59 | $74,654.29 | $137,547.41 |
| 105 | $137,547.41 | $274.64 | $659.08 | $22,727.23 | $75,313.37 | $137,272.77 |
| 106 | $137,272.77 | $275.95 | $657.77 | $23,003.19 | $75,971.13 | $136,996.81 |
| 107 | $136,996.81 | $277.28 | $656.44 | $23,280.46 | $76,627.58 | $136,719.54 |
| 108 | $136,719.54 | $278.61 | $655.11 | $23,559.07 | $77,282.69 | $136,440.93 |
| 109 | $136,440.93 | $279.94 | $653.78 | $23,839.01 | $77,936.47 | $136,160.99 |
| 110 | $136,160.99 | $281.28 | $652.44 | $24,120.29 | $78,588.91 | $135,879.71 |
| 111 | $135,879.71 | $282.63 | $651.09 | $24,402.92 | $79,240.00 | $135,597.08 |
| 112 | $135,597.08 | $283.98 | $649.74 | $24,686.91 | $79,889.73 | $135,313.09 |
| 113 | $135,313.09 | $285.34 | $648.38 | $24,972.25 | $80,538.11 | $135,027.75 |
| 114 | $135,027.75 | $286.71 | $647.01 | $25,258.96 | $81,185.12 | $134,741.04 |
| 115 | $134,741.04 | $288.09 | $645.63 | $25,547.05 | $81,830.75 | $134,452.95 |
| 116 | $134,452.95 | $289.47 | $644.25 | $25,836.51 | $82,475.01 | $134,163.49 |
| 117 | $134,163.49 | $290.85 | $642.87 | $26,127.37 | $83,117.87 | $133,872.63 |
| 118 | $133,872.63 | $292.25 | $641.47 | $26,419.61 | $83,759.35 | $133,580.39 |
| 119 | $133,580.39 | $293.65 | $640.07 | $26,713.26 | $84,399.42 | $133,286.74 |
| 120 | $133,286.74 | $295.05 | $638.67 | $27,008.32 | $85,038.08 | $132,991.68 |
| 121 | $132,991.68 | $296.47 | $637.25 | $27,304.78 | $85,675.34 | $132,695.22 |
| 122 | $132,695.22 | $297.89 | $635.83 | $27,602.67 | $86,311.17 | $132,397.33 |
| 123 | $132,397.33 | $299.32 | $634.40 | $27,901.99 | $86,945.57 | $132,098.01 |
| 124 | $132,098.01 | $300.75 | $632.97 | $28,202.74 | $87,578.54 | $131,797.26 |
| 125 | $131,797.26 | $302.19 | $631.53 | $28,504.93 | $88,210.07 | $131,495.07 |
| 126 | $131,495.07 | $303.64 | $630.08 | $28,808.57 | $88,840.15 | $131,191.43 |
| 127 | $131,191.43 | $305.09 | $628.63 | $29,113.67 | $89,468.77 | $130,886.33 |
| 128 | $130,886.33 | $306.56 | $627.16 | $29,420.22 | $90,095.94 | $130,579.78 |
| 129 | $130,579.78 | $308.03 | $625.69 | $29,728.25 | $90,721.63 | $130,271.75 |
| 130 | $130,271.75 | $309.50 | $624.22 | $30,037.75 | $91,345.85 | $129,962.25 |
| 131 | $129,962.25 | $310.98 | $622.74 | $30,348.73 | $91,968.59 | $129,651.27 |
| 132 | $129,651.27 | $312.47 | $621.25 | $30,661.21 | $92,589.83 | $129,338.79 |
| 133 | $129,338.79 | $313.97 | $619.75 | $30,975.18 | $93,209.58 | $129,024.82 |
| 134 | $129,024.82 | $315.48 | $618.24 | $31,290.65 | $93,827.83 | $128,709.35 |
| 135 | $128,709.35 | $316.99 | $616.73 | $31,607.64 | $94,444.56 | $128,392.36 |
| 136 | $128,392.36 | $318.51 | $615.21 | $31,926.15 | $95,059.77 | $128,073.85 |
| 137 | $128,073.85 | $320.03 | $613.69 | $32,246.18 | $95,673.46 | $127,753.82 |
| 138 | $127,753.82 | $321.57 | $612.15 | $32,567.75 | $96,285.61 | $127,432.25 |
| 139 | $127,432.25 | $323.11 | $610.61 | $32,890.85 | $96,896.23 | $127,109.15 |
| 140 | $127,109.15 | $324.66 | $609.06 | $33,215.51 | $97,505.29 | $126,784.49 |
| 141 | $126,784.49 | $326.21 | $607.51 | $33,541.72 | $98,112.80 | $126,458.28 |
| 142 | $126,458.28 | $327.77 | $605.95 | $33,869.50 | $98,718.74 | $126,130.50 |
| 143 | $126,130.50 | $329.34 | $604.38 | $34,198.84 | $99,323.12 | $125,801.16 |
| 144 | $125,801.16 | $330.92 | $602.80 | $34,529.76 | $99,925.92 | $125,470.24 |
| 145 | $125,470.24 | $332.51 | $601.21 | $34,862.27 | $100,527.13 | $125,137.73 |
| 146 | $125,137.73 | $334.10 | $599.62 | $35,196.37 | $101,126.75 | $124,803.63 |
| 147 | $124,803.63 | $335.70 | $598.02 | $35,532.08 | $101,724.76 | $124,467.92 |
| 148 | $124,467.92 | $337.31 | $596.41 | $35,869.39 | $102,321.17 | $124,130.61 |

TABLE 2d-continued

CONVENTIONAL LOAN AMORTIZATION SCHEDULE

LOAN AMOUNT $160,000.00
INTEREST RATE 5.75%
TOTAL NUMBER OF PAYMENTS 360
PAYMENT $933.72

| PMT | BEGINNING LOAN BALANCE | PRINCIPAL | INTEREST | CUMMULATIVE PRINCIPAL | CUMMULATIVE INTEREST | LOAN BALANCE |
|---|---|---|---|---|---|---|
| 149 | $124,130.61 | $338.93 | $594.79 | $36,208.31 | $102,915.97 | $123,791.69 |
| 150 | $123,791.69 | $340.55 | $593.17 | $36,548.87 | $103,509.13 | $123,451.13 |
| 151 | $123,451.13 | $342.18 | $591.54 | $36,891.05 | $104,100.67 | $123,108.95 |
| 152 | $123,108.95 | $343.82 | $589.90 | $37,234.87 | $104,690.57 | $122,765.13 |
| 153 | $122,765.13 | $345.47 | $588.25 | $37,580.34 | $105,278.82 | $122,419.66 |
| 154 | $122,419.66 | $347.13 | $586.59 | $37,927.47 | $105,865.41 | $122,072.53 |
| 155 | $122,072.53 | $348.79 | $584.93 | $38,276.26 | $106,450.34 | $121,723.74 |
| 156 | $121,723.74 | $350.46 | $583.26 | $38,626.72 | $107,033.60 | $121,373.28 |
| 157 | $121,373.28 | $352.14 | $581.58 | $38,978.86 | $107,615.18 | $121,021.14 |
| 158 | $121,021.14 | $353.83 | $579.89 | $39,332.68 | $108,195.08 | $120,667.32 |
| 159 | $120,667.32 | $355.52 | $578.20 | $39,688.21 | $108,773.27 | $120,311.79 |
| 160 | $120,311.79 | $357.23 | $576.49 | $40,045.43 | $109,349.77 | $119,954.57 |
| 161 | $119,954.57 | $358.94 | $574.78 | $40,404.37 | $109,924.55 | $119,595.63 |
| 162 | $119,595.63 | $360.66 | $573.06 | $40,765.03 | $110,497.61 | $119,234.97 |
| 163 | $119,234.97 | $362.39 | $571.33 | $41,127.41 | $111,068.95 | $118,872.59 |
| 164 | $118,872.59 | $364.12 | $569.60 | $41,491.54 | $111,638.54 | $118,508.46 |
| 165 | $118,508.46 | $365.87 | $567.85 | $41,857.40 | $112,206.40 | $118,142.60 |
| 166 | $118,142.60 | $367.62 | $566.10 | $42,225.02 | $112,772.50 | $117,774.98 |
| 167 | $117,774.98 | $369.38 | $564.34 | $42,594.40 | $113,336.84 | $117,405.60 |
| 168 | $117,405.60 | $371.15 | $562.57 | $42,965.56 | $113,899.40 | $117,034.44 |
| 169 | $117,034.44 | $372.93 | $560.79 | $43,338.49 | $114,460.19 | $116,661.51 |
| 170 | $116,661.51 | $374.72 | $559.00 | $43,713.20 | $115,019.20 | $116,286.80 |
| 171 | $116,286.80 | $376.51 | $557.21 | $44,089.72 | $115,576.40 | $115,910.28 |
| 172 | $115,910.28 | $378.32 | $555.40 | $44,468.03 | $116,131.81 | $115,531.97 |
| 173 | $115,531.97 | $380.13 | $553.59 | $44,848.16 | $116,685.40 | $115,151.84 |
| 174 | $115,151.84 | $381.95 | $551.77 | $45,230.11 | $117,237.17 | $114,769.89 |
| 175 | $114,769.89 | $383.78 | $549.94 | $45,613.89 | $117,787.11 | $114,386.11 |
| 176 | $114,386.11 | $385.62 | $548.10 | $45,999.51 | $118,335.21 | $114,000.49 |
| 177 | $114,000.49 | $387.47 | $546.25 | $46,386.98 | $118,881.46 | $113,613.02 |
| 178 | $113,613.02 | $389.32 | $544.40 | $46,776.30 | $119,425.86 | $113,223.70 |
| 179 | $113,223.70 | $391.19 | $542.53 | $47,167.49 | $119,968.39 | $112,832.51 |
| 180 | $112,832.51 | $393.06 | $540.66 | $47,560.56 | $120,509.04 | $112,439.44 |
| 181 | $112,439.44 | $394.95 | $538.77 | $47,955.51 | $121,047.81 | $112,044.49 |
| 182 | $112,044.49 | $396.84 | $536.88 | $48,352.35 | $121,584.69 | $111,647.65 |
| 183 | $111,647.65 | $398.74 | $534.98 | $48,751.09 | $122,119.67 | $111,248.91 |
| 184 | $111,248.91 | $400.65 | $533.07 | $49,151.74 | $122,652.74 | $110,848.26 |
| 185 | $110,848.26 | $402.57 | $531.15 | $49,554.31 | $123,183.89 | $110,445.69 |
| 186 | $110,445.69 | $404.50 | $529.22 | $49,958.81 | $123,713.11 | $110,041.19 |
| 187 | $110,041.19 | $406.44 | $527.28 | $50,365.25 | $124,240.39 | $109,634.75 |
| 188 | $109,634.75 | $408.39 | $525.33 | $50,773.64 | $124,765.72 | $109,226.36 |
| 189 | $109,226.36 | $410.34 | $523.38 | $51,183.98 | $125,289.10 | $108,816.02 |
| 190 | $108,816.02 | $412.31 | $521.41 | $51,596.29 | $125,810.51 | $108,403.71 |
| 191 | $108,403.71 | $414.29 | $519.43 | $52,010.58 | $126,329.94 | $107,989.42 |
| 192 | $107,989.42 | $416.27 | $517.45 | $52,426.85 | $126,847.39 | $107,573.15 |
| 193 | $107,573.15 | $418.27 | $515.45 | $52,845.12 | $127,362.84 | $107,154.88 |
| 194 | $107,154.88 | $420.27 | $513.45 | $53,265.38 | $127,876.30 | $106,734.62 |
| 195 | $106,734.62 | $422.28 | $511.44 | $53,687.67 | $128,387.73 | $106,312.33 |
| 196 | $106,312.33 | $424.31 | $509.41 | $54,111.97 | $128,897.15 | $105,888.03 |
| 197 | $105,888.03 | $426.34 | $507.38 | $54,538.31 | $129,404.53 | $105,461.69 |
| 198 | $105,461.69 | $428.38 | $505.34 | $54,966.70 | $129,909.86 | $105,033.30 |
| 199 | $105,033.30 | $430.44 | $503.28 | $55,397.13 | $130,413.15 | $104,602.87 |
| 200 | $104,602.87 | $432.50 | $501.22 | $55,829.63 | $130,914.37 | $104,170.37 |
| 201 | $104,170.37 | $434.57 | $499.15 | $56,264.20 | $131,413.52 | $103,735.80 |
| 202 | $103,735.80 | $436.65 | $497.07 | $56,700.85 | $131,910.59 | $103,299.15 |
| 203 | $103,299.15 | $438.74 | $494.98 | $57,139.60 | $132,405.56 | $102,860.40 |
| 204 | $102,860.40 | $440.85 | $492.87 | $57,580.45 | $132,898.43 | $102,419.55 |
| 205 | $102,419.55 | $442.96 | $490.76 | $58,023.41 | $133,389.19 | $101,976.59 |
| 206 | $101,976.59 | $445.08 | $488.64 | $58,468.49 | $133,877.83 | $101,531.51 |
| 207 | $101,531.51 | $447.21 | $486.51 | $58,915.70 | $134,364.34 | $101,084.30 |
| 208 | $101,084.30 | $449.36 | $484.36 | $59,365.06 | $134,848.70 | $100,634.94 |
| 209 | $100,634.94 | $451.51 | $482.21 | $59,816.57 | $135,330.91 | $100,183.43 |
| 210 | $100,183.43 | $453.67 | $480.05 | $60,270.25 | $135,810.95 | $99,729.75 |
| 211 | $99,729.75 | $455.85 | $477.87 | $60,726.09 | $136,288.83 | $99,273.91 |
| 212 | $99,273.91 | $458.03 | $475.69 | $61,184.13 | $136,764.51 | $98,815.87 |
| 213 | $98,815.87 | $460.23 | $473.49 | $61,644.35 | $137,238.01 | $98,355.65 |
| 214 | $98,355.65 | $462.43 | $471.29 | $62,106.79 | $137,709.29 | $97,893.21 |
| 215 | $97,893.21 | $464.65 | $469.07 | $62,571.43 | $138,178.37 | $97,428.57 |
| 216 | $97,428.57 | $466.87 | $466.85 | $63,038.31 | $138,645.21 | $96,961.69 |
| 217 | $96,961.69 | $469.11 | $464.61 | $63,507.42 | $139,109.82 | $96,492.58 |
| 218 | $96,492.58 | $471.36 | $462.36 | $63,978.78 | $139,572.18 | $96,021.22 |
| 219 | $96,021.22 | $473.62 | $460.10 | $64,452.40 | $140,032.28 | $95,547.60 |

TABLE 2d-continued

CONVENTIONAL LOAN AMORTIZATION SCHEDULE

LOAN AMOUNT $160,000.00
INTEREST RATE 5.75%
TOTAL NUMBER OF PAYMENTS 360
PAYMENT $933.72

| PMT | BEGINNING LOAN BALANCE | PRINCIPAL | INTEREST | CUMMULATIVE PRINCIPAL | CUMMULATIVE INTEREST | LOAN BALANCE |
|---|---|---|---|---|---|---|
| 220 | $95,547.60 | $475.89 | $457.83 | $64,928.29 | $140,490.11 | $95,071.71 |
| 221 | $95,071.71 | $478.17 | $455.55 | $65,406.45 | $140,945.67 | $94,593.55 |
| 222 | $94,593.55 | $480.46 | $453.26 | $65,886.91 | $141,398.93 | $94,113.09 |
| 223 | $94,113.09 | $482.76 | $450.96 | $66,369.68 | $141,849.88 | $93,630.32 |
| 224 | $93,630.32 | $485.07 | $448.65 | $66,854.75 | $142,298.53 | $93,145.25 |
| 225 | $93,145.25 | $487.40 | $446.32 | $67,342.15 | $142,744.85 | $92,657.85 |
| 226 | $92,657.85 | $489.73 | $443.99 | $67,831.88 | $143,188.84 | $92,168.12 |
| 227 | $92,168.12 | $492.08 | $441.64 | $68,323.96 | $143,630.48 | $91,676.04 |
| 228 | $91,676.04 | $494.44 | $439.28 | $68,818.40 | $144,069.76 | $91,181.60 |
| 229 | $91,181.60 | $496.81 | $436.91 | $69,315.21 | $144,506.67 | $90,684.79 |
| 230 | $90,684.79 | $499.19 | $434.53 | $69,814.40 | $144,941.20 | $90,185.60 |
| 231 | $90,185.60 | $501.58 | $432.14 | $70,315.98 | $145,373.34 | $89,684.02 |
| 232 | $89,684.02 | $503.98 | $429.74 | $70,819.97 | $145,803.07 | $89,180.03 |
| 233 | $89,180.03 | $506.40 | $427.32 | $71,326.36 | $146,230.40 | $88,673.64 |
| 234 | $88,673.64 | $508.83 | $424.89 | $71,835.19 | $146,655.29 | $88,164.81 |
| 235 | $88,164.81 | $511.26 | $422.46 | $72,346.45 | $147,077.75 | $87,653.55 |
| 236 | $87,653.55 | $513.71 | $420.01 | $72,860.17 | $147,497.75 | $87,139.83 |
| 237 | $87,139.83 | $516.17 | $417.55 | $73,376.34 | $147,915.30 | $86,623.66 |
| 238 | $86,623.66 | $518.65 | $415.07 | $73,894.99 | $148,330.37 | $86,105.01 |
| 239 | $86,105.01 | $521.13 | $412.59 | $74,416.12 | $148,742.96 | $85,583.88 |
| 240 | $85,583.88 | $523.63 | $410.09 | $74,939.75 | $149,153.05 | $85,060.25 |
| 241 | $85,060.25 | $526.14 | $407.58 | $75,465.89 | $149,560.63 | $84,534.11 |
| 242 | $84,534.11 | $528.66 | $405.06 | $75,994.55 | $149,965.69 | $84,005.45 |
| 243 | $84,005.45 | $531.19 | $402.53 | $76,525.75 | $150,368.21 | $83,474.25 |
| 244 | $83,474.25 | $533.74 | $399.98 | $77,059.49 | $150,768.19 | $82,940.51 |
| 245 | $82,940.51 | $536.30 | $397.42 | $77,595.78 | $151,165.62 | $82,404.22 |
| 246 | $82,404.22 | $538.87 | $394.85 | $78,134.65 | $151,560.47 | $81,865.35 |
| 247 | $81,865.35 | $541.45 | $392.27 | $78,676.10 | $151,952.74 | $81,323.90 |
| 248 | $81,323.90 | $544.04 | $389.68 | $79,220.14 | $152,342.42 | $80,779.86 |
| 249 | $80,779.86 | $546.65 | $387.07 | $79,766.79 | $152,729.49 | $80,233.21 |
| 250 | $80,233.21 | $549.27 | $384.45 | $80,316.06 | $153,113.94 | $79,683.94 |
| 251 | $79,683.94 | $551.90 | $381.82 | $80,867.96 | $153,495.76 | $79,132.04 |
| 252 | $79,132.04 | $554.55 | $379.17 | $81,422.51 | $153,874.93 | $78,577.49 |
| 253 | $78,577.49 | $557.20 | $376.52 | $81,979.71 | $154,251.45 | $78,020.29 |
| 254 | $78,020.29 | $559.87 | $373.85 | $82,539.58 | $154,625.30 | $77,460.42 |
| 255 | $77,460.42 | $562.56 | $371.16 | $83,102.14 | $154,996.46 | $76,897.86 |
| 256 | $76,897.86 | $565.25 | $368.47 | $83,667.39 | $155,364.93 | $76,332.61 |
| 257 | $76,332.61 | $567.96 | $365.76 | $84,235.35 | $155,730.69 | $75,764.65 |
| 258 | $75,764.65 | $570.68 | $363.04 | $84,806.03 | $156,093.73 | $75,193.97 |
| 259 | $75,193.97 | $573.42 | $360.30 | $85,379.45 | $156,454.03 | $74,620.55 |
| 260 | $74,620.55 | $576.16 | $357.56 | $85,955.61 | $156,811.59 | $74,044.39 |
| 261 | $74,044.39 | $578.92 | $354.80 | $86,534.53 | $157,166.39 | $73,465.47 |
| 262 | $73,465.47 | $581.70 | $352.02 | $87,116.23 | $157,518.41 | $72,883.77 |
| 263 | $72,883.77 | $584.49 | $349.23 | $87,700.72 | $157,867.64 | $72,299.28 |
| 264 | $72,299.28 | $587.29 | $346.43 | $88,288.00 | $158,214.08 | $71,712.00 |
| 265 | $71,712.00 | $590.10 | $343.62 | $88,878.10 | $158,557.70 | $71,121.90 |
| 266 | $71,121.90 | $592.93 | $340.79 | $89,471.03 | $158,898.49 | $70,528.97 |
| 267 | $70,528.97 | $595.77 | $337.95 | $90,066.80 | $159,236.44 | $69,933.20 |
| 268 | $69,933.20 | $598.62 | $335.10 | $90,665.42 | $159,571.54 | $69,334.58 |
| 269 | $69,334.58 | $601.49 | $332.23 | $91,266.91 | $159,903.77 | $68,733.09 |
| 270 | $68,733.09 | $604.37 | $329.35 | $91,871.29 | $160,233.11 | $68,128.71 |
| 271 | $68,128.71 | $607.27 | $326.45 | $92,478.56 | $160,559.56 | $67,521.44 |
| 272 | $67,521.44 | $610.18 | $323.54 | $93,088.74 | $160,883.10 | $66,911.26 |
| 273 | $66,911.26 | $613.10 | $320.62 | $93,701.84 | $161,203.72 | $66,298.16 |
| 274 | $66,298.16 | $616.04 | $317.68 | $94,317.88 | $161,521.40 | $65,682.12 |
| 275 | $65,682.12 | $618.99 | $314.73 | $94,936.88 | $161,836.12 | $65,063.12 |
| 276 | $65,063.12 | $621.96 | $311.76 | $95,558.84 | $162,147.88 | $64,441.16 |
| 277 | $64,441.16 | $624.94 | $308.78 | $96,183.78 | $162,456.66 | $63,816.22 |
| 278 | $63,816.22 | $627.93 | $305.79 | $96,811.71 | $162,762.45 | $63,188.29 |
| 279 | $63,188.29 | $630.94 | $302.78 | $97,442.65 | $163,065.23 | $62,557.35 |
| 280 | $62,557.35 | $633.97 | $299.75 | $98,076.62 | $163,364.98 | $61,923.38 |
| 281 | $61,923.38 | $637.00 | $296.72 | $98,713.62 | $163,661.70 | $61,286.38 |
| 282 | $61,286.38 | $640.06 | $293.66 | $99,353.68 | $163,955.36 | $60,646.32 |
| 283 | $60,646.32 | $643.12 | $290.60 | $99,996.80 | $164,245.96 | $60,003.20 |
| 284 | $60,003.20 | $646.20 | $287.52 | $100,643.01 | $164,533.47 | $59,356.99 |
| 285 | $59,356.99 | $649.30 | $284.42 | $101,292.31 | $164,817.89 | $58,707.69 |
| 286 | $58,707.69 | $652.41 | $281.31 | $101,944.72 | $165,099.20 | $58,055.28 |
| 287 | $58,055.28 | $655.54 | $278.18 | $102,600.26 | $165,377.38 | $57,399.74 |
| 288 | $57,399.74 | $658.68 | $275.04 | $103,258.94 | $165,652.42 | $56,741.06 |
| 289 | $56,741.06 | $661.84 | $271.88 | $103,920.77 | $165,924.31 | $56,079.23 |
| 290 | $56,079.23 | $665.01 | $268.71 | $104,585.78 | $166,193.02 | $55,414.22 |

TABLE 2d-continued

CONVENTIONAL LOAN AMORTIZATION SCHEDULE

LOAN AMOUNT $160,000.00
INTEREST RATE 5.75%
TOTAL NUMBER OF PAYMENTS 360
PAYMENT $933.72

| PMT | BEGINNING LOAN BALANCE | PRINCIPAL | INTEREST | CUMMULATIVE PRINCIPAL | CUMMULATIVE INTEREST | LOAN BALANCE |
|---|---|---|---|---|---|---|
| 291 | $55,414.22 | $668.19 | $265.53 | $105,253.97 | $166,458.55 | $54,746.03 |
| 292 | $54,746.03 | $671.40 | $262.32 | $105,925.37 | $166,720.87 | $54,074.63 |
| 293 | $54,074.63 | $674.61 | $259.11 | $106,599.98 | $166,979.98 | $53,400.02 |
| 294 | $53,400.02 | $677.84 | $255.88 | $107,277.83 | $167,235.85 | $52,722.17 |
| 295 | $52,722.17 | $681.09 | $252.63 | $107,958.92 | $167,488.48 | $52,041.08 |
| 296 | $52,041.08 | $684.36 | $249.36 | $108,643.28 | $167,737.84 | $51,356.72 |
| 297 | $51,356.72 | $687.64 | $246.08 | $109,330.91 | $167,983.93 | $50,669.09 |
| 298 | $50,669.09 | $690.93 | $242.79 | $110,021.84 | $168,226.72 | $49,978.16 |
| 299 | $49,978.16 | $694.24 | $239.48 | $110,716.08 | $168,466.20 | $49,283.92 |
| 300 | $49,283.92 | $697.57 | $236.15 | $111,413.65 | $168,702.35 | $48,586.35 |
| 301 | $48,586.35 | $700.91 | $232.81 | $112,114.56 | $168,935.16 | $47,885.44 |
| 302 | $47,885.44 | $704.27 | $229.45 | $112,818.83 | $169,164.61 | $47,181.17 |
| 303 | $47,181.17 | $707.64 | $226.08 | $113,526.47 | $169,390.69 | $46,473.53 |
| 304 | $46,473.53 | $711.03 | $222.69 | $114,237.51 | $169,613.37 | $45,762.49 |
| 305 | $45,762.49 | $714.44 | $219.28 | $114,951.95 | $169,832.65 | $45,048.05 |
| 306 | $45,048.05 | $717.86 | $215.86 | $115,669.81 | $170,048.51 | $44,330.19 |
| 307 | $44,330.19 | $721.30 | $212.42 | $116,391.12 | $170,260.92 | $43,608.88 |
| 308 | $43,608.88 | $724.76 | $208.96 | $117,115.88 | $170,469.88 | $42,884.12 |
| 309 | $42,884.12 | $728.23 | $205.49 | $117,844.11 | $170,675.37 | $42,155.89 |
| 310 | $42,155.89 | $731.72 | $202.00 | $118,575.84 | $170,877.36 | $41,424.16 |
| 311 | $41,424.16 | $735.23 | $198.49 | $119,311.07 | $171,075.85 | $40,688.93 |
| 312 | $40,688.93 | $738.75 | $194.97 | $120,049.82 | $171,270.82 | $39,950.18 |
| 313 | $39,950.18 | $742.29 | $191.43 | $120,792.11 | $171,462.25 | $39,207.89 |
| 314 | $39,207.89 | $745.85 | $187.87 | $121,537.96 | $171,650.12 | $38,462.04 |
| 315 | $38,462.04 | $749.42 | $184.30 | $122,287.38 | $171,834.42 | $37,712.62 |
| 316 | $37,712.62 | $753.01 | $180.71 | $123,040.39 | $172,015.13 | $36,959.61 |
| 317 | $36,959.61 | $756.62 | $177.10 | $123,797.02 | $172,192.22 | $36,202.98 |
| 318 | $36,202.98 | $760.25 | $173.47 | $124,557.26 | $172,365.70 | $35,442.74 |
| 319 | $35,442.74 | $763.89 | $169.83 | $125,321.15 | $172,535.53 | $34,678.85 |
| 320 | $34,678.85 | $767.55 | $166.17 | $126,088.70 | $172,701.70 | $33,911.30 |
| 321 | $33,911.30 | $771.23 | $162.49 | $126,859.93 | $172,864.19 | $33,140.07 |
| 322 | $33,140.07 | $774.92 | $158.80 | $127,634.86 | $173,022.98 | $32,365.14 |
| 323 | $32,365.14 | $778.64 | $155.08 | $128,413.49 | $173,178.07 | $31,586.51 |
| 324 | $31,586.51 | $782.37 | $151.35 | $129,195.86 | $173,329.42 | $30,804.14 |
| 325 | $30,804.14 | $786.12 | $147.60 | $129,981.98 | $173,477.02 | $30,018.02 |
| 326 | $30,018.02 | $789.88 | $143.84 | $130,771.86 | $173,620.86 | $29,228.14 |
| 327 | $29,228.14 | $793.67 | $140.05 | $131,565.53 | $173,760.91 | $28,434.47 |
| 328 | $28,434.47 | $797.47 | $136.25 | $132,363.00 | $173,897.16 | $27,637.00 |
| 329 | $27,637.00 | $801.29 | $132.43 | $133,164.30 | $174,029.58 | $26,835.70 |
| 330 | $26,835.70 | $805.13 | $128.59 | $133,969.43 | $174,158.17 | $26,030.57 |
| 331 | $26,030.57 | $808.99 | $124.73 | $134,778.42 | $174,282.90 | $25,221.58 |
| 332 | $25,221.58 | $812.87 | $120.85 | $135,591.28 | $174,403.76 | $24,408.72 |
| 333 | $24,408.72 | $816.76 | $116.96 | $136,408.05 | $174,520.71 | $23,591.95 |
| 334 | $23,591.95 | $820.68 | $113.04 | $137,228.72 | $174,633.76 | $22,771.28 |
| 335 | $22,771.28 | $824.61 | $109.11 | $138,053.33 | $174,742.87 | $21,946.67 |
| 336 | $21,946.67 | $828.56 | $105.16 | $138,881.89 | $174,848.03 | $21,118.11 |
| 337 | $21,118.11 | $832.53 | $101.19 | $139,714.42 | $174,949.22 | $20,285.58 |
| 338 | $20,285.58 | $836.52 | $97.20 | $140,550.93 | $175,046.43 | $19,449.07 |
| 339 | $19,449.07 | $840.53 | $93.19 | $141,391.49 | $175,139.62 | $18,608.54 |
| 340 | $18,608.54 | $844.55 | $89.17 | $142,236.02 | $175,228.78 | $17,763.98 |
| 341 | $17,763.98 | $848.60 | $85.12 | $143,084.62 | $175,313.90 | $16,915.38 |
| 342 | $16,915.38 | $852.67 | $81.05 | $143,937.28 | $175,394.96 | $16,062.72 |
| 343 | $16,062.72 | $856.75 | $76.97 | $144,794.04 | $175,471.92 | $15,205.96 |
| 344 | $15,205.96 | $860.86 | $72.86 | $145,654.89 | $175,544.79 | $14,345.11 |
| 345 | $14,345.11 | $864.98 | $68.74 | $146,519.88 | $175,613.52 | $13,480.12 |
| 346 | $13,480.12 | $869.13 | $64.59 | $147,389.01 | $175,678.11 | $12,610.99 |
| 347 | $12,610.99 | $873.29 | $60.43 | $148,262.30 | $175,738.54 | $11,737.70 |
| 348 | $11,737.70 | $877.48 | $56.24 | $149,139.77 | $175,794.79 | $10,860.23 |
| 349 | $10,860.23 | $881.68 | $52.04 | $150,021.46 | $175,846.82 | $9,978.54 |
| 350 | $9,978.54 | $885.91 | $47.81 | $150,907.36 | $175,894.64 | $9,092.64 |
| 351 | $9,092.64 | $890.15 | $43.57 | $151,797.51 | $175,938.21 | $8,202.49 |
| 352 | $8,202.49 | $894.42 | $39.30 | $152,691.93 | $175,977.51 | $7,308.07 |
| 353 | $7,308.07 | $898.70 | $35.02 | $153,590.63 | $176,012.53 | $6,409.37 |
| 354 | $6,409.37 | $903.01 | $30.71 | $154,493.64 | $176,043.24 | $5,506.36 |
| 355 | $5,506.36 | $907.34 | $26.38 | $155,400.98 | $176,069.62 | $4,599.02 |
| 356 | $4,599.02 | $911.68 | $22.04 | $156,312.66 | $176,091.66 | $3,687.34 |
| 357 | $3,687.34 | $916.05 | $17.67 | $157,228.71 | $176,109.33 | $2,771.29 |
| 358 | $2,771.29 | $920.44 | $13.28 | $158,149.15 | $176,122.61 | $1,850.85 |
| 359 | $1,850.85 | $924.85 | $8.87 | $159,074.00 | $176,131.48 | $926.00 |
| 360 | $926.00 | $929.28 | $4.44 | $160,003.28 | $176,135.92 | −$3.28 |

TABLE 3a

Combined Loan & Investment System
Comparison Report Input (Systematic and Lump Sum Investment)

| | |
|---|---|
| HOME VALUE: | $250,000.00 |
| EXISTING LOAN AMOUNT: | $160,000.00 |
| CONVENTIONAL LOAN INTEREST RATE: | 5.75% |
| PAYMENTS PER YEAR: | 12 |
| NUMBER OF REGULAR PAYMENTS: | 360 |
| PAYMENT AMOUNT: | $933.72 |
| INTEREST ONLY LOAN RATE: | 5.25% |
| INVESTMENT RATE OF RETURN: | 7.00% |
| INCOME TAX RATE: | 25.00% |
| MAXIMUM LOAN TO VALUE: | 80.00% |

TABLE 3b

Combined Loan and Investment System Comparison Report (Systematic and Lump Sum Investment)

| CONVENTIONAL LOAN RESULTS | | COMBINED LOAN & INVESTMENT SYSTEM RESULTS | | DIFFERENCE |
|---|---|---|---|---|
| ANNUAL LOAN INTEREST RATE: | 5.75% | ANNUAL INTEREST ONLY LOAN RATE: | 5.25% | −0.50% |
| NUMBER OF REGULAR PAYMENTS: | 360 | NUMBER OF REGULAR PAYMENTS: | 360 | EQUAL |
| REGULAR PAYMENT AMOUNT: | 933.72 | REGULAR PAYMENT AMOUNT: | $933.72 | EQUAL |
| TOTAL PAYMENTS AT END OF TERM: | $336,139.20 | TOTAL PAYMENTS AT END OF TERM: | $336,139.20 | EQUAL |
| MAXIMUM BANK LTV PERCENT: | 80.00% | MAXIMUM BANK LTV PERCENT: | 80.00% | EQUAL |
| | | INVESTMENT RATE OF RETURN: | 7.00% | 7.00% |
| MAXIMUM LOAN TO VALUE: | $200,000.00 | MAXIMUM LOAN TO VALUE: | $200,000.00 | $200,000.00 |
| PRINCIPAL BORROWED: | $160,000.00 | PRINCIPAL BORROWED: | $200,000.00 | $40,000.00 |
| TOTAL INTEREST PAID | $176,139.20 | TOTAL INTEREST PAID: | $315,000.00 | $138,860.80 |
| LOAN PRINCIPAL AND INTEREST REPAID: | $336,139.20 | LOAN PRINCIPAL AND INTEREST REPAID: | $515,000.00 | $178,860.80 |
| | | SYSTEMATIC INVESTMENT: | $58.72 | $58.72 |
| | | LUMP SUM INVESTMENT: | $40,000.00 | $40,000.00 |
| | | LESS: | | |
| | | INVESTMENT VALUE AT END OF PERIOD: | $396,714.48 | $396,714.48 |
| NET AMOUNT PAID OUT OF POCKET: | $336,139.20 | NET AMOUNT PAID OUT OF POCKET: | $139,424.72 | ($196,714.48) |
| NET ANNUAL PERCENTAGE RATE: | 5.75% | NET ANNUAL PERCENTAGE RATE: | 2.32% | −3.43% |
| INVESTMENT VALUE AFTER LOAN PAYOFF: | $0.00 | INVESTMENT VALUE AFTER LOAN PAYOFF: | $196,714.48 | $196,714.48 |
| TAX SAVINGS: | $44,034.80 | TAX SAVINGS: | $78,750.00 | $34,715.20 |
| TERM TO REACH LOAN PAYOFF: | 360 | TERM TO REACH LOAN PAYOFF: | 254 | −106 |

TABLE 3c

Combined Loan and Investment System Comparison Report Data (Systematic and Lump Sum Investment)

| | | |
|---|---|---|
| LOAN | $200,000 | |
| RATE | 5.25% | |
| LUMP SUM INVESTMENT | $40,000.00 | |
| SYSTEMATIC INVESTMENT | $58.72 | |

| | COST OF BORROWING | | | INVESTMENT VALUE | | | | |
|---|---|---|---|---|---|---|---|---|
| DATE | MONTHLY INTEREST PAYMENT | TOTAL INTEREST PAID | CUMMULATIVE INVESTMENT AMOUNT | 1% | 2% | 3% | 4% | 5% |
| 1 | $875.00 | $875.00 | $40,058.72 | $40,092.10 | $40,125.48 | $40,158.87 | $40,192.25 | $40,225.63 |
| 2 | $875.00 | $1,750.00 | $40,117.44 | $40,184.28 | $40,251.18 | $40,318.13 | $40,385.14 | $40,452.20 |
| 3 | $875.00 | $2,625.00 | $40,176.16 | $40,276.54 | $40,377.08 | $40,477.79 | $40,578.67 | $40,679.72 |
| 4 | $875.00 | $3,500.00 | $40,234.88 | $40,368.87 | $40,503.19 | $40,637.85 | $40,772.85 | $40,908.18 |
| 5 | $875.00 | $4,375.00 | $40,293.60 | $40,461.28 | $40,629.52 | $40,798.32 | $40,967.68 | $41,137.60 |
| 6 | $875.00 | $5,250.00 | $40,352.32 | $40,553.77 | $40,756.05 | $40,959.18 | $41,163.15 | $41,367.97 |
| 7 | $875.00 | $6,125.00 | $40,411.04 | $40,646.33 | $40,882.80 | $41,120.44 | $41,359.28 | $41,599.30 |
| 8 | $875.00 | $7,000.00 | $40,469.76 | $40,738.97 | $41,009.75 | $41,282.11 | $41,556.06 | $41,831.59 |
| 9 | $875.00 | $7,875.00 | $40,528.48 | $40,831.69 | $41,136.92 | $41,444.18 | $41,753.49 | $42,064.86 |
| 10 | $875.00 | $8,750.00 | $40,587.20 | $40,924.48 | $41,264.30 | $41,606.62 | $41,951.59 | $42,299.09 |
| 11 | $875.00 | $9,625.00 | $40,645.92 | $41,017.36 | $41,391.89 | $41,769.54 | $42,150.34 | $42,534.30 |
| 12 | $875.00 | $10,500.00 | $40,704.64 | $41,110.31 | $41,519.69 | $41,932.83 | $42,349.76 | $42,770.49 |
| 13 | $875.00 | $11,375.00 | $40,763.36 | $41,203.33 | $41,647.71 | $42,096.53 | $42,549.84 | $43,007.67 |
| 14 | $875.00 | $12,250.00 | $40,822.08 | $41,296.44 | $41,775.94 | $42,260.64 | $42,750.59 | $43,245.83 |
| 15 | $875.00 | $13,125.00 | $40,880.80 | $41,389.62 | $41,904.39 | $42,425.16 | $42,952.00 | $43,484.99 |
| 16 | $875.00 | $14,000.00 | $40,939.52 | $41,482.88 | $42,033.05 | $42,590.09 | $43,154.09 | $43,725.14 |
| 17 | $875.00 | $14,875.00 | $40,998.24 | $41,576.22 | $42,161.92 | $42,755.43 | $43,356.86 | $43,966.29 |
| 18 | $875.00 | $15,750.00 | $41,056.96 | $41,669.64 | $42,291.01 | $42,921.19 | $43,560.30 | $44,208.45 |
| 19 | $875.00 | $16,625.00 | $41,115.68 | $41,763.13 | $42,420.31 | $43,087.36 | $43,764.41 | $44,451.62 |
| 20 | $875.00 | $17,500.00 | $41,174.40 | $41,856.70 | $42,549.83 | $43,253.94 | $43,969.21 | $44,695.80 |
| 21 | $875.00 | $18,375.00 | $41,233.12 | $41,950.35 | $42,679.56 | $43,420.94 | $44,174.69 | $44,940.99 |
| 22 | $875.00 | $19,250.00 | $41,291.84 | $42,044.08 | $42,809.51 | $43,588.36 | $44,380.85 | $45,187.21 |
| 23 | $875.00 | $20,125.00 | $41,350.56 | $42,137.88 | $42,939.68 | $43,756.20 | $44,587.71 | $45,434.46 |

TABLE 3c-continued

Combined Loan and Investment System Comparison Report Data (Systematic and Lump Sum Investment)

|  |  | LOAN | $200,000 |  |  |  |  |
|--|--|------|----------|--|--|--|--|
|  |  | RATE | 5.25% |  |  |  |  |
|  |  | LUMP SUM INVESTMENT | $40,000.00 |  |  |  |  |
|  |  | SYSTEMATIC INVESTMENT | $58.72 |  |  |  |  |

| | | | | | | | |
|---|---|---|---|---|---|---|---|
| 24 | $875.00 | $21,000.00 | $41,409.28 | $42,231.77 | $43,070.06 | $43,924.46 | $44,795.25 | $45,682.73 |
| 25 | $875.00 | $21,875.00 | $41,468.00 | $42,325.73 | $43,200.66 | $44,093.14 | $45,003.48 | $45,932.04 |
| 26 | $875.00 | $22,750.00 | $41,526.72 | $42,419.77 | $43,331.48 | $44,262.24 | $45,212.41 | $46,182.39 |
| 27 | $875.00 | $23,625.00 | $41,585.44 | $42,513.89 | $43,462.52 | $44,431.76 | $45,422.03 | $46,433.78 |
| 28 | $875.00 | $24,500.00 | $41,644.16 | $42,608.09 | $43,593.78 | $44,601.70 | $45,632.35 | $46,686.22 |
| 29 | $875.00 | $25,375.00 | $41,702.88 | $42,702.36 | $43,725.25 | $44,772.07 | $45,843.38 | $46,939.71 |
| 30 | $875.00 | $26,250.00 | $41,761.60 | $42,796.72 | $43,856.94 | $44,942.87 | $46,055.10 | $47,194.26 |
| 31 | $875.00 | $27,125.00 | $41,820.32 | $42,891.15 | $43,988.86 | $45,114.10 | $46,267.54 | $47,449.87 |
| 32 | $875.00 | $28,000.00 | $41,879.04 | $42,985.66 | $44,120.99 | $45,285.75 | $46,480.68 | $47,706.54 |
| 33 | $875.00 | $28,875.00 | $41,937.76 | $43,080.25 | $44,253.34 | $45,457.83 | $46,694.53 | $47,964.28 |
| 34 | $875.00 | $29,750.00 | $41,996.48 | $43,174.92 | $44,385.92 | $45,630.34 | $46,909.09 | $48,223.10 |
| 35 | $875.00 | $30,625.00 | $42,055.20 | $43,269.67 | $44,518.71 | $45,803.28 | $47,124.37 | $48,482.99 |
| 36 | $875.00 | $31,500.00 | $42,113.92 | $43,364.50 | $44,651.73 | $45,976.66 | $47,340.37 | $48,743.97 |
| 37 | $875.00 | $32,375.00 | $42,172.64 | $43,459.40 | $44,784.96 | $46,150.47 | $47,557.09 | $49,006.03 |
| 38 | $875.00 | $33,250.00 | $42,231.36 | $43,554.39 | $44,918.42 | $46,324.71 | $47,774.53 | $49,269.19 |
| 39 | $875.00 | $34,125.00 | $42,290.08 | $43,649.45 | $45,052.10 | $46,499.39 | $47,992.69 | $49,533.44 |
| 40 | $875.00 | $35,000.00 | $42,348.80 | $43,744.59 | $45,186.01 | $46,674.50 | $48,211.58 | $49,798.79 |
| 41 | $875.00 | $35,875.00 | $42,407.52 | $43,839.82 | $45,320.14 | $46,850.06 | $48,431.20 | $50,065.25 |
| 42 | $875.00 | $36,750.00 | $42,466.24 | $43,935.12 | $45,454.49 | $47,026.05 | $48,651.56 | $50,332.82 |
| 43 | $875.00 | $37,625.00 | $42,524.96 | $44,030.50 | $45,589.06 | $47,202.48 | $48,872.64 | $50,601.51 |
| 44 | $875.00 | $38,500.00 | $42,583.68 | $44,125.96 | $45,723.86 | $47,379.35 | $49,094.47 | $50,871.31 |
| 45 | $875.00 | $39,375.00 | $42,642.40 | $44,221.50 | $45,858.89 | $47,556.67 | $49,317.03 | $51,142.24 |
| 46 | $875.00 | $40,250.00 | $42,701.12 | $44,317.12 | $45,994.14 | $47,734.43 | $49,540.34 | $51,414.30 |
| 47 | $875.00 | $41,125.00 | $42,759.84 | $44,412.82 | $46,129.61 | $47,912.63 | $49,764.39 | $51,687.49 |
| 48 | $875.00 | $42,000.00 | $42,818.56 | $44,508.60 | $46,265.31 | $48,091.28 | $49,989.18 | $51,961.82 |
| 49 | $875.00 | $42,875.00 | $42,877.28 | $44,604.46 | $46,401.24 | $48,270.37 | $50,214.73 | $52,237.29 |
| 50 | $875.00 | $43,750.00 | $42,936.00 | $44,700.40 | $46,537.39 | $48,449.92 | $50,441.03 | $52,513.91 |
| 51 | $875.00 | $44,625.00 | $42,994.72 | $44,796.42 | $46,673.77 | $48,629.91 | $50,668.08 | $52,791.68 |
| 52 | $875.00 | $45,500.00 | $43,053.44 | $44,892.52 | $46,810.38 | $48,810.35 | $50,895.89 | $53,070.61 |
| 53 | $875.00 | $46,375.00 | $43,112.16 | $44,988.70 | $46,947.21 | $48,991.24 | $51,124.46 | $53,350.71 |
| 54 | $875.00 | $47,250.00 | $43,170.88 | $45,084.96 | $47,084.28 | $49,172.59 | $51,353.79 | $53,631.97 |
| 55 | $875.00 | $48,125.00 | $43,229.60 | $45,181.30 | $47,221.57 | $49,354.38 | $51,583.89 | $53,914.40 |
| 56 | $875.00 | $49,000.00 | $43,288.32 | $45,277.72 | $47,359.09 | $49,536.64 | $51,814.75 | $54,198.00 |
| 57 | $875.00 | $49,875.00 | $43,347.04 | $45,374.22 | $47,496.84 | $49,719.35 | $52,046.38 | $54,482.79 |
| 58 | $875.00 | $50,750.00 | $43,405.76 | $45,470.80 | $47,634.82 | $49,902.51 | $52,278.78 | $54,768.77 |
| 59 | $875.00 | $51,625.00 | $43,464.48 | $45,567.46 | $47,773.03 | $50,086.13 | $52,511.96 | $55,055.94 |
| 60 | $875.00 | $52,500.00 | $43,523.20 | $45,664.20 | $47,911.47 | $50,270.22 | $52,745.92 | $55,344.30 |
| 61 | $875.00 | $53,375.00 | $43,581.92 | $45,761.02 | $48,050.14 | $50,454.76 | $52,980.65 | $55,633.87 |
| 62 | $875.00 | $54,250.00 | $43,640.64 | $45,857.93 | $48,189.04 | $50,639.76 | $53,216.17 | $55,924.64 |
| 63 | $875.00 | $55,125.00 | $43,699.36 | $45,954.91 | $48,328.17 | $50,825.23 | $53,452.47 | $56,216.63 |
| 64 | $875.00 | $56,000.00 | $43,758.08 | $46,051.98 | $48,467.54 | $51,011.16 | $53,689.56 | $56,509.83 |
| 65 | $875.00 | $56,875.00 | $43,816.80 | $46,149.12 | $48,607.13 | $51,197.55 | $53,927.44 | $56,804.25 |
| 66 | $875.00 | $57,750.00 | $43,875.52 | $46,246.35 | $48,746.96 | $51,384.41 | $54,166.12 | $57,099.90 |
| 67 | $875.00 | $58,625.00 | $43,934.24 | $46,343.66 | $48,887.03 | $51,571.74 | $54,405.59 | $57,396.78 |
| 68 | $875.00 | $59,500.00 | $43,992.96 | $46,441.04 | $49,027.32 | $51,759.54 | $54,645.86 | $57,694.90 |
| 69 | $875.00 | $60,375.00 | $44,051.68 | $46,538.51 | $49,167.85 | $51,947.80 | $54,886.92 | $57,994.26 |
| 70 | $875.00 | $61,250.00 | $44,110.40 | $46,636.07 | $49,308.62 | $52,136.54 | $55,128.80 | $58,294.86 |
| 71 | $875.00 | $62,125.00 | $44,169.12 | $46,733.70 | $49,449.62 | $52,325.75 | $55,371.47 | $58,596.72 |
| 72 | $875.00 | $63,000.00 | $44,227.84 | $46,831.41 | $49,590.85 | $52,515.43 | $55,614.96 | $58,899.84 |
| 73 | $875.00 | $63,875.00 | $44,286.56 | $46,929.21 | $49,732.32 | $52,705.58 | $55,859.26 | $59,204.22 |
| 74 | $875.00 | $64,750.00 | $44,345.28 | $47,027.08 | $49,874.02 | $52,896.22 | $56,104.37 | $59,509.87 |
| 75 | $875.00 | $65,625.00 | $44,404.00 | $47,125.04 | $50,015.97 | $53,087.32 | $56,350.30 | $59,816.79 |
| 76 | $875.00 | $66,500.00 | $44,462.72 | $47,223.08 | $50,158.14 | $53,278.91 | $56,597.05 | $60,124.99 |
| 77 | $875.00 | $67,375.00 | $44,521.44 | $47,321.20 | $50,300.56 | $53,470.97 | $56,844.63 | $60,434.48 |
| 78 | $875.00 | $68,250.00 | $44,580.16 | $47,419.41 | $50,443.21 | $53,663.52 | $57,093.03 | $60,745.26 |
| 79 | $875.00 | $69,125.00 | $44,638.88 | $47,517.69 | $50,586.10 | $53,856.54 | $57,342.25 | $61,057.33 |
| 80 | $875.00 | $70,000.00 | $44,697.60 | $47,616.06 | $50,729.23 | $54,050.05 | $57,592.31 | $61,370.70 |
| 81 | $875.00 | $70,875.00 | $44,756.32 | $47,714.51 | $50,872.60 | $54,244.04 | $57,843.20 | $61,685.37 |
| 82 | $875.00 | $71,750.00 | $44,815.04 | $47,813.04 | $51,016.20 | $54,438.52 | $58,094.92 | $62,001.36 |
| 83 | $875.00 | $72,625.00 | $44,873.76 | $47,911.65 | $51,160.05 | $54,633.48 | $58,347.49 | $62,318.66 |
| 84 | $875.00 | $73,500.00 | $44,932.48 | $48,010.35 | $51,304.13 | $54,828.93 | $58,600.90 | $62,637.29 |
| 85 | $875.00 | $74,375.00 | $44,991.20 | $48,109.12 | $51,448.46 | $55,024.87 | $58,855.15 | $62,957.24 |
| 86 | $875.00 | $75,250.00 | $45,049.92 | $48,207.98 | $51,593.02 | $55,221.30 | $59,110.25 | $63,278.53 |
| 87 | $875.00 | $76,125.00 | $45,108.64 | $48,306.93 | $51,737.83 | $55,418.22 | $59,366.20 | $63,601.15 |
| 88 | $875.00 | $77,000.00 | $45,167.36 | $48,405.95 | $51,882.87 | $55,615.63 | $59,623.00 | $63,925.12 |
| 89 | $875.00 | $77,875.00 | $45,226.08 | $48,505.06 | $52,028.16 | $55,813.54 | $59,880.66 | $64,250.44 |
| 90 | $875.00 | $78,750.00 | $45,284.80 | $48,604.25 | $52,173.70 | $56,011.94 | $60,139.18 | $64,577.12 |
| 91 | $875.00 | $79,625.00 | $45,343.52 | $48,703.52 | $52,319.47 | $56,210.84 | $60,398.56 | $64,905.15 |
| 92 | $875.00 | $80,500.00 | $45,402.24 | $48,802.88 | $52,465.49 | $56,410.23 | $60,658.80 | $65,234.56 |
| 93 | $875.00 | $81,375.00 | $45,460.96 | $48,902.31 | $52,611.75 | $56,610.12 | $60,919.91 | $65,565.33 |
| 94 | $875.00 | $82,250.00 | $45,519.68 | $49,001.83 | $52,758.25 | $56,810.51 | $61,181.90 | $65,897.48 |
| 95 | $875.00 | $83,125.00 | $45,578.40 | $49,101.44 | $52,905.00 | $57,011.41 | $61,444.75 | $66,231.02 |
| 96 | $875.00 | $84,000.00 | $45,637.12 | $49,201.12 | $53,051.99 | $57,212.80 | $61,708.48 | $66,565.95 |

TABLE 3c-continued

Combined Loan and Investment System Comparison Report Data (Systematic and Lump Sum Investment)

|  | LOAN | $200,000 |
|---|---|---|
|  | RATE | 5.25% |
|  | LUMP SUM INVESTMENT | $40,000.00 |
|  | SYSTEMATIC INVESTMENT | $58.72 |

| | | | | | | | | |
|---|---|---|---|---|---|---|---|---|
| 97 | $875.00 | $84,875.00 | $45,695.84 | $49,300.89 | $53,199.23 | $57,414.70 | $61,973.09 | $66,902.27 |
| 98 | $875.00 | $85,750.00 | $45,754.56 | $49,400.75 | $53,346.71 | $57,617.10 | $62,238.59 | $67,240.00 |
| 99 | $875.00 | $86,625.00 | $45,813.28 | $49,500.68 | $53,494.44 | $57,820.01 | $62,504.96 | $67,579.13 |
| 100 | $875.00 | $87,500.00 | $45,872.00 | $49,600.70 | $53,642.42 | $58,023.43 | $62,772.23 | $67,919.67 |
| 101 | $875.00 | $88,375.00 | $45,930.72 | $49,700.81 | $53,790.64 | $58,227.36 | $63,040.39 | $68,261.63 |
| 102 | $875.00 | $89,250.00 | $45,989.44 | $49,800.99 | $53,939.11 | $58,431.79 | $63,309.44 | $68,605.02 |
| 103 | $875.00 | $90,125.00 | $46,048.16 | $49,901.26 | $54,087.82 | $58,636.74 | $63,579.38 | $68,949.84 |
| 104 | $875.00 | $91,000.00 | $46,106.88 | $50,001.62 | $54,236.79 | $58,842.20 | $63,850.23 | $69,296.10 |
| 105 | $875.00 | $91,875.00 | $46,165.60 | $50,102.05 | $54,386.00 | $59,048.17 | $64,121.98 | $69,643.80 |
| 106 | $875.00 | $92,750.00 | $46,224.32 | $50,202.57 | $54,535.46 | $59,254.66 | $64,394.64 | $69,992.94 |
| 107 | $875.00 | $93,625.00 | $46,283.04 | $50,303.18 | $54,685.17 | $59,461.66 | $64,668.20 | $70,343.54 |
| 108 | $875.00 | $94,500.00 | $46,341.76 | $50,403.87 | $54,835.13 | $59,669.18 | $64,942.68 | $70,695.61 |
| 109 | $875.00 | $95,375.00 | $46,400.48 | $50,504.64 | $54,985.34 | $59,877.22 | $65,218.07 | $71,049.14 |
| 110 | $875.00 | $96,250.00 | $46,459.20 | $50,605.49 | $55,135.80 | $60,085.78 | $65,494.38 | $71,404.14 |
| 111 | $875.00 | $97,125.00 | $46,517.92 | $50,706.43 | $55,286.51 | $60,294.86 | $65,771.61 | $71,760.62 |
| 112 | $875.00 | $98,000.00 | $46,576.64 | $50,807.46 | $55,437.48 | $60,504.47 | $66,049.76 | $72,118.59 |
| 113 | $875.00 | $98,875.00 | $46,635.36 | $50,908.57 | $55,588.69 | $60,714.59 | $66,328.84 | $72,478.05 |
| 114 | $875.00 | $99,750.00 | $46,694.08 | $51,009.76 | $55,740.15 | $60,925.25 | $66,608.86 | $72,839.00 |
| 115 | $875.00 | $100,625.00 | $46,752.80 | $51,111.04 | $55,891.87 | $61,136.43 | $66,889.80 | $73,201.47 |
| 116 | $875.00 | $101,500.00 | $46,811.52 | $51,212.40 | $56,043.84 | $61,348.13 | $67,171.68 | $73,565.44 |
| 117 | $875.00 | $102,375.00 | $46,870.24 | $51,313.84 | $56,196.07 | $61,560.37 | $67,454.50 | $73,930.92 |
| 118 | $875.00 | $103,250.00 | $46,928.96 | $51,415.37 | $56,348.55 | $61,773.14 | $67,738.27 | $74,297.93 |
| 119 | $875.00 | $104,125.00 | $46,987.68 | $51,516.99 | $56,501.28 | $61,986.44 | $68,022.98 | $74,666.47 |
| 120 | $875.00 | $105,000.00 | $47,046.40 | $51,618.69 | $56,654.26 | $62,200.27 | $68,308.64 | $75,036.55 |
| 121 | $875.00 | $105,875.00 | $47,105.12 | $51,720.47 | $56,807.51 | $62,414.64 | $68,595.25 | $75,408.16 |
| 122 | $875.00 | $106,750.00 | $47,163.84 | $51,822.34 | $56,961.00 | $62,629.54 | $68,882.82 | $75,781.33 |
| 123 | $875.00 | $107,625.00 | $47,222.56 | $51,924.30 | $57,114.76 | $62,844.98 | $69,171.34 | $76,156.05 |
| 124 | $875.00 | $108,500.00 | $47,281.28 | $52,026.34 | $57,268.77 | $63,060.96 | $69,460.83 | $76,532.33 |
| 125 | $875.00 | $109,375.00 | $47,340.00 | $52,128.46 | $57,423.03 | $63,277.48 | $69,751.28 | $76,910.18 |
| 126 | $875.00 | $110,250.00 | $47,398.72 | $52,230.67 | $57,577.55 | $63,494.54 | $70,042.70 | $77,289.60 |
| 127 | $875.00 | $111,125.00 | $47,457.44 | $52,332.96 | $57,732.33 | $63,712.15 | $70,335.09 | $77,670.61 |
| 128 | $875.00 | $112,000.00 | $47,516.16 | $52,435.34 | $57,887.37 | $63,930.29 | $70,628.46 | $78,053.20 |
| 129 | $875.00 | $112,875.00 | $47,574.88 | $52,537.81 | $58,042.67 | $64,148.99 | $70,922.80 | $78,437.39 |
| 130 | $875.00 | $113,750.00 | $47,633.60 | $52,640.36 | $58,198.23 | $64,368.22 | $71,218.13 | $78,823.18 |
| 131 | $875.00 | $114,625.00 | $47,692.32 | $52,743.00 | $58,354.04 | $64,588.01 | $71,514.43 | $79,210.57 |
| 132 | $875.00 | $115,500.00 | $47,751.04 | $52,845.72 | $58,510.11 | $64,808.35 | $71,811.73 | $79,599.58 |
| 133 | $875.00 | $116,375.00 | $47,809.76 | $52,948.52 | $58,666.45 | $65,029.24 | $72,110.02 | $79,990.21 |
| 134 | $875.00 | $117,250.00 | $47,868.48 | $53,051.42 | $58,823.04 | $65,250.68 | $72,409.30 | $80,382.47 |
| 135 | $875.00 | $118,125.00 | $47,927.20 | $53,154.40 | $58,979.90 | $65,472.67 | $72,709.58 | $80,776.36 |
| 136 | $875.00 | $119,000.00 | $47,985.92 | $53,257.46 | $59,137.02 | $65,695.22 | $73,010.86 | $81,171.89 |
| 137 | $875.00 | $119,875.00 | $48,044.64 | $53,360.61 | $59,294.40 | $65,918.32 | $73,313.15 | $81,569.07 |
| 138 | $875.00 | $120,750.00 | $48,103.36 | $53,463.85 | $59,452.04 | $66,141.99 | $73,616.44 | $81,967.91 |
| 139 | $875.00 | $121,625.00 | $48,162.08 | $53,567.17 | $59,609.94 | $66,366.21 | $73,920.75 | $82,368.40 |
| 140 | $875.00 | $122,500.00 | $48,220.80 | $53,670.58 | $59,768.11 | $66,590.99 | $74,226.06 | $82,770.57 |
| 141 | $875.00 | $123,375.00 | $48,279.52 | $53,774.07 | $59,926.54 | $66,816.33 | $74,532.40 | $83,174.41 |
| 142 | $875.00 | $124,250.00 | $48,338.24 | $53,877.65 | $60,085.24 | $67,042.24 | $74,839.76 | $83,579.94 |
| 143 | $875.00 | $125,125.00 | $48,396.96 | $53,981.32 | $60,244.20 | $67,268.71 | $75,148.14 | $83,987.15 |
| 144 | $875.00 | $126,000.00 | $48,455.68 | $54,085.07 | $60,403.42 | $67,495.75 | $75,457.55 | $84,396.06 |
| 145 | $875.00 | $126,875.00 | $48,514.40 | $54,188.91 | $60,562.91 | $67,723.36 | $75,767.99 | $84,806.68 |
| 146 | $875.00 | $127,750.00 | $48,573.12 | $54,292.84 | $60,722.67 | $67,951.53 | $76,079.46 | $85,219.00 |
| 147 | $875.00 | $128,625.00 | $48,631.84 | $54,396.85 | $60,882.69 | $68,180.28 | $76,391.98 | $85,633.05 |
| 148 | $875.00 | $129,500.00 | $48,690.56 | $54,500.95 | $61,042.98 | $68,409.60 | $76,705.53 | $86,048.82 |
| 149 | $875.00 | $130,375.00 | $48,749.28 | $54,605.14 | $61,203.54 | $68,639.49 | $77,020.14 | $86,466.32 |
| 150 | $875.00 | $131,250.00 | $48,808.00 | $54,709.41 | $61,364.36 | $68,869.95 | $77,335.78 | $86,885.56 |
| 151 | $875.00 | $132,125.00 | $48,866.72 | $54,813.77 | $61,525.45 | $69,101.00 | $77,652.49 | $87,306.55 |
| 152 | $875.00 | $133,000.00 | $48,925.44 | $54,918.22 | $61,686.81 | $69,332.61 | $77,970.24 | $87,729.29 |
| 153 | $875.00 | $133,875.00 | $48,984.16 | $55,022.75 | $61,848.44 | $69,564.81 | $78,289.06 | $88,153.79 |
| 154 | $875.00 | $134,750.00 | $49,042.88 | $55,127.37 | $62,010.34 | $69,797.59 | $78,608.94 | $88,580.06 |
| 155 | $875.00 | $135,625.00 | $49,101.60 | $55,232.08 | $62,172.51 | $70,030.95 | $78,929.89 | $89,008.11 |
| 156 | $875.00 | $136,500.00 | $49,160.32 | $55,336.88 | $62,334.95 | $70,264.90 | $79,251.90 | $89,437.94 |
| 157 | $875.00 | $137,375.00 | $49,219.04 | $55,441.76 | $62,497.66 | $70,499.43 | $79,574.99 | $89,869.57 |
| 158 | $875.00 | $138,250.00 | $49,277.76 | $55,546.73 | $62,660.64 | $70,734.54 | $79,899.16 | $90,302.99 |
| 159 | $875.00 | $139,125.00 | $49,336.48 | $55,651.79 | $62,823.89 | $70,970.24 | $80,224.40 | $90,738.22 |
| 160 | $875.00 | $140,000.00 | $49,395.20 | $55,756.93 | $62,987.42 | $71,206.54 | $80,550.73 | $91,175.26 |
| 161 | $875.00 | $140,875.00 | $49,453.92 | $55,862.17 | $63,151.21 | $71,443.42 | $80,878.15 | $91,614.12 |
| 162 | $875.00 | $141,750.00 | $49,512.64 | $55,967.49 | $63,315.28 | $71,680.90 | $81,206.66 | $92,054.81 |
| 163 | $875.00 | $142,625.00 | $49,571.36 | $56,072.90 | $63,479.63 | $71,918.96 | $81,536.26 | $92,497.33 |
| 164 | $875.00 | $143,500.00 | $49,630.08 | $56,178.39 | $63,644.24 | $72,157.63 | $81,866.97 | $92,941.70 |
| 165 | $875.00 | $144,375.00 | $49,688.80 | $56,283.98 | $63,809.13 | $72,396.89 | $82,198.77 | $93,387.93 |
| 166 | $875.00 | $145,250.00 | $49,747.52 | $56,389.65 | $63,974.30 | $72,636.75 | $82,531.68 | $93,836.01 |
| 167 | $875.00 | $146,125.00 | $49,806.24 | $56,495.41 | $64,139.74 | $72,877.21 | $82,865.71 | $94,285.95 |
| 168 | $875.00 | $147,000.00 | $49,864.96 | $56,601.26 | $64,305.46 | $73,118.27 | $83,200.84 | $94,737.78 |
| 169 | $875.00 | $147,875.00 | $49,923.68 | $56,707.19 | $64,471.45 | $73,359.93 | $83,537.09 | $95,191.48 |

TABLE 3c-continued

Combined Loan and Investment System Comparison Report Data (Systematic and Lump Sum Investment)

|  | LOAN | $200,000 |
|---|---|---|
|  | RATE | 5.25% |
|  | LUMP SUM INVESTMENT | $40,000.00 |
|  | SYSTEMATIC INVESTMENT | $58.72 |

| | | | | | | | | |
|---|---|---|---|---|---|---|---|---|
| 170 | $875.00 | $148,750.00 | $49,982.40 | $56,813.22 | $64,637.72 | $73,602.20 | $83,874.47 | $95,647.08 |
| 171 | $875.00 | $149,625.00 | $50,041.12 | $56,919.33 | $64,804.27 | $73,845.07 | $84,212.96 | $96,104.57 |
| 172 | $875.00 | $150,500.00 | $50,099.84 | $57,025.53 | $64,971.10 | $74,088.55 | $84,552.59 | $96,563.97 |
| 173 | $875.00 | $151,375.00 | $50,158.56 | $57,131.82 | $65,138.20 | $74,332.64 | $84,893.35 | $97,025.29 |
| 174 | $875.00 | $152,250.00 | $50,217.28 | $57,238.20 | $65,305.58 | $74,577.33 | $85,235.24 | $97,488.52 |
| 175 | $875.00 | $153,125.00 | $50,276.00 | $57,344.67 | $65,473.24 | $74,822.64 | $85,578.27 | $97,953.69 |
| 176 | $875.00 | $154,000.00 | $50,334.72 | $57,451.23 | $65,641.18 | $75,068.57 | $85,922.45 | $98,420.80 |
| 177 | $875.00 | $154,875.00 | $50,393.44 | $57,557.87 | $65,809.40 | $75,315.11 | $86,267.77 | $98,889.85 |
| 178 | $875.00 | $155,750.00 | $50,452.16 | $57,664.61 | $65,977.90 | $75,562.26 | $86,614.25 | $99,360.85 |
| 179 | $875.00 | $156,625.00 | $50,510.88 | $57,771.43 | $66,146.68 | $75,810.03 | $86,961.88 | $99,833.82 |
| 180 | $875.00 | $157,500.00 | $50,569.60 | $57,878.34 | $66,315.74 | $76,058.42 | $87,310.67 | $100,308.76 |
| 181 | $875.00 | $158,375.00 | $50,628.32 | $57,985.34 | $66,485.09 | $76,307.44 | $87,660.62 | $100,785.68 |
| 182 | $875.00 | $159,250.00 | $50,687.04 | $58,092.43 | $66,654.72 | $76,557.07 | $88,011.74 | $101,264.58 |
| 183 | $875.00 | $160,125.00 | $50,745.76 | $58,199.61 | $66,824.62 | $76,807.33 | $88,364.02 | $101,745.48 |
| 184 | $875.00 | $161,000.00 | $50,804.48 | $58,306.88 | $66,994.82 | $77,058.22 | $88,717.49 | $102,228.39 |
| 185 | $875.00 | $161,875.00 | $50,863.20 | $58,414.24 | $67,165.29 | $77,309.73 | $89,072.13 | $102,713.30 |
| 186 | $875.00 | $162,750.00 | $50,921.92 | $58,521.68 | $67,336.05 | $77,561.87 | $89,427.95 | $103,200.24 |
| 187 | $875.00 | $163,625.00 | $50,980.64 | $58,629.22 | $67,507.10 | $77,814.64 | $89,784.96 | $103,689.21 |
| 188 | $875.00 | $164,500.00 | $51,039.36 | $58,736.85 | $67,678.43 | $78,068.05 | $90,143.16 | $104,180.21 |
| 189 | $875.00 | $165,375.00 | $51,098.08 | $58,844.56 | $67,850.04 | $78,322.08 | $90,502.55 | $104,673.26 |
| 190 | $875.00 | $166,250.00 | $51,156.80 | $58,952.37 | $68,021.94 | $78,576.76 | $90,863.14 | $105,168.36 |
| 191 | $875.00 | $167,125.00 | $51,215.52 | $59,060.27 | $68,194.13 | $78,832.06 | $91,224.93 | $105,665.53 |
| 192 | $875.00 | $168,000.00 | $51,274.24 | $59,168.25 | $68,366.61 | $79,088.01 | $91,587.93 | $106,164.77 |
| 193 | $875.00 | $168,875.00 | $51,332.96 | $59,276.33 | $68,539.37 | $79,344.60 | $91,952.14 | $106,666.08 |
| 194 | $875.00 | $169,750.00 | $51,391.68 | $59,384.49 | $68,712.42 | $79,601.83 | $92,317.57 | $107,169.49 |
| 195 | $875.00 | $170,625.00 | $51,450.40 | $59,492.75 | $68,885.76 | $79,859.70 | $92,684.21 | $107,674.99 |
| 196 | $875.00 | $171,500.00 | $51,509.12 | $59,601.10 | $69,059.38 | $80,118.21 | $93,052.07 | $108,182.61 |
| 197 | $875.00 | $172,375.00 | $51,567.84 | $59,709.53 | $69,233.30 | $80,377.38 | $93,421.16 | $108,692.33 |
| 198 | $875.00 | $173,250.00 | $51,626.56 | $59,818.06 | $69,407.51 | $80,637.19 | $93,791.48 | $109,204.18 |
| 199 | $875.00 | $174,125.00 | $51,685.28 | $59,926.68 | $69,582.00 | $80,897.65 | $94,163.03 | $109,718.16 |
| 200 | $875.00 | $175,000.00 | $51,744.00 | $60,035.38 | $69,756.79 | $81,158.76 | $94,535.82 | $110,234.29 |
| 201 | $875.00 | $175,875.00 | $51,802.72 | $60,144.18 | $69,931.87 | $81,420.52 | $94,909.86 | $110,752.56 |
| 202 | $875.00 | $176,750.00 | $51,861.44 | $60,253.07 | $70,107.24 | $81,682.94 | $95,285.14 | $111,272.99 |
| 203 | $875.00 | $177,625.00 | $51,920.16 | $60,362.05 | $70,282.91 | $81,946.01 | $95,661.67 | $111,795.60 |
| 204 | $875.00 | $178,500.00 | $51,978.88 | $60,471.12 | $70,458.86 | $82,209.74 | $96,039.46 | $112,320.38 |
| 205 | $875.00 | $179,375.00 | $52,037.60 | $60,580.28 | $70,635.11 | $82,474.14 | $96,418.51 | $112,847.34 |
| 206 | $875.00 | $180,250.00 | $52,096.32 | $60,689.54 | $70,811.65 | $82,739.19 | $96,798.82 | $113,376.50 |
| 207 | $875.00 | $181,125.00 | $52,155.04 | $60,798.88 | $70,988.49 | $83,004.90 | $97,180.40 | $113,907.87 |
| 208 | $875.00 | $182,000.00 | $52,213.76 | $60,908.31 | $71,165.62 | $83,271.28 | $97,563.25 | $114,441.45 |
| 209 | $875.00 | $182,875.00 | $52,272.48 | $61,017.84 | $71,343.05 | $83,538.33 | $97,947.38 | $114,977.26 |
| 210 | $875.00 | $183,750.00 | $52,331.20 | $61,127.46 | $71,520.77 | $83,806.04 | $98,332.78 | $115,515.29 |
| 211 | $875.00 | $184,625.00 | $52,389.92 | $61,237.17 | $71,698.79 | $84,074.42 | $98,719.47 | $116,055.57 |
| 212 | $875.00 | $185,500.00 | $52,448.64 | $61,346.97 | $71,877.11 | $84,343.47 | $99,107.46 | $116,598.10 |
| 213 | $875.00 | $186,375.00 | $52,507.36 | $61,456.86 | $72,055.72 | $84,613.20 | $99,496.73 | $117,142.89 |
| 214 | $875.00 | $187,250.00 | $52,566.08 | $61,566.84 | $72,234.63 | $84,883.60 | $99,887.30 | $117,689.95 |
| 215 | $875.00 | $188,125.00 | $52,624.80 | $61,676.91 | $72,413.84 | $85,154.67 | $100,279.17 | $118,239.29 |
| 216 | $875.00 | $189,000.00 | $52,683.52 | $61,787.08 | $72,593.35 | $85,426.43 | $100,672.35 | $118,790.92 |
| 217 | $875.00 | $189,875.00 | $52,742.24 | $61,897.34 | $72,773.16 | $85,698.86 | $101,066.84 | $119,344.84 |
| 218 | $875.00 | $190,750.00 | $52,800.96 | $62,007.69 | $72,953.26 | $85,971.98 | $101,462.65 | $119,901.08 |
| 219 | $875.00 | $191,625.00 | $52,859.68 | $62,118.13 | $73,133.67 | $86,245.77 | $101,859.77 | $120,459.63 |
| 220 | $875.00 | $192,500.00 | $52,918.40 | $62,228.67 | $73,314.38 | $86,520.25 | $102,258.22 | $121,020.51 |
| 221 | $875.00 | $193,375.00 | $52,977.12 | $62,339.29 | $73,495.39 | $86,795.42 | $102,658.00 | $121,583.73 |
| 222 | $875.00 | $194,250.00 | $53,035.84 | $62,450.01 | $73,676.70 | $87,071.28 | $103,059.11 | $122,149.29 |
| 223 | $875.00 | $195,125.00 | $53,094.56 | $62,560.82 | $73,858.31 | $87,347.82 | $103,461.55 | $122,717.21 |
| 224 | $875.00 | $196,000.00 | $53,153.28 | $62,671.72 | $74,040.22 | $87,625.06 | $103,865.34 | $123,287.50 |
| 225 | $875.00 | $196,875.00 | $53,212.00 | $62,782.72 | $74,222.44 | $87,902.99 | $104,270.47 | $123,860.16 |
| 226 | $875.00 | $197,750.00 | $53,270.72 | $62,893.81 | $74,404.96 | $88,181.61 | $104,676.96 | $124,435.21 |
| 227 | $875.00 | $198,625.00 | $53,329.44 | $63,004.99 | $74,587.79 | $88,460.93 | $105,084.80 | $125,012.65 |
| 228 | $875.00 | $199,500.00 | $53,388.16 | $63,116.26 | $74,770.92 | $88,740.95 | $105,494.00 | $125,592.51 |
| 229 | $875.00 | $200,375.00 | $53,446.88 | $63,227.63 | $74,954.36 | $89,021.67 | $105,904.56 | $126,174.77 |
| 230 | $875.00 | $201,250.00 | $53,505.60 | $63,339.08 | $75,138.10 | $89,303.09 | $106,316.49 | $126,759.46 |
| 231 | $875.00 | $202,125.00 | $53,564.32 | $63,450.64 | $75,322.15 | $89,585.22 | $106,729.79 | $127,346.59 |
| 232 | $875.00 | $203,000.00 | $53,623.04 | $63,562.28 | $75,506.50 | $89,868.05 | $107,144.48 | $127,936.17 |
| 233 | $875.00 | $203,875.00 | $53,681.76 | $63,674.02 | $75,691.16 | $90,151.58 | $107,560.54 | $128,528.20 |
| 234 | $875.00 | $204,750.00 | $53,740.48 | $63,785.85 | $75,876.13 | $90,435.83 | $107,977.99 | $129,122.70 |
| 235 | $875.00 | $205,625.00 | $53,799.20 | $63,897.77 | $76,061.41 | $90,720.78 | $108,396.83 | $129,719.68 |
| 236 | $875.00 | $206,500.00 | $53,857.92 | $64,009.79 | $76,247.00 | $91,006.45 | $108,817.07 | $130,319.14 |
| 237 | $875.00 | $207,375.00 | $53,916.64 | $64,121.90 | $76,432.89 | $91,292.84 | $109,238.71 | $130,921.10 |
| 238 | $875.00 | $208,250.00 | $53,975.36 | $64,234.10 | $76,619.10 | $91,579.94 | $109,661.75 | $131,525.57 |
| 239 | $875.00 | $209,125.00 | $54,034.08 | $64,346.40 | $76,805.62 | $91,867.75 | $110,086.21 | $132,132.56 |
| 240 | $875.00 | $210,000.00 | $54,092.80 | $64,458.79 | $76,992.44 | $92,156.29 | $110,512.08 | $132,742.07 |
| 241 | $875.00 | $210,875.00 | $54,151.52 | $64,571.28 | $77,179.58 | $92,445.55 | $110,939.37 | $133,354.13 |
| 242 | $875.00 | $211,750.00 | $54,210.24 | $64,683.86 | $77,367.03 | $92,735.53 | $111,368.08 | $133,968.74 |

TABLE 3c-continued

Combined Loan and Investment System Comparison Report Data (Systematic and Lump Sum Investment)

|  | LOAN | $200,000 |
|---|---|---|
|  | RATE | 5.25% |
|  | LUMP SUM INVESTMENT | $40,000.00 |
|  | SYSTEMATIC INVESTMENT | $58.72 |

| | | | | | | | | |
|---|---|---|---|---|---|---|---|---|
| 243 | $875.00 | $212,625.00 | $54,268.96 | $64,796.53 | $77,554.80 | $93,026.23 | $111,798.23 | $134,585.91 |
| 244 | $875.00 | $213,500.00 | $54,327.68 | $64,909.29 | $77,742.87 | $93,317.66 | $112,229.80 | $135,205.65 |
| 245 | $875.00 | $214,375.00 | $54,386.40 | $65,022.15 | $77,931.26 | $93,609.83 | $112,662.82 | $135,827.97 |
| 246 | $875.00 | $215,250.00 | $54,445.12 | $65,135.11 | $78,119.96 | $93,902.72 | $113,097.28 | $136,452.88 |
| 247 | $875.00 | $216,125.00 | $54,503.84 | $65,248.16 | $78,308.98 | $94,196.34 | $113,533.18 | $137,080.40 |
| 248 | $875.00 | $217,000.00 | $54,562.56 | $65,361.30 | $78,498.31 | $94,490.70 | $113,970.54 | $137,710.53 |
| 249 | $875.00 | $217,875.00 | $54,621.28 | $65,474.53 | $78,687.96 | $94,785.79 | $114,409.36 | $138,343.29 |
| 250 | $875.00 | $218,750.00 | $54,680.00 | $65,587.87 | $78,877.93 | $95,081.62 | $114,849.64 | $138,978.69 |
| 251 | $875.00 | $219,625.00 | $54,738.72 | $65,701.29 | $79,068.21 | $95,378.19 | $115,291.39 | $139,616.73 |
| 252 | $875.00 | $220,500.00 | $54,797.44 | $65,814.81 | $79,258.81 | $95,675.51 | $115,734.61 | $140,257.43 |
| 253 | $875.00 | $221,375.00 | $54,856.16 | $65,928.43 | $79,449.72 | $95,973.56 | $116,179.31 | $140,900.80 |
| 254 | $875.00 | $222,250.00 | $54,914.88 | $66,042.14 | $79,640.96 | $96,272.36 | $116,625.49 | $141,546.85 |
| 255 | $875.00 | $223,125.00 | $54,973.60 | $66,155.94 | $79,832.51 | $96,571.91 | $117,073.15 | $142,195.59 |
| 256 | $875.00 | $224,000.00 | $55,032.32 | $66,269.84 | $80,024.38 | $96,872.21 | $117,522.31 | $142,847.04 |
| 257 | $875.00 | $224,875.00 | $55,091.04 | $66,383.83 | $80,216.57 | $97,173.25 | $117,972.97 | $143,501.20 |
| 258 | $875.00 | $225,750.00 | $55,149.76 | $66,497.92 | $80,409.09 | $97,475.05 | $118,425.13 | $144,158.09 |
| 259 | $875.00 | $226,625.00 | $55,208.48 | $66,612.10 | $80,601.92 | $97,777.61 | $118,878.79 | $144,817.71 |
| 260 | $875.00 | $227,500.00 | $55,267.20 | $66,726.38 | $80,795.07 | $98,080.92 | $119,333.97 | $145,480.08 |
| 261 | $875.00 | $228,375.00 | $55,325.92 | $66,840.76 | $80,988.55 | $98,384.99 | $119,790.67 | $146,145.22 |
| 262 | $875.00 | $229,250.00 | $55,384.64 | $66,955.23 | $81,182.35 | $98,689.82 | $120,248.89 | $146,813.12 |
| 263 | $875.00 | $230,125.00 | $55,443.36 | $67,069.79 | $81,376.47 | $98,995.41 | $120,708.63 | $147,483.80 |
| 264 | $875.00 | $231,000.00 | $55,502.08 | $67,184.45 | $81,570.91 | $99,301.76 | $121,169.91 | $148,157.28 |
| 265 | $875.00 | $231,875.00 | $55,560.80 | $67,299.21 | $81,765.68 | $99,608.88 | $121,632.72 | $148,833.57 |
| 266 | $875.00 | $232,750.00 | $55,619.52 | $67,414.06 | $81,960.78 | $99,916.77 | $122,097.08 | $149,512.68 |
| 267 | $875.00 | $233,625.00 | $55,678.24 | $67,529.01 | $82,156.20 | $100,225.43 | $122,562.99 | $150,194.61 |
| 268 | $875.00 | $234,500.00 | $55,736.96 | $67,644.05 | $82,351.94 | $100,534.86 | $123,030.45 | $150,879.39 |
| 269 | $875.00 | $235,375.00 | $55,795.68 | $67,759.19 | $82,548.01 | $100,845.07 | $123,499.47 | $151,567.01 |
| 270 | $875.00 | $236,250.00 | $55,854.40 | $67,874.42 | $82,744.41 | $101,156.05 | $123,970.05 | $152,257.51 |
| 271 | $875.00 | $237,125.00 | $55,913.12 | $67,989.76 | $82,941.14 | $101,467.80 | $124,442.20 | $152,950.88 |
| 272 | $875.00 | $238,000.00 | $55,971.84 | $68,105.18 | $83,138.19 | $101,780.34 | $124,915.92 | $153,647.14 |
| 273 | $875.00 | $238,875.00 | $56,030.56 | $68,220.71 | $83,335.57 | $102,093.66 | $125,391.22 | $154,346.30 |
| 274 | $875.00 | $239,750.00 | $56,089.28 | $68,336.33 | $83,533.28 | $102,407.76 | $125,868.11 | $155,048.37 |
| 275 | $875.00 | $240,625.00 | $56,148.00 | $68,452.04 | $83,731.32 | $102,722.64 | $126,346.58 | $155,753.37 |
| 276 | $875.00 | $241,500.00 | $56,206.72 | $68,567.85 | $83,929.69 | $103,038.32 | $126,826.65 | $156,461.31 |
| 277 | $875.00 | $242,375.00 | $56,265.44 | $68,683.76 | $84,128.39 | $103,354.78 | $127,308.33 | $157,172.20 |
| 278 | $875.00 | $243,250.00 | $56,324.16 | $68,799.77 | $84,327.42 | $103,672.03 | $127,791.60 | $157,886.05 |
| 279 | $875.00 | $244,125.00 | $56,382.88 | $68,915.87 | $84,526.79 | $103,990.08 | $128,276.49 | $158,602.87 |
| 280 | $875.00 | $245,000.00 | $56,441.60 | $69,032.07 | $84,726.48 | $104,308.92 | $128,762.99 | $159,322.68 |
| 281 | $875.00 | $245,875.00 | $56,500.32 | $69,148.36 | $84,926.51 | $104,628.56 | $129,251.12 | $160,045.49 |
| 282 | $875.00 | $246,750.00 | $56,559.04 | $69,264.76 | $85,126.87 | $104,949.00 | $129,740.87 | $160,771.31 |
| 283 | $875.00 | $247,625.00 | $56,617.76 | $69,381.25 | $85,327.57 | $105,270.24 | $130,232.26 | $161,500.16 |
| 284 | $875.00 | $248,500.00 | $56,676.48 | $69,497.83 | $85,528.60 | $105,592.28 | $130,725.28 | $162,232.04 |
| 285 | $875.00 | $249,375.00 | $56,735.20 | $69,614.52 | $85,729.97 | $105,915.13 | $131,219.95 | $162,966.97 |
| 286 | $875.00 | $250,250.00 | $56,793.92 | $69,731.30 | $85,931.67 | $106,238.78 | $131,716.26 | $163,704.96 |
| 287 | $875.00 | $251,125.00 | $56,852.64 | $69,848.18 | $86,133.70 | $106,563.25 | $132,214.23 | $164,446.03 |
| 288 | $875.00 | $252,000.00 | $56,911.36 | $69,965.15 | $86,336.08 | $106,888.52 | $132,713.86 | $165,190.19 |
| 289 | $875.00 | $252,875.00 | $56,970.08 | $70,082.23 | $86,538.79 | $107,214.61 | $133,215.16 | $165,937.44 |
| 290 | $875.00 | $253,750.00 | $57,028.80 | $70,199.40 | $86,741.84 | $107,541.51 | $133,718.12 | $166,687.82 |
| 291 | $875.00 | $254,625.00 | $57,087.52 | $70,316.66 | $86,945.23 | $107,869.23 | $134,222.77 | $167,441.31 |
| 292 | $875.00 | $255,500.00 | $57,146.24 | $70,434.03 | $87,148.95 | $108,197.77 | $134,729.09 | $168,197.95 |
| 293 | $875.00 | $256,375.00 | $57,204.96 | $70,551.49 | $87,353.02 | $108,527.14 | $135,237.10 | $168,957.74 |
| 294 | $875.00 | $257,250.00 | $57,263.68 | $70,669.06 | $87,557.43 | $108,857.32 | $135,746.81 | $169,720.69 |
| 295 | $875.00 | $258,125.00 | $57,322.40 | $70,786.72 | $87,762.17 | $109,188.33 | $136,258.22 | $170,486.83 |
| 296 | $875.00 | $259,000.00 | $57,381.12 | $70,904.47 | $87,967.26 | $109,520.17 | $136,771.33 | $171,256.15 |
| 297 | $875.00 | $259,875.00 | $57,439.84 | $71,022.33 | $88,172.69 | $109,852.84 | $137,286.15 | $172,028.69 |
| 298 | $875.00 | $260,750.00 | $57,498.56 | $71,140.28 | $88,378.46 | $110,186.33 | $137,802.68 | $172,804.44 |
| 299 | $875.00 | $261,625.00 | $57,557.28 | $71,258.34 | $88,584.58 | $110,520.67 | $138,320.94 | $173,583.42 |
| 300 | $875.00 | $262,500.00 | $57,616.00 | $71,376.49 | $88,791.04 | $110,855.84 | $138,840.93 | $174,365.65 |
| 301 | $875.00 | $263,375.00 | $57,674.72 | $71,494.74 | $88,997.84 | $111,191.84 | $139,362.64 | $175,151.14 |
| 302 | $875.00 | $264,250.00 | $57,733.44 | $71,613.09 | $89,204.99 | $111,528.69 | $139,886.10 | $175,939.90 |
| 303 | $875.00 | $265,125.00 | $57,792.16 | $71,731.53 | $89,412.48 | $111,866.38 | $140,411.31 | $176,731.95 |
| 304 | $875.00 | $266,000.00 | $57,850.88 | $71,850.08 | $89,620.32 | $112,204.91 | $140,938.26 | $177,527.29 |
| 305 | $875.00 | $266,875.00 | $57,909.60 | $71,968.72 | $89,828.50 | $112,544.29 | $141,466.97 | $178,325.96 |
| 306 | $875.00 | $267,750.00 | $57,968.32 | $72,087.46 | $90,037.04 | $112,884.52 | $141,997.44 | $179,127.95 |
| 307 | $875.00 | $268,625.00 | $58,027.04 | $72,206.31 | $90,245.92 | $113,225.59 | $142,529.68 | $179,933.28 |
| 308 | $875.00 | $269,500.00 | $58,085.76 | $72,325.25 | $90,455.14 | $113,567.53 | $143,063.70 | $180,741.96 |
| 309 | $875.00 | $270,375.00 | $58,144.48 | $72,444.29 | $90,664.72 | $113,910.31 | $143,599.49 | $181,554.02 |
| 310 | $875.00 | $271,250.00 | $58,203.20 | $72,563.43 | $90,874.65 | $114,253.95 | $144,137.07 | $182,369.46 |
| 311 | $875.00 | $272,125.00 | $58,261.92 | $72,682.66 | $91,084.92 | $114,598.46 | $144,676.44 | $183,188.30 |
| 312 | $875.00 | $273,000.00 | $58,320.64 | $72,802.00 | $91,295.55 | $114,943.82 | $145,217.61 | $184,010.55 |
| 313 | $875.00 | $273,875.00 | $58,379.36 | $72,921.44 | $91,506.52 | $115,290.04 | $145,760.59 | $184,836.22 |
| 314 | $875.00 | $274,750.00 | $58,438.08 | $73,040.98 | $91,717.85 | $115,637.14 | $146,305.37 | $185,665.34 |
| 315 | $875.00 | $275,625.00 | $58,496.80 | $73,160.61 | $91,929.53 | $115,985.10 | $146,851.97 | $186,497.91 |

TABLE 3c-continued

Combined Loan and Investment System Comparison Report Data (Systematic and Lump Sum Investment)

|  |  | LOAN | $200,000 |  |  |  |  |
|---|---|---|---|---|---|---|---|
|  |  | RATE | 5.25% |  |  |  |  |
|  |  | LUMP SUM INVESTMENT | $40,000.00 |  |  |  |  |
|  |  | SYSTEMATIC INVESTMENT | $58.72 |  |  |  |  |

| | | | | | | | |
|---|---|---|---|---|---|---|---|
| 316 | $875.00 | $276,500.00 | $58,555.52 | $73,280.35 | $92,141.57 | $116,333.93 | $147,400.40 | $187,333.95 |
| 317 | $875.00 | $277,375.00 | $58,614.24 | $73,400.18 | $92,353.96 | $116,683.63 | $147,950.65 | $188,173.47 |
| 318 | $875.00 | $278,250.00 | $58,672.96 | $73,520.12 | $92,566.70 | $117,034.20 | $148,502.73 | $189,016.49 |
| 319 | $875.00 | $279,125.00 | $58,731.68 | $73,640.16 | $92,779.79 | $117,385.66 | $149,056.66 | $189,863.02 |
| 320 | $875.00 | $280,000.00 | $58,790.40 | $73,760.29 | $92,993.24 | $117,737.99 | $149,612.43 | $190,713.08 |
| 321 | $875.00 | $280,875.00 | $58,849.12 | $73,880.53 | $93,207.05 | $118,091.20 | $150,170.05 | $191,566.69 |
| 322 | $875.00 | $281,750.00 | $58,907.84 | $74,000.86 | $93,421.21 | $118,445.29 | $150,729.53 | $192,423.85 |
| 323 | $875.00 | $282,625.00 | $58,966.56 | $74,121.30 | $93,635.73 | $118,800.27 | $151,290.88 | $193,284.58 |
| 324 | $875.00 | $283,500.00 | $59,025.28 | $74,241.84 | $93,850.61 | $119,156.14 | $151,854.10 | $194,148.89 |
| 325 | $875.00 | $284,375.00 | $59,084.00 | $74,362.47 | $94,065.85 | $119,512.90 | $152,419.20 | $195,016.81 |
| 326 | $875.00 | $285,250.00 | $59,142.72 | $74,483.21 | $94,281.44 | $119,870.55 | $152,986.18 | $195,888.35 |
| 327 | $875.00 | $286,125.00 | $59,201.44 | $74,604.05 | $94,497.39 | $120,229.09 | $153,555.04 | $196,763.51 |
| 328 | $875.00 | $287,000.00 | $59,260.16 | $74,724.99 | $94,713.71 | $120,588.53 | $154,125.81 | $197,642.32 |
| 329 | $875.00 | $287,875.00 | $59,318.88 | $74,846.03 | $94,930.38 | $120,948.87 | $154,698.48 | $198,524.80 |
| 330 | $875.00 | $288,750.00 | $59,377.60 | $74,967.17 | $95,147.42 | $121,310.11 | $155,273.06 | $199,410.95 |
| 331 | $875.00 | $289,625.00 | $59,436.32 | $75,088.41 | $95,364.81 | $121,672.25 | $155,849.55 | $200,300.79 |
| 332 | $875.00 | $290,500.00 | $59,495.04 | $75,209.75 | $95,582.57 | $122,035.30 | $156,427.96 | $201,194.35 |
| 333 | $875.00 | $291,375.00 | $59,553.76 | $75,331.20 | $95,800.69 | $122,399.25 | $157,008.31 | $202,091.62 |
| 334 | $875.00 | $292,250.00 | $59,612.48 | $75,452.74 | $96,019.18 | $122,764.12 | $157,590.58 | $202,992.63 |
| 335 | $875.00 | $293,125.00 | $59,671.20 | $75,574.39 | $96,238.03 | $123,129.89 | $158,174.80 | $203,897.40 |
| 336 | $875.00 | $294,000.00 | $59,729.92 | $75,696.14 | $96,457.24 | $123,496.58 | $158,760.97 | $204,805.94 |
| 337 | $875.00 | $294,875.00 | $59,788.64 | $75,817.98 | $96,676.82 | $123,864.19 | $159,349.08 | $205,718.26 |
| 338 | $875.00 | $295,750.00 | $59,847.36 | $75,939.94 | $96,896.77 | $124,232.72 | $159,939.16 | $206,634.38 |
| 339 | $875.00 | $296,625.00 | $59,906.08 | $76,061.99 | $97,117.08 | $124,602.17 | $160,531.21 | $207,554.33 |
| 340 | $875.00 | $297,500.00 | $59,964.80 | $76,184.14 | $97,337.76 | $124,972.54 | $161,125.23 | $208,478.10 |
| 341 | $875.00 | $298,375.00 | $60,023.52 | $76,306.40 | $97,558.81 | $125,343.84 | $161,721.23 | $209,405.72 |
| 342 | $875.00 | $299,250.00 | $60,082.24 | $76,428.75 | $97,780.23 | $125,716.07 | $162,319.22 | $210,337.21 |
| 343 | $875.00 | $300,125.00 | $60,140.96 | $76,551.21 | $98,002.01 | $126,089.22 | $162,919.20 | $211,272.58 |
| 344 | $875.00 | $301,000.00 | $60,199.68 | $76,673.78 | $98,224.17 | $126,463.31 | $163,521.18 | $212,211.85 |
| 345 | $875.00 | $301,875.00 | $60,258.40 | $76,796.44 | $98,446.69 | $126,838.34 | $164,125.16 | $213,155.03 |
| 346 | $875.00 | $302,750.00 | $60,317.12 | $76,919.21 | $98,669.59 | $127,214.30 | $164,731.16 | $214,102.14 |
| 347 | $875.00 | $303,625.00 | $60,375.84 | $77,042.07 | $98,892.85 | $127,591.20 | $165,339.18 | $215,053.20 |
| 348 | $875.00 | $304,500.00 | $60,434.56 | $77,165.04 | $99,116.49 | $127,969.05 | $165,949.23 | $216,008.22 |
| 349 | $875.00 | $305,375.00 | $60,493.28 | $77,288.12 | $99,340.50 | $128,347.84 | $166,561.31 | $216,967.22 |
| 350 | $875.00 | $306,250.00 | $60,552.00 | $77,411.29 | $99,564.89 | $128,727.57 | $167,175.43 | $217,930.21 |
| 351 | $875.00 | $307,125.00 | $60,610.72 | $77,534.57 | $99,789.65 | $129,108.26 | $167,791.59 | $218,897.22 |
| 352 | $875.00 | $308,000.00 | $60,669.44 | $77,657.95 | $100,014.78 | $129,489.90 | $168,409.82 | $219,868.25 |
| 353 | $875.00 | $308,875.00 | $60,728.16 | $77,781.44 | $100,240.29 | $129,872.49 | $169,030.10 | $220,843.34 |
| 354 | $875.00 | $309,750.00 | $60,786.88 | $77,905.02 | $100,466.18 | $130,256.04 | $169,652.45 | $221,822.48 |
| 355 | $875.00 | $310,625.00 | $60,845.60 | $78,028.71 | $100,692.44 | $130,640.54 | $170,276.87 | $222,805.71 |
| 356 | $875.00 | $311,500.00 | $60,904.32 | $78,152.51 | $100,919.08 | $131,026.01 | $170,903.38 | $223,793.03 |
| 357 | $875.00 | $312,375.00 | $60,963.04 | $78,276.40 | $101,146.09 | $131,412.44 | $171,531.97 | $224,784.46 |
| 358 | $875.00 | $313,250.00 | $61,021.76 | $78,400.40 | $101,373.49 | $131,799.84 | $172,162.66 | $225,780.03 |
| 359 | $875.00 | $314,125.00 | $61,080.48 | $78,524.50 | $101,601.26 | $132,188.21 | $172,795.45 | $226,779.75 |
| 360 | $875.00 | $315,000.00 | $61,139.20 | $78,648.71 | $101,829.42 | $132,577.54 | $173,430.35 | $227,783.63 |

| | | INVESTMENT VALUE | | | | | |
|---|---|---|---|---|---|---|---|
| DATE | 6% | 7% | 8% | 9% | 10% | 11% | 12% |
| 1 | $40,259.01 | $40,292.40 | $40,325.78 | $40,359.16 | $40,392.54 | $40,425.92 | $40,459.31 |
| 2 | $40,519.32 | $40,586.50 | $40,653.73 | $40,721.01 | $40,788.36 | $40,855.75 | $40,923.21 |
| 3 | $40,780.93 | $40,882.31 | $40,983.86 | $41,085.58 | $41,187.47 | $41,289.52 | $41,391.75 |
| 4 | $41,043.85 | $41,179.86 | $41,316.20 | $41,452.88 | $41,589.91 | $41,727.27 | $41,864.97 |
| 5 | $41,308.08 | $41,479.14 | $41,650.75 | $41,822.94 | $41,995.70 | $42,169.03 | $42,342.93 |
| 6 | $41,573.64 | $41,780.16 | $41,987.54 | $42,195.77 | $42,404.87 | $42,614.84 | $42,825.66 |
| 7 | $41,840.52 | $42,082.94 | $42,326.57 | $42,571.40 | $42,817.46 | $43,064.73 | $43,313.23 |
| 8 | $42,108.74 | $42,387.49 | $42,667.85 | $42,949.85 | $43,233.48 | $43,518.75 | $43,805.67 |
| 9 | $42,378.29 | $42,693.81 | $43,011.42 | $43,331.13 | $43,652.97 | $43,976.93 | $44,303.03 |
| 10 | $42,649.20 | $43,001.92 | $43,357.27 | $43,715.28 | $44,075.95 | $44,439.31 | $44,805.37 |
| 11 | $42,921.46 | $43,311.83 | $43,705.43 | $44,102.30 | $44,502.46 | $44,905.93 | $45,312.73 |
| 12 | $43,195.08 | $43,623.54 | $44,055.91 | $44,492.23 | $44,932.52 | $45,376.82 | $45,825.16 |
| 13 | $43,470.07 | $43,937.07 | $44,408.73 | $44,885.08 | $45,366.17 | $45,852.03 | $46,342.72 |
| 14 | $43,746.43 | $44,252.44 | $44,763.90 | $45,280.88 | $45,803.43 | $46,331.60 | $46,865.46 |
| 15 | $44,024.18 | $44,569.64 | $45,121.44 | $45,679.65 | $46,244.33 | $46,815.57 | $47,393.42 |
| 16 | $44,303.31 | $44,888.69 | $45,481.36 | $46,081.41 | $46,688.91 | $47,303.97 | $47,926.66 |
| 17 | $44,583.84 | $45,209.60 | $45,843.68 | $46,486.18 | $47,137.20 | $47,796.85 | $48,465.24 |
| 18 | $44,865.77 | $45,532.39 | $46,208.42 | $46,893.98 | $47,589.22 | $48,294.24 | $49,009.19 |
| 19 | $45,149.12 | $45,857.06 | $46,575.58 | $47,304.85 | $48,045.00 | $48,796.20 | $49,558.59 |
| 20 | $45,433.88 | $46,183.62 | $46,945.20 | $47,718.79 | $48,504.59 | $49,302.76 | $50,113.49 |
| 21 | $45,720.06 | $46,512.09 | $47,317.28 | $48,135.85 | $48,968.00 | $49,813.96 | $50,673.93 |
| 22 | $46,007.67 | $46,842.47 | $47,691.84 | $48,556.03 | $49,435.28 | $50,329.84 | $51,239.98 |
| 23 | $46,296.73 | $47,174.78 | $48,068.90 | $48,979.36 | $49,906.45 | $50,850.46 | $51,811.68 |

TABLE 3c-continued

Combined Loan and Investment System Comparison Report Data (Systematic and Lump Sum Investment)

|  | LOAN | $200,000 |
|---|---|---|
|  | RATE | 5.25% |
|  | LUMP SUM INVESTMENT | $40,000.00 |
|  | SYSTEMATIC INVESTMENT | $58.72 |

| | | | | | | | |
|---|---|---|---|---|---|---|---|
| 24 | $46,587.22 | $47,509.03 | $48,448.47 | $49,405.86 | $50,381.54 | $51,375.84 | $52,389.11 |
| 25 | $46,879.17 | $47,845.23 | $48,830.57 | $49,835.57 | $50,860.60 | $51,906.05 | $52,972.30 |
| 26 | $47,172.58 | $48,183.39 | $49,215.22 | $50,268.49 | $51,343.65 | $52,441.11 | $53,561.34 |
| 27 | $47,467.46 | $48,523.52 | $49,602.43 | $50,704.67 | $51,830.72 | $52,981.08 | $54,156.26 |
| 28 | $47,763.81 | $48,865.63 | $49,992.22 | $51,144.11 | $52,321.85 | $53,526.00 | $54,757.13 |
| 29 | $48,061.64 | $49,209.75 | $50,384.62 | $51,586.85 | $52,817.08 | $54,075.91 | $55,364.00 |
| 30 | $48,360.96 | $49,555.87 | $50,779.63 | $52,032.92 | $53,316.43 | $54,630.87 | $55,976.95 |
| 31 | $48,661.78 | $49,904.00 | $51,177.27 | $52,482.32 | $53,819.94 | $55,190.91 | $56,596.03 |
| 32 | $48,964.10 | $50,254.17 | $51,577.56 | $52,935.10 | $54,327.65 | $55,756.08 | $57,221.30 |
| 33 | $49,267.94 | $50,606.39 | $51,980.52 | $53,391.27 | $54,839.59 | $56,326.44 | $57,852.82 |
| 34 | $49,573.29 | $50,960.65 | $52,386.17 | $53,850.87 | $55,355.79 | $56,902.02 | $58,490.65 |
| 35 | $49,880.17 | $51,316.98 | $52,794.52 | $54,313.91 | $55,876.30 | $57,482.88 | $59,134.86 |
| 36 | $50,188.59 | $51,675.40 | $53,205.60 | $54,780.43 | $56,401.15 | $58,069.07 | $59,785.52 |
| 37 | $50,498.54 | $52,035.90 | $53,619.41 | $55,250.44 | $56,930.37 | $58,660.62 | $60,442.68 |
| 38 | $50,810.05 | $52,398.50 | $54,035.99 | $55,723.98 | $57,464.00 | $59,257.60 | $61,106.42 |
| 39 | $51,123.11 | $52,763.22 | $54,455.34 | $56,201.07 | $58,002.07 | $59,860.06 | $61,776.79 |
| 40 | $51,437.74 | $53,130.07 | $54,877.49 | $56,681.74 | $58,544.63 | $60,468.03 | $62,453.86 |
| 41 | $51,753.94 | $53,499.06 | $55,302.45 | $57,166.01 | $59,091.71 | $61,081.58 | $63,137.71 |
| 42 | $52,071.73 | $53,870.20 | $55,730.24 | $57,653.92 | $59,643.35 | $61,700.75 | $63,828.39 |
| 43 | $52,391.10 | $54,243.51 | $56,160.89 | $58,145.48 | $60,199.59 | $62,325.60 | $64,525.98 |
| 44 | $52,712.07 | $54,618.99 | $56,594.41 | $58,640.73 | $60,760.46 | $62,956.18 | $65,230.55 |
| 45 | $53,034.64 | $54,996.66 | $57,030.81 | $59,139.70 | $61,326.01 | $63,592.54 | $65,942.16 |
| 46 | $53,358.83 | $55,376.54 | $57,470.13 | $59,642.41 | $61,896.27 | $64,234.73 | $66,660.89 |
| 47 | $53,684.64 | $55,758.63 | $57,912.38 | $60,148.88 | $62,471.28 | $64,882.80 | $67,386.81 |
| 48 | $54,012.07 | $56,142.95 | $58,357.57 | $60,659.16 | $63,051.08 | $65,536.82 | $68,119.98 |
| 49 | $54,341.15 | $56,529.52 | $58,805.73 | $61,173.27 | $63,635.72 | $66,196.83 | $68,860.49 |
| 50 | $54,671.87 | $56,918.33 | $59,256.88 | $61,691.23 | $64,225.23 | $66,862.89 | $69,608.40 |
| 51 | $55,004.24 | $57,309.42 | $59,711.04 | $62,213.07 | $64,819.65 | $67,535.06 | $70,363.79 |
| 52 | $55,338.28 | $57,702.79 | $60,168.22 | $62,738.83 | $65,419.02 | $68,213.39 | $71,126.74 |
| 53 | $55,673.98 | $58,098.45 | $60,628.46 | $63,268.53 | $66,023.39 | $68,897.94 | $71,897.31 |
| 54 | $56,011.36 | $58,496.42 | $61,091.76 | $63,802.20 | $66,632.79 | $69,588.76 | $72,675.60 |
| 55 | $56,350.43 | $58,896.71 | $61,558.15 | $64,339.88 | $67,247.27 | $70,285.92 | $73,461.66 |
| 56 | $56,691.20 | $59,299.34 | $62,027.65 | $64,881.59 | $67,866.88 | $70,989.46 | $74,255.58 |
| 57 | $57,033.67 | $59,704.31 | $62,500.28 | $65,427.36 | $68,491.64 | $71,699.46 | $75,057.44 |
| 58 | $57,377.85 | $60,111.65 | $62,976.06 | $65,977.23 | $69,121.62 | $72,415.96 | $75,867.33 |
| 59 | $57,723.75 | $60,521.36 | $63,455.01 | $66,531.22 | $69,756.84 | $73,139.03 | $76,685.31 |
| 60 | $58,071.39 | $60,933.47 | $63,937.15 | $67,089.36 | $70,397.35 | $73,868.73 | $77,511.47 |
| 61 | $58,420.76 | $61,347.98 | $64,422.51 | $67,651.69 | $71,043.21 | $74,605.12 | $78,345.89 |
| 62 | $58,771.87 | $61,764.90 | $64,911.11 | $68,218.24 | $71,694.44 | $75,348.26 | $79,188.66 |
| 63 | $59,124.75 | $62,184.26 | $65,402.96 | $68,789.04 | $72,351.11 | $76,098.21 | $80,039.85 |
| 64 | $59,479.39 | $62,606.06 | $65,898.09 | $69,364.12 | $73,013.24 | $76,855.04 | $80,899.55 |
| 65 | $59,835.80 | $63,030.33 | $66,396.52 | $69,943.51 | $73,680.90 | $77,618.80 | $81,767.86 |
| 66 | $60,193.99 | $63,457.07 | $66,898.28 | $70,527.25 | $74,354.11 | $78,389.56 | $82,644.84 |
| 67 | $60,553.97 | $63,886.30 | $67,403.38 | $71,115.36 | $75,032.94 | $79,167.39 | $83,530.60 |
| 68 | $60,915.76 | $64,318.03 | $67,911.84 | $71,707.89 | $75,717.42 | $79,952.35 | $84,425.21 |
| 69 | $61,279.35 | $64,752.28 | $68,423.70 | $72,304.86 | $76,407.61 | $80,744.51 | $85,328.77 |
| 70 | $61,644.76 | $65,189.06 | $68,938.97 | $72,906.30 | $77,103.55 | $81,543.92 | $86,241.37 |
| 71 | $62,012.00 | $65,628.40 | $69,457.68 | $73,512.26 | $77,805.29 | $82,350.67 | $87,163.09 |
| 72 | $62,381.07 | $66,070.29 | $69,979.84 | $74,122.76 | $78,512.88 | $83,164.81 | $88,094.03 |
| 73 | $62,751.99 | $66,514.76 | $70,505.48 | $74,737.84 | $79,226.36 | $83,986.41 | $89,034.27 |
| 74 | $63,124.76 | $66,961.83 | $71,034.63 | $75,357.54 | $79,945.79 | $84,815.54 | $89,983.92 |
| 75 | $63,499.40 | $67,411.50 | $71,567.31 | $75,981.88 | $80,671.21 | $85,652.28 | $90,943.07 |
| 76 | $63,875.91 | $67,863.80 | $72,103.53 | $76,610.90 | $81,402.68 | $86,496.68 | $91,911.81 |
| 77 | $64,254.30 | $68,318.73 | $72,643.33 | $77,244.65 | $82,140.25 | $87,348.82 | $92,890.23 |
| 78 | $64,634.59 | $68,776.32 | $73,186.73 | $77,883.14 | $82,883.96 | $88,208.78 | $93,878.44 |
| 79 | $65,016.77 | $69,236.58 | $73,733.76 | $78,526.43 | $83,633.87 | $89,076.62 | $94,876.53 |
| 80 | $65,400.87 | $69,699.52 | $74,284.43 | $79,174.53 | $84,390.03 | $89,952.41 | $95,884.61 |
| 81 | $65,786.89 | $70,165.17 | $74,838.77 | $79,827.50 | $85,152.49 | $90,836.23 | $96,902.76 |
| 82 | $66,174.84 | $70,633.52 | $75,396.81 | $80,485.37 | $85,921.30 | $91,728.16 | $97,931.09 |
| 83 | $66,564.73 | $71,104.62 | $75,958.56 | $81,148.17 | $86,696.52 | $92,628.26 | $98,969.71 |
| 84 | $66,956.56 | $71,578.46 | $76,524.06 | $81,815.94 | $87,478.20 | $93,536.61 | $100,018.72 |
| 85 | $67,350.36 | $72,055.06 | $77,093.34 | $82,488.72 | $88,266.39 | $94,453.29 | $101,078.21 |
| 86 | $67,746.12 | $72,534.44 | $77,666.40 | $83,166.55 | $89,061.16 | $95,378.37 | $102,148.30 |
| 87 | $68,143.87 | $73,016.62 | $78,243.29 | $83,849.46 | $89,862.54 | $96,311.93 | $103,229.09 |
| 88 | $68,543.60 | $73,501.62 | $78,824.02 | $84,537.49 | $90,670.61 | $97,254.04 | $104,320.69 |
| 89 | $68,945.33 | $73,989.44 | $79,408.63 | $85,230.68 | $91,485.40 | $98,204.80 | $105,423.20 |
| 90 | $69,349.07 | $74,480.11 | $79,997.13 | $85,929.07 | $92,306.99 | $99,164.27 | $106,536.74 |
| 91 | $69,754.83 | $74,973.64 | $80,589.56 | $86,632.70 | $93,135.43 | $100,132.53 | $107,661.42 |
| 92 | $70,162.62 | $75,470.04 | $81,185.93 | $87,341.60 | $93,970.76 | $101,109.67 | $108,797.34 |
| 93 | $70,572.45 | $75,969.35 | $81,786.28 | $88,055.83 | $94,813.06 | $102,095.77 | $109,944.62 |
| 94 | $70,984.32 | $76,471.57 | $82,390.64 | $88,775.41 | $95,662.38 | $103,090.90 | $111,103.37 |
| 95 | $71,398.26 | $76,976.71 | $82,999.02 | $89,500.38 | $96,518.78 | $104,095.16 | $112,273.71 |
| 96 | $71,814.26 | $77,484.81 | $83,611.46 | $90,230.80 | $97,382.31 | $105,108.63 | $113,455.76 |

TABLE 3c-continued

Combined Loan and Investment System Comparison Report Data (Systematic and Lump Sum Investment)

|  | LOAN | $200,000 |
|---|---|---|
|  | RATE | 5.25% |
|  | LUMP SUM INVESTMENT | $40,000.00 |
|  | SYSTEMATIC INVESTMENT | $58.72 |

| | | | | | | | |
|---|---|---|---|---|---|---|---|
| 97 | $72,232.35 | $77,995.86 | $84,227.98 | $90,966.69 | $98,253.04 | $106,131.38 | $114,649.62 |
| 98 | $72,652.52 | $78,509.90 | $84,848.61 | $91,708.10 | $99,131.02 | $107,163.51 | $115,855.43 |
| 99 | $73,074.80 | $79,026.94 | $85,473.38 | $92,455.07 | $100,016.32 | $108,205.10 | $117,073.29 |
| 100 | $73,499.19 | $79,546.99 | $86,102.31 | $93,207.64 | $100,909.00 | $109,256.24 | $118,303.33 |
| 101 | $73,925.70 | $80,070.08 | $86,735.44 | $93,965.86 | $101,809.12 | $110,317.01 | $119,545.67 |
| 102 | $74,354.34 | $80,596.22 | $87,372.79 | $94,729.76 | $102,716.74 | $111,387.51 | $120,800.43 |
| 103 | $74,785.12 | $81,125.42 | $88,014.38 | $95,499.40 | $103,631.92 | $112,467.82 | $122,067.74 |
| 104 | $75,218.06 | $81,657.72 | $88,660.26 | $96,274.80 | $104,554.73 | $113,558.03 | $123,347.73 |
| 105 | $75,653.17 | $82,193.12 | $89,310.44 | $97,056.03 | $105,485.23 | $114,658.24 | $124,640.51 |
| 106 | $76,090.45 | $82,731.64 | $89,964.95 | $97,843.11 | $106,423.48 | $115,768.53 | $125,946.22 |
| 107 | $76,529.91 | $83,273.30 | $90,623.83 | $98,636.09 | $107,369.55 | $116,889.00 | $127,264.99 |
| 108 | $76,971.58 | $83,818.13 | $91,287.10 | $99,435.02 | $108,323.51 | $118,019.74 | $128,596.95 |
| 109 | $77,415.45 | $84,366.13 | $91,954.79 | $100,239.94 | $109,285.41 | $119,160.85 | $129,942.23 |
| 110 | $77,861.54 | $84,917.33 | $92,626.94 | $101,050.90 | $110,255.33 | $120,312.41 | $131,300.96 |
| 111 | $78,309.86 | $85,471.74 | $93,303.56 | $101,867.95 | $111,233.34 | $121,474.54 | $132,673.27 |
| 112 | $78,760.42 | $86,029.39 | $93,984.70 | $102,691.12 | $112,219.49 | $122,647.31 | $134,059.31 |
| 113 | $79,213.24 | $86,590.29 | $94,670.37 | $103,520.46 | $113,213.86 | $123,830.84 | $135,459.21 |
| 114 | $79,668.32 | $87,154.46 | $95,360.62 | $104,356.02 | $114,216.52 | $125,025.21 | $136,873.11 |
| 115 | $80,125.67 | $87,721.92 | $96,055.47 | $105,197.85 | $115,227.54 | $126,230.53 | $138,301.15 |
| 116 | $80,585.31 | $88,292.70 | $96,754.95 | $106,046.00 | $116,246.97 | $127,446.90 | $139,743.47 |
| 117 | $81,047.25 | $88,866.80 | $97,459.09 | $106,900.50 | $117,274.91 | $128,674.43 | $141,200.21 |
| 118 | $81,511.50 | $89,444.25 | $98,167.93 | $107,761.42 | $118,311.41 | $129,913.20 | $142,671.52 |
| 119 | $81,978.08 | $90,025.07 | $98,881.50 | $108,628.79 | $119,356.55 | $131,163.33 | $144,157.54 |
| 120 | $82,446.98 | $90,609.28 | $99,599.82 | $109,502.67 | $120,410.39 | $132,424.92 | $145,658.43 |
| 121 | $82,918.23 | $91,196.90 | $100,322.93 | $110,383.10 | $121,473.02 | $133,698.07 | $147,174.32 |
| 122 | $83,391.83 | $91,787.94 | $101,050.86 | $111,270.13 | $122,544.51 | $134,982.89 | $148,705.37 |
| 123 | $83,867.81 | $92,382.44 | $101,783.64 | $112,163.82 | $123,624.92 | $136,279.50 | $150,251.73 |
| 124 | $84,346.16 | $92,980.40 | $102,521.31 | $113,064.20 | $124,714.34 | $137,587.98 | $151,813.55 |
| 125 | $84,826.90 | $93,581.84 | $103,263.90 | $113,971.35 | $125,812.83 | $138,908.46 | $153,391.00 |
| 126 | $85,310.05 | $94,186.80 | $104,011.44 | $114,885.29 | $126,920.48 | $140,241.05 | $154,984.21 |
| 127 | $85,795.61 | $94,795.29 | $104,763.96 | $115,806.09 | $128,037.36 | $141,585.85 | $156,593.36 |
| 128 | $86,283.61 | $95,407.32 | $105,521.50 | $116,733.80 | $129,163.55 | $142,942.98 | $158,218.60 |
| 129 | $86,774.04 | $96,022.93 | $106,284.08 | $117,668.46 | $130,299.12 | $144,312.55 | $159,860.10 |
| 130 | $87,266.92 | $96,642.12 | $107,051.76 | $118,610.14 | $131,444.16 | $145,694.67 | $161,518.01 |
| 131 | $87,762.27 | $97,264.93 | $107,824.55 | $119,558.87 | $132,598.74 | $147,089.47 | $163,192.49 |
| 132 | $88,260.09 | $97,891.37 | $108,602.49 | $120,514.72 | $133,762.93 | $148,497.04 | $164,883.72 |
| 133 | $88,760.41 | $98,521.47 | $109,385.62 | $121,477.75 | $134,936.84 | $149,917.53 | $166,591.87 |
| 134 | $89,263.22 | $99,155.24 | $110,173.96 | $122,447.99 | $136,120.52 | $151,351.03 | $168,317.09 |
| 135 | $89,768.55 | $99,792.71 | $110,967.57 | $123,425.51 | $137,314.07 | $152,797.67 | $170,059.57 |
| 136 | $90,276.41 | $100,433.89 | $111,766.46 | $124,410.36 | $138,517.56 | $154,257.57 | $171,819.48 |
| 137 | $90,786.81 | $101,078.82 | $112,570.68 | $125,402.60 | $139,731.08 | $155,730.86 | $173,596.98 |
| 138 | $91,299.75 | $101,727.51 | $113,380.27 | $126,402.28 | $140,954.72 | $157,217.65 | $175,392.25 |
| 139 | $91,815.27 | $102,379.98 | $114,195.25 | $127,409.46 | $142,188.57 | $158,718.07 | $177,205.48 |
| 140 | $92,333.36 | $103,036.26 | $115,015.66 | $128,424.19 | $143,432.66 | $160,232.24 | $179,036.85 |
| 141 | $92,854.04 | $103,696.37 | $115,841.54 | $129,446.53 | $144,687.14 | $161,760.30 | $180,886.52 |
| 142 | $93,377.32 | $104,360.33 | $116,672.93 | $130,476.54 | $145,952.08 | $163,302.36 | $182,754.69 |
| 143 | $93,903.22 | $105,028.16 | $117,509.86 | $131,514.27 | $147,227.56 | $164,858.56 | $184,641.55 |
| 144 | $94,431.75 | $105,699.88 | $118,352.37 | $132,559.79 | $148,513.66 | $166,429.02 | $186,547.27 |
| 145 | $94,962.92 | $106,375.53 | $119,200.50 | $133,613.15 | $149,810.48 | $168,013.88 | $188,472.05 |
| 146 | $95,496.75 | $107,055.12 | $120,054.28 | $134,674.41 | $151,118.11 | $169,613.26 | $190,416.08 |
| 147 | $96,033.25 | $107,738.67 | $120,913.76 | $135,743.63 | $152,436.64 | $171,227.31 | $192,379.55 |
| 148 | $96,572.43 | $108,426.21 | $121,778.96 | $136,820.86 | $153,766.16 | $172,856.15 | $194,362.65 |
| 149 | $97,114.30 | $109,117.75 | $122,649.93 | $137,906.18 | $155,106.75 | $174,499.92 | $196,365.58 |
| 150 | $97,658.89 | $109,813.34 | $123,526.71 | $138,999.64 | $156,458.52 | $176,158.76 | $198,388.55 |
| 151 | $98,206.20 | $110,512.98 | $124,409.33 | $140,101.30 | $157,821.55 | $177,832.81 | $200,431.74 |
| 152 | $98,756.24 | $111,216.70 | $125,297.84 | $141,211.22 | $159,195.93 | $179,522.20 | $202,495.36 |
| 153 | $99,309.04 | $111,924.53 | $126,192.27 | $142,329.46 | $160,581.78 | $181,227.08 | $204,579.62 |
| 154 | $99,864.60 | $112,636.48 | $127,092.66 | $143,456.09 | $161,979.17 | $182,947.59 | $206,684.73 |
| 155 | $100,422.93 | $113,352.59 | $127,999.06 | $144,591.17 | $163,388.20 | $184,683.87 | $208,810.88 |
| 156 | $100,984.06 | $114,072.88 | $128,911.50 | $145,734.77 | $164,808.98 | $186,436.06 | $210,958.30 |
| 157 | $101,547.99 | $114,797.36 | $129,830.02 | $146,886.94 | $166,241.60 | $188,204.31 | $213,127.19 |
| 158 | $102,114.75 | $115,526.08 | $130,754.66 | $148,047.75 | $167,686.15 | $189,988.78 | $215,317.77 |
| 159 | $102,684.33 | $116,259.04 | $131,685.47 | $149,217.27 | $169,142.75 | $191,789.60 | $217,530.25 |
| 160 | $103,256.77 | $116,996.28 | $132,622.49 | $150,395.56 | $170,611.48 | $193,606.93 | $219,764.86 |
| 161 | $103,832.07 | $117,737.82 | $133,565.75 | $151,582.69 | $172,092.45 | $195,440.92 | $222,021.82 |
| 162 | $104,410.24 | $118,483.69 | $134,515.30 | $152,778.72 | $173,585.77 | $197,291.72 | $224,301.34 |
| 163 | $104,991.31 | $119,233.91 | $135,471.18 | $153,983.72 | $175,091.52 | $199,159.48 | $226,603.66 |
| 164 | $105,575.28 | $119,988.50 | $136,433.43 | $155,197.76 | $176,609.83 | $201,044.37 | $228,929.01 |
| 165 | $106,162.17 | $120,747.50 | $137,402.10 | $156,420.90 | $178,140.79 | $202,946.54 | $231,277.61 |
| 166 | $106,751.99 | $121,510.92 | $138,377.22 | $157,653.22 | $179,684.50 | $204,866.14 | $233,649.69 |
| 167 | $107,344.76 | $122,278.79 | $139,358.85 | $158,894.78 | $181,241.08 | $206,803.34 | $236,045.49 |
| 168 | $107,940.50 | $123,051.15 | $140,347.02 | $160,145.65 | $182,810.63 | $208,758.29 | $238,465.25 |
| 169 | $108,539.22 | $123,828.01 | $141,341.78 | $161,405.90 | $184,393.27 | $210,731.17 | $240,909.21 |

TABLE 3c-continued

Combined Loan and Investment System Comparison Report Data (Systematic and Lump Sum Investment)

| | LOAN | $200,000 |
|---|---|---|
| | RATE | 5.25% |
| | LUMP SUM INVESTMENT | $40,000.00 |
| | SYSTEMATIC INVESTMENT | $58.72 |

| | | | | | | | |
|---|---|---|---|---|---|---|---|
| 170 | $109,140.93 | $124,609.40 | $142,343.17 | $162,675.60 | $185,989.08 | $212,722.13 | $243,377.61 |
| 171 | $109,745.65 | $125,395.35 | $143,351.23 | $163,954.83 | $187,598.20 | $214,731.34 | $245,870.70 |
| 172 | $110,353.39 | $126,185.89 | $144,366.02 | $165,243.65 | $189,220.73 | $216,758.97 | $248,388.71 |
| 173 | $110,964.17 | $126,981.04 | $145,387.57 | $166,542.14 | $190,856.78 | $218,805.18 | $250,931.91 |
| 174 | $111,578.00 | $127,780.82 | $146,415.93 | $167,850.37 | $192,506.46 | $220,870.16 | $253,500.53 |
| 175 | $112,194.91 | $128,585.27 | $147,451.15 | $169,168.41 | $194,169.89 | $222,954.06 | $256,094.84 |
| 176 | $112,814.89 | $129,394.42 | $148,493.27 | $170,496.33 | $195,847.18 | $225,057.06 | $258,715.10 |
| 177 | $113,437.98 | $130,208.28 | $149,542.34 | $171,834.21 | $197,538.45 | $227,179.34 | $261,361.56 |
| 178 | $114,064.19 | $131,026.89 | $150,598.40 | $173,182.13 | $199,243.82 | $229,321.08 | $264,034.48 |
| 179 | $114,693.52 | $131,850.28 | $151,661.50 | $174,540.16 | $200,963.39 | $231,482.45 | $266,734.13 |
| 180 | $115,326.00 | $132,678.47 | $152,731.69 | $175,908.37 | $202,697.29 | $233,663.63 | $269,460.78 |
| 181 | $115,961.65 | $133,511.49 | $153,809.01 | $177,286.84 | $204,445.65 | $235,864.80 | $272,214.70 |
| 182 | $116,600.47 | $134,349.37 | $154,893.51 | $178,675.65 | $206,208.57 | $238,086.15 | $274,996.15 |
| 183 | $117,242.48 | $135,192.13 | $155,985.25 | $180,074.88 | $207,986.19 | $240,327.87 | $277,805.42 |
| 184 | $117,887.71 | $136,039.82 | $157,084.26 | $181,484.60 | $209,778.61 | $242,590.13 | $280,642.78 |
| 185 | $118,536.16 | $136,892.44 | $158,190.60 | $182,904.90 | $211,585.98 | $244,873.13 | $283,508.52 |
| 186 | $119,187.86 | $137,750.05 | $159,304.32 | $184,335.84 | $213,408.40 | $247,177.06 | $286,402.91 |
| 187 | $119,842.81 | $138,612.65 | $160,425.46 | $185,777.52 | $215,246.02 | $249,502.11 | $289,326.24 |
| 188 | $120,501.04 | $139,480.29 | $161,554.07 | $187,230.02 | $217,098.94 | $251,848.47 | $292,278.81 |
| 189 | $121,162.55 | $140,352.98 | $162,690.21 | $188,693.40 | $218,967.31 | $254,216.34 | $295,260.91 |
| 190 | $121,827.38 | $141,230.77 | $163,833.92 | $190,167.76 | $220,851.25 | $256,605.92 | $298,272.83 |
| 191 | $122,495.53 | $142,113.68 | $164,985.26 | $191,653.18 | $222,750.88 | $259,017.39 | $301,314.86 |
| 192 | $123,167.02 | $143,001.74 | $166,144.27 | $193,149.74 | $224,666.35 | $261,450.98 | $304,387.32 |
| 193 | $123,841.87 | $143,894.98 | $167,311.01 | $194,657.52 | $226,597.78 | $263,906.87 | $307,490.50 |
| 194 | $124,520.09 | $144,793.43 | $168,485.53 | $196,176.61 | $228,545.30 | $266,385.28 | $310,624.71 |
| 195 | $125,201.71 | $145,697.12 | $169,667.88 | $197,707.10 | $230,509.06 | $268,886.40 | $313,790.26 |
| 196 | $125,886.73 | $146,606.08 | $170,858.11 | $199,249.06 | $232,489.17 | $271,410.45 | $316,987.47 |
| 197 | $126,575.18 | $147,520.35 | $172,056.28 | $200,802.59 | $234,485.79 | $273,957.64 | $320,216.66 |
| 198 | $127,267.07 | $148,439.95 | $173,262.43 | $202,367.77 | $236,499.05 | $276,528.17 | $323,478.13 |
| 199 | $127,962.42 | $149,364.91 | $174,476.62 | $203,944.69 | $238,529.09 | $279,122.27 | $326,772.22 |
| 200 | $128,661.24 | $150,295.27 | $175,698.91 | $205,533.44 | $240,576.04 | $281,740.15 | $330,099.25 |
| 201 | $129,363.56 | $151,231.05 | $176,929.35 | $207,134.10 | $242,640.05 | $284,382.03 | $333,459.55 |
| 202 | $130,069.39 | $152,172.29 | $178,167.99 | $208,746.76 | $244,721.26 | $287,048.12 | $336,853.45 |
| 203 | $130,778.75 | $153,119.03 | $179,414.89 | $210,371.52 | $246,819.81 | $289,738.65 | $340,281.29 |
| 204 | $131,491.66 | $154,071.28 | $180,670.10 | $212,008.47 | $248,935.85 | $292,453.85 | $343,743.41 |
| 205 | $132,208.13 | $155,029.10 | $181,933.68 | $213,657.69 | $251,069.53 | $295,193.94 | $347,240.15 |
| 206 | $132,928.19 | $155,992.50 | $183,205.68 | $215,319.29 | $253,220.98 | $297,959.14 | $350,771.86 |
| 207 | $133,651.84 | $156,961.51 | $184,486.16 | $216,993.34 | $255,390.37 | $300,749.69 | $354,338.89 |
| 208 | $134,379.11 | $157,936.19 | $185,775.18 | $218,679.95 | $257,577.83 | $303,565.82 | $357,941.58 |
| 209 | $135,110.02 | $158,916.54 | $187,072.80 | $220,379.21 | $259,783.52 | $306,407.76 | $361,580.31 |
| 210 | $135,844.59 | $159,902.62 | $188,379.06 | $222,091.22 | $262,007.59 | $309,275.76 | $365,255.42 |
| 211 | $136,582.82 | $160,894.45 | $189,694.03 | $223,816.06 | $264,250.20 | $312,170.05 | $368,967.28 |
| 212 | $137,324.75 | $161,892.06 | $191,017.77 | $225,553.84 | $266,511.49 | $315,090.86 | $372,716.26 |
| 213 | $138,070.39 | $162,895.49 | $192,350.33 | $227,304.66 | $268,791.63 | $318,038.45 | $376,502.73 |
| 214 | $138,819.76 | $163,904.78 | $193,691.78 | $229,068.60 | $271,090.77 | $321,013.07 | $380,327.06 |
| 215 | $139,572.87 | $164,919.95 | $195,042.17 | $230,845.78 | $273,409.07 | $324,014.94 | $384,189.64 |
| 216 | $140,329.75 | $165,941.05 | $196,401.56 | $232,636.28 | $275,746.69 | $327,044.34 | $388,090.84 |
| 217 | $141,090.41 | $166,968.10 | $197,770.02 | $234,440.21 | $278,103.78 | $330,101.50 | $392,031.06 |
| 218 | $141,854.87 | $168,001.14 | $199,147.60 | $236,257.68 | $280,480.53 | $333,186.69 | $396,010.68 |
| 219 | $142,623.16 | $169,040.21 | $200,534.36 | $238,088.77 | $282,877.07 | $336,300.16 | $400,030.09 |
| 220 | $143,395.29 | $170,085.34 | $201,930.37 | $239,933.60 | $285,293.59 | $339,442.17 | $404,089.70 |
| 221 | $144,171.28 | $171,136.57 | $203,335.68 | $241,792.26 | $287,730.25 | $342,612.98 | $408,189.90 |
| 222 | $144,951.15 | $172,193.93 | $204,750.36 | $243,664.86 | $290,187.21 | $345,812.86 | $412,331.11 |
| 223 | $145,734.92 | $173,257.46 | $206,174.48 | $245,551.51 | $292,664.64 | $349,042.07 | $416,513.73 |
| 224 | $146,522.61 | $174,327.19 | $207,608.08 | $247,452.30 | $295,162.73 | $352,300.88 | $420,738.17 |
| 225 | $147,314.23 | $175,403.16 | $209,051.25 | $249,367.36 | $297,681.62 | $355,589.56 | $425,004.86 |
| 226 | $148,109.82 | $176,485.41 | $210,504.04 | $251,296.77 | $300,221.51 | $358,908.39 | $429,314.22 |
| 227 | $148,909.38 | $177,573.97 | $211,966.51 | $253,240.66 | $302,782.57 | $362,257.64 | $433,666.67 |
| 228 | $149,712.94 | $178,668.88 | $213,438.73 | $255,199.12 | $305,364.97 | $365,637.60 | $438,062.64 |
| 229 | $150,520.52 | $179,770.17 | $214,920.77 | $257,172.28 | $307,968.88 | $369,048.53 | $442,502.57 |
| 230 | $151,332.14 | $180,877.90 | $216,412.68 | $259,160.23 | $310,594.50 | $372,490.74 | $446,986.91 |
| 231 | $152,147.81 | $181,992.08 | $217,914.54 | $261,163.09 | $313,242.00 | $375,964.49 | $451,516.08 |
| 232 | $152,967.56 | $183,112.76 | $219,426.42 | $263,180.98 | $315,911.56 | $379,470.09 | $456,090.55 |
| 233 | $153,791.42 | $184,239.98 | $220,948.37 | $265,213.99 | $318,603.36 | $383,007.83 | $460,710.76 |
| 234 | $154,619.39 | $185,373.78 | $222,480.47 | $267,262.26 | $321,317.60 | $386,577.99 | $465,377.18 |
| 235 | $155,451.50 | $186,514.19 | $224,022.79 | $269,325.89 | $324,054.46 | $390,180.88 | $470,090.26 |
| 236 | $156,287.77 | $187,661.25 | $225,575.39 | $271,404.99 | $326,814.12 | $393,816.80 | $474,850.47 |
| 237 | $157,128.22 | $188,815.00 | $227,138.33 | $273,499.69 | $329,596.78 | $397,486.04 | $479,658.28 |
| 238 | $157,972.88 | $189,975.49 | $228,711.70 | $275,610.10 | $332,402.63 | $401,188.92 | $484,514.17 |
| 239 | $158,821.75 | $191,142.74 | $230,295.56 | $277,736.33 | $335,231.86 | $404,925.75 | $489,418.62 |
| 240 | $159,674.88 | $192,316.80 | $231,889.97 | $279,878.52 | $338,084.67 | $408,696.82 | $494,372.11 |
| 241 | $160,532.26 | $193,497.71 | $233,495.02 | $282,036.76 | $340,961.25 | $412,502.47 | $499,375.14 |
| 242 | $161,393.94 | $194,685.51 | $235,110.76 | $284,211.20 | $343,861.80 | $416,343.00 | $504,428.20 |

TABLE 3c-continued

Combined Loan and Investment System Comparison Report Data (Systematic and Lump Sum Investment)

| | LOAN | $200,000 |
|---|---|---|
| | RATE | 5.25% |
| | LUMP SUM INVESTMENT | $40,000.00 |
| | SYSTEMATIC INVESTMENT | $58.72 |

| | | | | | | | |
|---|---|---|---|---|---|---|---|
| 243 | $162,259.92 | $195,880.24 | $236,737.28 | $286,401.95 | $346,786.53 | $420,218.74 | $509,531.79 |
| 244 | $163,130.24 | $197,081.94 | $238,374.64 | $288,609.12 | $349,735.62 | $424,130.00 | $514,686.41 |
| 245 | $164,004.90 | $198,290.64 | $240,022.91 | $290,832.85 | $352,709.30 | $428,077.12 | $519,892.58 |
| 246 | $164,883.94 | $199,506.40 | $241,682.18 | $293,073.26 | $355,707.75 | $432,060.41 | $525,150.82 |
| 247 | $165,767.37 | $200,729.25 | $243,352.50 | $295,330.47 | $358,731.19 | $436,080.23 | $530,461.63 |
| 248 | $166,655.22 | $201,959.24 | $245,033.96 | $297,604.60 | $361,779.83 | $440,136.89 | $535,825.56 |
| 249 | $167,547.51 | $203,196.39 | $246,726.64 | $299,895.80 | $364,853.87 | $444,230.73 | $541,243.12 |
| 250 | $168,444.26 | $204,440.77 | $248,430.59 | $302,204.18 | $367,953.53 | $448,362.11 | $546,714.86 |
| 251 | $169,345.50 | $205,692.40 | $250,145.91 | $304,529.87 | $371,079.01 | $452,531.35 | $552,241.31 |
| 252 | $170,251.24 | $206,951.34 | $251,872.66 | $306,873.00 | $374,230.55 | $456,738.81 | $557,823.03 |
| 253 | $171,161.51 | $208,217.62 | $253,610.92 | $309,233.71 | $377,408.35 | $460,984.84 | $563,460.57 |
| 254 | $172,076.33 | $209,491.28 | $255,360.77 | $311,612.13 | $380,612.63 | $465,269.80 | $569,154.48 |
| 255 | $172,995.72 | $210,772.38 | $257,122.29 | $314,008.38 | $383,843.61 | $469,594.03 | $574,905.34 |
| 256 | $173,919.72 | $212,060.94 | $258,895.55 | $316,422.60 | $387,101.51 | $473,957.90 | $580,713.70 |
| 257 | $174,848.33 | $213,357.03 | $260,680.63 | $318,854.93 | $390,386.57 | $478,361.77 | $586,580.14 |
| 258 | $175,781.58 | $214,660.67 | $262,477.61 | $321,305.50 | $393,699.00 | $482,806.01 | $592,505.25 |
| 259 | $176,719.51 | $215,971.92 | $264,286.57 | $323,774.45 | $397,039.03 | $487,290.99 | $598,489.61 |
| 260 | $177,662.12 | $217,290.82 | $266,107.60 | $326,261.92 | $400,406.90 | $491,817.08 | $604,533.81 |
| 261 | $178,609.44 | $218,617.41 | $267,940.76 | $328,768.05 | $403,802.83 | $496,384.67 | $610,638.46 |
| 262 | $179,561.50 | $219,951.75 | $269,786.14 | $331,292.97 | $407,227.07 | $500,994.12 | $616,804.15 |
| 263 | $180,518.32 | $221,293.86 | $271,643.83 | $333,836.83 | $410,679.84 | $505,645.82 | $623,031.50 |
| 264 | $181,479.93 | $222,643.80 | $273,513.90 | $336,399.76 | $414,161.38 | $510,340.17 | $629,321.12 |
| 265 | $182,446.34 | $224,001.62 | $275,396.44 | $338,981.92 | $417,671.93 | $515,077.54 | $635,673.64 |
| 266 | $183,417.59 | $225,367.36 | $277,291.52 | $341,583.45 | $421,211.74 | $519,858.34 | $642,089.68 |
| 267 | $184,393.69 | $226,741.07 | $279,199.24 | $344,204.48 | $424,781.05 | $524,682.97 | $648,569.89 |
| 268 | $185,374.67 | $228,122.78 | $281,119.68 | $346,845.18 | $428,380.10 | $529,551.82 | $655,114.89 |
| 269 | $186,360.56 | $229,512.56 | $283,052.93 | $349,505.68 | $432,009.14 | $534,465.31 | $661,725.35 |
| 270 | $187,351.37 | $230,910.45 | $284,999.06 | $352,186.13 | $435,668.43 | $539,423.83 | $668,401.91 |
| 271 | $188,347.14 | $232,316.49 | $286,958.16 | $354,886.69 | $439,358.21 | $544,427.81 | $675,145.24 |
| 272 | $189,347.89 | $233,730.73 | $288,930.33 | $357,607.50 | $443,078.73 | $549,477.65 | $681,956.00 |
| 273 | $190,353.65 | $235,153.22 | $290,915.64 | $360,348.71 | $446,830.27 | $554,573.79 | $688,834.86 |
| 274 | $191,364.43 | $236,584.01 | $292,914.19 | $363,110.49 | $450,613.06 | $559,716.64 | $695,782.52 |
| 275 | $192,380.26 | $238,023.15 | $294,926.06 | $365,892.98 | $454,427.38 | $564,906.64 | $702,799.65 |
| 276 | $193,401.18 | $239,470.68 | $296,951.35 | $368,696.33 | $458,273.48 | $570,144.20 | $709,886.95 |
| 277 | $194,427.20 | $240,926.65 | $298,990.14 | $371,520.72 | $462,151.64 | $575,429.79 | $717,045.13 |
| 278 | $195,458.35 | $242,391.12 | $301,042.52 | $374,366.28 | $466,062.11 | $580,763.82 | $724,274.89 |
| 279 | $196,494.65 | $243,864.13 | $303,108.58 | $377,233.19 | $470,005.17 | $586,146.74 | $731,576.95 |
| 280 | $197,536.14 | $245,345.74 | $305,188.41 | $380,121.60 | $473,981.09 | $591,579.01 | $738,952.02 |
| 281 | $198,582.83 | $246,835.98 | $307,282.11 | $383,031.67 | $477,990.14 | $597,061.08 | $746,400.85 |
| 282 | $199,634.76 | $248,334.92 | $309,389.77 | $385,963.57 | $482,032.60 | $602,593.40 | $753,924.17 |
| 283 | $200,691.95 | $249,842.60 | $311,511.48 | $388,917.46 | $486,108.75 | $608,176.43 | $761,522.71 |
| 284 | $201,754.42 | $251,359.08 | $313,647.34 | $391,893.50 | $490,218.87 | $613,810.64 | $769,197.25 |
| 285 | $202,822.21 | $252,884.41 | $315,797.43 | $394,891.86 | $494,363.23 | $619,496.49 | $776,948.53 |
| 286 | $203,895.33 | $254,418.63 | $317,961.86 | $397,912.71 | $498,542.14 | $625,234.47 | $784,777.32 |
| 287 | $204,973.82 | $255,961.80 | $320,140.72 | $400,956.22 | $502,755.86 | $631,025.04 | $792,684.40 |
| 288 | $206,057.71 | $257,513.97 | $322,334.10 | $404,022.55 | $507,004.71 | $636,868.70 | $800,670.55 |
| 289 | $207,147.01 | $259,075.20 | $324,542.10 | $407,111.88 | $511,288.95 | $642,765.92 | $808,736.57 |
| 290 | $208,241.76 | $260,645.53 | $326,764.83 | $410,224.38 | $515,608.90 | $648,717.20 | $816,883.24 |
| 291 | $209,341.98 | $262,225.03 | $329,002.37 | $413,360.22 | $519,964.85 | $654,723.03 | $825,111.38 |
| 292 | $210,447.70 | $263,813.74 | $331,254.83 | $416,519.58 | $524,357.10 | $660,783.92 | $833,421.80 |
| 293 | $211,558.96 | $265,411.71 | $333,522.31 | $419,702.64 | $528,785.96 | $666,900.36 | $841,815.32 |
| 294 | $212,675.76 | $267,019.01 | $335,804.90 | $422,909.57 | $533,251.72 | $673,072.87 | $850,292.78 |
| 295 | $213,798.16 | $268,635.68 | $338,102.72 | $426,140.55 | $537,754.69 | $679,301.97 | $858,855.02 |
| 296 | $214,926.16 | $270,261.79 | $340,415.85 | $429,395.77 | $542,295.19 | $685,588.16 | $867,502.88 |
| 297 | $216,059.80 | $271,897.38 | $342,744.40 | $432,675.39 | $546,873.52 | $691,931.97 | $876,237.21 |
| 298 | $217,199.12 | $273,542.51 | $345,088.47 | $435,979.62 | $551,490.01 | $698,333.94 | $885,058.89 |
| 299 | $218,344.13 | $275,197.24 | $347,448.17 | $439,308.63 | $556,144.97 | $704,794.60 | $893,968.79 |
| 300 | $219,494.86 | $276,861.61 | $349,823.60 | $442,662.60 | $560,838.72 | $711,314.47 | $902,967.78 |
| 301 | $220,651.35 | $278,535.70 | $352,214.87 | $446,041.73 | $565,571.59 | $717,894.11 | $912,056.77 |
| 302 | $221,813.62 | $280,219.56 | $354,622.08 | $449,446.21 | $570,343.89 | $724,534.07 | $921,236.64 |
| 303 | $222,981.70 | $281,913.23 | $357,045.34 | $452,876.21 | $575,155.97 | $731,234.89 | $930,508.32 |
| 304 | $224,155.62 | $283,616.79 | $359,484.76 | $456,331.95 | $580,008.14 | $737,997.13 | $939,872.71 |
| 305 | $225,335.41 | $285,330.28 | $361,940.43 | $459,813.60 | $584,900.75 | $744,821.36 | $949,330.74 |
| 306 | $226,521.11 | $287,053.77 | $364,412.48 | $463,321.36 | $589,834.14 | $751,708.15 | $958,883.36 |
| 307 | $227,712.72 | $288,787.32 | $366,901.01 | $466,855.43 | $594,808.63 | $758,658.07 | $968,531.50 |
| 308 | $228,910.30 | $290,530.97 | $369,406.13 | $470,416.00 | $599,824.58 | $765,671.69 | $978,276.12 |
| 309 | $230,113.87 | $292,284.80 | $371,927.94 | $474,003.29 | $604,882.33 | $772,749.61 | $988,118.19 |
| 310 | $231,323.45 | $294,048.86 | $374,466.58 | $477,617.47 | $609,982.22 | $779,892.40 | $998,058.68 |
| 311 | $232,539.08 | $295,823.20 | $377,022.13 | $481,258.76 | $615,124.62 | $787,100.67 | $1,008,098.57 |
| 312 | $233,760.79 | $297,607.90 | $379,594.72 | $484,927.36 | $620,309.86 | $794,375.02 | $1,018,238.86 |
| 313 | $234,988.61 | $299,403.01 | $382,184.47 | $488,623.48 | $625,538.32 | $801,716.05 | $1,028,480.56 |
| 314 | $236,222.56 | $301,208.59 | $384,791.47 | $492,347.31 | $630,810.35 | $809,124.37 | $1,038,824.67 |
| 315 | $237,462.69 | $303,024.70 | $387,415.86 | $496,099.08 | $636,126.31 | $816,600.61 | $1,049,272.23 |

TABLE 3c-continued

Combined Loan and Investment System Comparison Report Data (Systematic and Lump Sum Investment)

|  | LOAN | $200,000 |  |  |  |  |
|---|---|---|---|---|---|---|
|  | RATE | 5.25% |  |  |  |  |
|  | LUMP SUM INVESTMENT | $40,000.00 |  |  |  |  |
|  | SYSTEMATIC INVESTMENT | $58.72 |  |  |  |  |

| | | | | | | | |
|---|---|---|---|---|---|---|---|
| 316 | $238,709.02 | $304,851.41 | $390,057.75 | $499,878.98 | $641,486.58 | $824,145.37 | $1,059,824.26 |
| 317 | $239,961.58 | $306,688.77 | $392,717.24 | $503,687.24 | $646,891.51 | $831,759.29 | $1,070,481.80 |
| 318 | $241,220.40 | $308,536.85 | $395,394.47 | $507,524.05 | $652,341.48 | $839,443.01 | $1,081,245.93 |
| 319 | $242,485.51 | $310,395.71 | $398,089.54 | $511,389.64 | $657,836.87 | $847,197.16 | $1,092,117.70 |
| 320 | $243,756.95 | $312,265.42 | $400,802.59 | $515,284.22 | $663,378.05 | $855,022.40 | $1,103,098.18 |
| 321 | $245,034.75 | $314,146.03 | $403,533.71 | $519,208.02 | $668,965.41 | $862,919.36 | $1,114,188.47 |
| 322 | $246,318.94 | $316,037.61 | $406,283.05 | $523,161.24 | $674,599.33 | $870,888.71 | $1,125,389.66 |
| 323 | $247,609.55 | $317,940.22 | $409,050.72 | $527,144.11 | $680,280.20 | $878,931.12 | $1,136,702.87 |
| 324 | $248,906.61 | $319,853.94 | $411,836.83 | $531,156.85 | $686,008.41 | $887,047.24 | $1,148,129.20 |
| 325 | $250,210.16 | $321,778.81 | $414,641.52 | $535,199.68 | $691,784.36 | $895,237.77 | $1,159,669.80 |
| 326 | $251,520.22 | $323,714.92 | $417,464.91 | $539,272.84 | $697,608.44 | $903,503.37 | $1,171,325.81 |
| 327 | $252,836.84 | $325,662.32 | $420,307.12 | $543,376.55 | $703,481.05 | $911,844.75 | $1,183,098.37 |
| 328 | $254,160.03 | $327,621.08 | $423,168.28 | $547,511.03 | $709,402.60 | $920,262.58 | $1,194,988.66 |
| 329 | $255,489.85 | $329,591.26 | $426,048.51 | $551,676.53 | $715,373.50 | $928,757.58 | $1,206,997.86 |
| 330 | $256,826.31 | $331,572.94 | $428,947.95 | $555,873.26 | $721,394.15 | $937,330.45 | $1,219,127.14 |
| 331 | $258,169.45 | $333,566.18 | $431,866.71 | $560,101.47 | $727,464.98 | $945,981.90 | $1,231,377.72 |
| 332 | $259,519.32 | $335,571.05 | $434,804.94 | $564,361.39 | $733,586.40 | $954,712.66 | $1,243,750.80 |
| 333 | $260,875.93 | $337,587.61 | $437,762.75 | $568,653.26 | $739,758.83 | $963,523.45 | $1,256,247.62 |
| 334 | $262,239.32 | $339,615.93 | $440,740.28 | $572,977.32 | $745,982.69 | $972,415.01 | $1,268,869.40 |
| 335 | $263,609.53 | $341,656.09 | $443,737.66 | $577,333.81 | $752,258.43 | $981,388.07 | $1,281,617.40 |
| 336 | $264,986.59 | $343,708.14 | $446,755.02 | $581,722.98 | $758,586.46 | $990,443.39 | $1,294,492.89 |
| 337 | $266,370.54 | $345,772.17 | $449,792.50 | $586,145.06 | $764,967.22 | $999,581.71 | $1,307,497.12 |
| 338 | $267,761.40 | $347,848.24 | $452,850.23 | $590,600.31 | $771,401.15 | $1,008,803.80 | $1,320,631.40 |
| 339 | $269,159.22 | $349,936.41 | $455,928.34 | $595,088.97 | $777,888.71 | $1,018,110.43 | $1,333,897.02 |
| 340 | $270,564.03 | $352,036.77 | $459,026.97 | $599,611.30 | $784,430.32 | $1,027,502.37 | $1,347,295.30 |
| 341 | $271,975.87 | $354,149.38 | $462,146.26 | $604,167.54 | $791,026.45 | $1,036,980.40 | $1,360,827.56 |
| 342 | $273,394.76 | $356,274.32 | $465,286.35 | $608,757.96 | $797,677.55 | $1,046,545.31 | $1,374,495.14 |
| 343 | $274,820.75 | $358,411.64 | $468,447.37 | $613,382.81 | $804,384.07 | $1,056,197.90 | $1,388,299.40 |
| 344 | $276,253.87 | $360,561.44 | $471,629.46 | $618,042.34 | $811,146.48 | $1,065,938.97 | $1,402,241.70 |
| 345 | $277,694.15 | $362,723.78 | $474,832.77 | $622,736.82 | $817,965.24 | $1,075,769.33 | $1,416,323.43 |
| 346 | $279,141.63 | $364,898.73 | $478,057.44 | $627,466.50 | $824,840.83 | $1,085,689.81 | $1,430,545.97 |
| 347 | $280,596.35 | $367,086.37 | $481,303.60 | $632,231.66 | $831,773.71 | $1,095,701.23 | $1,444,910.73 |
| 348 | $282,058.35 | $369,286.77 | $484,571.40 | $637,032.56 | $838,764.37 | $1,105,804.41 | $1,459,419.15 |
| 349 | $283,527.65 | $371,500.00 | $487,860.99 | $641,869.46 | $845,813.28 | $1,116,000.21 | $1,474,072.65 |
| 350 | $285,004.31 | $373,726.15 | $491,172.50 | $646,742.65 | $852,920.93 | $1,126,289.47 | $1,488,872.68 |
| 351 | $286,488.34 | $375,965.28 | $494,506.10 | $651,652.38 | $860,087.82 | $1,136,673.05 | $1,503,820.72 |
| 352 | $287,979.80 | $378,217.48 | $497,861.92 | $656,598.93 | $867,314.43 | $1,147,151.81 | $1,518,918.23 |
| 353 | $289,478.71 | $380,482.81 | $501,240.11 | $661,582.58 | $874,601.26 | $1,157,726.63 | $1,534,166.72 |
| 354 | $290,985.12 | $382,761.35 | $504,640.82 | $666,603.61 | $881,948.81 | $1,168,398.38 | $1,549,567.69 |
| 355 | $292,499.06 | $385,053.19 | $508,064.20 | $671,662.30 | $889,357.59 | $1,179,167.96 | $1,565,122.68 |
| 356 | $294,020.57 | $387,358.40 | $511,510.41 | $676,758.93 | $896,828.11 | $1,190,036.26 | $1,580,833.21 |
| 357 | $295,549.68 | $389,677.05 | $514,979.59 | $681,893.78 | $904,360.89 | $1,201,004.18 | $1,596,700.85 |
| 358 | $297,086.44 | $392,009.23 | $518,471.90 | $687,067.14 | $911,956.44 | $1,212,072.64 | $1,612,727.17 |
| 359 | $298,630.89 | $394,355.01 | $521,987.49 | $692,279.31 | $919,615.29 | $1,223,242.57 | $1,628,913.75 |
| 360 | $300,183.06 | $396,714.48 | $525,526.52 | $697,530.56 | $927,337.96 | $1,234,514.88 | $1,645,262.19 |

TABLE 3d

CONVENTIONAL LOAN AMORTIZATION SCHEDULE

| | LOAN AMOUNT | | $160,000.00 | | |
|---|---|---|---|---|---|
| | INTEREST RATE | | 5.75% | | |
| | TOTAL NUMBER OF PAYMENTS | | 360 | | |
| | PAYMENT | | $933.72 | | |

| PMT | BEGINNING LOAN BALANCE | PRINCIPAL | INTEREST | CUMMULATIVE PRINCIPAL | CUMMULATIVE INTEREST | LOAN BALANCE |
|---|---|---|---|---|---|---|
| 1 | $160,000.00 | $167.05 | $766.67 | $167.05 | $766.67 | $159,832.95 |
| 2 | $159,832.95 | $167.85 | $765.87 | $334.91 | $1,532.53 | $159,665.09 |
| 3 | $159,665.09 | $168.66 | $765.06 | $503.57 | $2,297.59 | $159,496.43 |
| 4 | $159,496.43 | $169.47 | $764.25 | $673.03 | $3,061.85 | $159,326.97 |
| 5 | $159,326.97 | $170.28 | $763.44 | $843.31 | $3,825.29 | $159,156.69 |
| 6 | $159,156.69 | $171.09 | $762.63 | $1,014.40 | $4,587.92 | $158,985.60 |
| 7 | $158,985.60 | $171.91 | $761.81 | $1,186.32 | $5,349.72 | $158,813.68 |
| 8 | $158,813.68 | $172.74 | $760.98 | $1,359.06 | $6,110.70 | $158,640.94 |
| 9 | $158,640.94 | $173.57 | $760.15 | $1,532.62 | $6,870.86 | $158,467.38 |
| 10 | $158,467.38 | $174.40 | $759.32 | $1,707.02 | $7,630.18 | $158,292.98 |
| 11 | $158,292.98 | $175.23 | $758.49 | $1,882.25 | $8,388.67 | $158,117.75 |
| 12 | $158,117.75 | $176.07 | $757.65 | $2,058.32 | $9,146.32 | $157,941.68 |
| 13 | $157,941.68 | $176.92 | $756.80 | $2,235.24 | $9,903.12 | $157,764.76 |

TABLE 3d-continued

CONVENTIONAL LOAN AMORTIZATION SCHEDULE

|  | LOAN AMOUNT | | $160,000.00 | | | |
|---|---|---|---|---|---|---|
|  | INTEREST RATE | | 5.75% | | | |
|  | TOTAL NUMBER OF PAYMENTS | | 360 | | | |
|  | PAYMENT | | | $933.72 | | |
|  | BEGINNING LOAN | | | CUMMULATIVE | CUMMULATIVE | |
| PMT | BALANCE | PRINCIPAL | INTEREST | PRINCIPAL | INTEREST | LOAN BALANCE |
| 14 | $157,764.76 | $177.76 | $755.96 | $2,413.00 | $10,659.08 | $157,587.00 |
| 15 | $157,587.00 | $178.62 | $755.10 | $2,591.62 | $11,414.18 | $157,408.38 |
| 16 | $157,408.38 | $179.47 | $754.25 | $2,771.09 | $12,168.43 | $157,228.91 |
| 17 | $157,228.91 | $180.33 | $753.39 | $2,951.42 | $12,921.82 | $157,048.58 |
| 18 | $157,048.58 | $181.20 | $752.52 | $3,132.62 | $13,674.34 | $156,867.38 |
| 19 | $156,867.38 | $182.06 | $751.66 | $3,314.68 | $14,426.00 | $156,685.32 |
| 20 | $156,685.32 | $182.94 | $750.78 | $3,497.62 | $15,176.78 | $156,502.38 |
| 21 | $156,502.38 | $183.81 | $749.91 | $3,681.43 | $15,926.69 | $156,318.57 |
| 22 | $156,318.57 | $184.69 | $749.03 | $3,866.12 | $16,675.72 | $156,133.88 |
| 23 | $156,133.88 | $185.58 | $748.14 | $4,051.70 | $17,423.86 | $155,948.30 |
| 24 | $155,948.30 | $186.47 | $747.25 | $4,238.17 | $18,171.11 | $155,761.83 |
| 25 | $155,761.83 | $187.36 | $746.36 | $4,425.53 | $18,917.47 | $155,574.47 |
| 26 | $155,574.47 | $188.26 | $745.46 | $4,613.79 | $19,662.93 | $155,386.21 |
| 27 | $155,386.21 | $189.16 | $744.56 | $4,802.95 | $20,407.49 | $155,197.05 |
| 28 | $155,197.05 | $190.07 | $743.65 | $4,993.02 | $21,151.14 | $155,006.98 |
| 29 | $155,006.98 | $190.98 | $742.74 | $5,184.00 | $21,893.88 | $154,816.00 |
| 30 | $154,816.00 | $191.89 | $741.83 | $5,375.89 | $22,635.71 | $154,624.11 |
| 31 | $154,624.11 | $192.81 | $740.91 | $5,568.70 | $23,376.62 | $154,431.30 |
| 32 | $154,431.30 | $193.74 | $739.98 | $5,762.44 | $24,116.60 | $154,237.56 |
| 33 | $154,237.56 | $194.67 | $739.05 | $5,957.11 | $24,855.65 | $154,042.89 |
| 34 | $154,042.89 | $195.60 | $738.12 | $6,152.70 | $25,593.78 | $153,847.30 |
| 35 | $153,847.30 | $196.54 | $737.18 | $6,349.24 | $26,330.96 | $153,650.76 |
| 36 | $153,650.76 | $197.48 | $736.24 | $6,546.71 | $27,067.21 | $153,453.29 |
| 37 | $153,453.29 | $198.42 | $735.30 | $6,745.14 | $27,802.50 | $153,254.86 |
| 38 | $153,254.86 | $199.37 | $734.35 | $6,944.51 | $28,536.85 | $153,055.49 |
| 39 | $153,055.49 | $200.33 | $733.39 | $7,144.84 | $29,270.24 | $152,855.16 |
| 40 | $152,855.16 | $201.29 | $732.43 | $7,346.13 | $30,002.67 | $152,653.87 |
| 41 | $152,653.87 | $202.25 | $731.47 | $7,548.38 | $30,734.14 | $152,451.62 |
| 42 | $152,451.62 | $203.22 | $730.50 | $7,751.61 | $31,464.63 | $152,248.39 |
| 43 | $152,248.39 | $204.20 | $729.52 | $7,955.80 | $32,194.16 | $152,044.20 |
| 44 | $152,044.20 | $205.17 | $728.55 | $8,160.98 | $32,922.70 | $151,839.02 |
| 45 | $151,839.02 | $206.16 | $727.56 | $8,367.14 | $33,650.26 | $151,632.86 |
| 46 | $151,632.86 | $207.15 | $726.57 | $8,574.28 | $34,376.84 | $151,425.72 |
| 47 | $151,425.72 | $208.14 | $725.58 | $8,782.42 | $35,102.42 | $151,217.58 |
| 48 | $151,217.58 | $209.14 | $724.58 | $8,991.56 | $35,827.00 | $151,008.44 |
| 49 | $151,008.44 | $210.14 | $723.58 | $9,201.69 | $36,550.59 | $150,798.31 |
| 50 | $150,798.31 | $211.14 | $722.58 | $9,412.84 | $37,273.16 | $150,587.16 |
| 51 | $150,587.16 | $212.16 | $721.56 | $9,624.99 | $37,994.73 | $150,375.01 |
| 52 | $150,375.01 | $213.17 | $720.55 | $9,838.17 | $38,715.27 | $150,161.83 |
| 53 | $150,161.83 | $214.19 | $719.53 | $10,052.36 | $39,434.80 | $149,947.64 |
| 54 | $149,947.64 | $215.22 | $718.50 | $10,267.58 | $40,153.30 | $149,732.42 |
| 55 | $149,732.42 | $216.25 | $717.47 | $10,483.84 | $40,870.76 | $149,516.16 |
| 56 | $149,516.16 | $217.29 | $716.43 | $10,701.12 | $41,587.20 | $149,298.88 |
| 57 | $149,298.88 | $218.33 | $715.39 | $10,919.45 | $42,302.59 | $149,080.55 |
| 58 | $149,080.55 | $219.38 | $714.34 | $11,138.83 | $43,016.93 | $148,861.17 |
| 59 | $148,861.17 | $220.43 | $713.29 | $11,359.26 | $43,730.22 | $148,640.74 |
| 60 | $148,640.74 | $221.48 | $712.24 | $11,580.74 | $44,442.46 | $148,419.26 |
| 61 | $148,419.26 | $222.54 | $711.18 | $11,803.28 | $45,153.64 | $148,196.72 |
| 62 | $148,196.72 | $223.61 | $710.11 | $12,026.89 | $45,863.75 | $147,973.11 |
| 63 | $147,973.11 | $224.68 | $709.04 | $12,251.58 | $46,572.78 | $147,748.42 |
| 64 | $147,748.42 | $225.76 | $707.96 | $12,477.33 | $47,280.75 | $147,522.67 |
| 65 | $147,522.67 | $226.84 | $706.88 | $12,704.18 | $47,987.62 | $147,295.82 |
| 66 | $147,295.82 | $227.93 | $705.79 | $12,932.10 | $48,693.42 | $147,067.90 |
| 67 | $147,067.90 | $229.02 | $704.70 | $13,161.12 | $49,398.12 | $146,838.88 |
| 68 | $146,838.88 | $230.12 | $703.60 | $13,391.24 | $50,101.72 | $146,608.76 |
| 69 | $146,608.76 | $231.22 | $702.50 | $13,622.46 | $50,804.22 | $146,377.54 |
| 70 | $146,377.54 | $232.33 | $701.39 | $13,854.79 | $51,505.61 | $146,145.21 |
| 71 | $146,145.21 | $233.44 | $700.28 | $14,088.23 | $52,205.89 | $145,911.77 |
| 72 | $145,911.77 | $234.56 | $699.16 | $14,322.79 | $52,905.05 | $145,677.21 |
| 73 | $145,677.21 | $235.68 | $698.04 | $14,558.47 | $53,603.09 | $145,441.53 |
| 74 | $145,441.53 | $236.81 | $696.91 | $14,795.28 | $54,300.00 | $145,204.72 |
| 75 | $145,204.72 | $237.95 | $695.77 | $15,033.23 | $54,995.77 | $144,966.77 |
| 76 | $144,966.77 | $239.09 | $694.63 | $15,272.32 | $55,690.40 | $144,727.68 |
| 77 | $144,727.68 | $240.23 | $693.49 | $15,512.55 | $56,383.89 | $144,487.45 |
| 78 | $144,487.45 | $241.38 | $692.34 | $15,753.94 | $57,076.22 | $144,246.06 |
| 79 | $144,246.06 | $242.54 | $691.18 | $15,996.48 | $57,767.40 | $144,003.52 |
| 80 | $144,003.52 | $243.70 | $690.02 | $16,240.18 | $58,457.42 | $143,759.82 |
| 81 | $143,759.82 | $244.87 | $688.85 | $16,485.05 | $59,146.27 | $143,514.95 |
| 82 | $143,514.95 | $246.04 | $687.68 | $16,731.09 | $59,833.95 | $143,268.91 |
| 83 | $143,268.91 | $247.22 | $686.50 | $16,978.32 | $60,520.44 | $143,021.68 |
| 84 | $143,021.68 | $248.41 | $685.31 | $17,226.73 | $61,205.75 | $142,773.27 |

TABLE 3d-continued

CONVENTIONAL LOAN AMORTIZATION SCHEDULE

LOAN AMOUNT $160,000.00
INTEREST RATE 5.75%
TOTAL NUMBER OF PAYMENTS 360
PAYMENT $933.72

| PMT | BEGINNING LOAN BALANCE | PRINCIPAL | INTEREST | CUMMULATIVE PRINCIPAL | CUMMULATIVE INTEREST | LOAN BALANCE |
|---|---|---|---|---|---|---|
| 85 | $142,773.27 | $249.60 | $684.12 | $17,476.32 | $61,889.88 | $142,523.68 |
| 86 | $142,523.68 | $250.79 | $682.93 | $17,727.12 | $62,572.80 | $142,272.88 |
| 87 | $142,272.88 | $252.00 | $681.72 | $17,979.11 | $63,254.53 | $142,020.89 |
| 88 | $142,020.89 | $253.20 | $680.52 | $18,232.32 | $63,935.04 | $141,767.68 |
| 89 | $141,767.68 | $254.42 | $679.30 | $18,486.73 | $64,614.35 | $141,513.27 |
| 90 | $141,513.27 | $255.64 | $678.08 | $18,742.37 | $65,292.43 | $141,257.63 |
| 91 | $141,257.63 | $256.86 | $676.86 | $18,999.23 | $65,969.29 | $141,000.77 |
| 92 | $141,000.77 | $258.09 | $675.63 | $19,257.32 | $66,644.92 | $140,742.68 |
| 93 | $140,742.68 | $259.33 | $674.39 | $19,516.65 | $67,319.31 | $140,483.35 |
| 94 | $140,483.35 | $260.57 | $673.15 | $19,777.22 | $67,992.46 | $140,222.78 |
| 95 | $140,222.78 | $261.82 | $671.90 | $20,039.04 | $68,664.36 | $139,960.96 |
| 96 | $139,960.96 | $263.07 | $670.65 | $20,302.11 | $69,335.01 | $139,697.89 |
| 97 | $139,697.89 | $264.33 | $669.39 | $20,566.45 | $70,004.39 | $139,433.55 |
| 98 | $139,433.55 | $265.60 | $668.12 | $20,832.05 | $70,672.51 | $139,167.95 |
| 99 | $139,167.95 | $266.87 | $666.85 | $21,098.92 | $71,339.36 | $138,901.08 |
| 100 | $138,901.08 | $268.15 | $665.57 | $21,367.07 | $72,004.93 | $138,632.93 |
| 101 | $138,632.93 | $269.44 | $664.28 | $21,636.51 | $72,669.21 | $138,363.49 |
| 102 | $138,363.49 | $270.73 | $662.99 | $21,907.24 | $73,332.20 | $138,092.76 |
| 103 | $138,092.76 | $272.03 | $661.69 | $22,179.26 | $73,993.90 | $137,820.74 |
| 104 | $137,820.74 | $273.33 | $660.39 | $22,452.59 | $74,654.29 | $137,547.41 |
| 105 | $137,547.41 | $274.64 | $659.08 | $22,727.23 | $75,313.37 | $137,272.77 |
| 106 | $137,272.77 | $275.95 | $657.77 | $23,003.19 | $75,971.13 | $136,996.81 |
| 107 | $136,996.81 | $277.28 | $656.44 | $23,280.46 | $76,627.58 | $136,719.54 |
| 108 | $136,719.54 | $278.61 | $655.11 | $23,559.07 | $77,282.69 | $136,440.93 |
| 109 | $136,440.93 | $279.94 | $653.78 | $23,839.01 | $77,936.47 | $136,160.99 |
| 110 | $136,160.99 | $281.28 | $652.44 | $24,120.29 | $78,588.91 | $135,879.71 |
| 111 | $135,879.71 | $282.63 | $651.09 | $24,402.92 | $79,240.00 | $135,597.08 |
| 112 | $135,597.08 | $283.98 | $649.74 | $24,686.91 | $79,889.73 | $135,313.09 |
| 113 | $135,313.09 | $285.34 | $648.38 | $24,972.25 | $80,538.11 | $135,027.75 |
| 114 | $135,027.75 | $286.71 | $647.01 | $25,258.96 | $81,185.12 | $134,741.04 |
| 115 | $134,741.04 | $288.09 | $645.63 | $25,547.05 | $81,830.75 | $134,452.95 |
| 116 | $134,452.95 | $289.47 | $644.25 | $25,836.51 | $82,475.01 | $134,163.49 |
| 117 | $134,163.49 | $290.85 | $642.87 | $26,127.37 | $83,117.87 | $133,872.63 |
| 118 | $133,872.63 | $292.25 | $641.47 | $26,419.61 | $83,759.35 | $133,580.39 |
| 119 | $133,580.39 | $293.65 | $640.07 | $26,713.26 | $84,399.42 | $133,286.74 |
| 120 | $133,286.74 | $295.05 | $638.67 | $27,008.32 | $85,038.08 | $132,991.68 |
| 121 | $132,991.68 | $296.47 | $637.25 | $27,304.78 | $85,675.34 | $132,695.22 |
| 122 | $132,695.22 | $297.89 | $635.83 | $27,602.67 | $86,311.17 | $132,397.33 |
| 123 | $132,397.33 | $299.32 | $634.40 | $27,901.99 | $86,945.57 | $132,098.01 |
| 124 | $132,098.01 | $300.75 | $632.97 | $28,202.74 | $87,578.54 | $131,797.26 |
| 125 | $131,797.26 | $302.19 | $631.53 | $28,504.93 | $88,210.07 | $131,495.07 |
| 126 | $131,495.07 | $303.64 | $630.08 | $28,808.57 | $88,840.15 | $131,191.43 |
| 127 | $131,191.43 | $305.09 | $628.63 | $29,113.67 | $89,468.77 | $130,886.33 |
| 128 | $130,886.33 | $306.56 | $627.16 | $29,420.22 | $90,095.94 | $130,579.78 |
| 129 | $130,579.78 | $308.03 | $625.69 | $29,728.25 | $90,721.63 | $130,271.75 |
| 130 | $130,271.75 | $309.50 | $624.22 | $30,037.75 | $91,345.85 | $129,962.25 |
| 131 | $129,962.25 | $310.98 | $622.74 | $30,348.73 | $91,968.59 | $129,651.27 |
| 132 | $129,651.27 | $312.47 | $621.25 | $30,661.21 | $92,589.83 | $129,338.79 |
| 133 | $129,338.79 | $313.97 | $619.75 | $30,975.18 | $93,209.58 | $129,024.82 |
| 134 | $129,024.82 | $315.48 | $618.24 | $31,290.65 | $93,827.83 | $128,709.35 |
| 135 | $128,709.35 | $316.99 | $616.73 | $31,607.64 | $94,444.56 | $128,392.36 |
| 136 | $128,392.36 | $318.51 | $615.21 | $31,926.15 | $95,059.77 | $128,073.85 |
| 137 | $128,073.85 | $320.03 | $613.69 | $32,246.18 | $95,673.46 | $127,753.82 |
| 138 | $127,753.82 | $321.57 | $612.15 | $32,567.75 | $96,285.61 | $127,432.25 |
| 139 | $127,432.25 | $323.11 | $610.61 | $32,890.85 | $96,896.23 | $127,109.15 |
| 140 | $127,109.15 | $324.66 | $609.06 | $33,215.51 | $97,505.29 | $126,784.49 |
| 141 | $126,784.49 | $326.21 | $607.51 | $33,541.72 | $98,112.80 | $126,458.28 |
| 142 | $126,458.28 | $327.77 | $605.95 | $33,869.50 | $98,718.74 | $126,130.50 |
| 143 | $126,130.50 | $329.34 | $604.38 | $34,198.84 | $99,323.12 | $125,801.16 |
| 144 | $125,801.16 | $330.92 | $602.80 | $34,529.76 | $99,925.92 | $125,470.24 |
| 145 | $125,470.24 | $332.51 | $601.21 | $34,862.27 | $100,527.13 | $125,137.73 |
| 146 | $125,137.73 | $334.10 | $599.62 | $35,196.37 | $101,126.75 | $124,803.63 |
| 147 | $124,803.63 | $335.70 | $598.02 | $35,532.08 | $101,724.76 | $124,467.92 |
| 148 | $124,467.92 | $337.31 | $596.41 | $35,869.39 | $102,321.17 | $124,130.61 |
| 149 | $124,130.61 | $338.93 | $594.79 | $36,208.31 | $102,915.97 | $123,791.69 |
| 150 | $123,791.69 | $340.55 | $593.17 | $36,548.87 | $103,509.13 | $123,451.13 |
| 151 | $123,451.13 | $342.18 | $591.54 | $36,891.05 | $104,100.67 | $123,108.95 |
| 152 | $123,108.95 | $343.82 | $589.90 | $37,234.87 | $104,690.57 | $122,765.13 |
| 153 | $122,765.13 | $345.47 | $588.25 | $37,580.34 | $105,278.82 | $122,419.66 |
| 154 | $122,419.66 | $347.13 | $586.59 | $37,927.47 | $105,865.41 | $122,072.53 |
| 155 | $122,072.53 | $348.79 | $584.93 | $38,276.26 | $106,450.34 | $121,723.74 |

TABLE 3d-continued

CONVENTIONAL LOAN AMORTIZATION SCHEDULE

| | LOAN AMOUNT | | $160,000.00 | | |
|---|---|---|---|---|---|
| | INTEREST RATE | | 5.75% | | |
| | TOTAL NUMBER OF PAYMENTS | | 360 | | |
| | PAYMENT | | | $933.72 | |

| PMT | BEGINNING LOAN BALANCE | PRINCIPAL | INTEREST | CUMMULATIVE PRINCIPAL | CUMMULATIVE INTEREST | LOAN BALANCE |
|---|---|---|---|---|---|---|
| 156 | $121,723.74 | $350.46 | $583.26 | $38,626.72 | $107,033.60 | $121,373.28 |
| 157 | $121,373.28 | $352.14 | $581.58 | $38,978.86 | $107,615.18 | $121,021.14 |
| 158 | $121,021.14 | $353.83 | $579.89 | $39,332.68 | $108,195.08 | $120,667.32 |
| 159 | $120,667.32 | $355.52 | $578.20 | $39,688.21 | $108,773.27 | $120,311.79 |
| 160 | $120,311.79 | $357.23 | $576.49 | $40,045.43 | $109,349.77 | $119,954.57 |
| 161 | $119,954.57 | $358.94 | $574.78 | $40,404.37 | $109,924.55 | $119,595.63 |
| 162 | $119,595.63 | $360.66 | $573.06 | $40,765.03 | $110,497.61 | $119,234.97 |
| 163 | $119,234.97 | $362.39 | $571.33 | $41,127.41 | $111,068.95 | $118,872.59 |
| 164 | $118,872.59 | $364.12 | $569.60 | $41,491.54 | $111,638.54 | $118,508.46 |
| 165 | $118,508.46 | $365.87 | $567.85 | $41,857.40 | $112,206.40 | $118,142.60 |
| 166 | $118,142.60 | $367.62 | $566.10 | $42,225.02 | $112,772.50 | $117,774.98 |
| 167 | $117,774.98 | $369.38 | $564.34 | $42,594.40 | $113,336.84 | $117,405.60 |
| 168 | $117,405.60 | $371.15 | $562.57 | $42,965.56 | $113,899.40 | $117,034.44 |
| 169 | $117,034.44 | $372.93 | $560.79 | $43,338.49 | $114,460.19 | $116,661.51 |
| 170 | $116,661.51 | $374.72 | $559.00 | $43,713.20 | $115,019.20 | $116,286.80 |
| 171 | $116,286.80 | $376.51 | $557.21 | $44,089.72 | $115,576.40 | $115,910.28 |
| 172 | $115,910.28 | $378.32 | $555.40 | $44,468.03 | $116,131.81 | $115,531.97 |
| 173 | $115,531.97 | $380.13 | $553.59 | $44,848.16 | $116,685.40 | $115,151.84 |
| 174 | $115,151.84 | $381.95 | $551.77 | $45,230.11 | $117,237.17 | $114,769.89 |
| 175 | $114,769.89 | $383.78 | $549.94 | $45,613.89 | $117,787.11 | $114,386.11 |
| 176 | $114,386.11 | $385.62 | $548.10 | $45,999.51 | $118,335.21 | $114,000.49 |
| 177 | $114,000.49 | $387.47 | $546.25 | $46,386.98 | $118,881.46 | $113,613.02 |
| 178 | $113,613.02 | $389.32 | $544.40 | $46,776.30 | $119,425.86 | $113,223.70 |
| 179 | $113,223.70 | $391.19 | $542.53 | $47,167.49 | $119,968.39 | $112,832.51 |
| 180 | $112,832.51 | $393.06 | $540.66 | $47,560.56 | $120,509.04 | $112,439.44 |
| 181 | $112,439.44 | $394.95 | $538.77 | $47,955.51 | $121,047.81 | $112,044.49 |
| 182 | $112,044.49 | $396.84 | $536.88 | $48,352.35 | $121,584.69 | $111,647.65 |
| 183 | $111,647.65 | $398.74 | $534.98 | $48,751.09 | $122,119.67 | $111,248.91 |
| 184 | $111,248.91 | $400.65 | $533.07 | $49,151.74 | $122,652.74 | $110,848.26 |
| 185 | $110,848.26 | $402.57 | $531.15 | $49,554.31 | $123,183.89 | $110,445.69 |
| 186 | $110,445.69 | $404.50 | $529.22 | $49,958.81 | $123,713.11 | $110,041.19 |
| 187 | $110,041.19 | $406.44 | $527.28 | $50,365.25 | $124,240.39 | $109,634.75 |
| 188 | $109,634.75 | $408.39 | $525.33 | $50,773.64 | $124,765.72 | $109,226.36 |
| 189 | $109,226.36 | $410.34 | $523.38 | $51,183.98 | $125,289.10 | $108,816.02 |
| 190 | $108,816.02 | $412.31 | $521.41 | $51,596.29 | $125,810.51 | $108,403.71 |
| 191 | $108,403.71 | $414.29 | $519.43 | $52,010.58 | $126,329.94 | $107,989.42 |
| 192 | $107,989.42 | $416.27 | $517.45 | $52,426.85 | $126,847.39 | $107,573.15 |
| 193 | $107,573.15 | $418.27 | $515.45 | $52,845.12 | $127,362.84 | $107,154.88 |
| 194 | $107,154.88 | $420.27 | $513.45 | $53,265.38 | $127,876.30 | $106,734.62 |
| 195 | $106,734.62 | $422.28 | $511.44 | $53,687.67 | $128,387.73 | $106,312.33 |
| 196 | $106,312.33 | $424.31 | $509.41 | $54,111.97 | $128,897.15 | $105,888.03 |
| 197 | $105,888.03 | $426.34 | $507.38 | $54,538.31 | $129,404.53 | $105,461.69 |
| 198 | $105,461.69 | $428.38 | $505.34 | $54,966.70 | $129,909.86 | $105,033.30 |
| 199 | $105,033.30 | $430.44 | $503.28 | $55,397.13 | $130,413.15 | $104,602.87 |
| 200 | $104,602.87 | $432.50 | $501.22 | $55,829.63 | $130,914.37 | $104,170.37 |
| 201 | $104,170.37 | $434.57 | $499.15 | $56,264.20 | $131,413.52 | $103,735.80 |
| 202 | $103,735.80 | $436.65 | $497.07 | $56,700.85 | $131,910.59 | $103,299.15 |
| 203 | $103,299.15 | $438.74 | $494.98 | $57,139.60 | $132,405.56 | $102,860.40 |
| 204 | $102,860.40 | $440.85 | $492.87 | $57,580.45 | $132,898.43 | $102,419.55 |
| 205 | $102,419.55 | $442.96 | $490.76 | $58,023.41 | $133,389.19 | $101,976.59 |
| 206 | $101,976.59 | $445.08 | $488.64 | $58,468.49 | $133,877.83 | $101,531.51 |
| 207 | $101,531.51 | $447.21 | $486.51 | $58,915.70 | $134,364.34 | $101,084.30 |
| 208 | $101,084.30 | $449.36 | $484.36 | $59,365.06 | $134,848.70 | $100,634.94 |
| 209 | $100,634.94 | $451.51 | $482.21 | $59,816.57 | $135,330.91 | $100,183.43 |
| 210 | $100,183.43 | $453.67 | $480.05 | $60,270.25 | $135,810.95 | $99,729.75 |
| 211 | $99,729.75 | $455.85 | $477.87 | $60,726.09 | $136,288.83 | $99,273.91 |
| 212 | $99,273.91 | $458.03 | $475.69 | $61,184.13 | $136,764.51 | $98,815.87 |
| 213 | $98,815.87 | $460.23 | $473.49 | $61,644.35 | $137,238.01 | $98,355.65 |
| 214 | $98,355.65 | $462.43 | $471.29 | $62,106.79 | $137,709.29 | $97,893.21 |
| 215 | $97,893.21 | $464.65 | $469.07 | $62,571.43 | $138,178.37 | $97,428.57 |
| 216 | $97,428.57 | $466.87 | $466.85 | $63,038.31 | $138,645.21 | $96,961.69 |
| 217 | $96,961.69 | $469.11 | $464.61 | $63,507.42 | $139,109.82 | $96,492.58 |
| 218 | $96,492.58 | $471.36 | $462.36 | $63,978.78 | $139,572.18 | $96,021.22 |
| 219 | $96,021.22 | $473.62 | $460.10 | $64,452.40 | $140,032.28 | $95,547.60 |
| 220 | $95,547.60 | $475.89 | $457.83 | $64,928.29 | $140,490.11 | $95,071.71 |
| 221 | $95,071.71 | $478.17 | $455.55 | $65,406.45 | $140,945.67 | $94,593.55 |
| 222 | $94,593.55 | $480.46 | $453.26 | $65,886.91 | $141,398.93 | $94,113.09 |
| 223 | $94,113.09 | $482.76 | $450.96 | $66,369.68 | $141,849.88 | $93,630.32 |
| 224 | $93,630.32 | $485.07 | $448.65 | $66,854.75 | $142,298.53 | $93,145.25 |
| 225 | $93,145.25 | $487.40 | $446.32 | $67,342.15 | $142,744.85 | $92,657.85 |
| 226 | $92,657.85 | $489.73 | $443.99 | $67,831.88 | $143,188.84 | $92,168.12 |

TABLE 3d-continued

CONVENTIONAL LOAN AMORTIZATION SCHEDULE

| | LOAN AMOUNT | | $160,000.00 | | |
|---|---|---|---|---|---|
| | INTEREST RATE | | 5.75% | | |
| | TOTAL NUMBER OF PAYMENTS | | 360 | | |
| | PAYMENT | | $933.72 | | |

| PMT | BEGINNING LOAN BALANCE | PRINCIPAL | INTEREST | CUMMULATIVE PRINCIPAL | CUMMULATIVE INTEREST | LOAN BALANCE |
|---|---|---|---|---|---|---|
| 227 | $92,168.12 | $492.08 | $441.64 | $68,323.96 | $143,630.48 | $91,676.04 |
| 228 | $91,676.04 | $494.44 | $439.28 | $68,818.40 | $144,069.76 | $91,181.60 |
| 229 | $91,181.60 | $496.81 | $436.91 | $69,315.21 | $144,506.67 | $90,684.79 |
| 230 | $90,684.79 | $499.19 | $434.53 | $69,814.40 | $144,941.20 | $90,185.60 |
| 231 | $90,185.60 | $501.58 | $432.14 | $70,315.98 | $145,373.34 | $89,684.02 |
| 232 | $89,684.02 | $503.98 | $429.74 | $70,819.97 | $145,803.07 | $89,180.03 |
| 233 | $89,180.03 | $506.40 | $427.32 | $71,326.36 | $146,230.40 | $88,673.64 |
| 234 | $88,673.64 | $508.83 | $424.89 | $71,835.19 | $146,655.29 | $88,164.81 |
| 235 | $88,164.81 | $511.26 | $422.46 | $72,346.45 | $147,077.75 | $87,653.55 |
| 236 | $87,653.55 | $513.71 | $420.01 | $72,860.17 | $147,497.75 | $87,139.83 |
| 237 | $87,139.83 | $516.17 | $417.55 | $73,376.34 | $147,915.30 | $86,623.66 |
| 238 | $86,623.66 | $518.65 | $415.07 | $73,894.99 | $148,330.37 | $86,105.01 |
| 239 | $86,105.01 | $521.13 | $412.59 | $74,416.12 | $148,742.96 | $85,583.88 |
| 240 | $85,583.88 | $523.63 | $410.09 | $74,939.75 | $149,153.05 | $85,060.25 |
| 241 | $85,060.25 | $526.14 | $407.58 | $75,465.89 | $149,560.63 | $84,534.11 |
| 242 | $84,534.11 | $528.66 | $405.06 | $75,994.55 | $149,965.69 | $84,005.45 |
| 243 | $84,005.45 | $531.19 | $402.53 | $76,525.75 | $150,368.21 | $83,474.25 |
| 244 | $83,474.25 | $533.74 | $399.98 | $77,059.49 | $150,768.19 | $82,940.51 |
| 245 | $82,940.51 | $536.30 | $397.42 | $77,595.78 | $151,165.62 | $82,404.22 |
| 246 | $82,404.22 | $538.87 | $394.85 | $78,134.65 | $151,560.47 | $81,865.35 |
| 247 | $81,865.35 | $541.45 | $392.27 | $78,676.10 | $151,952.74 | $81,323.90 |
| 248 | $81,323.90 | $544.04 | $389.68 | $79,220.14 | $152,342.42 | $80,779.86 |
| 249 | $80,779.86 | $546.65 | $387.07 | $79,766.79 | $152,729.49 | $80,233.21 |
| 250 | $80,233.21 | $549.27 | $384.45 | $80,316.06 | $153,113.94 | $79,683.94 |
| 251 | $79,683.94 | $551.90 | $381.82 | $80,867.96 | $153,495.76 | $79,132.04 |
| 252 | $79,132.04 | $554.55 | $379.17 | $81,422.51 | $153,874.93 | $78,577.49 |
| 253 | $78,577.49 | $557.20 | $376.52 | $81,979.71 | $154,251.45 | $78,020.29 |
| 254 | $78,020.29 | $559.87 | $373.85 | $82,539.58 | $154,625.30 | $77,460.42 |
| 255 | $77,460.42 | $562.56 | $371.16 | $83,102.14 | $154,996.46 | $76,897.86 |
| 256 | $76,897.86 | $565.25 | $368.47 | $83,667.39 | $155,364.93 | $76,332.61 |
| 257 | $76,332.61 | $567.96 | $365.76 | $84,235.35 | $155,730.69 | $75,764.65 |
| 258 | $75,764.65 | $570.68 | $363.04 | $84,806.03 | $156,093.73 | $75,193.97 |
| 259 | $75,193.97 | $573.42 | $360.30 | $85,379.45 | $156,454.03 | $74,620.55 |
| 260 | $74,620.55 | $576.16 | $357.56 | $85,955.61 | $156,811.59 | $74,044.39 |
| 261 | $74,044.39 | $578.92 | $354.80 | $86,534.53 | $157,166.39 | $73,465.47 |
| 262 | $73,465.47 | $581.70 | $352.02 | $87,116.23 | $157,518.41 | $72,883.77 |
| 263 | $72,883.77 | $584.49 | $349.23 | $87,700.72 | $157,867.64 | $72,299.28 |
| 264 | $72,299.28 | $587.29 | $346.43 | $88,288.00 | $158,214.08 | $71,712.00 |
| 265 | $71,712.00 | $590.10 | $343.62 | $88,878.10 | $158,557.70 | $71,121.90 |
| 266 | $71,121.90 | $592.93 | $340.79 | $89,471.03 | $158,898.49 | $70,528.97 |
| 267 | $70,528.97 | $595.77 | $337.95 | $90,066.80 | $159,236.44 | $69,933.20 |
| 268 | $69,933.20 | $598.62 | $335.10 | $90,665.42 | $159,571.54 | $69,334.58 |
| 269 | $69,334.58 | $601.49 | $332.23 | $91,266.91 | $159,903.77 | $68,733.09 |
| 270 | $68,733.09 | $604.37 | $329.35 | $91,871.29 | $160,233.11 | $68,128.71 |
| 271 | $68,128.71 | $607.27 | $326.45 | $92,478.56 | $160,559.56 | $67,521.44 |
| 272 | $67,521.44 | $610.18 | $323.54 | $93,088.74 | $160,883.10 | $66,911.26 |
| 273 | $66,911.26 | $613.10 | $320.62 | $93,701.84 | $161,203.72 | $66,298.16 |
| 274 | $66,298.16 | $616.04 | $317.68 | $94,317.88 | $161,521.40 | $65,682.12 |
| 275 | $65,682.12 | $618.99 | $314.73 | $94,936.88 | $161,836.12 | $65,063.12 |
| 276 | $65,063.12 | $621.96 | $311.76 | $95,558.84 | $162,147.88 | $64,441.16 |
| 277 | $64,441.16 | $624.94 | $308.78 | $96,183.78 | $162,456.66 | $63,816.22 |
| 278 | $63,816.22 | $627.93 | $305.79 | $96,811.71 | $162,762.45 | $63,188.29 |
| 279 | $63,188.29 | $630.94 | $302.78 | $97,442.65 | $163,065.23 | $62,557.35 |
| 280 | $62,557.35 | $633.97 | $299.75 | $98,076.62 | $163,364.98 | $61,923.38 |
| 281 | $61,923.38 | $637.00 | $296.72 | $98,713.62 | $163,661.70 | $61,286.38 |
| 282 | $61,286.38 | $640.06 | $293.66 | $99,353.68 | $163,955.36 | $60,646.32 |
| 283 | $60,646.32 | $643.12 | $290.60 | $99,996.80 | $164,245.96 | $60,003.20 |
| 284 | $60,003.20 | $646.20 | $287.52 | $100,643.01 | $164,533.47 | $59,356.99 |
| 285 | $59,356.99 | $649.30 | $284.42 | $101,292.31 | $164,817.89 | $58,707.69 |
| 286 | $58,707.69 | $652.41 | $281.31 | $101,944.72 | $165,099.20 | $58,055.28 |
| 287 | $58,055.28 | $655.54 | $278.18 | $102,600.26 | $165,377.38 | $57,399.74 |
| 288 | $57,399.74 | $658.68 | $275.04 | $103,258.94 | $165,652.42 | $56,741.06 |
| 289 | $56,741.06 | $661.84 | $271.88 | $103,920.77 | $165,924.31 | $56,079.23 |
| 290 | $56,079.23 | $665.01 | $268.71 | $104,585.78 | $166,193.02 | $55,414.22 |
| 291 | $55,414.22 | $668.19 | $265.53 | $105,253.97 | $166,458.55 | $54,746.03 |
| 292 | $54,746.03 | $671.40 | $262.32 | $105,925.37 | $166,720.87 | $54,074.63 |
| 293 | $54,074.63 | $674.61 | $259.11 | $106,599.98 | $166,979.98 | $53,400.02 |
| 294 | $53,400.02 | $677.84 | $255.88 | $107,277.83 | $167,235.85 | $52,722.17 |
| 295 | $52,722.17 | $681.09 | $252.63 | $107,958.92 | $167,488.48 | $52,041.08 |
| 296 | $52,041.08 | $684.36 | $249.36 | $108,643.28 | $167,737.84 | $51,356.72 |
| 297 | $51,356.72 | $687.64 | $246.08 | $109,330.91 | $167,983.93 | $50,669.09 |

TABLE 3d-continued

CONVENTIONAL LOAN AMORTIZATION SCHEDULE

LOAN AMOUNT $160,000.00
INTEREST RATE 5.75%
TOTAL NUMBER OF PAYMENTS 360
PAYMENT $933.72

| PMT | BEGINNING LOAN BALANCE | PRINCIPAL | INTEREST | CUMMULATIVE PRINCIPAL | CUMMULATIVE INTEREST | LOAN BALANCE |
|---|---|---|---|---|---|---|
| 298 | $50,669.09 | $690.93 | $242.79 | $110,021.84 | $168,226.72 | $49,978.16 |
| 299 | $49,978.16 | $694.24 | $239.48 | $110,716.08 | $168,466.20 | $49,283.92 |
| 300 | $49,283.92 | $697.57 | $236.15 | $111,413.65 | $168,702.35 | $48,586.35 |
| 301 | $48,586.35 | $700.91 | $232.81 | $112,114.56 | $168,935.16 | $47,885.44 |
| 302 | $47,885.44 | $704.27 | $229.45 | $112,818.83 | $169,164.61 | $47,181.17 |
| 303 | $47,181.17 | $707.64 | $226.08 | $113,526.47 | $169,390.69 | $46,473.53 |
| 304 | $46,473.53 | $711.03 | $222.69 | $114,237.51 | $169,613.37 | $45,762.49 |
| 305 | $45,762.49 | $714.44 | $219.28 | $114,951.95 | $169,832.65 | $45,048.05 |
| 306 | $45,048.05 | $717.86 | $215.86 | $115,669.81 | $170,048.51 | $44,330.19 |
| 307 | $44,330.19 | $721.30 | $212.42 | $116,391.12 | $170,260.92 | $43,608.88 |
| 308 | $43,608.88 | $724.76 | $208.96 | $117,115.88 | $170,469.88 | $42,884.12 |
| 309 | $42,884.12 | $728.23 | $205.49 | $117,844.11 | $170,675.37 | $42,155.89 |
| 310 | $42,155.89 | $731.72 | $202.00 | $118,575.84 | $170,877.36 | $41,424.16 |
| 311 | $41,424.16 | $735.23 | $198.49 | $119,311.07 | $171,075.85 | $40,688.93 |
| 312 | $40,688.93 | $738.75 | $194.97 | $120,049.82 | $171,270.82 | $39,950.18 |
| 313 | $39,950.18 | $742.29 | $191.43 | $120,792.11 | $171,462.25 | $39,207.89 |
| 314 | $39,207.89 | $745.85 | $187.87 | $121,537.96 | $171,650.12 | $38,462.04 |
| 315 | $38,462.04 | $749.42 | $184.30 | $122,287.38 | $171,834.42 | $37,712.62 |
| 316 | $37,712.62 | $753.01 | $180.71 | $123,040.39 | $172,015.13 | $36,959.61 |
| 317 | $36,959.61 | $756.62 | $177.10 | $123,797.02 | $172,192.22 | $36,202.98 |
| 318 | $36,202.98 | $760.25 | $173.47 | $124,557.26 | $172,365.70 | $35,442.74 |
| 319 | $35,442.74 | $763.89 | $169.83 | $125,321.15 | $172,535.53 | $34,678.85 |
| 320 | $34,678.85 | $767.55 | $166.17 | $126,088.70 | $172,701.70 | $33,911.30 |
| 321 | $33,911.30 | $771.23 | $162.49 | $126,859.93 | $172,864.19 | $33,140.07 |
| 322 | $33,140.07 | $774.92 | $158.80 | $127,634.86 | $173,022.98 | $32,365.14 |
| 323 | $32,365.14 | $778.64 | $155.08 | $128,413.49 | $173,178.07 | $31,586.51 |
| 324 | $31,586.51 | $782.37 | $151.35 | $129,195.86 | $173,329.42 | $30,804.14 |
| 325 | $30,804.14 | $786.12 | $147.60 | $129,981.98 | $173,477.02 | $30,018.02 |
| 326 | $30,018.02 | $789.88 | $143.84 | $130,771.86 | $173,620.86 | $29,228.14 |
| 327 | $29,228.14 | $793.67 | $140.05 | $131,565.53 | $173,760.91 | $28,434.47 |
| 328 | $28,434.47 | $797.47 | $136.25 | $132,363.00 | $173,897.16 | $27,637.00 |
| 329 | $27,637.00 | $801.29 | $132.43 | $133,164.30 | $174,029.58 | $26,835.70 |
| 330 | $26,835.70 | $805.13 | $128.59 | $133,969.43 | $174,158.17 | $26,030.57 |
| 331 | $26,030.57 | $808.99 | $124.73 | $134,778.42 | $174,282.90 | $25,221.58 |
| 332 | $25,221.58 | $812.87 | $120.85 | $135,591.28 | $174,403.76 | $24,408.72 |
| 333 | $24,408.72 | $816.76 | $116.96 | $136,408.05 | $174,520.71 | $23,591.95 |
| 334 | $23,591.95 | $820.68 | $113.04 | $137,228.72 | $174,633.76 | $22,771.28 |
| 335 | $22,771.28 | $824.61 | $109.11 | $138,053.33 | $174,742.87 | $21,946.67 |
| 336 | $21,946.67 | $828.56 | $105.16 | $138,881.89 | $174,848.03 | $21,118.11 |
| 337 | $21,118.11 | $832.53 | $101.19 | $139,714.42 | $174,949.22 | $20,285.58 |
| 338 | $20,285.58 | $836.52 | $97.20 | $140,550.93 | $175,046.43 | $19,449.07 |
| 339 | $19,449.07 | $840.53 | $93.19 | $141,391.46 | $175,139.62 | $18,608.54 |
| 340 | $18,608.54 | $844.55 | $89.17 | $142,236.02 | $175,228.78 | $17,763.98 |
| 341 | $17,763.98 | $848.60 | $85.12 | $143,084.62 | $175,313.90 | $16,915.38 |
| 342 | $16,915.38 | $852.67 | $81.05 | $143,937.28 | $175,394.96 | $16,062.72 |
| 343 | $16,062.72 | $856.75 | $76.97 | $144,794.04 | $175,471.92 | $15,205.96 |
| 344 | $15,205.96 | $860.86 | $72.86 | $145,654.89 | $175,544.79 | $14,345.11 |
| 345 | $14,345.11 | $864.98 | $68.74 | $146,519.88 | $175,613.52 | $13,480.12 |
| 346 | $13,480.12 | $869.13 | $64.59 | $147,389.01 | $175,678.11 | $12,610.99 |
| 347 | $12,610.99 | $873.29 | $60.43 | $148,262.30 | $175,738.54 | $11,737.70 |
| 348 | $11,737.70 | $877.48 | $56.24 | $149,139.77 | $175,794.79 | $10,860.23 |
| 349 | $10,860.23 | $881.68 | $52.04 | $150,021.46 | $175,846.82 | $9,978.54 |
| 350 | $9,978.54 | $885.91 | $47.81 | $150,907.36 | $175,894.64 | $9,092.64 |
| 351 | $9,092.64 | $890.15 | $43.57 | $151,797.51 | $175,938.21 | $8,202.49 |
| 352 | $8,202.49 | $894.42 | $39.30 | $152,691.93 | $175,977.51 | $7,308.07 |
| 353 | $7,308.07 | $898.70 | $35.02 | $153,590.63 | $176,012.53 | $6,409.37 |
| 354 | $6,409.37 | $903.01 | $30.71 | $154,493.64 | $176,043.24 | $5,506.36 |
| 355 | $5,506.36 | $907.34 | $26.38 | $155,400.98 | $176,069.62 | $4,599.02 |
| 356 | $4,599.02 | $911.68 | $22.04 | $156,312.66 | $176,091.66 | $3,687.34 |
| 357 | $3,687.34 | $916.05 | $17.67 | $157,228.71 | $176,109.33 | $2,771.29 |
| 358 | $2,771.29 | $920.44 | $13.28 | $158,149.15 | $176,122.61 | $1,850.85 |
| 359 | $1,850.85 | $924.85 | $8.87 | $159,074.00 | $176,131.48 | $926.00 |
| 360 | $926.00 | $929.28 | $4.44 | $160,003.28 | $176,135.92 | −$3.28 |

Using this system gives consumers the ability to achieve a variety of financial goals such as accelerating the payoff of a mortgage, paying for a college education, providing an additional source of income, creating additional net worth, accumulating assets, making the maximum affordable/minimum monthly payment, having a declining minimum monthly payment, or any other long term financial goal which requires the accumulation of wealth. The necessity of making payments in addition to a conventional loan payment is not required, provided the interest rate on the loan allows for a difference between the conventional loan payment and the interest only loan, or there is a lump sum interest earning principal payment that achieves desirable results over the life of the loan. If the principal payments are reduced or the interest rate earned on the principal declines, possible additional principal payment would be required to meet the same objectives. The system empowers the consumer to achieve a variety of financial goals not typically associated with the conventional mortgage loan.

The system empowers the consumer and also allows lending institutions the ability to improve the level of fee income to which they are accustomed. The system offers consumers multiple benefits such as a lower credit score, a level amount of tax deductible interest paid annually, and a unique opportunity to leverage an asset to achieve financial goals. These benefits occur while making a payment less than or equal to a conventional loan payment. The system allows the consumer and lending institution rising protection against default. Consumers will not look at a conventional loan the same way with the flexibility and dramatic financial implications the system provides.

The system further provides increased security to the lender. With a traditional or conventional mortgage, the lender relies exclusively on the equity in the property as its collateral for the loan. While the equity in a property traditionally grows over time, such is not always the case. For example, in a falling or declining market, a property may actually be worth less in the future than when the loan was issued. Hence, not only does the borrower find themselves "upside down" by owing more money on the property than the property is worth, but the lender has now greatly increased their risk for if the borrower defaults, the lender will not be able to sell the property for the amount that is due on the loan. While some lenders may attempt to guard against such contingencies by adjusting their loan to value "LTV" ratios, e.g, from 90% to 70%, this still may not prove adequate in some markets or in some market conditions. In other words, even if a lender set the LTV at 70%, the value of the property would need to still decline by something less than 30% to allow for the lender to breakeven in a default sale situation as there will generally be sales costs involved in such a situation. Of course if a lender sets a higher LTV ratio, say 95-97% or more, the lender will be assuming a greater risk initially, and will assume that risk for some time until some equity can be established, for the sales costs added to the loan balance will likely be greater than the sale price of the property.

However, by providing a separate investment program which the lender may use as collateral, the lender is actually able to diversify its collateral and thus reduce its risks. Thus rather than a lender relying exclusively on real estate, and more particularly, real estate in a particular market, and more specifically still, the value of one particular property, the lender can diversify its risk by relying on investments in real estate in other markets and/or investments that have no connection to real estate.

The investment program further provides additional lending opportunities for the lender. For example, a lender could provide a debit card, line of credit, or home equity type of financial services to a customer based on the value of the customer's investment program. This has the additional advantage of providing a source of collateral for a new loan to the customer other than the equity in the property. In some market conditions, such as when there have been declining property values, a particular property may not have any equity against which a home equity loan could be written, but there could be a collateralizable value in the investment program against which a new loan could be written. Moreover, the interest rate that could be offered to the customer in such circumstances could be below the market rates since the customer is essentially acting as their own bank and borrowing their own money with the interest rate simply covering the cost of the lender facilitating the transaction.

The interest only component of the present invention has additional benefits to both the borrower and the lender. For the borrower, because the amount of interest paid per year will remain constant, the potential tax deduction will also remain constant. In contrast, with traditional or conventional mortgages, the amount of interest that can be deducted declines each year. Additionally, the fact that the interest remains constant also means the lender will receive constant revenue from the loan over time. Here again, with a conventional loan, as payments are made, less and less of each payment is attributable to interest and more and more to principal, meaning the lender, over time, receives less and less monthly income from a particular loan. The present invention eliminates this negative aspect of a declining loan balance and the associated declining revenue to a lender.

The present invention thus comprises a combined mortgage and investment program wherein the mortgage is set up as an interest payment only loan and is additionally secured by an investment account into which periodic payments, which would have been principal payments under a conventional mortgage at similar rates and terms, are deposited. Interest compounds on this investment side of the program so that equity is built on the principal payments, otherwise dormant insofar as producing appreciation. As a result, many advantages to both the lender and consumer occur. Mortgage payments are flat on the mortgage side, yet equity on principal appreciates as well, in addition to, and apart from, any real estate appreciation or depreciation. The ability to pay off the capitalized value of the mortgage over a shorter term than a conventional loan is provided, while much greater flexibility and wealth accumulation is provided for the consumer.

The system works by integrating the two financial concepts of compound interest and interest only loan payments. The system separates the principal payment from the interest payment. The principal payment through the system does not reduce the amount of the loan, but is applied to an investment that earns a rate of return. The consumer chooses any conventional loan amortization period at prevailing market rates to help determine the amount of the total monthly payment. The difference between a conventional loan payment and the interest only loan payment helps determine the amount to be applied towards the investment. The payment with the system can remain the same as a conventional loan payment or be reduced to extend the period of time to achieve the financial results desired. The consumer may be responsible to select the best investment and loan rates available being prudent to choose a realistic time horizon and a proper risk tolerance. The interest rate achieved, the amount of principal applied towards the investment component, and the length of time the money is invested all determine the frequency to achieve a consumer's financial goal. The interest only payment allows the amount allocated to the investment an opportunity to accumulate at any given rate of return. The earnings on the investment value have a net effect of decreasing the interest rate of the loan over time. The higher the rate earned on the investment the faster the principal grows to equal or exceed the original loan balance. The total out of pocket cost equals the total interest paid on the loan plus the total payments to the systematic and/or lump sum investment. As the rate of return on the investment increases the result can even have a net effect of reducing the out of pocket costs to below the stated loan value. In addition, the level interest only payment allows for a consistent income tax deduction over the life of the loan.

The Payment Table 4 below illustrates the cost of borrowing versus the time period needed to reach desired principal values at specified interest rates. The Payment Table illustrates a loan amount of $100,000 at an interest only loan rate of 3.125%. The difference between a conventional loan payment of $583.57 and the interest only loan payment of $260.42 equals $323.15 which is an amount eligible for systematic investment. The Payment Table shows the effect of compound interest on systematic investments at various interest rates. In addition, the Payment Table could also be used to illustrate different loan amounts, loan interest rates, different rates of return, and different principal amounts applied to the investment.

PAYMENT TABLE 4

| | | |
|---|---|---|
| LOAN | | $100,000 |
| RATE | | 3.125% |
| AMT | | $323.15 |
| INVESTMENT PAYMENT CALCULATION | | |
| Conventional Loan Payment at 5.75% | | $583.57 |
| LESS: Interest Only Loan Payment at 3.125% | | $260.42 |
| Difference Applied to Investment | | $323.15 |

| | COST OF BORROWING | | SYSTEMATIC INVESTMENT | | | | | | |
|---|---|---|---|---|---|---|---|---|---|
| DATE | MINIMUM MONTHLY INTEREST PAYMENT ($) | TOTAL INTEREST PAID ($) | INV AMT ($) | TOTAL INVESTMENT AMOUNT ($) | 1% ($) | 2% ($) | 3% ($) | 4% ($) | 5% ($) |
| 1 | 260.42 | 260.42 | 323.15 | 323.15 | 323.42 | 323.69 | 323.96 | 324.23 | 324.50 |
| 2 | 260.42 | 520.83 | 323.15 | 646.30 | 647.11 | 647.92 | 648.73 | 649.54 | 650.34 |
| 3 | 260.42 | 781.25 | 323.15 | 969.45 | 971.07 | 972.69 | 974.31 | 975.93 | 977.55 |
| 4 | 260.42 | 1,041.67 | 323.15 | 1,292.60 | 1,295.30 | 1,297.99 | 1,300.70 | 1,303.41 | 1,306.12 |
| 5 | 260.42 | 1,302.08 | 323.15 | 1,615.75 | 1,619.79 | 1,623.85 | 1,627.91 | 1,631.98 | 1,636.06 |
| 6 | 260.42 | 1,562.50 | 323.15 | 1,938.90 | 1,944.56 | 1,950.24 | 1,955.94 | 1,961.65 | 1,967.37 |
| 7 | 260.42 | 1,822.92 | 323.15 | 2,262.05 | 2,269.60 | 2,277.18 | 2,284.78 | 2,292.41 | 2,300.07 |
| 8 | 260.42 | 2,083.33 | 323.15 | 2,585.20 | 2,594.91 | 2,604.66 | 2,614.45 | 2,624.28 | 2,634.15 |
| 9 | 260.42 | 2,343.75 | 323.15 | 2,908.35 | 2,920.50 | 2,932.69 | 2,944.95 | 2,957.26 | 2,969.62 |
| 10 | 260.42 | 2,604.17 | 323.15 | 3,231.50 | 3,246.35 | 3,261.27 | 3,276.27 | 3,291.34 | 3,306.49 |
| 11 | 260.42 | 2,864.58 | 323.15 | 3,554.65 | 3,572.47 | 3,590.39 | 3,608.42 | 3,626.54 | 3,644.76 |
| 12 | 260.42 | 3,125.00 | 323.15 | 3,877.80 | 3,898.87 | 3,920.07 | 3,941.40 | 3,962.85 | 3,984.45 |
| 13 | 260.42 | 3,385.42 | 323.15 | 4,200.95 | 4,225.54 | 4,250.29 | 4,275.21 | 4,300.29 | 4,325.54 |
| 14 | 260.42 | 3,645.83 | 323.15 | 4,524.10 | 4,552.48 | 4,581.06 | 4,609.85 | 4,638.85 | 4,668.06 |
| 15 | 260.42 | 3,906.25 | 323.15 | 4,847.25 | 4,879.69 | 4,912.39 | 4,945.34 | 4,978.54 | 5,012.01 |
| 16 | 260.42 | 4,166.67 | 323.15 | 5,170.40 | 5,207.18 | 5,244.26 | 5,281.66 | 5,319.36 | 5,357.39 |
| 17 | 260.42 | 4,427.08 | 323.15 | 5,493.55 | 5,534.94 | 5,576.69 | 5,618.82 | 5,661.32 | 5,704.21 |
| 18 | 260.42 | 4,687.50 | 323.15 | 5,816.70 | 5,862.97 | 5,909.67 | 5,956.82 | 6,004.42 | 6,052.47 |
| 19 | 260.42 | 4,947.92 | 323.15 | 6,139.85 | 6,191.27 | 6,243.21 | 6,295.67 | 6,348.66 | 6,402.19 |
| 20 | 260.42 | 5,208.33 | 323.15 | 6,463.00 | 6,519.85 | 6,577.31 | 6,635.37 | 6,694.05 | 6,753.36 |
| 21 | 260.42 | 5,468.75 | 323.15 | 6,786.15 | 6,848.70 | 6,911.96 | 6,975.92 | 7,040.59 | 7,106.00 |
| 22 | 260.42 | 5,729.17 | 323.15 | 7,109.30 | 7,177.83 | 7,247.16 | 7,317.31 | 7,388.29 | 7,460.10 |
| 23 | 260.42 | 5,989.58 | 323.15 | 7,432.45 | 7,507.23 | 7,582.93 | 7,659.57 | 7,737.14 | 7,815.68 |
| 24 | 260.42 | 6,250.00 | 323.15 | 7,755.60 | 7,836.91 | 7,919.26 | 8,002.67 | 8,087.16 | 8,172.74 |
| 25 | 260.42 | 6,510.42 | 323.15 | 8,078.75 | 8,166.86 | 8,256.15 | 8,346.64 | 8,438.35 | 8,531.29 |
| 26 | 260.42 | 6,770.83 | 323.15 | 8,401.90 | 8,497.08 | 8,593.59 | 8,691.46 | 8,790.70 | 8,891.34 |
| 27 | 260.42 | 7,031.25 | 323.15 | 8,725.05 | 8,827.58 | 8,931.61 | 9,037.15 | 9,144.23 | 9,252.88 |
| 28 | 260.42 | 7,291.67 | 323.15 | 9,048.20 | 9,158.36 | 9,270.18 | 9,383.70 | 9,498.94 | 9,615.93 |
| 29 | 260.42 | 7,552.08 | 323.15 | 9,371.35 | 9,489.41 | 9,609.32 | 9,731.12 | 9,854.83 | 9,980.49 |
| 30 | 260.42 | 7,812.50 | 323.15 | 9,694.50 | 9,820.74 | 9,949.02 | 10,079.40 | 10,211.91 | 10,346.57 |
| 31 | 260.42 | 8,072.92 | 323.15 | 10,017.65 | 10,152.34 | 10,289.29 | 10,428.56 | 10,570.17 | 10,714.18 |
| 32 | 260.42 | 8,333.33 | 323.15 | 10,340.80 | 10,484.22 | 10,630.13 | 10,778.59 | 10,929.63 | 11,083.32 |
| 33 | 260.42 | 8,593.75 | 323.15 | 10,663.95 | 10,816.37 | 10,971.54 | 11,129.49 | 11,290.29 | 11,454.00 |
| 34 | 260.42 | 8,854.17 | 323.15 | 10,987.10 | 11,148.81 | 11,313.51 | 11,481.27 | 11,652.15 | 11,826.22 |
| 35 | 260.42 | 9,114.58 | 323.15 | 11,310.25 | 11,481.52 | 11,656.06 | 11,833.93 | 12,015.22 | 12,199.99 |
| 36 | 260.42 | 9,375.00 | 323.15 | 11,633.40 | 11,814.50 | 11,999.17 | 12,187.48 | 12,379.50 | 12,575.32 |
| 37 | 260.42 | 9,635.42 | 323.15 | 11,956.55 | 12,147.77 | 12,342.86 | 12,541.90 | 12,744.99 | 12,952.21 |
| 38 | 260.42 | 9,895.83 | 323.15 | 12,279.70 | 12,481.31 | 12,687.12 | 12,897.22 | 13,111.70 | 13,330.68 |
| 39 | 260.42 | 10,156.25 | 323.15 | 12,602.85 | 12,815.13 | 13,031.95 | 13,253.42 | 13,479.64 | 13,710.72 |
| 40 | 260.42 | 10,416.67 | 323.15 | 12,926.00 | 13,149.23 | 13,377.36 | 13,610.51 | 13,848.79 | 14,092.34 |
| 41 | 260.42 | 10,677.08 | 323.15 | 13,249.15 | 13,483.61 | 13,723.34 | 13,968.49 | 14,219.18 | 14,475.56 |
| 42 | 260.42 | 10,937.50 | 323.15 | 13,572.30 | 13,818.26 | 14,069.91 | 14,327.37 | 14,590.81 | 14,860.37 |
| 43 | 260.42 | 11,197.92 | 323.15 | 13,895.45 | 14,153.20 | 14,417.04 | 14,687.15 | 14,963.67 | 15,246.78 |
| 44 | 260.42 | 11,458.33 | 323.15 | 14,218.60 | 14,488.41 | 14,764.76 | 15,047.82 | 15,337.78 | 15,634.81 |
| 45 | 260.42 | 11,718.75 | 323.15 | 14,541.75 | 14,823.90 | 15,113.06 | 15,409.40 | 15,713.13 | 16,024.45 |
| 46 | 260.42 | 11,979.17 | 323.15 | 14,864.90 | 15,159.68 | 15,461.93 | 15,771.88 | 16,089.74 | 16,415.71 |
| 47 | 260.42 | 12,239.58 | 323.15 | 15,188.05 | 15,495.73 | 15,811.39 | 16,135.27 | 16,467.60 | 16,808.61 |
| 48 | 260.42 | 12,500.00 | 323.15 | 15,511.20 | 15,832.06 | 16,161.43 | 16,499.57 | 16,846.71 | 17,203.14 |
| 49 | 260.42 | 12,760.42 | 323.15 | 15,834.35 | 16,168.67 | 16,512.06 | 16,864.77 | 17,227.10 | 17,599.32 |
| 50 | 260.42 | 13,020.83 | 323.15 | 16,157.50 | 16,505.57 | 16,863.27 | 17,230.89 | 17,608.75 | 17,997.15 |
| 51 | 260.42 | 13,281.25 | 323.15 | 16,480.65 | 16,842.74 | 17,215.06 | 17,597.93 | 17,991.67 | 18,396.63 |
| 52 | 260.42 | 13,541.67 | 323.15 | 16,803.80 | 17,180.20 | 17,567.44 | 17,965.88 | 18,375.87 | 18,797.78 |

PAYMENT TABLE 4-continued

| | | | | | | | | | |
|---|---|---|---|---|---|---|---|---|---|
| 53 | 260.42 | 13,802.08 | 323.15 | 17,126.95 | 17,517.93 | 17,920.41 | 18,334.75 | 18,761.35 | 19,200.60 |
| 54 | 260.42 | 14,062.50 | 323.15 | 17,450.10 | 17,855.95 | 18,273.96 | 18,704.55 | 19,148.12 | 19,605.10 |
| 55 | 260.42 | 14,322.92 | 323.15 | 17,773.25 | 18,194.25 | 18,628.11 | 19,075.27 | 19,536.17 | 20,011.28 |
| 56 | 260.42 | 14,583.33 | 323.15 | 18,096.40 | 18,532.83 | 18,982.85 | 19,446.91 | 19,925.52 | 20,419.16 |
| 57 | 260.42 | 14,843.75 | 323.15 | 18,419.55 | 18,871.69 | 19,338.17 | 19,819.49 | 20,316.16 | 20,828.74 |
| 58 | 260.42 | 15,104.17 | 323.15 | 18,742.70 | 19,210.84 | 19,694.09 | 20,192.99 | 20,708.11 | 21,240.02 |
| 59 | 260.42 | 15,364.58 | 323.15 | 19,065.85 | 19,550.27 | 20,050.60 | 20,567.44 | 21,101.36 | 21,653.02 |
| 60 | 260.42 | 15,625.00 | 323.15 | 19,389.00 | 19,889.98 | 20,407.71 | 20,942.81 | 21,495.93 | 22,067.73 |
| 61 | 260.42 | 15,885.42 | 323.15 | 19,712.15 | 20,229.97 | 20,765.41 | 21,319.13 | 21,891.81 | 22,484.18 |
| 62 | 260.42 | 16,145.83 | 323.15 | 20,035.30 | 20,570.25 | 21,123.71 | 21,696.38 | 22,289.01 | 22,902.36 |
| 63 | 260.42 | 16,406.25 | 323.15 | 20,358.45 | 20,910.81 | 21,482.60 | 22,074.58 | 22,687.53 | 23,322.28 |
| 64 | 260.42 | 16,666.67 | 323.15 | 20,681.60 | 21,251.66 | 21,842.10 | 22,453.73 | 23,087.39 | 23,743.95 |
| 65 | 260.42 | 16,927.08 | 323.15 | 21,004.75 | 21,592.79 | 22,202.19 | 22,833.82 | 23,488.57 | 24,167.38 |
| 66 | 260.42 | 17,187.50 | 323.15 | 21,327.90 | 21,934.20 | 22,562.88 | 23,214.86 | 23,891.09 | 24,592.58 |
| 67 | 260.42 | 17,447.92 | 323.15 | 21,651.05 | 22,275.90 | 22,924.17 | 23,596.86 | 24,294.96 | 25,019.54 |
| 68 | 260.42 | 17,708.33 | 323.15 | 21,974.20 | 22,617.88 | 23,286.07 | 23,979.81 | 24,700.17 | 25,448.29 |
| 69 | 260.42 | 17,968.75 | 323.15 | 22,297.35 | 22,960.15 | 23,648.57 | 24,363.71 | 25,106.73 | 25,878.82 |
| 70 | 260.42 | 18,229.17 | 323.15 | 22,620.50 | 23,302.70 | 24,011.67 | 24,748.58 | 25,514.65 | 26,311.14 |
| 71 | 260.42 | 18,489.58 | 323.15 | 22,943.65 | 23,645.54 | 24,375.38 | 25,134.41 | 25,923.92 | 26,745.27 |
| 72 | 260.42 | 18,750.00 | 323.15 | 23,266.80 | 23,988.66 | 24,739.69 | 25,521.20 | 26,334.56 | 27,181.21 |
| 73 | 260.42 | 19,010.42 | 323.15 | 23,589.95 | 24,332.07 | 25,104.61 | 25,908.96 | 26,746.57 | 27,618.96 |
| 74 | 260.42 | 19,270.83 | 323.15 | 23,913.10 | 24,675.77 | 25,470.14 | 26,297.69 | 27,159.95 | 28,058.53 |
| 75 | 260.42 | 19,531.25 | 323.15 | 24,236.25 | 25,019.75 | 25,836.28 | 26,687.40 | 27,574.71 | 28,499.94 |
| 76 | 260.42 | 19,791.67 | 323.15 | 24,559.40 | 25,364.02 | 26,203.03 | 27,078.07 | 27,990.86 | 28,943.19 |
| 77 | 260.42 | 20,052.08 | 323.15 | 24,882.55 | 25,708.58 | 26,570.39 | 27,469.73 | 28,408.39 | 29,388.28 |
| 78 | 260.42 | 20,312.50 | 323.15 | 25,205.70 | 26,053.42 | 26,938.36 | 27,862.36 | 28,827.31 | 29,835.23 |
| 79 | 260.42 | 20,572.92 | 323.15 | 25,528.85 | 26,398.55 | 27,306.95 | 28,255.97 | 29,247.63 | 30,284.04 |
| 80 | 260.42 | 20,833.33 | 323.15 | 25,852.00 | 26,743.97 | 27,676.15 | 28,650.57 | 29,669.35 | 30,734.72 |
| 81 | 260.42 | 21,093.75 | 323.15 | 26,175.15 | 27,089.67 | 28,045.97 | 29,046.15 | 30,092.47 | 31,187.27 |
| 82 | 260.42 | 21,354.17 | 323.15 | 26,498.30 | 27,435.67 | 28,416.40 | 29,442.73 | 30,517.01 | 31,641.72 |
| 83 | 260.42 | 21,614.58 | 323.15 | 26,821.45 | 27,781.95 | 28,787.45 | 29,840.29 | 30,942.96 | 32,098.05 |
| 84 | 260.42 | 21,875.00 | 323.15 | 27,144.60 | 28,128.52 | 29,159.12 | 30,238.85 | 31,370.33 | 32,556.29 |
| 85 | 260.42 | 22,135.42 | 323.15 | 27,467.75 | 28,475.38 | 29,531.40 | 30,638.41 | 31,799.12 | 33,016.44 |
| 86 | 260.42 | 22,395.83 | 323.15 | 27,790.90 | 28,822.53 | 29,904.31 | 31,038.96 | 32,229.35 | 33,478.51 |
| 87 | 260.42 | 22,656.25 | 323.15 | 28,114.05 | 29,169.97 | 30,277.84 | 31,440.51 | 32,661.00 | 33,942.50 |
| 88 | 260.42 | 22,916.67 | 323.15 | 28,437.20 | 29,517.69 | 30,651.99 | 31,843.07 | 33,094.10 | 34,408.42 |
| 89 | 260.42 | 23,177.08 | 323.15 | 28,760.35 | 29,865.71 | 31,026.77 | 32,246.64 | 33,528.64 | 34,876.28 |
| 90 | 260.42 | 23,437.50 | 323.15 | 29,083.50 | 30,214.02 | 31,402.17 | 32,651.21 | 33,964.63 | 35,346.10 |
| 91 | 260.42 | 23,697.92 | 323.15 | 29,406.65 | 30,562.62 | 31,778.19 | 33,056.80 | 34,402.07 | 35,817.87 |
| 92 | 260.42 | 23,958.33 | 323.15 | 29,729.80 | 30,911.50 | 32,154.84 | 33,463.40 | 34,840.98 | 36,291.61 |
| 93 | 260.42 | 24,218.75 | 323.15 | 30,052.95 | 31,260.68 | 32,532.12 | 33,871.02 | 35,281.34 | 36,767.32 |
| 94 | 260.42 | 24,479.17 | 323.15 | 30,376.10 | 31,610.15 | 32,910.03 | 34,279.65 | 35,723.17 | 37,245.01 |
| 95 | 260.42 | 24,739.58 | 323.15 | 30,699.25 | 31,959.91 | 33,288.57 | 34,689.31 | 36,166.47 | 37,724.70 |
| 96 | 260.42 | 25,000.00 | 323.15 | 31,022.40 | 32,309.97 | 33,667.74 | 35,099.99 | 36,611.26 | 38,206.38 |
| 97 | 260.42 | 25,260.42 | 323.15 | 31,345.55 | 32,660.31 | 34,047.54 | 35,511.70 | 37,057.52 | 38,690.07 |
| 98 | 260.42 | 25,520.83 | 323.15 | 31,668.70 | 33,010.95 | 34,427.98 | 35,924.43 | 37,505.27 | 39,175.77 |
| 99 | 260.42 | 25,781.25 | 323.15 | 31,991.85 | 33,361.88 | 34,809.04 | 36,338.20 | 37,954.52 | 39,663.50 |
| 100 | 260.42 | 26,041.67 | 323.15 | 32,315.00 | 33,713.10 | 35,190.75 | 36,753.01 | 38,405.26 | 40,153.26 |
| 101 | 260.42 | 26,302.08 | 323.15 | 32,638.15 | 34,064.61 | 35,573.09 | 37,168.85 | 38,857.51 | 40,645.07 |
| 102 | 260.42 | 26,562.50 | 323.15 | 32,961.30 | 34,416.42 | 35,956.07 | 37,585.73 | 39,311.26 | 41,138.92 |
| 103 | 260.42 | 26,822.92 | 323.15 | 33,284.45 | 34,768.52 | 36,339.68 | 38,003.65 | 39,766.52 | 41,634.83 |
| 104 | 260.42 | 27,083.33 | 323.15 | 33,607.60 | 35,120.91 | 36,723.94 | 38,422.62 | 40,223.30 | 42,132.80 |
| 105 | 260.42 | 27,343.75 | 323.15 | 33,930.75 | 35,473.60 | 37,108.83 | 38,842.63 | 40,681.61 | 42,632.85 |
| 106 | 260.42 | 27,604.17 | 323.15 | 34,253.90 | 35,826.58 | 37,494.37 | 39,263.69 | 41,141.44 | 43,134.98 |
| 107 | 260.42 | 27,864.58 | 323.15 | 34,577.05 | 36,179.85 | 37,880.55 | 39,685.81 | 41,602.81 | 43,639.21 |
| 108 | 260.42 | 28,125.00 | 323.15 | 34,900.20 | 36,533.42 | 38,267.37 | 40,108.98 | 42,065.71 | 44,145.54 |
| 109 | 260.42 | 28,385.42 | 323.15 | 35,223.35 | 36,887.28 | 38,654.84 | 40,533.21 | 42,530.16 | 44,653.97 |
| 110 | 260.42 | 28,645.83 | 323.15 | 35,546.50 | 37,241.44 | 39,042.95 | 40,958.51 | 42,996.15 | 45,164.53 |
| 111 | 260.42 | 28,906.25 | 323.15 | 35,869.65 | 37,595.90 | 39,431.71 | 41,384.86 | 43,463.70 | 45,677.21 |
| 112 | 260.42 | 29,166.67 | 323.15 | 36,192.80 | 37,950.65 | 39,821.12 | 41,812.28 | 43,932.80 | 46,192.03 |
| 113 | 260.42 | 29,427.08 | 323.15 | 36,515.95 | 38,305.69 | 40,211.18 | 42,240.77 | 44,403.47 | 46,708.99 |
| 114 | 260.42 | 29,687.50 | 323.15 | 36,839.10 | 38,661.03 | 40,601.88 | 42,670.33 | 44,875.71 | 47,228.11 |
| 115 | 260.42 | 29,947.92 | 323.15 | 37,162.25 | 39,016.67 | 40,993.24 | 43,100.96 | 45,349.53 | 47,749.39 |
| 116 | 260.42 | 30,208.33 | 323.15 | 37,485.40 | 39,372.60 | 41,385.25 | 43,532.67 | 45,824.92 | 48,272.84 |
| 117 | 260.42 | 30,468.75 | 323.15 | 37,808.55 | 39,728.83 | 41,777.92 | 43,965.46 | 46,301.90 | 48,798.47 |
| 118 | 260.42 | 30,729.17 | 323.15 | 38,131.70 | 40,085.36 | 42,171.23 | 44,399.33 | 46,780.46 | 49,326.30 |
| 119 | 260.42 | 30,989.58 | 323.15 | 38,454.85 | 40,442.18 | 42,565.21 | 44,834.29 | 47,260.62 | 49,856.32 |
| 120 | 260.42 | 31,250.00 | 323.15 | 38,778.00 | 40,799.30 | 42,959.84 | 45,270.33 | 47,742.39 | 50,388.55 |
| 121 | 260.42 | 31,510.42 | 323.15 | 39,101.15 | 41,156.72 | 43,355.13 | 45,707.47 | 48,225.76 | 50,923.00 |
| 122 | 260.42 | 31,770.83 | 323.15 | 39,424.30 | 41,514.44 | 43,751.07 | 46,145.69 | 48,710.74 | 51,459.67 |
| 123 | 260.42 | 32,031.25 | 323.15 | 39,747.45 | 41,872.45 | 44,147.68 | 46,585.02 | 49,197.33 | 51,998.59 |
| 124 | 260.42 | 32,291.67 | 323.15 | 40,070.60 | 42,230.77 | 44,544.95 | 47,025.44 | 49,685.55 | 52,539.74 |
| 125 | 260.42 | 32,552.08 | 323.15 | 40,393.75 | 42,589.38 | 44,942.88 | 47,466.96 | 50,175.40 | 53,083.16 |
| 126 | 260.42 | 32,812.50 | 323.15 | 40,716.90 | 42,948.29 | 45,341.47 | 47,909.58 | 50,666.87 | 53,628.83 |
| 127 | 260.42 | 33,072.92 | 323.15 | 41,040.05 | 43,307.50 | 45,740.73 | 48,353.31 | 51,159.99 | 54,176.78 |
| 128 | 260.42 | 33,333.33 | 323.15 | 41,363.20 | 43,667.01 | 46,140.65 | 48,798.16 | 51,654.75 | 54,727.01 |
| 129 | 260.42 | 33,593.75 | 323.15 | 41,686.35 | 44,026.82 | 46,541.24 | 49,244.11 | 52,151.16 | 55,279.54 |
| 130 | 260.42 | 33,854.17 | 323.15 | 42,009.50 | 44,386.92 | 46,942.50 | 49,691.18 | 52,649.23 | 55,834.37 |
| 131 | 260.42 | 34,114.58 | 323.15 | 42,332.65 | 44,747.33 | 47,344.43 | 50,139.36 | 53,148.95 | 56,391.51 |
| 132 | 260.42 | 34,375.00 | 323.15 | 42,655.80 | 45,108.04 | 47,747.02 | 50,588.67 | 53,650.34 | 56,950.97 |

PAYMENT TABLE 4-continued

| | | | | | | | | | |
|---|---|---|---|---|---|---|---|---|---|
| 133 | 260.42 | 34,635.42 | 323.15 | 42,978.95 | 45,469.05 | 48,150.29 | 51,039.10 | 54,153.40 | 57,512.76 |
| 134 | 260.42 | 34,895.83 | 323.15 | 43,302.10 | 45,830.36 | 48,554.23 | 51,490.65 | 54,658.14 | 58,076.89 |
| 135 | 260.42 | 35,156.25 | 323.15 | 43,625.25 | 46,191.97 | 48,958.84 | 51,943.34 | 55,164.56 | 58,643.38 |
| 136 | 260.42 | 35,416.67 | 323.15 | 43,948.40 | 46,553.88 | 49,364.13 | 52,397.16 | 55,672.67 | 59,212.22 |
| 137 | 260.42 | 35,677.08 | 323.15 | 44,271.55 | 46,916.10 | 49,770.09 | 52,852.11 | 56,182.47 | 59,783.44 |
| 138 | 260.42 | 35,937.50 | 323.15 | 44,594.70 | 47,278.61 | 50,176.73 | 53,308.19 | 56,693.97 | 60,357.03 |
| 139 | 260.42 | 36,197.92 | 323.15 | 44,917.85 | 47,641.43 | 50,584.05 | 53,765.42 | 57,207.18 | 60,933.01 |
| 140 | 260.42 | 36,458.33 | 323.15 | 45,241.00 | 48,004.55 | 50,992.04 | 54,223.79 | 57,722.10 | 61,511.40 |
| 141 | 260.42 | 36,718.75 | 323.15 | 45,564.15 | 48,367.98 | 51,400.72 | 54,683.31 | 58,238.73 | 62,092.19 |
| 142 | 260.42 | 36,979.17 | 323.15 | 45,887.30 | 48,731.70 | 51,810.07 | 55,143.98 | 58,757.09 | 62,675.41 |
| 143 | 260.42 | 37,239.58 | 323.15 | 46,210.45 | 49,095.73 | 52,220.11 | 55,605.80 | 59,277.17 | 63,261.05 |
| 144 | 260.42 | 37,500.00 | 323.15 | 46,533.60 | 49,460.06 | 52,630.83 | 56,068.77 | 59,798.99 | 63,849.13 |
| 145 | 260.42 | 37,760.42 | 323.15 | 46,856.75 | 49,824.70 | 53,042.24 | 56,532.90 | 60,322.55 | 64,439.67 |
| 146 | 260.42 | 38,020.83 | 323.15 | 47,179.90 | 50,189.64 | 53,454.33 | 56,998.19 | 60,847.85 | 65,032.66 |
| 147 | 260.42 | 38,281.25 | 323.15 | 47,503.05 | 50,554.88 | 53,867.11 | 57,464.64 | 61,374.90 | 65,628.13 |
| 148 | 260.42 | 38,541.67 | 323.15 | 47,826.20 | 50,920.43 | 54,280.58 | 57,932.26 | 61,903.72 | 66,226.08 |
| 149 | 260.42 | 38,802.08 | 323.15 | 48,149.35 | 51,286.28 | 54,694.73 | 58,401.05 | 62,434.29 | 66,826.51 |
| 150 | 260.42 | 39,062.50 | 323.15 | 48,472.50 | 51,652.44 | 55,109.58 | 58,871.01 | 62,966.63 | 67,429.45 |
| 151 | 260.42 | 39,322.92 | 323.15 | 48,795.65 | 52,018.91 | 55,525.12 | 59,342.14 | 63,500.75 | 68,034.91 |
| 152 | 260.42 | 39,583.33 | 323.15 | 49,118.80 | 52,385.67 | 55,941.35 | 59,814.46 | 64,036.64 | 68,642.88 |
| 153 | 260.42 | 39,843.75 | 323.15 | 49,441.95 | 52,752.75 | 56,358.27 | 60,287.95 | 64,574.32 | 69,253.39 |
| 154 | 260.42 | 40,104.17 | 323.15 | 49,765.10 | 53,120.13 | 56,775.89 | 60,762.63 | 65,113.80 | 69,866.44 |
| 155 | 260.42 | 40,364.58 | 323.15 | 50,088.25 | 53,487.81 | 57,194.21 | 61,238.49 | 65,655.07 | 70,482.05 |
| 156 | 260.42 | 40,625.00 | 323.15 | 50,411.40 | 53,855.81 | 57,613.22 | 61,715.55 | 66,198.15 | 71,100.22 |
| 157 | 260.42 | 40,885.42 | 323.15 | 50,734.55 | 54,224.11 | 58,032.93 | 62,193.79 | 66,743.04 | 71,720.97 |
| 158 | 260.42 | 41,145.83 | 323.15 | 51,057.70 | 54,592.71 | 58,453.34 | 62,673.24 | 67,289.74 | 72,344.30 |
| 159 | 260.42 | 41,406.25 | 323.15 | 51,380.85 | 54,961.62 | 58,874.45 | 63,153.88 | 67,838.27 | 72,970.23 |
| 160 | 260.42 | 41,666.67 | 323.15 | 51,704.00 | 55,330.85 | 59,296.26 | 63,635.72 | 68,388.62 | 73,598.77 |
| 161 | 260.42 | 41,927.08 | 323.15 | 52,027.15 | 55,700.37 | 59,718.78 | 64,118.77 | 68,940.81 | 74,229.93 |
| 162 | 260.42 | 42,187.50 | 323.15 | 52,350.30 | 56,070.21 | 60,142.00 | 64,603.02 | 69,494.84 | 74,863.72 |
| 163 | 260.42 | 42,447.92 | 323.15 | 52,673.45 | 56,440.35 | 60,565.92 | 65,088.49 | 70,050.72 | 75,500.15 |
| 164 | 260.42 | 42,708.33 | 323.15 | 52,996.60 | 56,810.81 | 60,990.56 | 65,575.17 | 70,608.45 | 76,139.23 |
| 165 | 260.42 | 42,968.75 | 323.15 | 53,319.75 | 57,181.57 | 61,415.90 | 66,063.06 | 71,168.04 | 76,780.97 |
| 166 | 260.42 | 43,229.17 | 323.15 | 53,642.90 | 57,552.64 | 61,841.94 | 66,552.18 | 71,729.49 | 77,425.39 |
| 167 | 260.42 | 43,489.58 | 323.15 | 53,966.05 | 57,924.02 | 62,268.70 | 67,042.52 | 72,292.82 | 78,072.49 |
| 168 | 260.42 | 43,750.00 | 323.15 | 54,289.20 | 58,295.71 | 62,696.17 | 67,534.08 | 72,858.02 | 78,722.29 |
| 169 | 260.42 | 44,010.42 | 323.15 | 54,612.35 | 58,667.71 | 63,124.35 | 68,026.87 | 73,425.11 | 79,374.79 |
| 170 | 260.42 | 44,270.83 | 323.15 | 54,935.50 | 59,040.02 | 63,553.25 | 68,520.90 | 73,994.08 | 80,030.02 |
| 171 | 260.42 | 44,531.25 | 323.15 | 55,258.65 | 59,412.64 | 63,982.86 | 69,016.16 | 74,564.96 | 80,687.97 |
| 172 | 260.42 | 44,791.67 | 323.15 | 55,581.80 | 59,785.57 | 64,413.19 | 69,512.66 | 75,137.74 | 81,348.67 |
| 173 | 260.42 | 45,052.08 | 323.15 | 55,904.95 | 60,158.81 | 64,844.23 | 70,010.40 | 75,712.42 | 82,012.12 |
| 174 | 260.42 | 45,312.50 | 323.15 | 56,228.10 | 60,532.36 | 65,275.99 | 70,509.38 | 76,289.02 | 82,678.33 |
| 175 | 260.42 | 45,572.92 | 323.15 | 56,551.25 | 60,906.22 | 65,708.48 | 71,009.61 | 76,867.55 | 83,347.32 |
| 176 | 260.42 | 45,833.33 | 323.15 | 56,874.40 | 61,280.40 | 66,141.68 | 71,511.09 | 77,448.00 | 84,019.10 |
| 177 | 260.42 | 46,093.75 | 323.15 | 57,197.55 | 61,654.88 | 66,575.60 | 72,013.83 | 78,030.39 | 84,693.68 |
| 178 | 260.42 | 46,354.17 | 323.15 | 57,520.70 | 62,029.68 | 67,010.25 | 72,517.82 | 78,614.72 | 85,371.06 |
| 179 | 260.42 | 46,614.58 | 323.15 | 57,843.85 | 62,404.79 | 67,445.62 | 73,023.07 | 79,200.99 | 86,051.27 |
| 180 | 260.42 | 46,875.00 | 323.15 | 58,167.00 | 62,780.21 | 67,881.72 | 73,529.59 | 79,789.22 | 86,734.32 |
| 181 | 260.42 | 47,135.42 | 323.15 | 58,490.15 | 63,155.95 | 68,318.55 | 74,037.37 | 80,379.41 | 87,420.21 |
| 182 | 260.42 | 47,395.83 | 323.15 | 58,813.30 | 63,532.00 | 68,756.10 | 74,546.42 | 80,971.57 | 88,108.95 |
| 183 | 260.42 | 47,656.25 | 323.15 | 59,136.45 | 63,908.36 | 69,194.38 | 75,056.75 | 81,565.70 | 88,800.57 |
| 184 | 260.42 | 47,916.67 | 323.15 | 59,459.60 | 64,285.04 | 69,633.39 | 75,568.35 | 82,161.82 | 89,495.07 |
| 185 | 260.42 | 48,177.08 | 323.15 | 59,782.75 | 64,662.03 | 70,073.14 | 76,081.23 | 82,759.92 | 90,192.46 |
| 186 | 260.42 | 48,437.50 | 323.15 | 60,105.90 | 65,039.33 | 70,513.62 | 76,595.39 | 83,360.01 | 90,892.76 |
| 187 | 260.42 | 48,697.92 | 323.15 | 60,429.05 | 65,416.95 | 70,954.83 | 77,110.83 | 83,962.10 | 91,595.98 |
| 188 | 260.42 | 48,958.33 | 323.15 | 60,752.20 | 65,794.88 | 71,396.77 | 77,627.57 | 84,566.20 | 92,302.12 |
| 189 | 260.42 | 49,218.75 | 323.15 | 61,075.35 | 66,173.13 | 71,839.46 | 78,145.59 | 85,172.32 | 93,011.21 |
| 190 | 260.42 | 49,479.17 | 323.15 | 61,398.50 | 66,551.70 | 72,282.88 | 78,664.92 | 85,780.45 | 93,723.25 |
| 191 | 260.42 | 49,739.58 | 323.15 | 61,721.65 | 66,930.58 | 72,727.04 | 79,185.54 | 86,390.62 | 94,438.26 |
| 192 | 260.42 | 50,000.00 | 323.15 | 62,044.80 | 67,309.77 | 73,171.94 | 79,707.46 | 87,002.81 | 95,156.25 |
| 193 | 260.42 | 50,260.42 | 323.15 | 62,367.95 | 67,689.28 | 73,617.58 | 80,230.69 | 87,617.05 | 95,877.23 |
| 194 | 260.42 | 50,520.83 | 323.15 | 62,691.10 | 68,069.11 | 74,063.96 | 80,755.22 | 88,233.33 | 96,601.22 |
| 195 | 260.42 | 50,781.25 | 323.15 | 63,014.25 | 68,449.25 | 74,511.09 | 81,281.07 | 88,851.67 | 97,328.22 |
| 196 | 260.42 | 51,041.67 | 323.15 | 63,337.40 | 68,829.71 | 74,958.97 | 81,808.23 | 89,472.07 | 98,058.25 |
| 197 | 260.42 | 51,302.08 | 323.15 | 63,660.55 | 69,210.49 | 75,407.59 | 82,336.70 | 90,094.54 | 98,791.32 |
| 198 | 260.42 | 51,562.50 | 323.15 | 63,983.70 | 69,591.58 | 75,856.95 | 82,866.50 | 90,719.08 | 99,527.45 |
| 199 | 260.42 | 51,822.92 | 323.15 | 64,306.85 | 69,973.00 | 76,307.07 | 83,397.63 | 91,345.70 | 100,266.64 |
| 200 | 260.42 | 52,083.33 | 323.15 | 64,630.00 | 70,354.73 | 76,757.94 | 83,930.08 | 91,974.42 | 101,008.92 |
| 201 | 260.42 | 52,343.75 | 323.15 | 64,953.15 | 70,736.77 | 77,209.56 | 84,463.86 | 92,605.23 | 101,754.29 |
| 202 | 260.42 | 52,604.17 | 323.15 | 65,276.30 | 71,119.14 | 77,661.93 | 84,998.98 | 93,238.14 | 102,502.76 |
| 203 | 260.42 | 52,864.58 | 323.15 | 65,599.45 | 71,501.83 | 78,115.05 | 85,535.44 | 93,873.16 | 103,254.35 |
| 204 | 260.42 | 53,125.00 | 323.15 | 65,922.60 | 71,884.83 | 78,568.93 | 86,073.23 | 94,510.30 | 104,009.07 |
| 205 | 260.42 | 53,385.42 | 323.15 | 66,245.75 | 72,268.15 | 79,023.57 | 86,612.37 | 95,149.56 | 104,766.94 |
| 206 | 260.42 | 53,645.83 | 323.15 | 66,568.90 | 72,651.80 | 79,478.97 | 87,152.86 | 95,790.95 | 105,527.97 |
| 207 | 260.42 | 53,906.25 | 323.15 | 66,892.05 | 73,035.76 | 79,935.14 | 87,694.70 | 96,434.48 | 106,292.16 |
| 208 | 260.42 | 54,166.67 | 323.15 | 67,215.20 | 73,420.04 | 80,392.03 | 88,237.90 | 97,080.16 | 107,059.54 |
| 209 | 260.42 | 54,427.08 | 323.15 | 67,538.35 | 73,804.64 | 80,849.71 | 88,782.45 | 97,727.98 | 107,830.12 |
| 210 | 260.42 | 54,687.50 | 323.15 | 67,861.50 | 74,189.57 | 81,308.15 | 89,328.36 | 98,377.97 | 108,603.91 |
| 211 | 260.42 | 54,947.92 | 323.15 | 68,184.65 | 74,574.81 | 81,767.35 | 89,875.64 | 99,030.12 | 109,380.92 |
| 212 | 260.42 | 55,208.33 | 323.15 | 68,507.80 | 74,960.38 | 82,227.32 | 90,424.29 | 99,684.45 | 110,161.17 |

PAYMENT TABLE 4-continued

| | | | | | | | | | |
|---|---|---|---|---|---|---|---|---|---|
| 213 | 260.42 | 55,468.75 | 323.15 | 68,830.95 | 75,346.26 | 82,688.05 | 90,974.31 | 100,340.96 | 110,944.67 |
| 214 | 260.42 | 55,729.17 | 323.15 | 69,154.10 | 75,732.47 | 83,149.55 | 91,525.70 | 100,999.66 | 111,731.44 |
| 215 | 260.42 | 55,989.58 | 323.15 | 69,477.25 | 76,119.00 | 83,611.82 | 92,078.47 | 101,660.55 | 112,521.48 |
| 216 | 260.42 | 56,250.00 | 323.15 | 69,800.40 | 76,505.85 | 84,074.86 | 92,632.63 | 102,323.65 | 113,314.82 |
| 217 | 260.42 | 56,510.42 | 323.15 | 70,123.55 | 76,893.03 | 84,538.68 | 93,188.17 | 102,988.95 | 114,111.46 |
| 218 | 260.42 | 56,770.83 | 323.15 | 70,446.70 | 77,280.52 | 85,003.26 | 93,745.10 | 103,656.47 | 114,911.42 |
| 219 | 260.42 | 57,031.25 | 323.15 | 70,769.85 | 77,668.34 | 85,468.62 | 94,303.42 | 104,326.22 | 115,714.72 |
| 220 | 260.42 | 57,291.67 | 323.15 | 71,093.00 | 78,056.49 | 85,934.76 | 94,863.13 | 104,998.20 | 116,521.36 |
| 221 | 260.42 | 57,552.08 | 323.15 | 71,416.15 | 78,444.95 | 86,401.67 | 95,424.25 | 105,672.43 | 117,331.36 |
| 222 | 260.42 | 57,812.50 | 323.15 | 71,739.30 | 78,833.74 | 86,869.37 | 95,986.77 | 106,348.89 | 118,144.74 |
| 223 | 260.42 | 58,072.92 | 323.15 | 72,062.45 | 79,222.86 | 87,337.84 | 96,550.69 | 107,027.62 | 118,961.50 |
| 224 | 260.42 | 58,333.33 | 323.15 | 72,385.60 | 79,612.29 | 87,807.09 | 97,116.03 | 107,708.60 | 119,781.67 |
| 225 | 260.42 | 58,593.75 | 323.15 | 72,708.75 | 80,002.06 | 88,277.12 | 97,682.77 | 108,391.86 | 120,605.26 |
| 226 | 260.42 | 58,854.17 | 323.15 | 73,031.90 | 80,392.15 | 88,747.94 | 98,250.94 | 109,077.39 | 121,432.28 |
| 227 | 260.42 | 59,114.58 | 323.15 | 73,355.05 | 80,782.56 | 89,219.54 | 98,820.52 | 109,765.21 | 122,262.74 |
| 228 | 260.42 | 59,375.00 | 323.15 | 73,678.20 | 81,173.30 | 89,691.93 | 99,391.53 | 110,455.32 | 123,096.67 |
| 229 | 260.42 | 59,635.42 | 323.15 | 74,001.35 | 81,564.36 | 90,165.10 | 99,963.97 | 111,147.73 | 123,934.06 |
| 230 | 260.42 | 59,895.83 | 323.15 | 74,324.50 | 81,955.75 | 90,639.07 | 100,537.84 | 111,842.45 | 124,774.95 |
| 231 | 260.42 | 60,156.25 | 323.15 | 74,647.65 | 82,347.47 | 91,113.82 | 101,113.14 | 112,539.49 | 125,619.35 |
| 232 | 260.42 | 60,416.67 | 323.15 | 74,970.80 | 82,739.51 | 91,589.37 | 101,689.88 | 113,238.85 | 126,467.26 |
| 233 | 260.42 | 60,677.08 | 323.15 | 75,293.95 | 83,131.88 | 92,065.70 | 102,268.06 | 113,940.54 | 127,318.70 |
| 234 | 260.42 | 60,937.50 | 323.15 | 75,617.10 | 83,524.57 | 92,542.84 | 102,847.69 | 114,644.57 | 128,173.69 |
| 235 | 260.42 | 61,197.92 | 323.15 | 75,940.25 | 83,917.60 | 93,020.76 | 103,428.77 | 115,350.94 | 129,032.24 |
| 236 | 260.42 | 61,458.33 | 323.15 | 76,263.40 | 84,310.95 | 93,499.48 | 104,011.30 | 116,059.67 | 129,894.37 |
| 237 | 260.42 | 61,718.75 | 323.15 | 76,586.55 | 84,704.62 | 93,979.01 | 104,595.28 | 116,770.77 | 130,760.10 |
| 238 | 260.42 | 61,979.17 | 323.15 | 76,909.70 | 85,098.63 | 94,459.33 | 105,180.73 | 117,484.23 | 131,629.43 |
| 239 | 260.42 | 62,239.58 | 323.15 | 77,232.85 | 85,492.97 | 94,940.45 | 105,767.64 | 118,200.07 | 132,502.38 |
| 240 | 260.42 | 62,500.00 | 323.15 | 77,556.00 | 85,887.63 | 95,422.37 | 106,356.02 | 118,918.30 | 133,378.97 |
| 241 | 260.42 | 62,760.42 | 323.15 | 77,879.15 | 86,282.62 | 95,905.10 | 106,945.87 | 119,638.92 | 134,259.21 |
| 242 | 260.42 | 63,020.83 | 323.15 | 78,202.30 | 86,677.94 | 96,388.63 | 107,537.19 | 120,361.94 | 135,143.12 |
| 243 | 260.42 | 63,281.25 | 323.15 | 78,525.45 | 87,073.59 | 96,872.96 | 108,129.99 | 121,087.38 | 136,030.71 |
| 244 | 260.42 | 63,541.67 | 323.15 | 78,848.60 | 87,469.57 | 97,358.11 | 108,724.27 | 121,815.23 | 136,922.01 |
| 245 | 260.42 | 63,802.08 | 323.15 | 79,171.75 | 87,865.88 | 97,844.06 | 109,320.04 | 122,545.51 | 137,817.01 |
| 246 | 260.42 | 64,062.50 | 323.15 | 79,494.90 | 88,262.53 | 98,330.82 | 109,917.30 | 123,278.22 | 138,715.74 |
| 247 | 260.42 | 64,322.92 | 323.15 | 79,818.05 | 88,659.50 | 98,818.39 | 110,516.05 | 124,013.37 | 139,618.22 |
| 248 | 260.42 | 64,583.33 | 323.15 | 80,141.20 | 89,056.80 | 99,306.78 | 111,116.30 | 124,750.98 | 140,524.46 |
| 249 | 260.42 | 64,843.75 | 323.15 | 80,464.35 | 89,454.43 | 99,795.98 | 111,718.05 | 125,491.04 | 141,434.48 |
| 250 | 260.42 | 65,104.17 | 323.15 | 80,787.50 | 89,852.40 | 100,285.99 | 112,321.30 | 126,233.57 | 142,348.28 |
| 251 | 260.42 | 65,364.58 | 323.15 | 81,110.65 | 90,250.69 | 100,776.83 | 112,926.06 | 126,978.58 | 143,265.90 |
| 252 | 260.42 | 65,625.00 | 323.15 | 81,433.80 | 90,649.32 | 101,268.48 | 113,532.33 | 127,726.07 | 144,187.34 |
| 253 | 260.42 | 65,885.42 | 323.15 | 81,756.95 | 91,048.28 | 101,760.95 | 114,140.12 | 128,476.05 | 145,112.61 |
| 254 | 260.42 | 66,145.83 | 323.15 | 82,080.10 | 91,447.57 | 102,254.24 | 114,749.43 | 129,228.53 | 146,041.75 |
| 255 | 260.42 | 66,406.25 | 323.15 | 82,403.25 | 91,847.20 | 102,748.35 | 115,360.26 | 129,983.52 | 146,974.75 |
| 256 | 260.42 | 66,666.67 | 323.15 | 82,726.40 | 92,247.16 | 103,243.28 | 115,972.62 | 130,741.02 | 147,911.64 |
| 257 | 260.42 | 66,927.08 | 323.15 | 83,049.55 | 92,647.45 | 103,739.04 | 116,586.51 | 131,501.05 | 148,852.44 |
| 258 | 260.42 | 67,187.50 | 323.15 | 83,372.70 | 93,048.08 | 104,235.63 | 117,201.93 | 132,263.62 | 149,797.15 |
| 259 | 260.42 | 67,447.92 | 323.15 | 83,695.85 | 93,449.04 | 104,733.05 | 117,818.90 | 133,028.72 | 150,745.80 |
| 260 | 260.42 | 67,708.33 | 323.15 | 84,019.00 | 93,850.33 | 105,231.29 | 118,437.40 | 133,796.38 | 151,698.41 |
| 261 | 260.42 | 67,968.75 | 323.15 | 84,342.15 | 94,251.96 | 105,730.36 | 119,057.45 | 134,566.59 | 152,654.98 |
| 262 | 260.42 | 68,229.17 | 323.15 | 84,665.30 | 94,653.92 | 106,230.27 | 119,679.05 | 135,339.38 | 153,615.54 |
| 263 | 260.42 | 68,489.58 | 323.15 | 84,988.45 | 95,056.22 | 106,731.01 | 120,302.21 | 136,114.74 | 154,580.10 |
| 264 | 260.42 | 68,750.00 | 323.15 | 85,311.60 | 95,458.85 | 107,232.58 | 120,926.92 | 136,892.68 | 155,548.68 |
| 265 | 260.42 | 69,010.42 | 323.15 | 85,634.75 | 95,861.82 | 107,734.99 | 121,553.20 | 137,673.21 | 156,521.29 |
| 266 | 260.42 | 69,270.83 | 323.15 | 85,957.90 | 96,265.12 | 108,238.24 | 122,181.04 | 138,456.35 | 157,497.96 |
| 267 | 260.42 | 69,531.25 | 323.15 | 86,281.05 | 96,668.76 | 108,742.32 | 122,810.45 | 139,242.10 | 158,478.70 |
| 268 | 260.42 | 69,791.67 | 323.15 | 86,604.20 | 97,072.74 | 109,247.25 | 123,441.43 | 140,030.47 | 159,463.53 |
| 269 | 260.42 | 70,052.08 | 323.15 | 86,927.35 | 97,477.05 | 109,753.02 | 124,074.00 | 140,821.46 | 160,452.45 |
| 270 | 260.42 | 70,312.50 | 323.15 | 87,250.50 | 97,881.70 | 110,259.63 | 124,708.14 | 141,615.10 | 161,445.50 |
| 271 | 260.42 | 70,572.92 | 323.15 | 87,573.65 | 98,286.69 | 110,767.08 | 125,343.87 | 142,411.37 | 162,442.69 |
| 272 | 260.42 | 70,833.33 | 323.15 | 87,896.80 | 98,692.02 | 111,275.38 | 125,981.18 | 143,210.31 | 163,444.03 |
| 273 | 260.42 | 71,093.75 | 323.15 | 88,219.95 | 99,097.68 | 111,784.53 | 126,620.09 | 144,011.90 | 164,449.54 |
| 274 | 260.42 | 71,354.17 | 323.15 | 88,543.10 | 99,503.68 | 112,294.53 | 127,260.60 | 144,816.17 | 165,459.25 |
| 275 | 260.42 | 71,614.58 | 323.15 | 88,866.25 | 99,910.02 | 112,805.37 | 127,902.71 | 145,623.11 | 166,473.16 |
| 276 | 260.42 | 71,875.00 | 323.15 | 89,189.40 | 100,316.70 | 113,317.07 | 128,546.43 | 146,432.75 | 167,491.29 |
| 277 | 260.42 | 72,135.42 | 323.15 | 89,512.55 | 100,723.71 | 113,829.62 | 129,191.75 | 147,245.09 | 168,513.67 |
| 278 | 260.42 | 72,395.83 | 323.15 | 89,835.70 | 101,131.07 | 114,343.03 | 129,838.69 | 148,060.13 | 169,540.30 |
| 279 | 260.42 | 72,656.25 | 323.15 | 90,158.85 | 101,538.76 | 114,857.29 | 130,487.24 | 148,877.89 | 170,571.22 |
| 280 | 260.42 | 72,916.67 | 323.15 | 90,482.00 | 101,946.80 | 115,372.40 | 131,137.42 | 149,698.38 | 171,606.43 |
| 281 | 260.42 | 73,177.08 | 323.15 | 90,805.15 | 102,355.17 | 115,888.38 | 131,789.22 | 150,521.60 | 172,645.95 |
| 282 | 260.42 | 73,437.50 | 323.15 | 91,128.30 | 102,763.89 | 116,405.21 | 132,442.65 | 151,347.57 | 173,689.81 |
| 283 | 260.42 | 73,697.92 | 323.15 | 91,451.45 | 103,172.94 | 116,922.91 | 133,097.72 | 152,176.29 | 174,738.01 |
| 284 | 260.42 | 73,958.33 | 323.15 | 91,774.60 | 103,582.34 | 117,441.47 | 133,754.42 | 153,007.77 | 175,790.58 |
| 285 | 260.42 | 74,218.75 | 323.15 | 92,097.75 | 103,992.08 | 117,960.90 | 134,412.76 | 153,842.02 | 176,847.54 |
| 286 | 260.42 | 74,479.17 | 323.15 | 92,420.90 | 104,402.16 | 118,481.19 | 135,072.75 | 154,679.06 | 177,908.90 |
| 287 | 260.42 | 74,739.58 | 323.15 | 92,744.05 | 104,812.58 | 119,002.34 | 135,734.39 | 155,518.88 | 178,974.68 |
| 288 | 260.42 | 75,000.00 | 323.15 | 93,067.20 | 105,223.34 | 119,524.37 | 136,397.68 | 156,361.50 | 180,044.91 |
| 289 | 260.42 | 75,260.42 | 323.15 | 93,390.35 | 105,634.45 | 120,047.27 | 137,062.64 | 157,206.94 | 181,119.59 |
| 290 | 260.42 | 75,520.83 | 323.15 | 93,713.50 | 106,045.90 | 120,571.03 | 137,729.25 | 158,055.19 | 182,198.75 |
| 291 | 260.42 | 75,781.25 | 323.15 | 94,036.65 | 106,457.69 | 121,095.67 | 138,397.53 | 158,906.26 | 183,282.41 |
| 292 | 260.42 | 76,041.67 | 323.15 | 94,359.80 | 106,869.82 | 121,621.19 | 139,067.48 | 159,760.18 | 184,370.58 |

PAYMENT TABLE 4-continued

| | | | | | | | | | |
|---|---|---|---|---|---|---|---|---|---|
| 293 | 260.42 | 76,302.08 | 323.15 | 94,682.95 | 107,282.30 | 122,147.58 | 139,739.11 | 160,616.94 | 185,463.29 |
| 294 | 260.42 | 76,562.50 | 323.15 | 95,006.10 | 107,695.12 | 122,674.85 | 140,412.42 | 161,476.56 | 186,560.55 |
| 295 | 260.42 | 76,822.92 | 323.15 | 95,329.25 | 108,108.28 | 123,202.99 | 141,087.41 | 162,339.04 | 187,662.38 |
| 296 | 260.42 | 77,083.33 | 323.15 | 95,652.40 | 108,521.79 | 123,732.02 | 141,764.08 | 163,204.40 | 188,768.81 |
| 297 | 260.42 | 77,343.75 | 323.15 | 95,975.55 | 108,935.65 | 124,261.93 | 142,442.45 | 164,072.64 | 189,879.84 |
| 298 | 260.42 | 77,604.17 | 323.15 | 96,298.70 | 109,349.85 | 124,792.72 | 143,122.51 | 164,943.77 | 190,995.50 |
| 299 | 260.42 | 77,864.58 | 323.15 | 96,621.85 | 109,764.39 | 125,324.40 | 143,804.28 | 165,817.81 | 192,115.81 |
| 300 | 260.42 | 78,125.00 | 323.15 | 96,945.00 | 110,179.28 | 125,856.96 | 144,487.75 | 166,694.77 | 193,240.79 |
| 301 | 260.42 | 78,385.42 | 323.15 | 97,268.15 | 110,594.52 | 126,390.41 | 145,172.92 | 167,574.64 | 194,370.46 |
| 302 | 260.42 | 78,645.83 | 323.15 | 97,591.30 | 111,010.10 | 126,924.75 | 145,859.81 | 168,457.45 | 195,504.83 |
| 303 | 260.42 | 78,906.25 | 323.15 | 97,914.45 | 111,426.03 | 127,459.98 | 146,548.42 | 169,343.20 | 196,643.93 |
| 304 | 260.42 | 79,166.67 | 323.15 | 98,237.60 | 111,842.30 | 127,996.10 | 147,238.75 | 170,231.91 | 197,787.78 |
| 305 | 260.42 | 79,427.08 | 323.15 | 98,560.75 | 112,258.92 | 128,533.12 | 147,930.81 | 171,123.58 | 198,936.39 |
| 306 | 260.42 | 79,687.50 | 323.15 | 98,883.90 | 112,675.89 | 129,071.03 | 148,624.59 | 172,018.21 | 200,089.79 |
| 307 | 260.42 | 79,947.92 | 323.15 | 99,207.05 | 113,093.20 | 129,609.83 | 149,320.11 | 172,915.84 | 201,247.99 |
| 308 | 260.42 | 80,208.33 | 323.15 | 99,530.20 | 113,510.87 | 130,149.54 | 150,017.37 | 173,816.45 | 202,411.02 |
| 309 | 260.42 | 80,468.75 | 323.15 | 99,853.35 | 113,928.88 | 130,690.14 | 150,716.37 | 174,720.06 | 203,578.90 |
| 310 | 260.42 | 80,729.17 | 323.15 | 100,176.50 | 114,347.24 | 131,231.65 | 151,417.12 | 175,626.69 | 204,751.64 |
| 311 | 260.42 | 80,989.58 | 323.15 | 100,499.65 | 114,765.95 | 131,774.06 | 152,119.62 | 176,536.34 | 205,929.27 |
| 312 | 260.42 | 81,250.00 | 323.15 | 100,822.80 | 115,185.01 | 132,317.37 | 152,823.88 | 177,449.02 | 207,111.80 |
| 313 | 260.42 | 81,510.42 | 323.15 | 101,145.95 | 115,604.41 | 132,861.59 | 153,529.89 | 178,364.75 | 208,299.26 |
| 314 | 260.42 | 81,770.83 | 323.15 | 101,469.10 | 116,024.17 | 133,406.71 | 154,237.68 | 179,283.52 | 209,491.67 |
| 315 | 260.42 | 82,031.25 | 323.15 | 101,792.25 | 116,444.28 | 133,952.74 | 154,947.23 | 180,205.36 | 210,689.05 |
| 316 | 260.42 | 82,291.67 | 323.15 | 102,115.40 | 116,864.73 | 134,499.69 | 155,658.55 | 181,130.27 | 211,891.42 |
| 317 | 260.42 | 82,552.08 | 323.15 | 102,438.55 | 117,285.54 | 135,047.54 | 156,371.66 | 182,058.27 | 213,098.80 |
| 318 | 260.42 | 82,812.50 | 323.15 | 102,761.70 | 117,706.70 | 135,596.31 | 157,086.54 | 182,989.36 | 214,311.21 |
| 319 | 260.42 | 83,072.92 | 323.15 | 103,084.85 | 118,128.20 | 136,145.99 | 157,803.22 | 183,923.55 | 215,528.67 |
| 320 | 260.42 | 83,333.33 | 323.15 | 103,408.00 | 118,550.06 | 136,696.59 | 158,521.68 | 184,860.85 | 216,751.20 |
| 321 | 260.42 | 83,593.75 | 323.15 | 103,731.15 | 118,972.27 | 137,248.11 | 159,241.95 | 185,801.28 | 217,978.82 |
| 322 | 260.42 | 83,854.17 | 323.15 | 104,054.30 | 119,394.84 | 137,800.54 | 159,964.01 | 186,744.85 | 219,211.57 |
| 323 | 260.42 | 84,114.58 | 323.15 | 104,377.45 | 119,817.75 | 138,353.90 | 160,687.88 | 187,691.56 | 220,449.44 |
| 324 | 260.42 | 84,375.00 | 323.15 | 104,700.60 | 120,241.02 | 138,908.18 | 161,413.56 | 188,641.42 | 221,692.48 |
| 325 | 260.42 | 84,635.42 | 323.15 | 105,023.75 | 120,664.64 | 139,463.38 | 162,141.05 | 189,594.46 | 222,940.70 |
| 326 | 260.42 | 84,895.83 | 323.15 | 105,346.90 | 121,088.61 | 140,019.51 | 162,870.36 | 190,550.67 | 224,194.11 |
| 327 | 260.42 | 85,156.25 | 323.15 | 105,670.05 | 121,512.94 | 140,576.56 | 163,601.49 | 191,510.06 | 225,452.75 |
| 328 | 260.42 | 85,416.67 | 323.15 | 105,993.20 | 121,937.62 | 141,134.54 | 164,334.45 | 192,472.66 | 226,716.63 |
| 329 | 260.42 | 85,677.08 | 323.15 | 106,316.35 | 122,362.65 | 141,693.46 | 165,069.25 | 193,438.46 | 227,985.78 |
| 330 | 260.42 | 85,937.50 | 323.15 | 106,639.50 | 122,788.04 | 142,253.30 | 165,805.88 | 194,407.48 | 229,260.22 |
| 331 | 260.42 | 86,197.92 | 323.15 | 106,962.65 | 123,213.78 | 142,814.08 | 166,544.35 | 195,379.73 | 230,539.97 |
| 332 | 260.42 | 86,458.33 | 323.15 | 107,285.80 | 123,639.88 | 143,375.79 | 167,284.67 | 196,355.22 | 231,825.05 |
| 333 | 260.42 | 86,718.75 | 323.15 | 107,608.95 | 124,066.33 | 143,938.44 | 168,026.84 | 197,333.97 | 233,115.48 |
| 334 | 260.42 | 86,979.17 | 323.15 | 107,932.10 | 124,493.14 | 144,502.02 | 168,770.86 | 198,315.98 | 234,411.29 |
| 335 | 260.42 | 87,239.58 | 323.15 | 108,255.25 | 124,920.31 | 145,066.55 | 169,516.75 | 199,301.26 | 235,712.50 |
| 336 | 260.42 | 87,500.00 | 323.15 | 108,578.40 | 125,347.83 | 145,632.02 | 170,264.50 | 200,289.82 | 237,019.13 |
| 337 | 260.42 | 87,760.42 | 323.15 | 108,901.55 | 125,775.70 | 146,198.42 | 171,014.12 | 201,281.68 | 238,331.21 |
| 338 | 260.42 | 88,020.83 | 323.15 | 109,224.70 | 126,203.93 | 146,765.78 | 171,765.61 | 202,276.85 | 239,648.75 |
| 339 | 260.42 | 88,281.25 | 323.15 | 109,547.85 | 126,632.52 | 147,334.08 | 172,518.98 | 203,275.33 | 240,971.79 |
| 340 | 260.42 | 88,541.67 | 323.15 | 109,871.00 | 127,061.47 | 147,903.32 | 173,274.24 | 204,277.14 | 242,300.33 |
| 341 | 260.42 | 88,802.08 | 323.15 | 110,194.15 | 127,490.77 | 148,473.51 | 174,031.38 | 205,282.29 | 243,634.41 |
| 342 | 260.42 | 89,062.50 | 323.15 | 110,517.30 | 127,920.43 | 149,044.66 | 174,790.42 | 206,290.80 | 244,974.05 |
| 343 | 260.42 | 89,322.92 | 323.15 | 110,840.45 | 128,350.45 | 149,616.76 | 175,551.35 | 207,302.66 | 246,319.27 |
| 344 | 260.42 | 89,583.33 | 323.15 | 111,163.60 | 128,780.83 | 150,189.81 | 176,314.19 | 208,317.89 | 247,670.10 |
| 345 | 260.42 | 89,843.75 | 323.15 | 111,486.75 | 129,211.57 | 150,763.81 | 177,078.93 | 209,336.51 | 249,026.56 |
| 346 | 260.42 | 90,104.17 | 323.15 | 111,809.90 | 129,642.66 | 151,338.77 | 177,845.59 | 210,358.53 | 250,388.66 |
| 347 | 260.42 | 90,364.58 | 323.15 | 112,133.05 | 130,074.12 | 151,914.69 | 178,614.16 | 211,383.95 | 251,756.45 |
| 348 | 260.42 | 90,625.00 | 323.15 | 112,456.20 | 130,505.93 | 152,491.57 | 179,384.65 | 212,412.79 | 253,129.93 |
| 349 | 260.42 | 90,885.42 | 323.15 | 112,779.35 | 130,938.11 | 153,069.41 | 180,157.07 | 213,445.06 | 254,509.13 |
| 350 | 260.42 | 91,145.83 | 323.15 | 113,102.50 | 131,370.64 | 153,648.22 | 180,931.42 | 214,480.77 | 255,894.08 |
| 351 | 260.42 | 91,406.25 | 323.15 | 113,425.65 | 131,803.54 | 154,227.99 | 181,707.71 | 215,519.94 | 257,284.80 |
| 352 | 260.42 | 91,666.67 | 323.15 | 113,748.80 | 132,236.79 | 154,808.72 | 182,485.94 | 216,562.56 | 258,681.32 |
| 353 | 260.42 | 91,927.08 | 323.15 | 114,071.95 | 132,670.41 | 155,390.42 | 183,266.11 | 217,608.67 | 260,083.66 |
| 354 | 260.42 | 92,187.50 | 323.15 | 114,395.10 | 133,104.39 | 155,973.10 | 184,048.23 | 218,658.25 | 261,491.83 |
| 355 | 260.42 | 92,447.92 | 323.15 | 114,718.25 | 133,538.73 | 156,556.74 | 184,832.31 | 219,711.34 | 262,905.89 |
| 356 | 260.42 | 92,708.33 | 323.15 | 115,041.40 | 133,973.43 | 157,141.36 | 185,618.35 | 220,767.94 | 264,325.82 |
| 357 | 260.42 | 92,968.75 | 323.15 | 115,364.55 | 134,408.49 | 157,726.95 | 186,406.35 | 221,828.06 | 265,751.67 |
| 358 | 260.42 | 93,229.17 | 323.15 | 115,687.70 | 134,843.92 | 158,313.51 | 187,196.33 | 222,891.72 | 267,183.47 |
| 359 | 260.42 | 93,489.58 | 323.15 | 116,010.85 | 135,279.71 | 158,901.06 | 187,988.27 | 223,958.92 | 268,621.23 |
| 360 | 260.42 | 93,750.00 | 323.15 | 116,334.00 | 135,715.86 | 159,489.58 | 188,782.20 | 225,029.67 | 270,064.98 |

SYSTEMATIC INVESTMENT

| DATE | 6% ($) | 7% ($) | 8% ($) | 9% ($) | 10% ($) | 11% ($) | 12% ($) | TOTAL OUT OF POCKET COST ($) |
|---|---|---|---|---|---|---|---|---|
| 1 | 324.77 | 325.04 | 325.30 | 325.57 | 325.84 | 326.11 | 326.38 | 583.57 |
| 2 | 651.16 | 651.97 | 652.78 | 653.59 | 654.40 | 655.21 | 656.03 | 1,167.13 |
| 3 | 979.18 | 980.80 | 982.43 | 984.06 | 985.70 | 987.33 | 988.97 | 1,750.70 |

PAYMENT TABLE 4-continued

| | | | | | | | | |
|---|---|---|---|---|---|---|---|---|
| 4 | 1,308.84 | 1,311.56 | 1,314.29 | 1,317.02 | 1,319.75 | 1,322.49 | 1,325.24 | 2,334.27 |
| 5 | 1,640.15 | 1,644.25 | 1,648.35 | 1,652.47 | 1,656.60 | 1,660.73 | 1,664.87 | 2,917.83 |
| 6 | 1,973.11 | 1,978.87 | 1,984.65 | 1,990.44 | 1,996.24 | 2,002.07 | 2,007.90 | 3,501.40 |
| 7 | 2,307.75 | 2,315.45 | 2,323.18 | 2,330.94 | 2,338.72 | 2,346.53 | 2,354.36 | 4,084.97 |
| 8 | 2,644.05 | 2,653.99 | 2,663.97 | 2,673.99 | 2,684.05 | 2,694.15 | 2,704.29 | 4,668.53 |
| 9 | 2,982.04 | 2,994.51 | 3,007.04 | 3,019.62 | 3,032.26 | 3,044.96 | 3,057.71 | 5,252.10 |
| 10 | 3,321.71 | 3,337.01 | 3,352.39 | 3,367.84 | 3,383.38 | 3,398.99 | 3,414.67 | 5,835.67 |
| 11 | 3,663.09 | 3,681.51 | 3,700.04 | 3,718.68 | 3,737.41 | 3,756.25 | 3,775.20 | 6,419.23 |
| 12 | 4,006.17 | 4,028.02 | 4,050.01 | 4,072.14 | 4,094.40 | 4,116.80 | 4,139.33 | 7,002.80 |
| 13 | 4,350.96 | 4,376.56 | 4,402.32 | 4,428.25 | 4,454.36 | 4,480.65 | 4,507.11 | 7,586.37 |
| 14 | 4,697.49 | 4,727.12 | 4,756.97 | 4,787.04 | 4,817.33 | 4,847.83 | 4,878.56 | 8,169.93 |
| 15 | 5,045.74 | 5,079.73 | 5,113.99 | 5,148.52 | 5,183.31 | 5,218.38 | 5,253.73 | 8,753.50 |
| 16 | 5,395.73 | 5,434.40 | 5,473.39 | 5,512.70 | 5,552.35 | 5,592.33 | 5,632.65 | 9,337.07 |
| 17 | 5,747.48 | 5,791.13 | 5,835.18 | 5,879.62 | 5,924.46 | 5,969.71 | 6,015.36 | 9,920.63 |
| 18 | 6,100.98 | 6,149.95 | 6,199.39 | 6,249.29 | 6,299.68 | 6,350.54 | 6,401.89 | 10,504.20 |
| 19 | 6,456.25 | 6,510.86 | 6,566.02 | 6,621.74 | 6,678.02 | 6,734.87 | 6,792.29 | 11,087.77 |
| 20 | 6,813.30 | 6,873.88 | 6,935.10 | 6,996.97 | 7,059.51 | 7,122.72 | 7,186.60 | 11,671.33 |
| 21 | 7,172.13 | 7,239.01 | 7,306.64 | 7,375.02 | 7,444.18 | 7,514.12 | 7,584.84 | 12,254.90 |
| 22 | 7,532.76 | 7,606.27 | 7,680.65 | 7,755.91 | 7,832.06 | 7,909.11 | 7,987.07 | 12,838.47 |
| 23 | 7,895.19 | 7,975.68 | 8,057.16 | 8,139.65 | 8,223.17 | 8,307.72 | 8,393.33 | 13,422.03 |
| 24 | 8,259.43 | 8,347.24 | 8,436.18 | 8,526.28 | 8,617.54 | 8,709.99 | 8,803.64 | 14,005.60 |
| 25 | 8,625.49 | 8,720.96 | 8,817.72 | 8,915.80 | 9,015.20 | 9,115.94 | 9,218.06 | 14,589.17 |
| 26 | 8,993.38 | 9,096.87 | 9,201.81 | 9,308.24 | 9,416.17 | 9,525.62 | 9,636.62 | 15,172.73 |
| 27 | 9,363.12 | 9,474.97 | 9,588.46 | 9,703.62 | 9,820.48 | 9,939.05 | 10,059.37 | 15,756.30 |
| 28 | 9,734.70 | 9,855.28 | 9,977.69 | 10,101.97 | 10,228.16 | 10,356.27 | 10,486.34 | 16,339.87 |
| 29 | 10,108.14 | 10,237.80 | 10,369.51 | 10,503.31 | 10,639.23 | 10,777.31 | 10,917.59 | 16,923.43 |
| 30 | 10,483.44 | 10,622.56 | 10,763.95 | 10,907.66 | 11,053.74 | 11,202.22 | 11,353.15 | 17,507.00 |
| 31 | 10,860.63 | 11,009.56 | 11,161.01 | 11,315.04 | 11,471.69 | 11,631.02 | 11,793.06 | 18,090.57 |
| 32 | 11,239.70 | 11,398.81 | 11,560.72 | 11,725.48 | 11,893.14 | 12,063.75 | 12,237.37 | 18,674.13 |
| 33 | 11,620.66 | 11,790.34 | 11,963.10 | 12,138.99 | 12,318.09 | 12,500.44 | 12,686.13 | 19,257.70 |
| 34 | 12,003.53 | 12,184.15 | 12,368.16 | 12,555.61 | 12,746.58 | 12,941.14 | 13,139.37 | 19,841.27 |
| 35 | 12,388.31 | 12,580.26 | 12,775.92 | 12,975.35 | 13,178.65 | 13,385.88 | 13,597.14 | 20,424.83 |
| 36 | 12,775.02 | 12,978.68 | 13,186.39 | 13,398.24 | 13,614.31 | 13,834.70 | 14,059.50 | 21,008.40 |
| 37 | 13,163.66 | 13,379.43 | 13,599.61 | 13,824.30 | 14,053.61 | 14,287.63 | 14,526.47 | 21,591.97 |
| 38 | 13,554.24 | 13,782.51 | 14,015.57 | 14,253.56 | 14,496.56 | 14,744.71 | 14,998.12 | 22,175.53 |
| 39 | 13,946.78 | 14,187.94 | 14,434.32 | 14,686.03 | 14,943.21 | 15,205.98 | 15,474.48 | 22,759.10 |
| 40 | 14,341.28 | 14,595.74 | 14,855.85 | 15,121.75 | 15,393.58 | 15,671.48 | 15,955.61 | 23,342.67 |
| 41 | 14,737.75 | 15,005.92 | 15,280.19 | 15,560.74 | 15,847.70 | 16,141.25 | 16,441.55 | 23,926.23 |
| 42 | 15,136.21 | 15,418.49 | 15,707.36 | 16,003.02 | 16,305.61 | 16,615.32 | 16,932.34 | 24,509.80 |
| 43 | 15,536.65 | 15,833.46 | 16,137.38 | 16,448.61 | 16,767.33 | 17,093.74 | 17,428.05 | 25,093.37 |
| 44 | 15,939.10 | 16,250.86 | 16,570.27 | 16,897.55 | 17,232.90 | 17,576.55 | 17,928.71 | 25,676.93 |
| 45 | 16,343.56 | 16,670.69 | 17,006.04 | 17,349.85 | 17,702.35 | 18,063.78 | 18,434.38 | 26,260.50 |
| 46 | 16,750.05 | 17,092.97 | 17,444.72 | 17,805.55 | 18,175.72 | 18,555.48 | 18,945.10 | 26,844.07 |
| 47 | 17,158.56 | 17,517.71 | 17,886.33 | 18,264.67 | 18,653.02 | 19,051.68 | 19,460.94 | 27,427.63 |
| 48 | 17,569.12 | 17,944.94 | 18,330.87 | 18,727.23 | 19,134.31 | 19,552.43 | 19,981.93 | 28,011.20 |
| 49 | 17,981.73 | 18,374.65 | 18,778.38 | 19,193.25 | 19,619.60 | 20,057.78 | 20,508.13 | 28,594.77 |
| 50 | 18,396.41 | 18,806.87 | 19,228.88 | 19,662.78 | 20,108.94 | 20,567.75 | 21,039.59 | 29,178.33 |
| 51 | 18,813.16 | 19,241.61 | 19,682.37 | 20,135.82 | 20,602.36 | 21,082.40 | 21,576.37 | 29,761.90 |
| 52 | 19,231.99 | 19,678.89 | 20,138.89 | 20,612.41 | 21,099.89 | 21,601.77 | 22,118.51 | 30,345.47 |
| 53 | 19,652.91 | 20,118.72 | 20,598.46 | 21,092.58 | 21,601.57 | 22,125.90 | 22,666.08 | 30,929.03 |
| 54 | 20,075.94 | 20,561.11 | 21,061.08 | 21,576.35 | 22,107.42 | 22,654.83 | 23,219.12 | 31,512.60 |
| 55 | 20,501.09 | 21,006.09 | 21,526.79 | 22,063.74 | 22,617.49 | 23,188.61 | 23,777.69 | 32,096.17 |
| 56 | 20,928.36 | 21,453.66 | 21,995.61 | 22,554.80 | 23,131.81 | 23,727.29 | 24,341.85 | 32,679.73 |
| 57 | 21,357.77 | 21,903.84 | 22,467.55 | 23,049.53 | 23,650.42 | 24,270.90 | 24,911.65 | 33,263.30 |
| 58 | 21,789.32 | 22,356.65 | 22,942.64 | 23,547.98 | 24,173.35 | 24,819.49 | 25,487.15 | 33,846.87 |
| 59 | 22,223.04 | 22,812.10 | 23,420.90 | 24,050.16 | 24,700.64 | 25,373.12 | 26,068.40 | 34,430.43 |
| 60 | 22,658.92 | 23,270.20 | 23,902.34 | 24,556.11 | 25,232.32 | 25,931.82 | 26,655.47 | 35,014.00 |
| 61 | 23,096.98 | 23,730.98 | 24,386.99 | 25,065.85 | 25,768.43 | 26,495.64 | 27,248.41 | 35,597.57 |
| 62 | 23,537.23 | 24,194.45 | 24,874.88 | 25,579.42 | 26,309.01 | 27,064.63 | 27,847.27 | 36,181.13 |
| 63 | 23,979.68 | 24,660.61 | 25,366.01 | 26,096.84 | 26,854.10 | 27,638.83 | 28,452.13 | 36,764.70 |
| 64 | 24,424.34 | 25,129.50 | 25,860.43 | 26,618.14 | 27,403.73 | 28,218.30 | 29,063.03 | 37,348.27 |
| 65 | 24,871.23 | 25,601.13 | 26,358.13 | 27,143.35 | 27,957.93 | 28,803.08 | 29,680.04 | 37,931.83 |
| 66 | 25,320.35 | 26,075.50 | 26,859.16 | 27,672.50 | 28,516.76 | 29,393.22 | 30,303.22 | 38,515.40 |
| 67 | 25,771.72 | 26,552.64 | 27,363.52 | 28,205.62 | 29,080.24 | 29,988.77 | 30,932.64 | 39,098.97 |
| 68 | 26,225.34 | 27,032.57 | 27,871.25 | 28,742.73 | 29,648.42 | 30,589.78 | 31,568.34 | 39,682.53 |
| 69 | 26,681.24 | 27,515.29 | 28,382.36 | 29,283.88 | 30,221.33 | 31,196.30 | 32,210.41 | 40,266.10 |
| 70 | 27,139.41 | 28,000.84 | 28,896.88 | 29,829.08 | 30,799.02 | 31,808.38 | 32,858.89 | 40,849.67 |
| 71 | 27,599.87 | 28,489.21 | 29,414.83 | 30,378.37 | 31,381.52 | 32,426.06 | 33,513.86 | 41,433.23 |
| 72 | 28,062.64 | 28,980.43 | 29,936.24 | 30,931.78 | 31,968.88 | 33,049.42 | 34,175.38 | 42,016.80 |
| 73 | 28,527.72 | 29,474.52 | 30,461.12 | 31,489.34 | 32,561.13 | 33,678.48 | 34,843.52 | 42,600.37 |
| 74 | 28,995.12 | 29,971.49 | 30,989.49 | 32,051.09 | 33,158.31 | 34,313.31 | 35,518.34 | 43,183.93 |
| 75 | 29,464.86 | 30,471.36 | 31,521.40 | 32,617.04 | 33,760.47 | 34,953.96 | 36,199.90 | 43,767.50 |
| 76 | 29,936.95 | 30,974.14 | 32,056.84 | 33,187.25 | 34,367.65 | 35,600.49 | 36,888.28 | 44,351.07 |
| 77 | 30,411.40 | 31,479.86 | 32,595.86 | 33,761.72 | 34,979.89 | 36,252.94 | 37,583.55 | 44,934.63 |
| 78 | 30,888.22 | 31,988.53 | 33,138.47 | 34,340.51 | 35,597.24 | 36,911.37 | 38,285.76 | 45,518.20 |
| 79 | 31,367.43 | 32,500.16 | 33,684.70 | 34,923.64 | 36,219.72 | 37,575.83 | 38,995.00 | 46,101.77 |
| 80 | 31,849.03 | 33,014.78 | 34,234.57 | 35,511.14 | 36,847.40 | 38,246.39 | 39,711.33 | 46,685.33 |
| 81 | 32,333.05 | 33,532.40 | 34,788.10 | 36,103.05 | 37,480.30 | 38,923.10 | 40,434.83 | 47,268.90 |
| 82 | 32,819.48 | 34,053.04 | 35,345.33 | 36,699.39 | 38,118.48 | 39,606.00 | 41,165.56 | 47,852.47 |
| 83 | 33,308.34 | 34,576.72 | 35,906.27 | 37,300.21 | 38,761.98 | 40,295.17 | 41,903.60 | 48,436.03 |

PAYMENT TABLE 4-continued

| | | | | | | | | |
|---|---|---|---|---|---|---|---|---|
| 84 | 33,799.65 | 35,103.45 | 36,470.94 | 37,905.54 | 39,410.84 | 40,990.65 | 42,649.01 | 49,019.60 |
| 85 | 34,293.41 | 35,633.26 | 37,039.39 | 38,515.40 | 40,065.10 | 41,692.51 | 43,401.88 | 49,603.17 |
| 86 | 34,789.64 | 36,166.15 | 37,611.62 | 39,129.84 | 40,724.82 | 42,400.81 | 44,162.28 | 50,186.73 |
| 87 | 35,288.36 | 36,702.16 | 38,187.67 | 39,748.89 | 41,390.04 | 43,115.59 | 44,930.29 | 50,770.30 |
| 88 | 35,789.57 | 37,241.29 | 38,767.56 | 40,372.58 | 42,060.80 | 43,836.93 | 45,705.97 | 51,353.87 |
| 89 | 36,293.28 | 37,783.57 | 39,351.31 | 41,000.95 | 42,737.15 | 44,564.88 | 46,489.41 | 51,937.43 |
| 90 | 36,799.51 | 38,329.00 | 39,938.96 | 41,634.03 | 43,419.13 | 45,299.51 | 47,280.69 | 52,521.00 |
| 91 | 37,308.27 | 38,877.63 | 40,530.52 | 42,271.86 | 44,106.80 | 46,040.86 | 48,079.88 | 53,104.57 |
| 92 | 37,819.58 | 39,429.45 | 41,126.03 | 42,914.47 | 44,800.20 | 46,789.02 | 48,887.06 | 53,688.13 |
| 93 | 38,333.45 | 39,984.49 | 41,725.51 | 43,561.90 | 45,499.38 | 47,544.03 | 49,702.31 | 54,271.70 |
| 94 | 38,849.88 | 40,542.76 | 42,328.99 | 44,214.19 | 46,204.39 | 48,305.96 | 50,525.72 | 54,855.27 |
| 95 | 39,368.89 | 41,104.30 | 42,936.48 | 44,871.37 | 46,915.26 | 49,074.88 | 51,357.35 | 55,438.83 |
| 96 | 39,890.50 | 41,669.11 | 43,548.03 | 45,533.48 | 47,632.07 | 49,850.84 | 52,197.31 | 56,022.40 |
| 97 | 40,414.72 | 42,237.21 | 44,163.65 | 46,200.55 | 48,354.84 | 50,633.92 | 53,045.66 | 56,605.97 |
| 98 | 40,941.56 | 42,808.63 | 44,783.38 | 46,872.63 | 49,083.64 | 51,424.18 | 53,902.50 | 57,189.53 |
| 99 | 41,471.03 | 43,383.38 | 45,407.24 | 47,549.75 | 49,818.52 | 52,221.68 | 54,767.91 | 57,773.10 |
| 100 | 42,003.16 | 43,961.49 | 46,035.26 | 48,231.95 | 50,559.52 | 53,026.49 | 55,641.97 | 58,356.67 |
| 101 | 42,537.94 | 44,542.97 | 46,667.47 | 48,919.26 | 51,306.69 | 53,838.68 | 56,524.77 | 58,940.23 |
| 102 | 43,075.39 | 45,127.84 | 47,303.89 | 49,611.73 | 52,060.09 | 54,658.31 | 57,416.40 | 59,523.80 |
| 103 | 43,615.54 | 45,716.12 | 47,944.55 | 50,309.39 | 52,819.76 | 55,485.46 | 58,316.95 | 60,107.37 |
| 104 | 44,158.38 | 46,307.83 | 48,589.49 | 51,012.28 | 53,585.77 | 56,320.19 | 59,226.50 | 60,690.93 |
| 105 | 44,703.94 | 46,902.99 | 49,238.72 | 51,720.45 | 54,358.16 | 57,162.57 | 60,145.14 | 61,274.50 |
| 106 | 45,252.22 | 47,501.63 | 49,892.28 | 52,433.93 | 55,136.99 | 58,012.67 | 61,072.98 | 61,858.07 |
| 107 | 45,803.25 | 48,103.76 | 50,550.20 | 53,152.75 | 55,922.31 | 58,870.57 | 62,010.09 | 62,441.63 |
| 108 | 46,357.03 | 48,709.40 | 51,212.51 | 53,876.97 | 56,714.17 | 59,736.33 | 62,956.57 | 63,025.20 |
| 109 | 46,913.58 | 49,318.57 | 51,879.23 | 54,606.62 | 57,512.63 | 60,610.02 | 63,912.52 | 63,608.77 |
| 110 | 47,472.92 | 49,931.30 | 52,550.40 | 55,341.75 | 58,317.75 | 61,491.72 | 64,878.02 | 64,192.33 |
| 111 | 48,035.05 | 50,547.60 | 53,226.04 | 56,082.38 | 59,129.57 | 62,381.51 | 65,853.18 | 64,775.90 |
| 112 | 48,599.99 | 51,167.49 | 53,906.18 | 56,828.58 | 59,948.16 | 63,279.45 | 66,838.10 | 65,359.47 |
| 113 | 49,167.75 | 51,791.01 | 54,590.86 | 57,580.36 | 60,773.57 | 64,185.63 | 67,832.86 | 65,943.03 |
| 114 | 49,738.36 | 52,418.16 | 55,280.10 | 58,337.79 | 61,605.86 | 65,100.11 | 68,837.57 | 66,526.60 |
| 115 | 50,311.81 | 53,048.96 | 55,973.94 | 59,100.90 | 62,445.08 | 66,022.97 | 69,852.33 | 67,110.17 |
| 116 | 50,888.14 | 53,683.45 | 56,672.41 | 59,869.73 | 63,291.30 | 66,954.29 | 70,877.23 | 67,693.73 |
| 117 | 51,467.35 | 54,321.64 | 57,375.53 | 60,644.32 | 64,144.57 | 67,894.15 | 71,912.39 | 68,277.30 |
| 118 | 52,049.45 | 54,963.55 | 58,083.33 | 61,424.73 | 65,004.95 | 68,842.63 | 72,957.89 | 68,860.87 |
| 119 | 52,634.46 | 55,609.21 | 58,795.86 | 62,210.99 | 65,872.50 | 69,799.80 | 74,013.85 | 69,444.43 |
| 120 | 53,222.40 | 56,258.63 | 59,513.14 | 63,003.14 | 66,747.29 | 70,765.74 | 75,080.37 | 70,028.00 |
| 121 | 53,813.28 | 56,911.84 | 60,235.20 | 63,801.24 | 67,629.36 | 71,740.54 | 76,157.56 | 70,611.57 |
| 122 | 54,407.11 | 57,568.86 | 60,962.07 | 64,605.32 | 68,518.78 | 72,724.27 | 77,245.51 | 71,195.13 |
| 123 | 55,003.91 | 58,229.71 | 61,693.79 | 65,415.44 | 69,415.61 | 73,717.03 | 78,344.35 | 71,778.70 |
| 124 | 55,603.70 | 58,894.42 | 62,430.38 | 66,231.63 | 70,319.92 | 74,718.88 | 79,454.18 | 72,362.27 |
| 125 | 56,206.48 | 59,563.01 | 63,171.89 | 67,053.94 | 71,231.76 | 75,729.91 | 80,575.10 | 72,945.83 |
| 126 | 56,812.28 | 60,235.49 | 63,918.34 | 67,882.42 | 72,151.20 | 76,750.22 | 81,707.23 | 73,529.40 |
| 127 | 57,421.10 | 60,911.90 | 64,669.77 | 68,717.11 | 73,078.30 | 77,779.87 | 82,850.69 | 74,112.97 |
| 128 | 58,032.98 | 61,592.26 | 65,426.20 | 69,558.06 | 74,013.13 | 78,818.97 | 84,005.57 | 74,696.53 |
| 129 | 58,647.91 | 62,276.58 | 66,187.68 | 70,405.32 | 74,955.75 | 79,867.59 | 85,172.01 | 75,280.10 |
| 130 | 59,265.91 | 62,964.89 | 66,954.24 | 71,258.93 | 75,906.22 | 80,925.82 | 86,350.11 | 75,863.67 |
| 131 | 59,887.01 | 63,657.22 | 67,725.90 | 72,118.95 | 76,864.62 | 81,993.75 | 87,540.00 | 76,447.23 |
| 132 | 60,511.21 | 64,353.59 | 68,502.71 | 72,985.41 | 77,831.00 | 83,071.47 | 88,741.78 | 77,030.80 |
| 133 | 61,138.53 | 65,054.02 | 69,284.70 | 73,858.38 | 78,805.43 | 84,159.07 | 89,955.58 | 77,614.37 |
| 134 | 61,768.99 | 65,758.54 | 70,071.91 | 74,737.89 | 79,787.99 | 85,256.64 | 91,181.51 | 78,197.93 |
| 135 | 62,402.60 | 66,467.17 | 70,864.36 | 75,624.00 | 80,778.73 | 86,364.27 | 92,419.71 | 78,781.50 |
| 136 | 63,039.38 | 67,179.93 | 71,662.09 | 76,516.75 | 81,777.73 | 87,482.06 | 93,670.29 | 79,365.07 |
| 137 | 63,679.34 | 67,896.85 | 72,465.14 | 77,416.20 | 82,785.06 | 88,610.09 | 94,933.37 | 79,948.63 |
| 138 | 64,322.50 | 68,617.95 | 73,273.55 | 78,322.40 | 83,800.77 | 89,748.46 | 96,209.09 | 80,532.20 |
| 139 | 64,968.88 | 69,343.25 | 74,087.34 | 79,235.39 | 84,824.96 | 90,897.27 | 97,497.56 | 81,115.77 |
| 140 | 65,618.49 | 70,072.79 | 74,906.56 | 80,155.23 | 85,857.67 | 92,056.60 | 98,798.92 | 81,699.33 |
| 141 | 66,271.35 | 70,806.58 | 75,731.24 | 81,081.96 | 86,899.00 | 93,226.57 | 100,113.29 | 82,282.90 |
| 142 | 66,927.47 | 71,544.66 | 76,561.42 | 82,015.65 | 87,949.00 | 94,407.26 | 101,440.80 | 82,866.47 |
| 143 | 67,586.88 | 72,287.03 | 77,397.14 | 82,956.34 | 89,007.75 | 95,598.77 | 102,781.59 | 83,450.03 |
| 144 | 68,249.58 | 73,033.74 | 78,238.42 | 83,904.09 | 90,075.32 | 96,801.20 | 104,135.79 | 84,033.60 |
| 145 | 68,915.59 | 73,784.81 | 79,085.31 | 84,858.94 | 91,151.79 | 98,014.66 | 105,503.53 | 84,617.17 |
| 146 | 69,584.93 | 74,540.26 | 79,937.85 | 85,820.96 | 92,237.24 | 99,239.24 | 106,884.95 | 85,200.73 |
| 147 | 70,257.62 | 75,300.11 | 80,796.08 | 86,790.19 | 93,331.72 | 100,475.05 | 108,280.18 | 85,784.30 |
| 148 | 70,933.68 | 76,064.39 | 81,660.02 | 87,766.69 | 94,435.33 | 101,722.18 | 109,689.36 | 86,367.87 |
| 149 | 71,613.11 | 76,833.14 | 82,529.73 | 88,750.51 | 95,548.13 | 102,980.74 | 111,112.64 | 86,951.43 |
| 150 | 72,295.94 | 77,606.37 | 83,405.23 | 89,741.72 | 96,670.21 | 104,250.85 | 112,550.14 | 87,535.00 |
| 151 | 72,982.19 | 78,384.11 | 84,286.57 | 90,740.35 | 97,801.64 | 105,532.59 | 114,002.03 | 88,118.57 |
| 152 | 73,671.86 | 79,166.38 | 85,173.78 | 91,746.48 | 98,942.50 | 106,826.09 | 115,468.43 | 88,702.13 |
| 153 | 74,364.99 | 79,953.22 | 86,066.91 | 92,760.15 | 100,092.86 | 108,131.44 | 116,949.49 | 89,285.70 |
| 154 | 75,061.58 | 80,744.65 | 86,966.00 | 93,781.43 | 101,252.81 | 109,448.75 | 118,445.37 | 89,869.27 |
| 155 | 75,761.65 | 81,540.69 | 87,871.07 | 94,810.36 | 102,422.43 | 110,778.15 | 119,956.21 | 90,452.83 |
| 156 | 76,465.23 | 82,341.38 | 88,782.19 | 95,847.01 | 103,601.79 | 112,119.73 | 121,482.15 | 91,036.40 |
| 157 | 77,172.32 | 83,146.74 | 89,699.37 | 96,891.44 | 104,790.98 | 113,473.60 | 123,023.35 | 91,619.97 |
| 158 | 77,882.95 | 83,956.80 | 90,622.67 | 97,943.70 | 105,990.08 | 114,839.89 | 124,579.97 | 92,203.53 |
| 159 | 78,597.13 | 84,771.58 | 91,552.13 | 99,003.85 | 107,199.17 | 116,218.70 | 126,152.15 | 92,787.10 |
| 160 | 79,314.88 | 85,591.12 | 92,487.78 | 100,071.95 | 108,418.34 | 117,610.15 | 127,740.05 | 93,370.67 |
| 161 | 80,036.22 | 86,415.44 | 93,429.67 | 101,148.07 | 109,647.67 | 119,014.36 | 129,343.83 | 93,954.23 |
| 162 | 80,761.17 | 87,244.56 | 94,377.84 | 102,232.25 | 110,887.25 | 120,431.43 | 130,963.65 | 94,537.80 |
| 163 | 81,489.74 | 88,078.52 | 95,332.33 | 103,324.56 | 112,137.15 | 121,861.50 | 132,599.67 | 95,121.37 |

PAYMENT TABLE 4-continued

| | | | | | | | | |
|---|---|---|---|---|---|---|---|---|
| 164 | 82,221.95 | 88,917.35 | 96,293.18 | 104,425.07 | 113,397.47 | 123,304.68 | 134,252.05 | 95,704.93 |
| 165 | 82,957.83 | 89,761.07 | 97,260.44 | 105,533.83 | 114,668.29 | 124,761.08 | 135,920.95 | 96,288.50 |
| 166 | 83,697.38 | 90,609.71 | 98,234.15 | 106,650.91 | 115,949.70 | 126,230.84 | 137,606.54 | 96,872.07 |
| 167 | 84,440.64 | 91,463.30 | 99,214.34 | 107,776.37 | 117,241.79 | 127,714.06 | 139,308.99 | 97,455.63 |
| 168 | 85,187.60 | 92,321.87 | 100,201.08 | 108,910.26 | 118,544.65 | 129,210.89 | 141,028.46 | 98,039.20 |
| 169 | 85,938.31 | 93,185.45 | 101,194.39 | 110,052.66 | 119,858.37 | 130,721.43 | 142,765.13 | 98,622.77 |
| 170 | 86,692.77 | 94,054.07 | 102,194.32 | 111,203.63 | 121,183.03 | 132,245.83 | 144,519.16 | 99,206.33 |
| 171 | 87,450.99 | 94,927.75 | 103,200.92 | 112,363.23 | 122,518.73 | 133,784.19 | 146,290.73 | 99,789.90 |
| 172 | 88,213.02 | 95,806.53 | 104,214.23 | 113,531.53 | 123,865.56 | 135,336.66 | 148,080.02 | 100,373.47 |
| 173 | 88,978.85 | 96,690.44 | 105,234.30 | 114,708.59 | 125,223.62 | 136,903.36 | 149,887.20 | 100,957.03 |
| 174 | 89,748.51 | 97,579.50 | 106,261.17 | 115,894.48 | 126,592.99 | 138,484.42 | 151,712.46 | 101,540.60 |
| 175 | 90,522.01 | 98,473.75 | 107,294.88 | 117,089.26 | 127,973.78 | 140,079.97 | 153,555.96 | 102,124.17 |
| 176 | 91,299.39 | 99,373.22 | 108,335.48 | 118,293.01 | 129,366.07 | 141,690.15 | 155,417.90 | 102,707.73 |
| 177 | 92,080.65 | 100,277.93 | 109,383.02 | 119,505.78 | 130,769.96 | 143,315.09 | 157,298.46 | 103,291.30 |
| 178 | 92,865.82 | 101,187.92 | 110,437.55 | 120,727.64 | 132,185.55 | 144,954.92 | 159,197.83 | 103,874.87 |
| 179 | 93,654.92 | 102,103.22 | 111,499.10 | 121,958.67 | 133,612.94 | 146,609.79 | 161,116.19 | 104,458.43 |
| 180 | 94,447.96 | 103,023.85 | 112,567.73 | 123,198.94 | 135,052.23 | 148,279.82 | 163,053.73 | 105,042.00 |
| 181 | 95,244.96 | 103,949.86 | 113,643.49 | 124,448.50 | 136,503.50 | 149,965.17 | 165,010.65 | 105,625.57 |
| 182 | 96,045.95 | 104,881.27 | 114,726.42 | 125,707.44 | 137,966.88 | 151,665.96 | 166,987.14 | 106,209.13 |
| 183 | 96,850.95 | 105,818.11 | 115,816.56 | 126,975.82 | 139,442.44 | 153,382.34 | 168,983.39 | 106,792.70 |
| 184 | 97,659.97 | 106,760.42 | 116,913.98 | 128,253.71 | 140,930.31 | 155,114.46 | 170,999.61 | 107,376.27 |
| 185 | 98,473.03 | 107,708.22 | 118,018.71 | 129,541.19 | 142,430.57 | 156,862.45 | 173,035.99 | 107,959.83 |
| 186 | 99,290.17 | 108,661.56 | 119,130.80 | 130,838.32 | 143,943.33 | 158,626.47 | 175,092.73 | 108,543.40 |
| 187 | 100,111.38 | 109,620.45 | 120,250.31 | 132,145.18 | 145,468.70 | 160,406.66 | 177,170.04 | 109,126.97 |
| 188 | 100,936.71 | 110,584.94 | 121,377.29 | 133,461.85 | 147,006.79 | 162,203.17 | 179,268.12 | 109,710.53 |
| 189 | 101,766.15 | 111,555.05 | 122,511.77 | 134,788.38 | 148,557.69 | 164,016.14 | 181,387.18 | 110,294.10 |
| 190 | 102,599.75 | 112,530.83 | 123,653.82 | 136,124.87 | 150,121.51 | 165,845.73 | 183,527.44 | 110,877.67 |
| 191 | 103,437.52 | 113,512.29 | 124,803.49 | 137,471.38 | 151,698.36 | 167,692.10 | 185,689.09 | 111,461.23 |
| 192 | 104,279.47 | 114,499.48 | 125,960.81 | 138,827.99 | 153,288.36 | 169,555.39 | 187,872.36 | 112,044.80 |
| 193 | 105,125.63 | 115,492.43 | 127,125.86 | 140,194.77 | 154,891.61 | 171,435.76 | 190,077.47 | 112,628.37 |
| 194 | 105,976.03 | 116,491.17 | 128,298.67 | 141,571.81 | 156,508.21 | 173,333.37 | 192,304.62 | 113,211.93 |
| 195 | 106,830.67 | 117,495.74 | 129,479.30 | 142,959.17 | 158,138.29 | 175,248.37 | 194,554.05 | 113,795.50 |
| 196 | 107,689.59 | 118,506.16 | 130,667.80 | 144,356.94 | 159,781.95 | 177,180.92 | 196,825.97 | 114,379.07 |
| 197 | 108,552.80 | 119,522.48 | 131,864.22 | 145,765.19 | 161,439.31 | 179,131.19 | 199,120.62 | 114,962.63 |
| 198 | 109,420.33 | 120,544.73 | 133,068.62 | 147,184.00 | 163,110.48 | 181,099.34 | 201,438.20 | 115,546.20 |
| 199 | 110,292.20 | 121,572.95 | 134,281.05 | 148,613.45 | 164,795.58 | 183,085.53 | 203,778.97 | 116,129.77 |
| 200 | 111,168.43 | 122,607.16 | 135,501.56 | 150,053.63 | 166,494.72 | 185,089.93 | 206,143.14 | 116,713.33 |
| 201 | 112,049.04 | 123,647.40 | 136,730.21 | 151,504.60 | 168,208.02 | 187,112.70 | 208,530.95 | 117,296.90 |
| 202 | 112,934.05 | 124,693.71 | 137,967.04 | 152,966.46 | 169,935.59 | 189,154.01 | 210,942.64 | 117,880.47 |
| 203 | 113,823.48 | 125,746.13 | 139,212.13 | 154,439.28 | 171,677.57 | 191,214.03 | 213,378.45 | 118,464.03 |
| 204 | 114,717.37 | 126,804.68 | 140,465.51 | 155,923.15 | 173,434.06 | 193,292.94 | 215,838.62 | 119,047.60 |
| 205 | 115,615.72 | 127,869.41 | 141,727.26 | 157,418.15 | 175,205.18 | 195,390.90 | 218,323.38 | 119,631.17 |
| 206 | 116,518.56 | 128,940.35 | 142,997.41 | 158,924.36 | 176,991.07 | 197,508.10 | 220,833.00 | 120,214.73 |
| 207 | 117,425.92 | 130,017.54 | 144,276.03 | 160,441.86 | 178,791.84 | 199,644.70 | 223,367.71 | 120,798.30 |
| 208 | 118,337.82 | 131,101.01 | 145,563.17 | 161,970.75 | 180,607.61 | 201,800.89 | 225,927.77 | 121,381.87 |
| 209 | 119,254.27 | 132,190.80 | 146,858.90 | 163,511.11 | 182,438.52 | 203,976.85 | 228,513.43 | 121,965.43 |
| 210 | 120,175.31 | 133,286.95 | 148,163.26 | 165,063.01 | 184,284.68 | 206,172.75 | 231,124.94 | 122,549.00 |
| 211 | 121,100.95 | 134,389.49 | 149,476.32 | 166,626.56 | 186,146.23 | 208,388.77 | 233,762.57 | 123,132.57 |
| 212 | 122,031.22 | 135,498.46 | 150,798.13 | 168,201.83 | 188,023.29 | 210,625.12 | 236,426.58 | 123,716.13 |
| 213 | 122,966.14 | 136,613.91 | 152,128.76 | 169,788.92 | 189,916.00 | 212,881.96 | 239,117.23 | 124,299.70 |
| 214 | 123,905.74 | 137,735.86 | 153,468.26 | 171,387.91 | 191,824.47 | 215,159.49 | 241,834.78 | 124,883.27 |
| 215 | 124,850.03 | 138,864.35 | 154,816.68 | 172,998.89 | 193,748.85 | 217,457.90 | 244,579.51 | 125,466.83 |
| 216 | 125,799.05 | 139,999.43 | 156,174.10 | 174,621.96 | 195,689.27 | 219,777.37 | 247,351.69 | 126,050.40 |
| 217 | 126,752.81 | 141,141.13 | 157,540.56 | 176,257.20 | 197,645.86 | 222,118.11 | 250,151.59 | 126,633.97 |
| 218 | 127,711.34 | 142,289.48 | 158,916.14 | 177,904.70 | 199,618.75 | 224,480.31 | 252,979.48 | 127,217.53 |
| 219 | 128,674.66 | 143,444.54 | 160,300.88 | 179,564.56 | 201,608.08 | 226,864.15 | 255,835.66 | 127,801.10 |
| 220 | 129,642.80 | 144,606.34 | 161,694.86 | 181,236.87 | 203,613.99 | 229,269.86 | 258,720.40 | 128,384.67 |
| 221 | 130,615.78 | 145,774.91 | 163,098.13 | 182,921.72 | 205,636.62 | 231,697.61 | 261,633.98 | 128,968.23 |
| 222 | 131,593.63 | 146,950.30 | 164,510.75 | 184,619.20 | 207,676.10 | 234,147.61 | 264,576.71 | 129,551.80 |
| 223 | 132,576.36 | 148,132.54 | 165,932.80 | 186,329.42 | 209,732.58 | 236,620.08 | 267,548.85 | 130,135.37 |
| 224 | 133,564.01 | 149,321.68 | 167,364.32 | 188,052.46 | 211,806.19 | 239,115.21 | 270,550.72 | 130,718.93 |
| 225 | 134,556.59 | 150,517.76 | 168,805.39 | 189,788.43 | 213,897.08 | 241,633.21 | 273,582.61 | 131,302.50 |
| 226 | 135,554.14 | 151,720.82 | 170,256.06 | 191,537.42 | 216,005.40 | 244,174.29 | 276,644.82 | 131,886.07 |
| 227 | 136,556.68 | 152,930.89 | 171,716.41 | 193,299.52 | 218,131.29 | 246,738.67 | 279,737.65 | 132,469.63 |
| 228 | 137,564.23 | 154,148.02 | 173,186.49 | 195,074.84 | 220,274.90 | 249,326.55 | 282,861.41 | 133,053.20 |
| 229 | 138,576.82 | 155,372.25 | 174,666.37 | 196,863.48 | 222,436.36 | 251,938.16 | 286,016.40 | 133,636.77 |
| 230 | 139,594.47 | 156,603.63 | 176,156.11 | 198,665.53 | 224,615.84 | 254,573.71 | 289,202.95 | 134,220.33 |
| 231 | 140,617.20 | 157,842.18 | 177,655.79 | 200,481.09 | 226,813.48 | 257,233.41 | 292,421.36 | 134,803.90 |
| 232 | 141,645.06 | 159,087.96 | 179,165.47 | 202,310.27 | 229,029.44 | 259,917.50 | 295,671.96 | 135,387.47 |
| 233 | 142,678.05 | 160,341.01 | 180,685.21 | 204,153.18 | 231,263.86 | 262,626.18 | 298,955.06 | 135,971.03 |
| 234 | 143,716.20 | 161,601.37 | 182,215.08 | 206,009.90 | 233,516.90 | 265,359.70 | 302,270.99 | 136,554.60 |
| 235 | 144,759.55 | 162,869.08 | 183,755.15 | 207,880.55 | 235,788.72 | 268,118.28 | 305,620.08 | 137,138.17 |
| 236 | 145,808.11 | 164,144.18 | 185,305.49 | 209,765.22 | 238,079.47 | 270,902.14 | 309,002.66 | 137,721.73 |
| 237 | 146,861.92 | 165,426.73 | 186,866.17 | 211,664.04 | 240,389.31 | 273,711.52 | 312,419.07 | 138,305.30 |
| 238 | 147,920.99 | 166,716.75 | 188,437.24 | 213,577.09 | 242,718.39 | 276,546.66 | 315,869.64 | 138,888.87 |
| 239 | 148,985.37 | 168,014.30 | 190,018.80 | 215,504.49 | 245,066.89 | 279,407.78 | 319,354.72 | 139,472.43 |
| 240 | 150,055.06 | 169,319.42 | 191,610.89 | 217,446.35 | 247,434.96 | 282,295.13 | 322,874.65 | 140,056.00 |
| 241 | 151,130.10 | 170,632.15 | 193,213.60 | 219,402.77 | 249,822.76 | 285,208.95 | 326,429.78 | 140,639.57 |
| 242 | 152,210.52 | 171,952.54 | 194,827.00 | 221,373.86 | 252,230.46 | 288,149.48 | 330,020.46 | 141,223.13 |
| 243 | 153,296.33 | 173,280.63 | 196,451.15 | 223,359.74 | 254,658.22 | 291,116.96 | 333,647.04 | 141,806.70 |

PAYMENT TABLE 4-continued

| | | | | | | | | |
|---|---|---|---|---|---|---|---|---|
| 244 | 154,387.58 | 174,616.47 | 198,086.13 | 225,360.51 | 257,106.21 | 294,111.64 | 337,309.90 | 142,390.27 |
| 245 | 155,484.28 | 175,960.10 | 199,732.01 | 227,376.29 | 259,574.61 | 297,133.78 | 341,009.38 | 142,973.83 |
| 246 | 156,586.47 | 177,311.57 | 201,388.86 | 229,407.19 | 262,063.57 | 300,183.62 | 344,745.85 | 143,557.40 |
| 247 | 157,694.17 | 178,670.92 | 203,056.75 | 231,453.32 | 264,573.28 | 303,261.41 | 348,519.69 | 144,140.97 |
| 248 | 158,807.41 | 180,038.20 | 204,735.77 | 233,514.79 | 267,103.90 | 306,367.42 | 352,331.27 | 144,724.53 |
| 249 | 159,926.21 | 181,413.46 | 206,425.98 | 235,591.72 | 269,655.61 | 309,501.90 | 356,180.96 | 145,308.10 |
| 250 | 161,050.61 | 182,796.74 | 208,127.46 | 237,684.23 | 272,228.58 | 312,665.12 | 360,069.15 | 145,891.67 |
| 251 | 162,180.62 | 184,188.09 | 209,840.28 | 239,792.44 | 274,823.00 | 315,857.32 | 363,996.23 | 146,475.23 |
| 252 | 163,316.29 | 185,587.56 | 211,564.52 | 241,916.46 | 277,439.03 | 319,078.80 | 367,962.57 | 147,058.80 |
| 253 | 164,457.64 | 186,995.19 | 213,300.25 | 244,056.40 | 280,076.87 | 322,329.80 | 371,968.58 | 147,642.37 |
| 254 | 165,604.69 | 188,411.03 | 215,047.56 | 246,212.40 | 282,736.68 | 325,610.60 | 376,014.65 | 148,225.93 |
| 255 | 166,757.48 | 189,835.13 | 216,806.51 | 248,384.57 | 285,418.66 | 328,921.47 | 380,101.17 | 148,809.50 |
| 256 | 167,916.04 | 191,267.53 | 218,577.19 | 250,573.03 | 288,123.00 | 332,262.70 | 384,228.57 | 149,393.07 |
| 257 | 169,080.38 | 192,708.30 | 220,359.68 | 252,777.90 | 290,849.86 | 335,634.55 | 388,397.23 | 149,976.63 |
| 258 | 170,250.55 | 194,157.46 | 222,154.05 | 254,999.30 | 293,599.46 | 339,037.32 | 392,607.59 | 150,560.20 |
| 259 | 171,426.57 | 195,615.08 | 223,960.38 | 257,237.37 | 296,371.96 | 342,471.27 | 396,860.05 | 151,143.77 |
| 260 | 172,608.47 | 197,081.21 | 225,778.75 | 259,492.23 | 299,167.57 | 345,936.70 | 401,155.03 | 151,727.33 |
| 261 | 173,796.28 | 198,555.88 | 227,609.25 | 261,763.99 | 301,986.48 | 349,433.90 | 405,492.96 | 152,310.90 |
| 262 | 174,990.02 | 200,039.16 | 229,451.95 | 264,052.80 | 304,828.87 | 352,963.16 | 409,874.27 | 152,894.47 |
| 263 | 176,189.74 | 201,531.09 | 231,306.93 | 266,358.77 | 307,694.96 | 356,524.77 | 414,299.39 | 153,478.03 |
| 264 | 177,395.45 | 203,031.72 | 233,174.28 | 268,682.03 | 310,584.92 | 360,119.02 | 418,768.77 | 154,061.60 |
| 265 | 178,607.20 | 204,541.11 | 235,054.08 | 271,022.72 | 313,498.97 | 363,746.22 | 423,282.84 | 154,645.17 |
| 266 | 179,825.00 | 206,059.30 | 236,946.41 | 273,380.96 | 316,437.31 | 367,406.68 | 427,842.05 | 155,228.73 |
| 267 | 181,048.89 | 207,586.35 | 238,851.36 | 275,756.89 | 319,400.13 | 371,100.68 | 432,446.85 | 155,812.30 |
| 268 | 182,278.90 | 209,122.30 | 240,769.01 | 278,150.64 | 322,387.64 | 374,828.55 | 437,097.70 | 156,395.87 |
| 269 | 183,515.06 | 210,667.22 | 242,699.44 | 280,562.35 | 325,400.05 | 378,590.59 | 441,795.06 | 156,979.43 |
| 270 | 184,757.40 | 212,221.15 | 244,642.74 | 282,992.14 | 328,437.56 | 382,387.12 | 446,539.39 | 157,563.00 |
| 271 | 186,005.95 | 213,784.14 | 246,599.00 | 285,440.15 | 331,500.38 | 386,218.45 | 451,331.17 | 158,146.57 |
| 272 | 187,260.75 | 215,356.25 | 248,568.29 | 287,906.53 | 334,588.73 | 390,084.89 | 456,170.86 | 158,730.13 |
| 273 | 188,521.82 | 216,937.53 | 250,550.72 | 290,391.40 | 337,702.81 | 393,986.78 | 461,058.95 | 159,313.70 |
| 274 | 189,789.19 | 218,528.03 | 252,546.36 | 292,894.91 | 340,842.84 | 397,924.44 | 465,995.92 | 159,897.27 |
| 275 | 191,062.90 | 220,127.81 | 254,555.31 | 295,417.19 | 344,009.04 | 401,898.20 | 470,982.26 | 160,480.83 |
| 276 | 192,342.99 | 221,736.93 | 256,577.65 | 297,958.40 | 347,201.63 | 405,908.37 | 476,018.47 | 161,064.40 |
| 277 | 193,629.47 | 223,355.43 | 258,613.47 | 300,518.66 | 350,420.82 | 409,955.31 | 481,105.03 | 161,647.97 |
| 278 | 194,922.38 | 224,983.37 | 260,662.87 | 303,098.12 | 353,666.83 | 414,039.35 | 486,242.46 | 162,231.53 |
| 279 | 196,221.76 | 226,620.81 | 262,725.92 | 305,696.93 | 356,939.90 | 418,160.82 | 491,431.27 | 162,815.10 |
| 280 | 197,527.63 | 228,267.80 | 264,802.73 | 308,315.23 | 360,240.24 | 422,320.08 | 496,671.96 | 163,398.67 |
| 281 | 198,840.03 | 229,924.39 | 266,893.39 | 310,953.17 | 363,568.09 | 426,517.46 | 501,965.07 | 163,982.23 |
| 282 | 200,159.00 | 231,590.65 | 268,997.98 | 313,610.89 | 366,923.66 | 430,753.31 | 507,311.10 | 164,565.80 |
| 283 | 201,484.56 | 233,266.63 | 271,116.61 | 316,288.55 | 370,307.20 | 435,027.99 | 512,710.59 | 165,149.37 |
| 284 | 202,816.75 | 234,952.39 | 273,249.35 | 318,986.29 | 373,718.94 | 439,341.86 | 518,164.08 | 165,732.93 |
| 285 | 204,155.60 | 236,647.98 | 275,396.32 | 321,704.26 | 377,159.11 | 443,695.28 | 523,672.10 | 166,316.50 |
| 286 | 205,501.14 | 238,353.46 | 277,557.60 | 324,442.61 | 380,627.94 | 448,088.60 | 529,235.20 | 166,900.07 |
| 287 | 206,853.41 | 240,068.89 | 279,733.29 | 327,201.51 | 384,125.68 | 452,522.19 | 534,853.94 | 167,483.63 |
| 288 | 208,212.45 | 241,794.33 | 281,923.48 | 329,981.09 | 387,652.57 | 456,996.42 | 540,528.86 | 168,067.20 |
| 289 | 209,578.28 | 243,529.83 | 284,128.28 | 332,781.52 | 391,208.86 | 461,511.66 | 546,260.53 | 168,650.77 |
| 290 | 210,950.93 | 245,275.46 | 286,347.77 | 335,602.96 | 394,794.77 | 466,068.30 | 552,049.51 | 169,234.33 |
| 291 | 212,330.45 | 247,031.27 | 288,582.06 | 338,445.55 | 398,410.57 | 470,666.71 | 557,896.39 | 169,817.90 |
| 292 | 213,716.87 | 248,797.32 | 290,831.24 | 341,309.47 | 402,056.50 | 475,307.26 | 563,801.74 | 170,401.47 |
| 293 | 215,110.22 | 250,573.67 | 293,095.42 | 344,194.86 | 405,732.82 | 479,990.36 | 569,766.13 | 170,985.03 |
| 294 | 216,510.54 | 252,360.38 | 295,374.70 | 347,101.90 | 409,439.77 | 484,716.38 | 575,790.18 | 171,568.60 |
| 295 | 217,917.86 | 254,157.52 | 297,669.17 | 350,030.74 | 413,177.61 | 489,485.73 | 581,874.46 | 172,152.17 |
| 296 | 219,332.21 | 255,965.14 | 299,978.93 | 352,981.54 | 416,946.60 | 494,298.79 | 588,019.59 | 172,735.73 |
| 297 | 220,753.64 | 257,783.31 | 302,304.10 | 355,954.48 | 420,746.99 | 499,155.98 | 594,226.16 | 173,319.30 |
| 298 | 222,182.17 | 259,612.08 | 304,644.76 | 358,949.71 | 424,579.06 | 504,057.69 | 600,494.81 | 173,902.87 |
| 299 | 223,617.85 | 261,451.52 | 307,001.03 | 361,967.40 | 428,443.06 | 509,004.33 | 606,826.14 | 174,486.43 |
| 300 | 225,060.70 | 263,301.69 | 309,373.01 | 365,007.73 | 432,339.27 | 513,996.31 | 613,220.78 | 175,070.00 |
| 301 | 226,510.77 | 265,162.65 | 311,760.80 | 368,070.86 | 436,267.94 | 519,034.06 | 619,679.37 | 175,653.57 |
| 302 | 227,968.09 | 267,034.47 | 314,164.51 | 371,156.97 | 440,229.35 | 524,117.98 | 626,202.54 | 176,237.13 |
| 303 | 229,432.70 | 268,917.20 | 316,584.24 | 374,266.22 | 444,223.77 | 529,248.51 | 632,790.95 | 176,820.70 |
| 304 | 230,904.63 | 270,810.92 | 319,020.11 | 377,398.79 | 448,251.47 | 534,426.06 | 639,445.24 | 177,404.27 |
| 305 | 232,383.92 | 272,715.69 | 321,472.21 | 380,554.86 | 452,312.75 | 539,651.08 | 646,166.08 | 177,987.83 |
| 306 | 233,870.60 | 274,631.56 | 323,940.67 | 383,734.59 | 456,407.86 | 544,924.00 | 652,954.12 | 178,571.40 |
| 307 | 235,364.72 | 276,558.61 | 326,425.57 | 386,938.17 | 460,537.10 | 550,245.25 | 659,810.04 | 179,154.97 |
| 308 | 236,866.31 | 278,496.91 | 328,927.05 | 390,165.78 | 464,700.76 | 555,615.27 | 666,734.52 | 179,738.53 |
| 309 | 238,375.41 | 280,446.51 | 331,445.20 | 393,417.60 | 468,899.10 | 561,034.52 | 673,728.25 | 180,322.10 |
| 310 | 239,892.05 | 282,407.48 | 333,980.14 | 396,693.81 | 473,132.44 | 566,503.45 | 680,791.91 | 180,905.67 |
| 311 | 241,416.28 | 284,379.89 | 336,531.98 | 399,994.58 | 477,401.05 | 572,022.51 | 687,926.21 | 181,489.23 |
| 312 | 242,948.12 | 286,363.81 | 339,100.83 | 403,320.12 | 481,705.24 | 577,592.17 | 695,131.86 | 182,072.80 |
| 313 | 244,487.63 | 288,359.30 | 341,686.81 | 406,670.59 | 486,045.29 | 583,212.87 | 702,409.56 | 182,656.37 |
| 314 | 246,034.83 | 290,366.43 | 344,290.02 | 410,046.19 | 490,421.51 | 588,885.10 | 709,760.04 | 183,239.93 |
| 315 | 247,589.77 | 292,385.27 | 346,910.59 | 413,447.11 | 494,834.20 | 594,609.33 | 717,184.02 | 183,823.50 |
| 316 | 249,152.49 | 294,415.89 | 349,548.63 | 416,873.54 | 499,283.66 | 600,386.03 | 724,682.24 | 184,407.07 |
| 317 | 250,723.02 | 296,458.35 | 352,204.26 | 420,325.67 | 503,770.20 | 606,215.68 | 732,255.44 | 184,990.63 |
| 318 | 252,301.40 | 298,512.72 | 354,877.60 | 423,803.68 | 508,294.13 | 612,098.77 | 739,904.38 | 185,574.20 |
| 319 | 253,887.67 | 300,579.08 | 357,568.75 | 427,307.78 | 512,855.76 | 618,035.78 | 747,629.80 | 186,157.77 |
| 320 | 255,481.87 | 302,657.50 | 360,277.85 | 430,838.17 | 517,455.40 | 624,027.22 | 755,432.48 | 186,741.33 |
| 321 | 257,084.05 | 304,748.03 | 363,005.00 | 434,395.03 | 522,093.37 | 630,073.59 | 763,313.19 | 187,324.90 |
| 322 | 258,694.24 | 306,850.77 | 365,750.34 | 437,978.56 | 526,769.99 | 636,175.37 | 771,272.70 | 187,908.47 |
| 323 | 260,312.47 | 308,965.76 | 368,513.98 | 441,588.97 | 531,485.58 | 642,333.09 | 779,311.81 | 188,492.03 |

PAYMENT TABLE 4-continued

| | | | | | | | | |
|---|---|---|---|---|---|---|---|---|
| 324 | 261,938.80 | 311,093.10 | 371,296.05 | 445,226.47 | 536,240.47 | 648,547.26 | 787,431.31 | 189,075.60 |
| 325 | 263,573.26 | 313,232.84 | 374,096.66 | 448,891.24 | 541,034.99 | 654,818.39 | 795,632.01 | 189,659.17 |
| 326 | 265,215.89 | 315,385.07 | 376,915.94 | 452,583.50 | 545,869.45 | 661,147.00 | 803,914.71 | 190,242.73 |
| 327 | 266,866.74 | 317,549.85 | 379,754.02 | 456,303.45 | 550,744.21 | 667,533.63 | 812,280.24 | 190,826.30 |
| 328 | 268,525.84 | 319,727.26 | 382,611.01 | 460,051.29 | 555,659.59 | 673,978.80 | 820,729.42 | 191,409.87 |
| 329 | 270,193.23 | 321,917.37 | 385,487.06 | 463,827.25 | 560,615.93 | 680,483.05 | 829,263.10 | 191,993.43 |
| 330 | 271,868.96 | 324,120.26 | 388,382.28 | 467,631.53 | 565,613.57 | 687,046.92 | 837,882.11 | 192,577.00 |
| 331 | 273,553.07 | 326,335.99 | 391,296.80 | 471,464.34 | 570,652.86 | 693,670.96 | 846,587.31 | 193,160.57 |
| 332 | 275,245.61 | 328,564.66 | 394,230.75 | 475,325.90 | 575,734.14 | 700,355.73 | 855,379.57 | 193,744.13 |
| 333 | 276,946.60 | 330,806.32 | 397,184.25 | 479,216.42 | 580,857.77 | 707,101.77 | 864,259.74 | 194,327.70 |
| 334 | 278,656.10 | 333,061.06 | 400,157.45 | 483,136.11 | 586,024.09 | 713,909.65 | 873,228.72 | 194,911.27 |
| 335 | 280,374.14 | 335,328.95 | 403,150.48 | 487,085.21 | 591,233.47 | 720,779.93 | 882,287.39 | 195,494.83 |
| 336 | 282,100.78 | 337,610.07 | 406,163.45 | 491,063.92 | 596,486.26 | 727,713.19 | 891,436.65 | 196,078.40 |
| 337 | 283,836.05 | 339,904.50 | 409,196.51 | 495,072.47 | 601,782.82 | 734,710.01 | 900,677.39 | 196,661.97 |
| 338 | 285,580.00 | 342,212.31 | 412,249.79 | 499,111.09 | 607,123.52 | 741,770.96 | 910,010.55 | 197,245.53 |
| 339 | 287,332.66 | 344,533.58 | 415,323.43 | 503,180.00 | 612,508.73 | 748,896.64 | 919,437.04 | 197,829.10 |
| 340 | 289,094.09 | 346,868.39 | 418,417.55 | 507,279.42 | 617,938.81 | 756,087.64 | 928,957.79 | 198,412.67 |
| 341 | 290,864.33 | 349,216.83 | 421,532.31 | 511,409.59 | 623,414.14 | 763,344.55 | 938,573.75 | 198,996.23 |
| 342 | 292,643.42 | 351,578.96 | 424,667.83 | 515,570.73 | 628,935.10 | 770,667.99 | 948,285.87 | 199,579.80 |
| 343 | 294,431.40 | 353,954.87 | 427,824.25 | 519,763.09 | 634,502.07 | 778,058.56 | 958,095.11 | 200,163.37 |
| 344 | 296,228.32 | 356,344.65 | 431,001.72 | 523,986.89 | 640,115.43 | 785,516.88 | 968,002.44 | 200,746.93 |
| 345 | 298,034.23 | 358,748.36 | 434,200.37 | 528,242.36 | 645,775.57 | 793,043.56 | 978,008.85 | 201,330.50 |
| 346 | 299,849.16 | 361,166.09 | 437,420.34 | 532,529.75 | 651,482.87 | 800,639.24 | 988,115.32 | 201,914.07 |
| 347 | 301,673.18 | 363,597.93 | 440,661.78 | 536,849.30 | 657,237.74 | 808,304.54 | 998,322.85 | 202,497.63 |
| 348 | 303,506.31 | 366,043.95 | 443,924.83 | 541,201.24 | 663,040.57 | 816,040.11 | 1,008,632.46 | 203,081.20 |
| 349 | 305,348.61 | 368,504.24 | 447,209.63 | 545,585.83 | 668,891.75 | 823,846.59 | 1,019,045.17 | 203,664.77 |
| 350 | 307,200.11 | 370,978.89 | 450,516.34 | 550,003.29 | 674,791.69 | 831,724.63 | 1,029,562.00 | 204,248.33 |
| 351 | 309,060.88 | 373,467.97 | 453,845.08 | 554,453.89 | 680,740.79 | 839,674.89 | 1,040,184.00 | 204,831.90 |
| 352 | 310,930.95 | 375,971.56 | 457,196.02 | 558,937.87 | 686,739.48 | 847,698.02 | 1,050,912.22 | 205,415.47 |
| 353 | 312,810.37 | 378,489.77 | 460,569.30 | 563,455.48 | 692,788.15 | 855,794.70 | 1,061,747.73 | 205,999.03 |
| 354 | 314,699.19 | 381,022.66 | 463,965.06 | 568,006.97 | 698,887.23 | 863,965.59 | 1,072,691.58 | 206,582.60 |
| 355 | 316,597.45 | 383,570.33 | 467,383.47 | 572,592.59 | 705,037.13 | 872,211.39 | 1,083,744.88 | 207,166.17 |
| 356 | 318,505.20 | 386,132.85 | 470,824.66 | 577,212.61 | 711,238.28 | 880,532.77 | 1,094,908.71 | 207,749.73 |
| 357 | 320,422.50 | 388,710.33 | 474,288.80 | 581,867.28 | 717,491.11 | 888,930.44 | 1,106,184.18 | 208,333.30 |
| 358 | 322,349.37 | 391,302.84 | 477,776.03 | 586,556.86 | 723,796.05 | 897,405.08 | 1,117,572.40 | 208,916.87 |
| 359 | 324,285.89 | 393,910.48 | 481,286.51 | 591,281.61 | 730,153.52 | 905,957.40 | 1,129,074.51 | 209,500.43 |
| 360 | 326,232.08 | 396,533.32 | 484,820.39 | 596,041.79 | 736,563.98 | 914,588.12 | 1,140,691.64 | 210,084.00 |

The system using the Payment Table illustrates the opportunity to payoff a loan in a period of time less than that of a conventional loan. The acceleration is demonstrated by showing the principal value increasing to an amount greater than or equal to the original loan amount as demonstrated by the values shown in bold. For example, at a 12% rate of return, this occurs at month number 141. As can be seen, the system lowers the cost of the loan or reduces the total out of pocket cost to a level below the face amount of the loan according to the rate of return on the investment.

The row in the Payment Table corresponding with the date of the 250th month will be used further to illustrate the effect of reducing the cost of the loan. When the investment value reaches the loan amount and the total out of pocket costs exceed the investment value, the difference divided by the number of years to reach the stated loan value equals the net annual cost of the loan. The net annual cost divided by the loan amount equals the real annual percentage rate of the loan. The total out of pocket cost, i.e., the total interest paid plus the total investment amount, in this example equals $145,891.67 ($65,104.17+$100,285.99). The systematic investment value earning a rate of 2% for 250 months equals $100,285.99. The difference ($145,891.67$-100,285.99) equals a net cost of $45,605.68 to carry this loan for 250 months. The net interest rate of the loan can be calculated by taking the difference of $45,605.68 and dividing it by 250 months ($45,605.68÷250 months). This produces the cost per month of the loan equal to $182.42. The monthly cost multiplied by 12 months ($182.42×12 months) equals $2,189.07 of net annual interest expense. The net annual rate of interest paid divided by the original loan amount of $100,000.00 determines the net rate charged on the loan ($2,189.07÷$100,000). As shown, the system reduced the net rate of interest charged on the loan from 3.125% to 2.19% for 250 months. Hence, the system reduces the time required to payoff the loan in this example from a conventional loan period of 360 months down to 250 months. This savings can be calculated by the total monthly payment of $583.57 multiplied by the 110 month period eliminated in the acceleration process. Using the system the consumer saves $64,192.70 ($583.57 per month×110 months) with the same payment amount as a conventional loan.

The Payment Table also illustrates the payoff scenario in which the total out of pocket cost equals a sum less than the face amount of the loan. (See Example 4 below.) For example, the row for the 168th month in Payment Table compares a 5.75% conventional loan payment with an interest only loan rate of 3.125% and shows the total out of pocket cost equals $98,039.20. The investment value earning 8% for 168 months equals $100,201.08. This amount sufficiently pays off the original loan of $100,000.00. The difference between the time periods to payoff the loan results in an additional savings of 192 months (360 months–168 months). The amount of savings realized is calculated by taking the 192 months multiplied by the monthly payment of $583.57. The savings realized by using the system equals $112,045.44 ($583.57 per month×192 months). Example 4 illustrates this scenario where the borrower's out of pocket costs are less than the loan amount.

Example 4

Borrower's Out of Pocket Costs are Less than the Loan Amount

|       | Total Interest Paid on Interest Only Loan | $43,750.00 |
|-------|-------------------------------------------|------------|
| Plus: | Total Investment Payments                 | $54,289.20 |
|       | Total Out of Pocket Cost                  | $98,039.20 |
|       | Original Loan Value                       | $100,000.00 |
| Less: | Total Out of Pocket Cost                  | $98,039.20 |
|       | Amount Paid Under the Original Loan Value | $1,960.80 |

Another benefit of the present invention is its ability to generate income. (See Example 5 below.) Many individuals spend years paying off traditional mortgages. They are then faced to rely on retirement benefits and, or meager savings accumulated for income needs. The cost of goods and services continue to rise due to the effects of inflation. The rising prices challenge consumers who are not able to meet the expected standard of living increases. The present invention can also be used to generate immediate income from existing equity in a property. The system can extract equity from a property and require making just the interest only loan payment. The cash out refinance creates principal that can be used to invest for income. The difference between the investment income and the mortgage interest rate is positive cash flow. The property value continues to increase in value based upon the housing market appreciation. In addition, the ability to generate income and/or take withdrawals from the investment provides additional security to the borrower and/or lender to lessen the risk of default. Example 5 illustrates this income generating potential.

Example 5

Income Generating Potential

|               | Property Value                  | $125,000.00 |
|---------------|---------------------------------|-------------|
| Less:         | Outstanding Loans               | $0.00 |
|               | Total Equity                    | $125,000.00 |
|               | Loan Amount at                  |  |
|               | 80% Loan to Value               | $100,000.00 |
|               | Amount Available for Investment | $100,000.00 |
| Multiplied by:| Rate of Return of 6%            | 6% |
|               | Annual Income Invested at 6%    | $6,000.00 |
|               | Annual Income at 6%             | $6,000.00 |
| Less:         | Annual Cost of Interest         |  |
|               | Only Loan at 3.125%             | ($3,125.04) |
|               | Positive Annual Cash Flow       | $2,874.96 |
| Or            | Monthly Positive Cash Flow      | $239.58 |

Another benefit of the present invention is its ability to accumulate wealth. The accumulation of wealth can be illustrated by using the Payment Table in the row corresponding with the 360th month. Using the system for thirty years allows the principal to accumulate at a rate of 6%, which as illustrated within the Payment Table would equal $326,232.08. The remaining investment value after deducting the $100,000.00 loan amount equals $226,232.08 ($326,232.08−$100,000.00). The value that accumulates depends on the interest rate earned, the time period, and the amount of the systematic payments that are made to the investment. As the investment value equals or exceeds the loan balance the difference equals an investment sum that can be used to achieve any additional financial goal.

Moreover, the present invention can actually make mortgage payments self funding or self sustaining. The system becomes self sustaining when the investment value grows to a level where the interest earned on the investment exceeds the payment of the interest only loan. This can also be illustrated using the Payment Table. To find the value needed to achieve an income that will pay the interest only loan payment divide the amount of the annual interest charged on the interest only loan by the rate the investment accumulates. In this illustration the annual interest only loan payment of $3,125.00 divided by a 5% investment rate equals $62,500.00 ($3,125.00÷0.05) of investment needed to achieve a self sustaining payment. The row corresponding to the 142nd month and the column representing the 5% rate of interest illustrate the ability to create a self sustaining payment. The investment value corresponding to the rate of 5% for 142 months equals $62,675.41. The investment value of $62,675.41 earning 5% generates $3,133.77 per year. The earnings are sufficient to pay the interest only payments per year of $3,125.04 ($260.42 per month×12 months). Any amount of earnings on the investment at a higher interest rate will allow the investment to continue to accumulate. If the earnings occur at a lower rate on the same principal amount the investment value will be reduced.

The present invention also offers the consumer the flexibility to draw the interest only payment from the value of the investment. If a hardship should result the interest only loan payments can be withdrawn from the investment value. The investment value combined with the property value helps protect the consumer and lending institution from the risk of default.

Yet another benefit of the present invention is its ability to allow for a borrower to make the minimum payment to achieve the maximum affordable house. Many circumstances make the accumulation of principal or the elimination of debt less important than only paying an interest only payment. A short time horizon for borrowing money, having a lump sum of principal to invest, or a financial hardship could be reasons systematic payments are not made towards the investment. The interest only loan payment can be the minimum payment required.

The maximum amount of the loan can be increased to a level dictated by a debt to income ratio with the reduced payment of the present invention. The maximum interest only loan amount can be determined by taking the eligible annual conventional loan payment that can be afforded and dividing it by the interest rate of the interest only loan. To illustrate the maximum loan amount concept compare a conventional loan amount of $100,000.00 at a 5.75% fixed interest rate for thirty years with the present invention. The conventional loan payment equals $583.57 per month of principal and interest.

The annual loan payment amount equals $7,002.84 ($583.57×12). The annual payment divided by the interest only loan rate of 3.125% equals a maximum loan amount of $224,090.88 ($7,002.84÷0.03125). With the same monthly payment the system affords an additional $124,090.88 ($224,090.88−$100,000.00) of loan value over a conventional loan. This scenario could be a prudent solution for a consumer with a lump sum to invest. The lump sum reduces or eliminates the need to add systematic investments to payoff the loan. The lump sum could come from equity in a current property. Once the property is sold the equity could be invested to accumulate with the goal of paying off the loan in the future. Even if the economic conditions change and a reduction in the payment is required the principal from the investment can be applied to reduce the monthly payment. Short term financing is another situation that the maximum loan value concept would be a prudent solution. The larger loan value affords a home of higher value. The consumer continues to profit from the rise in equity value based on local housing market increases. In comparison the amount of principal reduction with a conventional loan during short time periods would be nominal. The value gained by affording a home of larger value can offset the nominal principal reduction of a conventional loan.

Hence, the present invention offers the flexibility of reducing the monthly payment. The amount allocated to accumulate in the investment component can be decreased to reduce the loan balance. The smaller loan balance results in a smaller monthly interest payment. The minimum payment can also be reduced by applying a lump sum payment or systematic amount towards the principal balance of the loan. The period of time to payoff the loan balance is extended if the lump sum or systematic amount is withdrawn from the investment.

Additionally, the present invention allows institutions to place a security interest or other restrictions on the additional collateral. Also, the financial institution may offer and/or require sound investment choices and may earn fee income on the interest only loan component as well as fee income generated from the investment deposits, the growth thereof, or the management of the investments.

Although it is envisioned that the primary application of the present invention will be in the mortgage market, it can be used equally as well in other lending/investment scenarios, particularly those involving static or appreciating collateral or long investment/loan time periods. Finally, while many of the benefits of the present invention have been described and illustrated herein, other benefits and advantages of the present invention, particularly in scenarios and relationships not specifically discussed or illustrated herein, may be readily recognized from the Payment Table and the relationship of the values illustrated therein.

The present invention encompasses a plurality of methods for establishing a combined collateral loan and investment system which accelerates paying off a mortgage while simultaneously generating wealth for a living mortgagor via an investment account. For example, in one embodiment, the mortgage will have a term and the collateral loan will have tangible collateral. The method uses loan amortization parameters to perform a comparative analysis. More specifically, the method comprises the steps of calculating, by a computer processor 12, a conventional loan amount at a given conventional rate and a given term, the conventional loan payment comprising a conventional interest payment and a conventional principal payment. The method also comprises the step of determining, by the computer processor 12, an amount of the interest only loan amount that is greater than the conventional loan amount for allocation as an initial lump sum for the investment account. Additionally, the method comprises the step of calculating, by the computer processor 12, a loan payment at the given interest only rate and the given term for an amount equal to the given conventional loan amount and the initial lump sum. The method further comprises the step of determining, by the computer processor 12, an amount of the conventional loan payment that is greater than the amount of the loan payment, the amount of the conventional loan payment that is greater being the amount for systematic and fixed deposits to the investment account.

This method further comprises the step of receiving, by a mortgagee, a plurality of systematic and fixed payments over the given term from the living mortgagor (Block 42), the amount of each of the plurality of systematic and fixed payments equaling the conventional loan payment. The method also comprises the step of dividing (Block 44), e.g., by the mortgagee, the systematic and fixed payment into a first portion and a second portion, the first portion being equal to the amount of the second interest only loan payment, and the second portion being equal to the amount of the systematic and fixed deposits to the investment account. In addition, the method comprises the steps of applying, e.g., by the mortgagee, the first portion of the systematic and fixed payment to satisfy the interest due on the mortgage (Block 46), applying, e.g., by the mortgagee, the second portion of the systematic and fixed payment to the investment account (Block 48), and applying, e.g., by the mortgagee, an amount received that is greater than the systematic and fixed payment and that is designated for the investment account to the investment account and an amount that is greater than the systematic and fixed payment that is designated to reduce the mortgage principal. Finally, the method provides for the steps of allowing the investment account to grow over time (Block 50) and applying a portion of the investment account to satisfy the mortgage (Block 52).

This method may also comprise the step of allowing the investment account to compound, the step of placing restrictions on the investment account, or the step of granting a security interest in the investment account to the mortgagee. Alternatively, this method may further comprise the step of granting a security interest in the investment account to a private mortgage insurer, the step of granting a security interest in the investment account to a second mortgagee, or the step of applying a portion of the investment account to satisfy the mortgage at a time after which the value of the investment account exceeds the mortgage but prior to the expiration of the mortgage. By way of yet another alternative, this method may have the additional step of providing a portion of the growth of the investment account to the mortgagee, the step of providing a portion of the growth of the investment account to an investment account manager, or the step of withdrawing a portion of the investment account to satisfy the interest due on the mortgage. In some embodiments, there may be present the additional step of waiting until the interest earned on the investment account for a particular period exceeds the systematic and fixed payment for that same period before withdrawing a portion of the investment account to pay the interest due on the mortgage.

In yet another alternative embodiment, the living mortgagor uses loan amortization parameters to perform a comparative analysis between a traditional amortized loan and the combined collateral loan and investment system 10, the living mortgagor deposits in the investment account an amount equal to the initial lump sum, and the living mortgagor makes a plurality of systematic and fixed payments over the given term to a mortgagee (Block 42), the amount of each of the plurality of systematic and fixed payments equaling the conventional loan payment, the systematic and fixed payment having a first portion and a second portion, the first portion being equal to the amount of the loan payment, and the second portion being equal to the amount of the systematic and fixed deposits to the investment account, the first portion of the systematic and fixed payment being allocated to satisfy the interest due on the mortgage (Block 46) and the second portion of the systematic and fixed payment being allocated to the investment account (Block 48). Additionally, the living mortgagor determines whether to deposit into the investment account any funds beyond the initial deposit and the second portion of the systematic and fixed payment, the living mortgagor determines whether to deposit any funds to reduce the mortgage, and the investment account is allowed to compound over time and a portion thereof is applied to satisfy the mortgage. In a further variant of this alternative method, a portion of the investment account is applied to satisfy the mortgage after the value of the investment account exceeds the mortgage or also prior to the expiration of the mortgage.

The present invention also encompasses a method for selecting a mortgage comprising the steps of determining the traditional amortization parameters for a conventional loan including specifying a desired amount of the conventional loan, specifying a desired term, determining a current interest rate that is available for the desired amount of the conventional loan and the desired term, specifying a number of plurality of traditional payments over the desired term, and calculating, by a computer processor 12, an amount for each of the plurality of traditional payments. The method also comprises the steps of determining interest only mortgage amortization parameters for the desired amount of the conventional loan including determining a current interest only rate for an interest only loan for the desired amount of the conventional loan for the desired term and calculating, by a computer processor 12, an amount for each of the plurality of interest only payments for the interest only loan. The method further comprises the steps of determining, by a computer processor 12, a maximum interest only loan amount at the interest only rate and for the desired term when the interest only payment equals the traditional payment, determining, by the computer processor 12, an amount of the interest only loan amount that is greater than the amount of the conventional loan for allocation as an initial lump sum investment, and determining the difference in the amount of the traditional payments and the amount of each of the interest only payments. Additionally, the method further comprises the steps of comparing, by a computer processor 12, the growth of the difference in the traditional payments and the interest only payments if the difference is invested at various given rates of return and over various given periods of time and given any initial lump sum investment, evaluating various investment vehicles currently available to satisfy a mortgagor's specified time to pay off the mortgage and the mortgagee's specific level of protection in the investment, and selecting the mortgage that meets the desires of the mortgagee and the mortgagor.

In an alternative embodiment of this method, the method further comprises the steps of calculating, by the computer processor 12, a loan payment at the interest only rate and the desired term for an amount equal to the amount of the conventional loan and the initial lump sum investment, and determining, by the computer processor 12, an amount of the traditional loan payment that is greater than the amount of loan payment, the amount of the traditional loan payment that is greater being the amount for systematic and fixed deposits to the investment.

The present invention also encompasses a method for increasing security to a lender and for accelerating the repayment of a loan by a borrower comprising the steps of calculating the amortization parameters for paying off the loan via periodic principal and interest payments at a given interest rate and over a given term, selecting a period of time to pay off the loan that is less than the given term, and selecting an investment, the investment being of the nature to provide unrestricted continuous collateral for the loan in an amount equal to or greater than any aggregated amounts that would otherwise be applied to reduce the principal balance of the loan. The method also comprises the steps of providing control of the investment to the lender until the loan is paid off, selecting an amount of an initial lump sum to be invested by the borrower in the investment, and selecting an amount that the borrower will periodically pay to the lender that will, in view of an expected rate of return of the investment, result in the investment growing to an amount equal to or greater than the principal balance of the loan in an amount of time that is less than or equal to the selected period of time to pay off the debt while satisfying any interest that is due on the loan. Finally, this method comprises the steps of waiting for the investment to grow to the amount of the principal balance of the loan, and applying at least a portion of the investment to satisfy the balance of the loan.

As compared to a traditional mortgagee offering a traditional mortgage to a traditional mortgagor, and the mortgagor offering a down payment to the mortgagee, the present invention also encompasses a method for decreasing risk to the mortgagee and accelerating the ability of a mortgagor to payoff a mortgage without using any additional assets of the mortgagee or the mortgagor other than the mortgagor's home equity and traditional mortgage payment. More specifically, a living mortgagor, who need not be able to qualify for life insurance, pension programs, or any tax free or tax reduced investments, grants a mortgage to a mortgagor, makes an initial investment in a collateral investment, and makes single periodic payments to the mortgagee, the single periodic payment consisting of an amount needed to satisfy the interest due on the mortgage. The method also comprises the steps of evaluating the time to pay off the mortgage in view of the collateral investment, determining the desired time to pay off the mortgage, and evaluating the collateral investment in view of the time to pay off the mortgage and in view of the security to the mortgagee. The method further comprises the steps of determining the investment that will provide for the growth of investment while simultaneously providing security of the investment during the desired time to pay off the mortgage, requiring the mortgagee to use the single periodic payment to satisfy the interest due on the mortgage, and granting the mortgagee a security interest in the collateral investment. Finally, the method comprises the steps of waiting until the balance of the collateral investment equals the principal balance of the mortgage and transferring an amount from the collateral investment that equals the principal balance of the mortgage to the mortgagee to pay off the mortgage. Program code 14 and a computer processor 12 may be utilized to facilitate these sets as needed.

As compared to a traditional mortgagee offering a traditional mortgage to a traditional mortgagor, the present invention also encompasses an alternative method for decreasing risk to the mortgagee and accelerating the ability of a mortgagor to payoff a mortgage without using any additional assets of the mortgagor other than a mortgagor's traditional mortgage payment. More specifically, a living mortgagor, who need not be able to qualify for life insurance, pension programs, or any tax free or tax reduced investments, grants a mortgage to a mortgagor, makes an initial investment in a collateral investment, and makes single periodic payments to the mortgagee, the single periodic payment consisting of a first amount needed to satisfy the interest due on the mortgage and a second amount. The method also comprises the steps of evaluating the desired time to pay off the mortgage in view of the desired value of the second amount and in further view of an expected rate of return of a collateral investment, determining the desired time to pay off the mortgage, and evaluating the desired value of the second amount in view of the desired time to pay off the mortgage and in further view of the expected rate of return of the collateral investment. The method further comprises the steps of determining the value of the second amount, evaluating collateral investment options in view of the desired time to pay off the mortgage, the value of the second amount, and the security provided to the mortgagee, and determining the collateral investment that will provide growth of the investment while providing security of the investment during the desired time to pay off the mortgage. Additionally, the method comprises the steps of requiring the mortgagee to use the first amount to satisfy the interest due on the mortgage, granting the mortgagee a security interest in the second amount and in the collateral investment, and requiring the mortgagor to invest the second amount in the collateral investment. Finally, the method comprises the steps of waiting until the balance of the collateral investment equals the principal balance of the mortgage, and transferring an amount from the collateral investment that equals the principal balance of the mortgage to the mortgagee to pay off the mortgage. Program code 14 and a computer processor 12 may be utilized to facilitate these sets as needed.

By way of yet another embodiment, the present a combined mortgage and investment system of the present invention may comprise a mortgage given by a mortgagee to a mortgagor, the mortgage having a balance, a specified interest rate, and a specified term, a mortgagee-controlled collateral investment of the mortgagor, the collateral investment having an initial lump sum balance and a rate of return to grow to greater than the balance of the mortgage prior to the expiration of the specified term of the mortgage, and a security interest granted to the mortgagee by the mortgagor in the mortgagee-controlled collateral investment of the mortgagor. Additionally, the system may have a computer processor having an investment performance program for determining the initial lump sum, wherein the mortgagee-controlled collateral investment provides collateral for the mortgage and provides for the accelerated pay off of the mortgage without any periodic principal payments.

While the present invention has been illustrated by description of various embodiments and while these embodiments have been described in considerable detail, it is not the intention of the applicant to restrict or in any way limit the scope of the claims to such detail. Additional advantages and modifications will readily appear to those skilled in the art. The invention in its broader aspect is, therefore, not limited to the specific details, representative system, apparatus, and method, and illustrative example shown and described. Accordingly, departures may be made from such details without departing from the spirit or scope of the applicant's general inventive concept.

What is claimed is:

1. A data processing system for managing a combined collateral loan and investment program, the collateral loan having tangible collateral, the system using loan amortization parameters to perform a comparative analysis, comprising:
a computer processor; and
program code configured to be executed by the computer processor to compare a conventional loan program to an interest only loan and systematic investment and lump sum program to determine an initial lump sum for an investment account and an amount for systematic and fixed deposits to the investment account.

2. The data processing system of claim 1 wherein the computer processor determines an amount of an interest only loan amount that is greater than a conventional loan amount for allocation as the initial lump sum for the investment account.

3. The data processing system of claim 2 wherein the computer processor calculates an interest only loan payment at a given interest only rate and a given term for an amount equal to a given conventional loan amount and the initial lump sum.

4. The data processing system of claim 3 wherein the computer processor determines an amount of a conventional loan payment that is greater than the amount of the interest only loan payment, the amount of the conventional loan payment that is greater being the amount for systematic and fixed deposits to the investment account.

5. The data processing system of claim 4 wherein the computer processor receives input data for loan and investment parameters including a market value of the tangible collateral, a loan to value ratio, a loan principal amount, a conventional loan term, a conventional loan annual interest rate, an interest only loan interest rate, an initial down payment, a periodic payment amount, an additional periodic principal payment amount, a number of annual periodic payments, a number of annual additional periodic principal payments, a balloon payment amount, a rate of return for the investment account, and an income tax rate.

6. The data processing system of claim 5 wherein the computer processor calculates output data for the comparative analysis of a conventional loan amortization program with the combined loan and investment program, output data for each of the conventional loan amortization program and the combined loan and investment program including principal borrowed, annual payments, total payments, annual interest rate, periodic payment amount, total interest paid, total amount invested in the investment account, minimum investment rate of return to reach a specified goal, projected investment account value, amount repaid, debt to equity ratio, total tax savings, annual cost of borrowing, investment account value after loan payoff, and term to reach loan payoff.

7. The data processing system of claim 6 wherein the investment account comprises an investment that generates returns over time, including fixed options, variable options, money market funds, certificate of deposits, mutual funds, fixed income investments, stocks, bonds, options, commodities, life insurance, annuities, tax free, tax advantaged investments, or any combination thereof.

8. A data processing system for managing a combined collateral loan and investment program, the collateral loan having tangible collateral, the system using loan amortization parameters to perform a comparative analysis, comprising:
a computer processor; and
program code configured to be executed by the computer processor to process financial loan and investment input data by calculating from the data interest and principal loan payments on a loan principal at a given rate and term, calculating investment performance data on periodic principal investment deposits at a given rate, calculating loan principal amortization parameters as a function of the investment performance data, and using said loan amortization parameters to perform a comparative analysis between a traditional amortized loan and said combined collateral loan and investment program, said loan principal amortization parameters including a loan amount, an anticipated down payment, a market value of the tangible collateral, a periodic loan balance, an accelerated loan repayment term, and a periodic investment program value.

9. The data processing system of claim 8 further comprising program code configured to be executed by the computer processor to calculate a minimum investment rate of return needed for the periodic investment program value to equal the loan amount within the accelerated loan repayment term.

10. The data processing system of claim 8 further comprising program code configured to be executed by the computer processor to process financial loan and investment data by dividing the interest and principal loan payment into an interest satisfaction portion and a principal reduction portion.

11. The data processing system of claim 10 further comprising program code configured to be executed by the computer processor to process financial loan and investment data by allocating the interest satisfaction portion to satisfy the requisite periodic interest payment for the loan.

12. The data processing system of claim 10 further comprising program code configured to be executed by the computer processor to process financial loan and investment data by allocating at least a portion of the principal reduction portion as the periodic principal investment deposit.

13. The data processing system of claim 8 further comprising program code configured to be executed by the computer processor to process financial loan and investment data by evaluating the investment performance data to determine when the loan principal may be reduced from the investment program.

14. The data processing system of claim 13 further comprising program code configured to be executed by the computer processor to process financial loan and investment data by evaluating a debt to equity ratio set by a lender.

15. A data processing system for managing a combined collateral loan and collateralizable investment program, the collateral loan having tangible collateral, the system using loan amortization parameters to perform a comparative analysis, comprising:
   a computer processor;
   an interest and principal loan payment calculator operably connected to the computer processor;
   an investment performance data calculator operably connected to the computer processor, said investment performance data calculator having program code configured to determine an investment account value, an investment account rate of return, an investment account initial deposit, an investment account systematic deposit, an investment account rate of interest, and an investment account frequency of compounding; and
   a loan principal amortization calculator operably connected to the computer processor;
   wherein said investment performance data calculator program code determines the investment account initial deposit and investment account systematic deposit by comparing a conventional loan to an interest only loan; and
   wherein said computer processor performs a comparative analysis of data from said investment performance data calculator and data from said loan principal amortization calculator.

16. The data processing system of claim 15 further comprising:
   an interest and principal divider operably connected to the computer processor; and
   an investment performance evaluator operably connected to the computer processor.

17. The data processing system of claim 16 further comprising:
   a user input, a display, a printer, a network interface, and mass storage operable connect to the computer processor; and
   an operating system adapted to run the computer processor.

18. A data processing system for managing a combined collateral loan and investment program, the collateral loan having tangible collateral, the system using loan amortization parameters to perform a comparative analysis, comprising:
   a computer processor for processing financial loan and investment data;
   a data storage means for storing the investment data on a storage medium;
   a means for calculating from the investment data a plurality of interest and principal loan payments for a loan principal at a particular rate and for a particular term;
   a means for calculating investment performance data for a plurality of periodic principal investment deposits;
   a means for calculating loan principal amortization parameters as a function of the investment performance data, said loan principal amortization parameters including a loan amount, an anticipated down payment, a market value of the tangible collateral, a periodic loan balance, an accelerated loan repayment term, and a periodic investment program value; and
   a means for using said loan amortization parameters to perform a comparative analysis between a traditional amortized loan and said combined collateral loan and investment program.

19. The data processing system of claim 18 further comprising:
   a means for dividing the plurality of interest and principal loan payments into an interest satisfaction portion and a principal reduction portion;
   a means for allocating the interest satisfaction portion to satisfy the interest due on the loan;
   a means for allocating at least a portion of the principal reduction portion as at least one of the plurality of periodic principal investment deposits and allowing the deposit to grow; and
   a means for evaluating the investment performance data to determine when the loan principal may be reduced from the principal investment deposits and the growth therefrom.

20. A method of establishing a combined collateral loan and investment system for accelerating paying off the collateral loan during the life of a borrower, the collateral loan having tangible collateral, the method using loan amortization parameters to perform a comparative analysis, comprising the steps of:
   setting a capitalized value of a loan;
   determining, by a computer processor, principal payments for a loan of said capitalized value at a given rate and given term;
   determining, by the computer processor, interest payments for a loan payment for said capital value;
   determining, by the computer processor, the performance of an investment growing with systematic and periodic payments of an amount similar to said principal payments and a lump sum payment;
   calculating, by the computer processor, amortization parameters of the capitalized loan value as a function of performance of said investment, said amortization parameters including an anticipated down payment, a market value of the tangible collateral, a periodic capitalized loan balance, an accelerated loan repayment term, and a periodic investment program value; and
   using said amortization parameters to perform a comparative analysis between a traditional amortized loan and said combined collateral loan and investment system.

21. The method of claim 20 further comprising the step of storing loan and investment data.

22. The method of claim 20 further comprising the steps of:
   dividing a combined loan and investment payment;
   allocating a first portion of said combined loan and investment payment to satisfy said interest payments; and
   allocating a second portion of said combined loan and investment payment to said periodic payments.

* * * * *

UNITED STATES PATENT AND TRADEMARK OFFICE
CERTIFICATE OF CORRECTION

PATENT NO. : 8,341,052 B2
APPLICATION NO. : 12/577581
DATED : December 25, 2012
INVENTOR(S) : Richard T. Combs It is certified that error appears in the above-identified patent and that said Letters Patent is hereby corrected as shown below:

Column 1, lines 26-28 "The number of ... increase annually." should be -- The number of ... increases annually. --

Column 3, line 53 "... or systematic withdraws to be ..." should be -- ... or systematic withdrawals to be ... --

Column 4, lines 9-10 "The availability of ... offer flexibility and ..." should be -- The availability of ... offers flexibility and ... --

Column 4, lines 43-44 "... withdraws for specified time periods ..." should be -- ... withdrawals for specified time periods ... --

Column 4, line 49 "... for systematic withdraw ..." should be -- ... for systematic withdrawals ... --

Column 4, lines 62-63 "... withdraw activity for ..." should be -- withdrawal activity for ... --

Column 5, line 55 "... investment goals a consumer." should be -- ... investment goals of a consumer. --

Column 6, line 41 "... system 10 will provided the ..." should be -- ... system 10 will provide the ... --

Column 7, line 66 "... calculation a maximum interest ..." should be -- ... calculation of a maximum interest ... --

Column 8, line 57 "... calculation the lump sum ..." should be -- ... calculation of the lump sum ... --

Signed and Sealed this
Twenty-sixth Day of March, 2013

Teresa Stanek Rea
*Acting Director of the United States Patent and Trademark Office*

Column 12, lines 14-15 "... reports, data sheets, comparison analysis ..." should be -- ... reports, data sheets, comparison analyses ... --

Column 107, line 40 "... lender to breakeven in a ..." should be -- ... lender to break even in a ... --

Column 127, line 2 text (after table) "... to payoff a loan in a period ..." should be -- ... to pay off a loan in a period ... --

Column 128, line 5 text (after table) "... time required to payoff the loan ..." should be -- ... time required to pay off the loan ... --

Column 128, line 58 "... to payoff the loan ..." should be -- ... to pay off the loan ... --

Column 134, line 18 "... grants a mortgage to a mortgagor, ..." should be -- ... grants a mortgage to a mortgagee, ... --

Column 135, lines 14-15 "... the present a combined mortgage and investment system of the present invention ..." should be -- ... a combined mortgage and investment system of the present invention ... --

Column 136, line 31 CLAIM 7 "... money market funds, certificate of deposits, mutual funds, ..." should be -- ... money market funds, certificates of deposit, mutual funds, ... --

Column 137, line 55 CLAIM 17 "... mass storage operable connect to the computer ..." should be -- ... mass storage operably connected to the computer ... --